(12) United States Patent
Isaacson et al.

(10) Patent No.: US 11,989,769 B2
(45) Date of Patent: May 21, 2024

(54) SYSTEM AND METHOD FOR PROVIDING SIMPLIFIED IN-STORE, PRODUCT-BASED AND RENTAL PAYMENT PROCESSES

(71) Applicant: Monticello Enterprises LLC, Huntingtown, MD (US)

(72) Inventors: Thomas M. Isaacson, Huntingtown, MD (US); Ryan Connell Durham, Anchorage, AK (US)

(73) Assignee: Monticello Enterprises LLC, Huntingtown, MD (US)

(*) Notice: Subject to any disclaimer, the term of this patent is extended or adjusted under 35 U.S.C. 154(b) by 41 days.

(21) Appl. No.: 17/177,846

(22) Filed: Feb. 17, 2021

(65) Prior Publication Data

US 2021/0174426 A1 Jun. 10, 2021

Related U.S. Application Data

(63) Continuation of application No. 16/884,416, filed on Jul. 14, 2020, now Pat. No. 11,080,777, which is a
(Continued)

(51) Int. Cl.
*G06Q 30/00* (2023.01)
*G06Q 20/40* (2012.01)
*G06Q 30/0601* (2023.01)

(52) U.S. Cl.
CPC ....... *G06Q 30/0633* (2013.01); *G06Q 20/401* (2013.01); *G06Q 30/0625* (2013.01); *G06Q 30/0635* (2013.01); *G06Q 30/0641* (2013.01)

(58) Field of Classification Search
CPC .... G06Q 30/00; G06Q 30/06; G06Q 30/0601; G06Q 30/0625; G06Q 30/0633; G06Q 30/0641
See application file for complete search history.

(56) References Cited

U.S. PATENT DOCUMENTS

| 4,837,842 A | 6/1989 | Holt |
| 4,912,654 A | 3/1990 | Wood |

(Continued)

FOREIGN PATENT DOCUMENTS

| CN | 101808633 | 8/2010 |
| CN | 102656599 | 9/2010 |

(Continued)

OTHER PUBLICATIONS

Baek, Hyochang, et al. "A model for detecting cryptocurrency transactions with discernible purpose." 2019 Eleventh International Conference on Ubiquitous and Future Networks (ICUFN). IEEE, 2019. (Year: 2019).*

(Continued)

*Primary Examiner* — Christopher B Seibert

(57) ABSTRACT

Disclosed is a system and method for receiving, at a user device, data from a near-field-communication tag on an object, initiating, based on the data, a browser on the user device, navigating, based on the data and via the browser, to a site and transmitting authorized payment data or other task to the site based on payment data retrieved from either the user device or a network entity. The data can be communicated from the browser to the site through an application programming interface. Any task can be performed as well such as opening a door, starting a car, or renting a parking space.

19 Claims, 31 Drawing Sheets

Related U.S. Application Data continuation of application No. 16/445,297, filed on Jun. 19, 2019, now Pat. No. 10,511,580, which is a continuation of application No. 16/420,785, filed on May 23, 2019, now Pat. No. 10,726,472, which is a continuation-in-part of application No. 16/176,425, filed on Oct. 31, 2018, now abandoned, which is a continuation-in-part of application No. 16/126,541, filed on Sep. 10, 2018, now Pat. No. 10,832,310, which is a continuation-in-part of application No. 15/947,395, filed on Apr. 6, 2018, now Pat. No. 10,152,756, which is a continuation-in-part of application No. 15/720,878, filed on Sep. 29, 2017, now Pat. No. 10,497,037, which is a continuation-in-part of application No. 15/678,664, filed on Aug. 16, 2017, now abandoned, which is a continuation of application No. 15/678,378, filed on Aug. 16, 2017, now Pat. No. 10,621,653, which is a continuation-in-part of application No. 15/602,868, filed on May 23, 2017, now Pat. No. 9,922,381, which is a continuation of application No. 15/600,599, filed on May 19, 2017, now Pat. No. 9,922,380, which is a continuation of application No. 15/600,388, filed on May 19, 2017, now Pat. No. 10,504,193, which is a continuation-in-part of application No. 15/586,999, filed on May 4, 2017, now Pat. No. 10,121,186, which is a continuation-in-part of application No. 15/269,451, filed on Sep. 19, 2016, now Pat. No. 9,767,520, which is a continuation of application No. 15/263,066, filed on Sep. 12, 2016, now Pat. No. 10,002,396, which is a continuation of application No. 15/018,954, filed on Feb. 9, 2016, now Pat. No. 9,734,526, which is a continuation of application No. 14/853,579, filed on Sep. 14, 2015, now Pat. No. 9,396,491, which is a continuation of application No. 14/822,368, filed on Aug. 10, 2015, now Pat. No. 9,292,871, which is a continuation of application No. 14/672,876, filed on Mar. 30, 2015, now Pat. No. 9,361,638, which is a continuation-in-part of application No. 14/230,864, filed on Mar. 31, 2014, now Pat. No. 9,430,794, said application No. 16/176,425 is a continuation of application No. 15/947,395, filed on Apr. 6, 2018, now Pat. No. 10,152,756, said application No. 15/720,878 is a continuation-in-part of application No. 15/263,057, filed on Sep. 12, 2016, now Pat. No. 9,824,408, which is a continuation of application No. 15/018,954, filed on Feb. 9, 2016, now Pat. No. 9,734,526, which is a continuation of application No. 14/853,579, filed on Sep. 14, 2015, now Pat. No. 9,396,491, which is a continuation of application No. 14/822,368, filed on Aug. 10, 2015, now Pat. No. 9,292,871, which is a continuation of application No. 14/672,876, filed on Mar. 30, 2015, now Pat. No. 9,361,638, which is a continuation-in-part of application No. 14/230,864, filed on Mar. 31, 2014, now Pat. No. 9,430,794, said application No. 16/420,785 is a continuation-in-part of application No. 16/279,685, filed on Feb. 19, 2019.

(60) Provisional application No. 62/725,855, filed on Aug. 31, 2018, provisional application No. 61/973,287, filed on Apr. 1, 2014, provisional application No. 61/972,843, filed on Mar. 31, 2014, provisional application No. 61/972,834, filed on Mar. 31, 2014, provisional application No. 61/972,848, filed on Mar. 31, 2014, provisional application No. 61/972,865, filed on Mar. 31, 2014, provisional application No. 61/972,879, filed on Mar. 31, 2014, provisional application No. 61/972,861, filed on Mar. 31, 2014, provisional application No. 61/972,878, filed on Mar. 31, 2014, provisional application No. 61/972,892, filed on Mar. 31, 2014, provisional application No. 61/972,890, filed on Mar. 31, 2014, provisional application No. 62/475,578, filed on Mar. 23, 2017, provisional application No. 62/450,900, filed on Jan. 26, 2017, provisional application No. 62/399,761, filed on Sep. 26, 2016, provisional application No. 62/560,261, filed on Sep. 19, 2017, provisional application No. 62/569,841, filed on Oct. 9, 2017, provisional application No. 62/809,170, filed on Feb. 22, 2019, provisional application No. 62/812,153, filed on Feb. 28, 2019, provisional application No. 62/818,440, filed on Mar. 14, 2019.

(56) References Cited

U.S. PATENT DOCUMENTS

| | | |
|---|---|---|
| 4,933,872 A | 6/1990 | Vandenberg |
| 5,524,182 A | 6/1996 | Chari |
| 5,608,819 A | 3/1997 | Ikeuchi |
| 5,644,656 A | 7/1997 | Akra |
| 5,678,677 A | 10/1997 | Baudat |
| 5,696,838 A | 12/1997 | Chiu |
| 5,797,031 A | 8/1998 | Shapiro et al. |
| 5,818,978 A | 10/1998 | Al-Hussein |
| 5,859,925 A | 1/1999 | Yaeger |
| 5,892,843 A | 4/1999 | Zhou |
| 5,924,042 A | 7/1999 | Sakamoto et al. |
| 5,960,411 A | 9/1999 | Hartman |
| 6,282,612 B1 | 8/2001 | Sakajiri et al. |
| 6,360,216 B1 | 3/2002 | Hennessey |
| 6,615,408 B1 | 9/2003 | Kaiser |
| 6,703,918 B1 | 3/2004 | Kita et al. |
| 6,731,788 B1 | 5/2004 | Agnihotri |
| 6,868,074 B1 | 3/2005 | Hanson |
| 6,922,675 B1 | 7/2005 | Chatterjee |
| 6,974,078 B1 | 12/2005 | Simon |
| 6,978,035 B2 | 12/2005 | Kawaguchi |
| 6,985,078 B2 | 1/2006 | Suzuki et al. |
| 7,014,107 B2 | 3/2006 | Singer |
| 7,028,020 B1 | 4/2006 | Keskar |
| 7,062,258 B1 | 6/2006 | Sini |
| 7,197,479 B1 | 3/2007 | Franciscus de Heer |
| 7,206,434 B2 | 4/2007 | Overton |
| 7,225,156 B2 | 5/2007 | Fisher |
| 7,230,653 B1 | 6/2007 | Overton |
| 7,327,885 B2 | 2/2008 | Divakaran |
| 7,328,176 B2 | 2/2008 | Tarvydas |
| 7,400,768 B1 | 7/2008 | Mayzlin |
| 7,433,845 B1 | 10/2008 | Flitcroft et al. |
| 7,641,111 B2 | 1/2010 | Adams et al. |
| 7,660,779 B2 | 2/2010 | Goodman et al. |
| 7,668,823 B2 | 2/2010 | Oldham |
| 7,769,771 B2 | 8/2010 | Ikeda |
| 7,778,994 B2 | 8/2010 | Raman |
| 7,792,705 B2 | 9/2010 | Bezos |
| 7,801,358 B2 | 9/2010 | Furmaniak |
| 7,853,583 B2 | 12/2010 | Schachter |
| 7,860,872 B2 | 12/2010 | Serjeantson |
| 7,877,295 B2 | 1/2011 | Mengerink et al. |
| 7,900,833 B2 | 3/2011 | Silverbrook et al. |
| 8,020,188 B2 | 9/2011 | Terasaki |
| 8,023,895 B2 | 9/2011 | Smith |
| 8,065,235 B2 | 11/2011 | Narayanswami et al. |
| 8,077,930 B2 | 12/2011 | Hauke |
| 8,086,495 B2 | 12/2011 | Ansari |
| 8,113,438 B1 | 2/2012 | Leason et al. |
| 8,126,806 B1 | 2/2012 | Dimartino et al. |
| 8,135,707 B2 | 3/2012 | Mika |

(56) References Cited

U.S. PATENT DOCUMENTS

| | | |
|---|---|---|
| 8,190,601 B2 | 5/2012 | Ahari |
| 8,196,131 B1 | 6/2012 | VonBehren et al. |
| 8,218,892 B2 | 7/2012 | Bober |
| 8,219,553 B2 | 7/2012 | Bedingfield, Sr. |
| 8,223,024 B1 | 7/2012 | Petrou |
| 8,224,851 B2 | 7/2012 | Banda |
| 8,239,370 B2 | 8/2012 | Wong |
| 8,255,323 B1 | 8/2012 | Casey |
| 8,296,196 B2 | 10/2012 | Martine |
| 8,296,280 B2 | 10/2012 | Mo |
| 8,301,632 B2 | 10/2012 | Bovenschulte |
| 8,311,957 B2 | 11/2012 | Kirshenbaum |
| 8,320,681 B2 | 11/2012 | Kim |
| 8,335,932 B2 | 12/2012 | VonBehren et al. |
| 8,341,036 B2 | 12/2012 | Hartman |
| 8,346,672 B1 | 1/2013 | Wiener et al. |
| 8,352,320 B2 | 1/2013 | MacDonald |
| 8,352,464 B2 | 1/2013 | Fotev |
| 8,355,997 B2 | 1/2013 | Kirshenbaum |
| 8,370,319 B1 | 2/2013 | Krynski |
| 8,370,330 B2 | 2/2013 | Priyadarshan |
| 8,370,431 B1 | 2/2013 | Wang et al. |
| 8,373,904 B2 | 2/2013 | Yano |
| 8,375,325 B2 | 2/2013 | Wuttke |
| 8,380,177 B2 | 2/2013 | Laracey |
| 8,380,570 B2 | 2/2013 | Agarwal |
| 8,406,528 B1 | 3/2013 | Hatwich |
| 8,406,792 B2 | 3/2013 | Aaltonen |
| 8,417,226 B2 | 4/2013 | Ahtisaari |
| 8,423,568 B2 | 4/2013 | Fuxman |
| 8,458,053 B1 | 6/2013 | Buron |
| 8,478,240 B2 | 7/2013 | Aaltonen |
| 8,489,582 B2 | 7/2013 | Jain |
| 8,504,419 B2 | 8/2013 | Priyadarshan |
| 8,510,309 B2 | 8/2013 | Priyadarshan |
| 8,510,658 B2 | 8/2013 | Priyadarshan |
| 8,515,966 B2 | 8/2013 | Jammalamadaka |
| 8,548,872 B1 | 10/2013 | Gupta |
| 8,577,813 B2 | 11/2013 | Weiss |
| 8,595,203 B2 | 11/2013 | Monahan |
| 8,595,851 B2 | 11/2013 | Aaltonen |
| 8,600,892 B2 | 12/2013 | Foster et al. |
| 8,631,122 B2 | 1/2014 | Kadam |
| 8,635,227 B2 | 1/2014 | Sankhla |
| 8,639,567 B2 | 1/2014 | Winters |
| 8,639,778 B2 | 1/2014 | Madanes |
| 8,640,032 B2 | 1/2014 | Priyadarshan |
| 8,649,770 B1 | 2/2014 | Cope et al. |
| 8,650,173 B2 | 2/2014 | McDonald |
| 8,655,146 B2 | 2/2014 | Bennett |
| 8,655,736 B2 | 2/2014 | Bharadwaj |
| 8,660,912 B1 | 2/2014 | Dandekar |
| 8,666,895 B2 | 3/2014 | Grigg et al. |
| 8,670,652 B2 | 3/2014 | Yai |
| 8,676,682 B2 | 3/2014 | Kalliola |
| 8,712,382 B2 | 4/2014 | Aaltonen |
| 8,713,003 B2 | 4/2014 | Fotev |
| 8,719,091 B2 | 5/2014 | Kirley |
| 8,738,418 B2 | 5/2014 | Winters |
| 8,762,475 B2 | 6/2014 | Cheung et al. |
| 8,762,484 B2 | 6/2014 | Ravichandran |
| 8,763,068 B2 | 6/2014 | Gu |
| 8,768,838 B1 | 7/2014 | Hoffman |
| 8,775,273 B2 | 7/2014 | Mengerink |
| 8,793,260 B2 | 7/2014 | Haykal |
| 8,843,125 B2 | 9/2014 | Kwon et al. |
| 8,856,539 B2 | 10/2014 | Weiss |
| 8,880,498 B2 | 11/2014 | Rubanovich |
| 8,898,217 B2 | 11/2014 | Grigorovici |
| 8,903,800 B2 | 12/2014 | Kakade |
| 8,935,340 B2 | 1/2015 | Aaltonen |
| 8,949,342 B2 | 2/2015 | Ahopelto |
| 8,949,889 B1 | 2/2015 | Erdmann |
| 8,959,022 B2 | 2/2015 | Cheng |
| 8,972,600 B2 | 3/2015 | Malaby |
| 8,977,554 B1 | 3/2015 | Hertschuh |
| 8,977,625 B2 | 3/2015 | Buehrer |
| 8,983,978 B2 | 3/2015 | Priyadarshan |
| 9,022,286 B2 | 5/2015 | Wyatt |
| 9,031,927 B2 | 5/2015 | Kaushal |
| 9,038,000 B2 | 5/2015 | Haynes, II |
| 9,064,281 B2 | 6/2015 | Ballard |
| 9,066,130 B1 | 6/2015 | Buron |
| 9,092,289 B2 | 7/2015 | Bouthillier |
| 9,100,826 B2 | 8/2015 | Weiss |
| 9,113,214 B2 | 8/2015 | Andrews, II |
| 9,129,273 B2 | 9/2015 | Baldwin et al. |
| 9,137,576 B2 | 9/2015 | McRae |
| 9,141,504 B2 | 9/2015 | Greenzeiger |
| 9,146,665 B2 | 9/2015 | Gandhi |
| 9,148,771 B2 | 9/2015 | Zentner |
| 9,170,812 B2 | 10/2015 | Vorbach et al. |
| 9,182,243 B2 | 11/2015 | Van Os |
| 9,183,280 B2 | 11/2015 | Achuthan |
| 9,183,588 B2 | 11/2015 | Yankovich |
| 9,189,549 B2 | 11/2015 | Rubinstein |
| 9,218,419 B2 | 12/2015 | Wu |
| 9,224,083 B2 | 12/2015 | Wyatt |
| 9,224,167 B2 | 12/2015 | Lampert |
| 9,251,144 B2 | 2/2016 | Du |
| 9,256,795 B1 | 2/2016 | Gray |
| 9,275,334 B2 | 3/2016 | Sharma |
| 9,276,991 B2 | 3/2016 | DeRoller |
| 9,277,022 B2 | 3/2016 | Lee |
| 9,292,871 B2 | 3/2016 | Isaacson |
| 9,299,072 B2 | 3/2016 | Khan et al. |
| 9,329,692 B2 | 5/2016 | Bai |
| 9,332,302 B2 | 5/2016 | Briggs |
| 9,338,327 B2 | 5/2016 | Miyata |
| 9,342,835 B2 | 5/2016 | Fordyce, III |
| 9,342,930 B1 | 5/2016 | Kraft |
| 9,348,935 B2 | 5/2016 | Doig |
| 9,355,391 B2 | 5/2016 | von Behren |
| 9,374,431 B2 | 6/2016 | Kannan |
| 9,383,815 B2 | 7/2016 | Kim |
| 9,400,977 B2 | 7/2016 | Brown et al. |
| 9,412,127 B2 | 8/2016 | Dumon |
| 9,418,672 B2 | 8/2016 | Pylappan |
| 9,424,002 B2 | 8/2016 | Bruno |
| 9,424,598 B1 | 8/2016 | Kraft |
| 9,430,765 B2 | 8/2016 | Wyatt |
| 9,430,766 B1 | 8/2016 | Kraft |
| 9,430,794 B2 | 8/2016 | Isaacson |
| 9,443,017 B2 | 9/2016 | Borisovich |
| 9,451,010 B2 | 9/2016 | Spitz |
| 9,477,985 B2 | 10/2016 | Poon |
| 9,483,755 B2 | 11/2016 | Lemay |
| 9,495,699 B2 | 11/2016 | Mangaru |
| 9,501,750 B2 | 11/2016 | Fujioka |
| 9,508,006 B2 | 11/2016 | Shamir |
| 9,516,304 B2 | 12/2016 | Friel |
| 9,519,715 B2 | 12/2016 | Dedhia |
| 9,529,490 B2 | 12/2016 | Li |
| 9,529,926 B2 | 12/2016 | Wu |
| 9,530,137 B2 | 12/2016 | Weiss |
| 9,535,990 B2 | 1/2017 | Skolicki |
| 9,536,161 B1 | 1/2017 | Lish |
| 9,536,238 B2 | 1/2017 | Garrett et al. |
| 9,557,891 B2 | 1/2017 | Iwabuchi |
| 9,558,272 B2 | 1/2017 | Kalinina |
| 9,560,415 B2 | 1/2017 | Good |
| 9,576,251 B2 | 2/2017 | Forman |
| 9,578,358 B1 | 2/2017 | Skolicki |
| 9,589,059 B2 | 3/2017 | Levens |
| 9,607,330 B2 | 3/2017 | Spitz |
| 9,613,160 B2 | 4/2017 | Houle |
| 9,658,931 B2 | 5/2017 | Simons |
| 9,659,067 B2 | 5/2017 | De Sousa |
| 9,665,895 B2 | 5/2017 | Alston |
| 9,684,741 B2 | 6/2017 | Li |
| 9,704,180 B2 | 7/2017 | Kobayashi |
| 9,736,028 B2 | 8/2017 | Ansari |
| 9,746,477 B2 | 8/2017 | Hembrough et al. |
| 9,754,174 B2 | 9/2017 | Sugiyama |

(56) References Cited

U.S. PATENT DOCUMENTS

| | | |
|---|---|---|
| 9,760,872 B2 | 9/2017 | Zamer |
| 9,760,884 B2 | 9/2017 | Wyatt |
| 9,767,520 B2 | 9/2017 | Isaacson |
| 9,799,046 B2 | 10/2017 | Stoll |
| 9,800,727 B1 | 10/2017 | Chakrabarty |
| 9,830,137 B2 | 11/2017 | Matthew |
| 9,832,519 B2 | 11/2017 | Avedissian |
| 9,841,282 B2 | 12/2017 | VonDerheide |
| 9,852,400 B2 | 12/2017 | Ruan |
| 9,858,297 B2 | 1/2018 | Park |
| 9,858,340 B1 | 1/2018 | Frey |
| 9,864,984 B2 | 1/2018 | Khan et al. |
| 9,870,131 B2 | 1/2018 | Kulikov |
| 9,875,489 B2 | 1/2018 | Spitz |
| 9,881,083 B2 | 1/2018 | Kalinina |
| 9,883,008 B2 | 1/2018 | Ravichandran |
| 9,898,162 B2 | 2/2018 | Jisrawi |
| 9,899,063 B2 | 2/2018 | Avedissian |
| 9,922,381 B2 | 3/2018 | Isaacson |
| 9,924,235 B2 | 3/2018 | Ansari |
| 9,959,872 B2 | 5/2018 | Barreira |
| 9,965,604 B2 | 5/2018 | Smith |
| 9,966,649 B2 | 5/2018 | Christie |
| 9,996,602 B2 | 6/2018 | Chong |
| 10,013,693 B2 | 7/2018 | Wyatt |
| 10,019,430 B2 | 7/2018 | Rossi |
| 10,037,582 B2 | 7/2018 | Carey |
| 10,042,514 B2 | 8/2018 | Delacroix |
| 10,055,768 B2 | 8/2018 | Briggs |
| 10,069,940 B2 | 9/2018 | Smith |
| 10,070,185 B1 | 9/2018 | Ho |
| 10,073,794 B2 | 9/2018 | Thomas |
| 10,078,621 B2 | 9/2018 | Luo |
| 10,083,369 B2 | 9/2018 | Tosic |
| 10,089,412 B2 | 10/2018 | Kosarev |
| 10,121,186 B2 | 11/2018 | Isaacson |
| 10,127,531 B2 | 11/2018 | Fu |
| 10,127,595 B1 | 11/2018 | Hipschman |
| 10,152,756 B2 | 12/2018 | Isaacson |
| 10,175,860 B2 | 1/2019 | Marantz |
| 10,176,506 B2 | 1/2019 | Ohara |
| 10,181,147 B2 | 1/2019 | Stoll |
| 10,185,972 B2 | 1/2019 | Churchill |
| 10,198,753 B2 | 2/2019 | Niepert |
| 10,210,559 B2 | 2/2019 | Stoll |
| 10,223,682 B2 | 3/2019 | Brown et al. |
| 10,231,076 B1 | 3/2019 | Stuart |
| 10,235,714 B2 | 3/2019 | Paulrajan |
| 10,242,398 B2 | 3/2019 | Woo |
| 10,248,967 B2 | 4/2019 | Liu |
| 10,268,994 B2 | 4/2019 | Spitz |
| 10,269,021 B2 | 4/2019 | Levy |
| 10,289,996 B2 | 5/2019 | Khan et al. |
| 10,311,499 B1 | 6/2019 | Kim |
| 10,319,013 B2 | 6/2019 | Moring |
| 10,339,520 B2 | 7/2019 | Wyatt |
| 10,346,895 B2 | 7/2019 | Stoll |
| 10,360,619 B2 | 7/2019 | Nichols |
| 10,373,383 B1 | 8/2019 | Werner |
| 10,380,166 B2 | 8/2019 | Lee |
| 10,380,673 B2 | 8/2019 | Beach |
| 10,395,293 B1 | 8/2019 | Mangtani |
| 10,397,326 B2 | 8/2019 | Thomas |
| 10,402,886 B2 | 9/2019 | Naito |
| 10,402,889 B1 | 9/2019 | Mukherjee |
| 10,403,394 B2 | 9/2019 | Ansari |
| 10,410,234 B1 | 9/2019 | Madden |
| 10,410,272 B1 | 9/2019 | Johnson |
| 10,430,849 B1 | 10/2019 | Hipschman |
| 10,459,919 B2 | 10/2019 | Zhong |
| 10,460,085 B2 | 10/2019 | Fujioka |
| 10,467,287 B2 | 11/2019 | Hume |
| 10,489,769 B2 | 11/2019 | Brown et al. |
| 10,497,037 B2 | 12/2019 | Isaacson |
| 10,503,796 B2 | 12/2019 | Stein |
| 10,504,126 B2 | 12/2019 | Kulkarni |
| 10,506,278 B2 | 12/2019 | Avedissian |
| 10,509,823 B2 | 12/2019 | Murata |
| 10,511,580 B2 | 12/2019 | Isaacson |
| 10,521,837 B1 | 12/2019 | Mossoba |
| 10,534,511 B2 | 1/2020 | Garcia |
| 10,536,414 B2 | 1/2020 | Dye |
| 10,565,562 B2 | 2/2020 | Saha |
| 10,579,602 B2 | 3/2020 | Wang |
| 10,580,049 B2 | 3/2020 | Graylin |
| 10,580,056 B2 | 3/2020 | Stoll |
| 10,594,870 B2 | 3/2020 | Satyavolu |
| 10,614,313 B2 | 4/2020 | Catalano |
| 10,621,653 B2 | 4/2020 | Isaacson |
| 10,628,820 B2 | 4/2020 | Wyatt |
| 10,643,266 B2 | 5/2020 | Isaacson |
| 10,650,358 B1 | 5/2020 | Edwards |
| 10,664,793 B1 | 5/2020 | Rehn |
| 10,671,931 B2 | 6/2020 | Bansal |
| 10,678,878 B2 | 6/2020 | Li |
| 10,679,269 B2 | 6/2020 | Wang |
| 10,701,127 B2 | 6/2020 | Spitz |
| 10,706,456 B2 | 7/2020 | Goodwin |
| 10,726,472 B2 | 7/2020 | Isaacson |
| 10,748,206 B1 | 8/2020 | Cooper |
| 10,775,254 B2 | 8/2020 | Hipschman |
| 10,776,847 B1 | 9/2020 | Comar |
| 10,789,631 B2 | 9/2020 | Spitz |
| 10,803,506 B2 | 10/2020 | Kim |
| 10,832,310 B2 | 11/2020 | Isaacson |
| 10,846,112 B2 | 11/2020 | Smith, III |
| 10,852,151 B2 | 12/2020 | Butts, III |
| 10,860,949 B2 | 12/2020 | Shamsi |
| 10,866,646 B2 | 12/2020 | Thomas-Brigden |
| 10,872,193 B2 | 12/2020 | Lu |
| 10,885,496 B2 | 1/2021 | Sonone |
| 10,909,586 B2 | 2/2021 | Avedisssian |
| 10,922,737 B2 | 2/2021 | Guo |
| 10,963,915 B2 | 3/2021 | Madden |
| 10,977,319 B2 | 4/2021 | Bright |
| 11,004,092 B2 | 5/2021 | MacIlwaine |
| 11,004,096 B2 | 5/2021 | Thomas |
| 11,004,139 B2 | 5/2021 | Isaacson |
| 11,017,163 B2 | 5/2021 | Wang |
| 11,030,633 B2 | 6/2021 | Reid |
| 11,042,898 B2 | 6/2021 | Mehanian |
| 11,049,164 B2 | 6/2021 | Agrawal |
| 11,068,892 B2 | 7/2021 | Buis |
| 11,068,969 B2 | 7/2021 | Wilson |
| 11,080,777 B2 | 8/2021 | Isaacson |
| 11,087,356 B2 | 8/2021 | Blom |
| 11,113,082 B2 | 9/2021 | Redin |
| 11,132,749 B1 | 9/2021 | Konson |
| 11,138,375 B2 | 10/2021 | Avedissian |
| 11,144,906 B2 | 10/2021 | Girish |
| 11,151,507 B2 | 10/2021 | Kang |
| 11,170,003 B2 | 11/2021 | Wu |
| 11,205,207 B2 | 12/2021 | Jain |
| 11,227,315 B2 | 1/2022 | Briggs |
| 11,250,493 B2 | 2/2022 | Isaacson |
| 11,265,912 B2 | 2/2022 | Hopen |
| 11,269,905 B2 | 3/2022 | Fitzpatrick |
| 11,270,064 B2 | 3/2022 | Collart |
| 11,270,323 B2 | 3/2022 | Gerard |
| 11,282,131 B2 | 3/2022 | Isaacson |
| 11,308,544 B2 | 4/2022 | Akbarpour |
| 11,314,746 B2 | 4/2022 | Kadam |
| 11,315,174 B2 | 4/2022 | Walker |
| 11,316,688 B2 | 4/2022 | Ansari |
| 11,317,159 B2 | 4/2022 | Crossley |
| 11,363,106 B2 | 6/2022 | Nelluri |
| 11,367,282 B2 | 6/2022 | Wang |
| 11,386,452 B1 | 7/2022 | Ostrover |
| 11,386,454 B1 | 7/2022 | Ripper |
| 11,423,463 B2 | 8/2022 | Belcher |
| 11,435,873 B1 | 9/2022 | Sharma |
| 11,436,654 B2 | 9/2022 | Coldwell |
| 2001/0032162 A1 | 10/2001 | Alsberg |
| 2001/0032170 A1 | 10/2001 | Sheth |

(56) References Cited

U.S. PATENT DOCUMENTS

| | | |
|---|---|---|
| 2002/0128981 A1 | 9/2002 | Kawan |
| 2003/0001722 A1 | 1/2003 | Smith et al. |
| 2003/0028481 A1 | 2/2003 | Flitcroft et al. |
| 2003/0055723 A1 | 3/2003 | English |
| 2003/0108009 A1 | 6/2003 | Petersen |
| 2004/0054629 A1 | 3/2004 | deJong et al. |
| 2004/0103197 A1 | 5/2004 | Benson |
| 2004/0225613 A1 | 11/2004 | Narayanaswami et al. |
| 2004/0243505 A1 | 12/2004 | Sweeting |
| 2004/0254891 A1 | 12/2004 | Blinn |
| 2005/0074125 A1 | 4/2005 | Chavanne et al. |
| 2005/0177474 A1 | 8/2005 | Ma |
| 2005/0212752 A1 | 9/2005 | Marvit |
| 2005/0221798 A1 | 10/2005 | Sengupta et al. |
| 2006/0041485 A1 | 2/2006 | Tarvydas |
| 2006/0064411 A1 | 3/2006 | Gross |
| 2006/0074780 A1 | 4/2006 | Taylor |
| 2006/0143094 A1 | 6/2006 | Kohout |
| 2006/0189382 A1 | 8/2006 | Muir et al. |
| 2006/0224973 A1 | 10/2006 | Albrecht |
| 2006/0288233 A1 | 12/2006 | Kozlay et al. |
| 2007/0050618 A1 | 2/2007 | Roux et al. |
| 2007/0050406 A1 | 3/2007 | Byers |
| 2007/0073599 A1 | 3/2007 | Perry |
| 2007/0106570 A1 | 5/2007 | Hartman et al. |
| 2007/0112647 A1 | 5/2007 | Borders |
| 2007/0152035 A1 | 7/2007 | Adams et al. |
| 2007/0162350 A1 | 7/2007 | Friedman |
| 2007/0206743 A1 | 9/2007 | Chang |
| 2007/0294240 A1 | 12/2007 | Steele |
| 2008/0005118 A1 | 1/2008 | Shakib |
| 2008/0011833 A1 | 1/2008 | Saarisalo |
| 2008/0045806 A1 | 2/2008 | Keppler |
| 2008/0071763 A1 | 3/2008 | Ferrenq |
| 2008/0103879 A1 | 5/2008 | Armstrong |
| 2008/0140523 A1 | 6/2008 | Mahoney |
| 2008/0167946 A1 | 7/2008 | Bezos |
| 2008/0201304 A1 | 8/2008 | Sue |
| 2008/0235144 A1 | 9/2008 | Phillips |
| 2008/0240490 A1 | 10/2008 | Finkelstein |
| 2008/0244721 A1 | 10/2008 | Barrus |
| 2009/0006375 A1 | 1/2009 | Lax |
| 2009/0037284 A1 | 2/2009 | Lewis |
| 2009/0037291 A1 | 2/2009 | Dawson et al. |
| 2009/0089260 A1 | 4/2009 | Chong |
| 2009/0094104 A1 | 4/2009 | Anuar |
| 2009/0132347 A1 | 5/2009 | Anderson |
| 2009/0132405 A1 | 5/2009 | Scipioni |
| 2009/0157450 A1 | 6/2009 | Athsani |
| 2009/0157479 A1 | 6/2009 | Caldwell |
| 2009/0159678 A1 | 6/2009 | Day et al. |
| 2009/0172746 A1 | 7/2009 | Aldrey |
| 2009/0196465 A1 | 8/2009 | Menon |
| 2009/0212902 A1 | 8/2009 | Haddock |
| 2009/0234849 A1 | 9/2009 | Erera |
| 2009/0235196 A1 | 9/2009 | MacBeth |
| 2009/0271735 A1 | 10/2009 | Anderson |
| 2009/0300476 A1 | 12/2009 | Vogel et al. |
| 2009/0307003 A1 | 12/2009 | Benyamin |
| 2010/0023449 A1 | 1/2010 | Skowronek et al. |
| 2010/0106611 A1 | 4/2010 | Paulsen et al. |
| 2010/0114654 A1 | 5/2010 | Lukose et al. |
| 2010/0114731 A1 | 5/2010 | Kingston et al. |
| 2010/0131347 A1 | 5/2010 | Sartipi |
| 2010/0145861 A1 | 6/2010 | Law |
| 2010/0205551 A1 | 8/2010 | Underwood |
| 2010/0280909 A1 | 11/2010 | Zhang |
| 2010/0281364 A1 | 11/2010 | Sidman |
| 2010/0309512 A1 | 12/2010 | Onoda |
| 2011/0047014 A1 | 2/2011 | DeAngelo |
| 2011/0165896 A1 | 7/2011 | Stromberg et al. |
| 2011/0214158 A1 | 9/2011 | Pasquero et al. |
| 2011/0239304 A1 | 9/2011 | Saarisalo et al. |
| 2011/0282785 A1 | 11/2011 | Chin |
| 2011/0289598 A1 | 11/2011 | Chastagnol |
| 2012/0005074 A1 | 1/2012 | Kothandaraman et al. |
| 2012/0011572 A1 | 1/2012 | Chew et al. |
| 2012/0015629 A1 | 1/2012 | Olsen et al. |
| 2012/0017084 A1 | 1/2012 | Hutton |
| 2012/0024947 A1 | 2/2012 | Naelon |
| 2012/0030043 A1 | 2/2012 | Ross et al. |
| 2012/0041767 A1 | 2/2012 | Hoffman et al. |
| 2012/0084199 A1 | 4/2012 | Stone |
| 2012/0109713 A1 | 5/2012 | Wilhite |
| 2012/0136756 A1 | 5/2012 | Jitkoff et al. |
| 2012/0143706 A1 | 6/2012 | Crake et al. |
| 2012/0166311 A1 | 6/2012 | Dwight |
| 2012/0191569 A1 | 7/2012 | Shah |
| 2012/0203776 A1 | 8/2012 | Nissan |
| 2012/0206335 A1 | 8/2012 | Osterhout et al. |
| 2012/0221421 A1 | 8/2012 | Hammad |
| 2012/0221437 A1* | 8/2012 | Yoo .................... G06Q 20/209 705/26.41 |
| 2012/0226620 A1 | 9/2012 | Junger |
| 2012/0233020 A1 | 9/2012 | Eberstadt |
| 2012/0233170 A1 | 9/2012 | Musgrove et al. |
| 2012/0241524 A1 | 9/2012 | Blot et al. |
| 2012/0244805 A1 | 9/2012 | Haikonen et al. |
| 2012/0254290 A1 | 10/2012 | Naaman |
| 2012/0266220 A1 | 10/2012 | Brudnicki et al. |
| 2012/0284130 A1 | 11/2012 | Lewis |
| 2012/0300932 A1 | 11/2012 | Cambridge |
| 2012/0310738 A1 | 12/2012 | Mesaros |
| 2013/0006733 A1 | 1/2013 | Fisher |
| 2013/0013427 A1 | 1/2013 | Gonsalves et al. |
| 2013/0060618 A1 | 3/2013 | Barton et al. |
| 2013/0066987 A1 | 3/2013 | Levinson |
| 2013/0066988 A1 | 3/2013 | Levinson |
| 2013/0069985 A1 | 3/2013 | Wong et al. |
| 2013/0073448 A1 | 3/2013 | Wall et al. |
| 2013/0073449 A1 | 3/2013 | Voynow et al. |
| 2013/0076788 A1 | 3/2013 | Ben Zvi |
| 2013/0104022 A1 | 4/2013 | Coon |
| 2013/0111599 A1 | 5/2013 | Gargiulo et al. |
| 2013/0151140 A1 | 6/2013 | Suh et al. |
| 2013/0151400 A1 | 6/2013 | Makhotin et al. |
| 2013/0173477 A1 | 7/2013 | Cairns et al. |
| 2013/0231969 A1* | 9/2013 | Van Pelt .......... G06Q 10/06311 705/7.13 |
| 2013/0262315 A1 | 10/2013 | Hruska |
| 2013/0290149 A1 | 10/2013 | Rashwan |
| 2013/0297425 A1 | 11/2013 | Wallaja |
| 2013/0307765 A1 | 11/2013 | Li |
| 2013/0316647 A1* | 11/2013 | Leica .................... H04B 5/0056 455/41.1 |
| 2013/0325980 A1 | 12/2013 | Ohayon |
| 2013/0332353 A1 | 12/2013 | Aidasani et al. |
| 2013/0339229 A1 | 12/2013 | Li |
| 2013/0345959 A1 | 12/2013 | Van Os |
| 2014/0019367 A1 | 1/2014 | Khan et al. |
| 2014/0025521 A1 | 1/2014 | Alsina |
| 2014/0052565 A1 | 2/2014 | Foster et al. |
| 2014/0058937 A1 | 2/2014 | Watson et al. |
| 2014/0095583 A1 | 4/2014 | Houle |
| 2014/0108260 A1 | 4/2014 | Poole et al. |
| 2014/0129438 A1 | 5/2014 | Desai et al. |
| 2014/0136334 A1 | 5/2014 | Legassey |
| 2014/0136990 A1 | 5/2014 | Gonnen |
| 2014/0164199 A1 | 6/2014 | Wilkes |
| 2014/0189514 A1 | 7/2014 | Hillard |
| 2014/0207462 A1 | 7/2014 | Bangalore |
| 2014/0229339 A1 | 8/2014 | Massiere |
| 2014/0244494 A1 | 8/2014 | Davis et al. |
| 2014/0244495 A1 | 8/2014 | Davis et al. |
| 2014/0249968 A1 | 9/2014 | MacKinnon |
| 2014/0279266 A1 | 9/2014 | Lampert |
| 2014/0285435 A1 | 9/2014 | Bezos |
| 2014/0297362 A1 | 10/2014 | Kumar |
| 2014/0297537 A1 | 10/2014 | Kassemi |
| 2014/0325614 A1 | 10/2014 | Rhelimi et al. |
| 2014/0344153 A1 | 11/2014 | Raj et al. |
| 2015/0019423 A1 | 1/2015 | Dowling |
| 2015/0052036 A1 | 2/2015 | Vernal et al. |
| 2015/0052061 A1 | 2/2015 | Anderson |

(56) References Cited

U.S. PATENT DOCUMENTS

| | | | |
|---|---|---|---|
| 2015/0058191 A1 | 2/2015 | Khan et al. | |
| 2015/0088655 A1 | 3/2015 | Taylor | |
| 2015/0088686 A1 | 3/2015 | Glassberg | |
| 2015/0095238 A1 | 4/2015 | Khan et al. | |
| 2015/0142640 A1 | 5/2015 | Kneen | |
| 2015/0149168 A1 | 5/2015 | Stent | |
| 2015/0186871 A1 | 7/2015 | Laracey | |
| 2015/0227925 A1 | 8/2015 | Filler | |
| 2015/0271091 A1 | 9/2015 | Maruyama | |
| 2015/0317698 A1 | 11/2015 | Kalyvas | |
| 2015/0324789 A1* | 11/2015 | Dvorak | H04L 9/3297 |
| | | | 705/67 |
| 2015/0348007 A1 | 12/2015 | Perez et al. | |
| 2015/0348009 A1 | 12/2015 | Brown et al. | |
| 2015/0348017 A1 | 12/2015 | Allmen | |
| 2015/0348025 A1 | 12/2015 | Steele et al. | |
| 2015/0356602 A1 | 12/2015 | Moore et al. | |
| 2015/0379811 A1 | 12/2015 | Earley | |
| 2016/0042362 A1 | 2/2016 | Rowe | |
| 2016/0092860 A1 | 3/2016 | Klingen | |
| 2016/0203467 A1 | 7/2016 | Khan et al. | |
| 2016/0247144 A1 | 8/2016 | Oh | |
| 2016/0275474 A1 | 9/2016 | Kim | |
| 2016/0300211 A1 | 10/2016 | Brown et al. | |
| 2017/0286938 A1 | 10/2017 | Brown et al. | |
| 2017/0330187 A1 | 11/2017 | Kohli | |
| 2017/0337542 A1 | 11/2017 | Kim | |
| 2021/0241256 A1 | 8/2021 | Caldwell | |

FOREIGN PATENT DOCUMENTS

| | | |
|---|---|---|
| CN | 1019332246 | 12/2010 |
| CN | 102160070 | 8/2011 |
| CN | 102215053 | 10/2011 |
| CN | 102254259 | 11/2011 |
| CN | 102498705 | 6/2012 |
| CN | 102906766 | 1/2013 |
| CN | 103310337 | 9/2013 |
| CN | 103745350 | 4/2014 |
| EP | 2388744 | 11/2011 |
| GB | 2277183 | 10/1994 |
| GB | 2407189 | 4/2005 |
| JP | 2000200315 | 7/2000 |
| KR | 1020070048860 | 5/2007 |
| KR | 1020110005889 | 1/2011 |
| KR | 20110094732 | 8/2011 |
| KR | 20140023608 | 2/2014 |
| KR | 2014006816 | 5/2014 |
| WO | WO 2008147457 | 12/2008 |
| WO | WO 2009039419 | 3/2009 |
| WO | WO 2010111002 | 9/2010 |
| WO | WO 2010128442 | 11/2010 |
| WO | WO 2012/075304 | 6/2012 |
| WO | WO 2014122451 | 8/2014 |
| WO | WO 2014143916 | 9/2014 |
| WO | WO 2015183412 | 12/2015 |

OTHER PUBLICATIONS

U.S. Appl. No. 61/884,926, filed Sep. 30, 2013, Khan et al. (Corres. to 2015/0095238).

U.S. Appl. No. 61/989,107, filed May 6, 2014, Khan et al. (Corres. to 2015/0095238).

U.S. Appl. No. 62/002,721, filed May 23, 2014, Khan et al. (Corres. to 2015/0095238).

U.S. Appl. No. 62/004,182, filed May 28, 2014, Khan et al. (Corres. to 2015/0095238).

www.travelocity.com, [online], Mar. 21, 2012 [retrieved from archive.org on Aug. 26, 2014].

www.tripadvisor.com, [online], Mar. 15, 2012 [retrieved from archive.org on Aug. 26, 2014].

Van den Poel, D. and W. Buckinx, "Predicting online-purchasing behavior," Jul. 28, 2004 [online]. European Journal of Operational Research 166 pp. 557-575. Retrieved from www.sciencedirect.com.

Williams, Owen, "Mozilla shows off Firefox's new search interface," thenextweb.com, Nov. 25, 2014.

Kraft, Ben, Eric Mannes, and Jordan Moldow, "Security research of a social payment app," (Year: 2014).

Gomzin, Slava and Dan Itkis, "Decentralized, Real-Time Credit, Debit and Crypto Payment Processing Blockchain," (Year: 2017).

"Firefox OS", Wikipedia, https://en.wikipedia.org/wiki/Firefox_OS, Initial release Feb. 21, 2013, 12 pages.

"Intro to Open Web Apps", Archive of obsolete content, MDN, https://developer.mozilla.org/en-US/docs/Archive/B2G_OS/Quickstart/Intro_to_open_web_apps, 4 pages.

Trusov, Michael, Randolph E. Bucklin, and Koen Pauwels, "Effects of word-of mouth versus traditional marketing: findings from an internet social networking site." Journal of marketing 73/5 (2009): 90-102 (Year: 2009).

Huang, Ziaodi, Ziaoling Dai, and Weiqiang Liang, "BulaPay: a novel web service based third-party payment system for e-commerce" &nspb; Electronic Commerce Research , 14.4 (2014): 611-633. (Year: 2014).

Hudaib, Adam Ali Zare. "E-payment Security Analysis In Depth." International Journal of Computer Science and Security (IJCSS) 8.1 (2014): 14. (Year: 2014).

By kumar303, "Introducing navigator.mozPay( ) For Web Payments", Apr. 4, 2013, https://hacks.mozilla.org/2013/04/introducing-navigator-mozpay-for-web-payments/, 18 pages.

"In-app payments with mozPay", Archive of obsolete content, MDN, https://developer.mozilla.org/en-US/docs/Archive/Marketplace/Monetization/In-app_payments_section/mozPay_iap, 16 pages.

By kumar303, "WebAPI/WebPayment", Revision Aug. 7, 2013, https://mozilla.org/index.php?title=WebAPI/WebPayment&oldid=691442, 11 pages.

"WebAPI/WebPaymentProvider", MozillaWiki, https://wiki.mozilla.org/WebAPI/WebPaymentProvider, 6 pages.

By Manu Sporny and Robert Nyman, "Web Payments with PaySwarm: Identity (part 1 of 3)", posted Apr. 16, 2013 in Payments and Standards, https://hacks.mozilla.org/2013/04/web-payments-with-payswarm-identity-part-1-of-3/, 8 pages.

By Manu Sporny and Robert Nyman, "Web Payments with PaySwarm: Assets and Listings (part 2 of 3)", posted Apr. 23, 2013 in Node.js, Payments and Standards, https://hacks.mozilla.org/2013/04/web-payments-with-payswarm-part-2/, 8 pages.

By Manu Sporny and Robert Nyman, "Web Payments with PaySwarm: Purchases (part 3 of 3)", posted Apr. 30, 2013 in Payments, https://hacks.mozilla.org/2013/04/web-payments-with-payswarm-purchasing-part-1-of-3/, 6 pages.

By Manu Sporny, "Browser Payments 1.0", May 7, 2013 in PaySwarm, Standards with 1 Comment—Permalink, https://manu.sporny.org/2013/browser-payments/, 2 pages.

M. Sporny committed on May 5, 2013, "martin-naumann/browser-payments", Added first version of browser payments spec to github pages, https://github.com/martin-naumann/browser-payments/commit/d7885a0c49fde3751ee58f1993245ba7518ec5a4, 14 pages.

Andreas Gall, Fernando Jimenez, Mike Hanson and Kumar McMillan, Editors: Manu Sporny and Kumar McMillan, "Web Commerce API 1.0", An API for initiating commerce transactions, Draft Community Group Specification Aug. 25, 2013, https://web-payments.github.io/web-commerce-api/, 10 pages.

Winnie N.Y. Yan, Dickson K.W. Chiu, "Enhancing E-Commerce Processes with Alerts and Web Services: A Case Study on Online Credit Card Payment Notification", Proceedings of the Sixth International Conference on Machine Learning and Cybernetics, Hong Kong, Aug. 19-22, 2007, pp. 3831-3837, https://ieeexplore.ieee.org/abstract/document/4370814/.

Ayu Tiwari, Sudip Sanyal, Ajith Abraham, Svein Johan Knapskog, Sugata Sanyal, A Multi-Factor Security Protocol for Wireless Payment—Secure Web Authentication using Mobile Devices, https://arxiv.org/abs/1111.3010, 8 pages, 163-166.

S. Karnouskos, Fraunhofer Fokus, "Mobile payment: A journey through existing procedures and standardization initiatives", Fourth Quarter 2004, vol. 6, No. 4, https://ieeexplore.ieee.org/abstract/document/5342298/, 2004, pp. 44-66.

(56) References Cited

OTHER PUBLICATIONS

Amir Herzberg, "Payments and banking with mobile personal devices", Communications of the ACM, vol. 46, No. 5, https://dl.acm.org/citation.cfm?id=769801, May 31, 2003, pp. 53-58.
Artur Romao, Miguel Mira Da Silva, Alberto Rodrigues Da Silva, "Secure Electronic Payments Based on Mobile Agents", Oct. 2000, https://link.springer.com/article/10.1023/A:1008733722279, pp. 1-28.
Amir Herzberg, "Secure Communication and Commerce Using Cryptography", https://dl.acm.org/citation.cfm?id=886341, Mar. 19, 2002, Chapter 12, pp. 3-10.
K. Luttge, "E-charging API: outsource charging to a payment service provider", https://ieeexplore.ieee.org/document/915316/, May 9, 2001, pp. 216-222.
Charles Chong, Hui-Na Chua, Cheng-Suan Lee, "Towards flexible mobile payment via mediator-based service model", https://dl.acm.org/citation.cfm?id=1151504, Aug. 16, 2006, 7 pages.
M. Sirbu, J.D. Tygar, "NetBill: an Internet commerce system optimized for Network-delivered services", https://ieeexplore.org/abstract/document/403456/, Aug. 30, 1995, pp. 34-39.
M. Bellare, J.A. Garay, R. Hauser, A. Herzberg, H. Krawczyk, M. Steiner, G. Tsudik, E. Van Herreweghen, M. Waidner, Design, implementation, and deployment of the iKP secure electronic payment system, vol. 18, No. 4, Apr. 2000, https://ieeexplore.ieee.org/abstract/document/839936/, pp. 611-627.
Luttge, Karsten, "E-charging api: outsource charging to a payment service provider", Intelligent Network Workshop, 2001, IEEE. (Year: 2001).
Constantinides, Efthymios. "Foundations of social media marketing." Procedia—Social and behavioral sciences 148 (2014): 40-57, (Year: 2014).
Meng, Jian, and Liang Ye, "Secure Mobile Payment Model Based on WAP," 2008 4$^{th}$ International Conference on Wireless Communications, Networking and Mobile Computing, IEEE, 2008. (Year: 2008).
Benyo, B. et al., "NFC Applications and Business Model of the Ecosystem," 2007, 16$^{th}$ IST Mobile and Wireless Communications Summit, IEEE, 2007. (Year: 2007).
Hong, Feng et al. "Waving authentication: your smartphone authenticate you on motion gesture," Proceedings of the 33$^{rd}$ Annual ACM Conference Extended Abstracts on Human Factors in Computing Systems, 2015. (Year: 2015).
Rejection Decision, dated May 31, 2019 in Chinese Patent Application No. 201580021465.8, 18 pages (includes English translation).
Google Wallet: Shopping Safe and Sound, Aug. 21, 2012 https://www.youtube.com/watch?v=yLHW7suDVDI.
What is ISIS? Jan. 23, 2014 https://www.nerdwallet.com/blog/credit-cards/isis/.
Notice of Allowance dated Nov. 20, 2017 in Korean Patent Application No. 10-2016-7030455, 11 pages includes English translation.
Final Office Action dated Apr. 30, 2018 in U.S. Appl. No. 15/186,114, 8 pages.
Chinese Office Action dated Jul. 4, 2018 in Application No. 201580021465.8, 15 pages (includes English translation).
U.S. Appl. No. 14/475,263, Notice of Allowance dated Nov. 19, 2015, 6 pages.
U.S. Appl. No. 14/475,424, Non-Final Office Action dated Sep. 21, 2015, 10 pages.
U.S. Appl. No. 14/475,424, Non-Final Office Action dated Nov. 13, 2015, 8 pages.
U.S. Appl. No. 14/475,424, Notice of Allowance dated Mar. 29, 2016, 7 pages.
U.S. Appl. No. 14/775,349, U.S. Appl. No. dated Sep. 11, 2015.
U.S. Appl. No. 15/186,114, First Action Interview Pilot Program Pre-Interview Communication dated Aug. 12, 2016, 4 pages.
U.S. Appl. No. 15/186,114, Non-Final Office Action dated Nov. 29, 2016, 9 pages.
U.S. Appl. No. 15/186,114, Notice of Allowance dated Apr. 27, 2017, 27 pages.
U.S. Appl. No. 61/909,717, filed Nov. 27, 2013.
U.S. Appl. No. 62/004,338, filed May 29, 2014.
Bell ID, Bell ID: Secure Element in the Cloud, YouTube, video file, available online of http://www.youtube.com/watchv=t5KuxXgW7Qs, Nov. 6, 2013.
European Application No. 14765497.4, Extended European Search Report dated Mar. 8, 2016, 7 pages.
Epstein, Video: Forget Smartphones and NFC, "Coin" is the Future Payments, BGR, available online at http://bgr.com/2013/11/14/coin-preorders-announcement-payment-solution/, Nov. 14, 2013, 3 pages.
Korean Application No. 10-2016-7030455, Notice of Preliminary Rejection dated Mar. 6, 2017, 7 pages.
International Application No. PCT/US2013/032529, International Patent Application No. dated Mar. 15, 2013.
International Application No. PCT/US2015/024447, International Preliminary Report on Patentability dated Dec. 8, 2016, 6 pages.
International Application No. PCT/US2015/024447, International Search Report and Written Opinion dated Jun. 30, 2015, 9 pages.
U.S. Appl. No. 14/475,266, filed Sep. 6, 2014.
U.S. Appl. No. 14/475,263, filed Sep. 6, 2014.
Office Action dated Dec. 5, 2018 in Chinese Patent Application No. 201580021465.8, 20 pages (includes English translation.).
Notice of Allowance dated Dec. 12, 2018 in U.S. Appl. No. 15/186,114, 8 pages.
Decision to Grant dated Nov. 19, 2018 in Korean Application No. 10-2018-7004687, 13 pages. Includes English translation of claims.
Office Action dated Aug. 1, 2017 in Chinese Application No. 201580021465.8, 34 pages includes English Translation.
Final Office Action dated Jul. 28, 2017 in Korean Application No. 10-2016-7030455, 8 pages includes English Translation.
International Preliminary Report on Patentability dated Sep. 24, 2015 for International Application No. PCT/US2014/028095, 10 pages.
International Search Report and Written Opinion dated Sep. 6, 2013 in PCT Application No. PCT/US13/32529, 19 pages.
International Search Report and Written Opinion dated Apr. 6, 2015 in PCT/US14/28095, 14 pages.
Grainger, U.S. Appl. No. 14/475,424, filed Sep. 2, 2014.
International Search Report and Written Opinion dated Dec. 18, 2013 in PCT/US2013/032550, 11 pages.
International Preliminary Report on Patentability dated Sep. 15, 2015 in PCT/US2014/027989, 10 pages.
International Search Report and Written Opinion dated Aug. 21, 2014 in PCT/US2014/027989, 11 pages.
First Communication Pursuant to Art. 94(3) dated Feb. 28, 2018 from the European Patent Office in application No. 15716386.6, 7 pages.
Notice of Preliminary Rejection dated Apr. 5, 2018 from the Korean Patent Office in application No. 10-2018-7004687, 15 pages.
Office Action dated Apr. 26, 2019 in Korean Patent Application No. 10-2019-7005060, 18 pages (includes English translation).
Chinese Office Action dated Feb. 2, 2018 in CN20158002146.8, 23 pages includes English translation.
Non-Final Office Action dated Nov. 3, 2017 in U.S. Appl. No. 15/186,114, 7 pages.
Dileep Kumar and Yeonseung Ryu, "A Brief Introduction of Biometrics and Fingerprint Payment Technology", International Journal of Advanced Science and Technology, vol. 4, Mar. 2009, pp. 25-28, (Year: 2009).
Nicholas Akinyokun and Vanessa Teague, "Security and Privacy Implications of NFC-enabled Contactless Payment Systems", Proceedings of the 12$^{th}$ International Conference on Availability, Reliability and Security, 10 pages, (Year: 2017).
Malaga, Ross A. "Search engine optimization—black and white hat approaches." Advances in Computers, vol. 78, Elsevier, 2010, 1-29. (Year: 2010).
Naylor, Rebecca Walker, Cait Poynor Lamberton, and Patricia M. West. "Beyond the "like" button: The impact of mere virtual presence on band evaluations and purchase intentions in social media settings." Journal of Marketing, 76.6, (2012): 105-120. (Year: 2012).
Google Wallet Make Your Phone Your Wallet by Google— YouTube, https://www.youtube.com/watch?v=qRVQTQIJV0g, 238 views—Feb. 18, 2013, retrieved on Feb. 11, 2022.

(56) References Cited

OTHER PUBLICATIONS

GV-R Isis Mobile Payment Demo—YouTube, https://www.youtube.com/watch?v=VlfRHCDTzql, 913 views—Aug. 8, 2012, retrieved Feb. 11, 2022.

Introducing the Isis Mobile Wallet™—YouTube, https://www.youtube.com/watch?v=id_Wrt-lyFU, 326 views—Dec. 6, 2013, retrieved Feb. 11, 2022.

Isis Mobile Wallet for Verizon—Wave To Pay (Hands-on Video)—YouTube, https://www.youtube.com/watch?v=djHgUhOqTYI, 21,654 views—Jan. 12, 2013, retrieved Feb. 11, 2022.

Lopes, Christian T., et al., "Cytoscape Web: an interactive web-based network browser," Bioinformatics—Applications Note, vol. 26, No. 18, pp. 2347-2348, 2010.

Dogru, Tarik, et al., "Blockchain Technology & it Implications for the Hospitality Industry," Boston University, Winter 2018.

Miraz, Mahdi H., et al., "Analysis of Users' Behaviour and Adoption Trends of Social Media Payment Platforms," 2019 International Conference on Computing, Electronics & Communications Engineering (iCCECE), IEEE, 2019.

Hutter, K et al., (2013). "The impact of user interactions in social media on brand awareness and purchase intention: The case of MINI on facebook." The Journal of Product and Brand Management, 22(5), 342-351. Doi:https://doi.org/10.1108/JPBM-05-2013-0299. (Year: 2013).

Gupta, Alok et al., "An empirical study of consumer switching from traditional to electronic channels: A purchase-decision process perspective." International Journal of Electronic Commerce, 8.3 (2004): 131-161. (Year: 2004).

Lipsman, Andrew et al., "The power of the "like": How brands reach (and influence) fans through social-media marketing", Journal of Advertising research, 52.1 (2012): 40-52. (Year: 2012).

Sawant, Ms Rupali, et al., "The RFID based smart shopping cart", International Journal of Engineering Research and General Science, 3.2 (2015): 275-280. (Year:2015).

Meng, Jian and Ye, Liang. "Secure mobile payment model based on WAP," 2008 $4^{th}$ International Conference on Wireless Communications, Networking and Mobile Computing, IEEE, 2008. (Year: 2008).

Spaid, Brian I., and Flint, Daniel J., "The meaning of shopping experiences augmented by mobile internet devices," Journal of Marketing Theory and Practice, vol. 22, No. 1, 2014, pp. 73-90. (Year: 2014).

Baek, Hyochan, et al., "A model for detecting cryptocurrency transactions with discernible purpose", 2019 Eleventh International Conference on Ubiquitous and Future Networks (ICUFN), IEEE, 2019. (Year: 2019).

Hajli, M. Nick. "A study of the impact of social media on consumers", International Journal of Market Research, 56.3 (2014) 387-404. (Year: 2014).

Ondrus, Jan and Yves Pigneur. "An assessment of NFC for future mobile payment systems." International Conference on the Management of Mobile Business (ICMB 2007). IEEE, 2007. (Year: 2007).

Lohse, Gerald L., and Peter Spiller. "Internet retail store design: How the user interface influences traffic and sales." Journal of Computer-Mediated Communication 5.2 (1999) (Year: 1999).

* cited by examiner

800

| WALLET | X |

CONFIRM AND PAY
ww.store.com ①

PAY WITH  [ JOHN SMITH **5567 ∨ ] — 802

SHIP TO  [ FRED SMITH ∨
13311 NE 100th ST. #100
ANYTOWN, WA 98100 ] — 804

SHIPPING OPTIONS  [ STANDARD - FREE 5-6 BUSINESS DAYS ∨ ] — 806

EMAIL RECEIPT TO  [ fredsmith@outlook.com ∨ ] — 808

[ TOTAL (USD) SHOW DETAILS ∨    $345.00 ] — 810

[ PAY ]

*FIG. 8*

SYSTEM AND METHOD FOR PROVIDING SIMPLIFIED IN-STORE, PRODUCT-BASED AND RENTAL PAYMENT PROCESSES

PRIORITY CLAIM

The present application is a continuation of U.S. patent application Ser. No. 16/884,416, filed Jul. 14, 2020, which is a continuation of Ser. No. 16/445,297, filed Jun. 19, 2019, now U.S. Pat. No. 10,511,580, issued Oct. 3, 2019, which is a continuation of Ser. No. 16/420,785, filed May 23, 2019, now U.S. Pat. No. 10,726,472, issued Jul. 28, 2020, which is a continuation-in-part of U.S. patent application Ser. No. 16/176,425, filed Oct. 31, 2018, which claims the benefit of U.S. Patent Provisional Application No. 62/725,855, filed Aug. 31, 2018, the contents of which are incorporated herein by reference in their entirety.

The present application is a continuation of U.S. patent application Ser. No. 16/884,416, filed Jul. 14, 2020, which is a continuation of Ser. No. 16/445,297, filed Jun. 19, 2019, now U.S. Pat. No. 10,511,580, issued Oct. 3, 2019, which is a continuation of Ser. No. 16/420,785, filed May 23, 2019, now U.S. Pat. No. 10,726,472, issued Jul. 28, 2020, which is a continuation-in-part of U.S. patent application Ser. No. 16/176,425, filed Oct. 31, 2018, which is a continuation-in-part of U.S. patent application Ser. No. 16/126,541, filed Sep. 10, 2018, which is a continuation-in-part of U.S. patent application Ser. No. 15/947,395, filed Apr. 6, 2018, now U.S. Pat. No. 10,152,756, issued Dec. 11, 2018, which is a continuation-in-part of U.S. patent application Ser. No. 15/720,878, filed Sep. 29, 2017, which is a continuation-in-part of U.S. patent application Ser. No. 15/678,664, filed Aug. 16, 2017, which is a continuation of U.S. patent application Ser. No. 15/678,378, filed Aug. 16, 2017, which is a continuation-in-part of U.S. patent application Ser. No. 15/602,868, filed May 23, 2017, now U.S. Pat. No. 9,922,381, issued Mar. 20, 2018, which is a continuation of U.S. patent application Ser. No. 15/600,599, filed May 19, 2017, now U.S. Pat. No. 9,22,380, issued Mar. 20, 2018, which is a continuation of U.S. patent application Ser. No. 15/600,388, filed May 19, 2017, which is a continuation-in-part of U.S. patent application Ser. No. 15/586,999, filed May 4, 2017, now U.S. Pat. No. 10,121,186, issued Nov. 6, 2018, which is a continuation-in-part of U.S. patent application Ser. No. 15/269,451, filed Sep. 19, 2016, now U.S. Pat. No. 9,767,520, issued Sep. 19, 2017, which is a continuation of U.S. patent application Ser. No. 15/263,066, filed Sep. 12, 2016, now U.S. Pat. No. 10,002,396, issued Jun. 19, 2018, which is a continuation of U.S. patent application Ser. No. 15/018,954, filed Feb. 9, 2016, now U.S. Pat. No. 9,734,526, issued Aug. 15, 2017, which is a continuation of U.S. patent application Ser. No. 14/853,579, filed Sep. 14, 2015, now U.S. Pat. No. 9,396,491, Issued on Jul. 19, 2016, which is a continuation of U.S. patent application Ser. No. 14/822,368, filed Aug. 10, 2015, now U.S. Pat. No. 9,292,871, issued Mar. 22, 2016, which is a continuation of U.S. patent application Ser. No. 14/672,876, filed Mar. 30, 2015, now U.S. Pat. No. 9,361,638, issued Jun. 7, 2016, which claims priority to U.S. Provisional Patent Application No. 61/973,287, filed Apr. 1, 2014 and also is a continuation-in-part of U.S. patent application Ser. No. 14/230,864, filed Mar. 31, 2014, now U.S. Pat. No. 9,430,794, issued Aug. 30, 2016, and also claims priority to U.S. Provisional Patent Application No. 61/972,843, filed Mar. 31, 2014, U.S. Provisional Patent Application No. 61/972,834, filed Mar. 31, 2014, U.S. Provisional Patent Application No. 61/972,848, filed Mar. 31, 2014, U.S. Provisional Patent Application No. 61/972,865, filed Mar. 31, 2014, U.S. Provisional Patent Application No. 61/972,879, filed Mar. 31, 2014, U.S. Provisional Patent Application No. 61/972,861, filed Mar. 31, 2014, U.S. Provisional Patent Application No. 61/972,878, filed Mar. 31, 2014, U.S. Provisional Patent Application No. 61/972,892, filed Mar. 31, 2014, U.S. Provisional Patent Application No. 61/972,890, filed Mar. 31, 2014, the contents of each of which are herein incorporated by reference in their entireties.

The present application is a continuation of U.S. patent application Ser. No. 16/884,416, filed Jul. 14, 2020, which is a continuation of Ser. No. 16/445,297, filed Jun. 19, 2019, now U.S. Pat. No. 10,511,580, issued Oct. 3, 2019, which is a continuation of Ser. No. 16/420,785, filed May 23, 2019, now U.S. Pat. No. 10,726,472, issued Jul. 28, 2020, which is a continuation-in-part of U.S. patent application Ser. No. 16/176,425, filed Oct. 31, 2018, which is a continuation of U.S. patent application Ser. No. 15/947,395, filed Apr. 6, 2018, now U.S. Pat. No. 10,152,756, issued Dec. 11, 2018, which is a continuation-in-part of U.S. patent application Ser. No. 15/720,878, filed Sep. 29, 2017, which is a continuation-in-part of U.S. patent application Ser. No. 15/678,664, filed Aug. 16, 2017, which claims priority to U.S. Provisional Patent Application No. 62/475,578, filed Mar. 23, 2017, U.S. Provisional Patent Application No. 62/450,900, filed Jan. 26, 2017, U.S. Provisional Patent Application No. 62/399,761, filed Sep. 26, 2016, and which U.S. patent application Ser. No. 15/720,878 claims the benefit of U.S. Provisional Patent Application No. 62/560,261, filed Sep. 19, 2017, the contents of which are herein incorporated by reference in their entireties.

The present application is a continuation of U.S. patent application Ser. No. 16/884,416, filed Jul. 14, 2020, which is a continuation of Ser. No. 16/445,297, filed Jun. 19, 2019, now U.S. Pat. No. 10,511,580, issued Oct. 3, 2019, which is a continuation of Ser. No. 16/420,785, filed May 23, 2019, now U.S. Pat. No. 10,726,472, issued Jul. 28, 2020, which is a continuation-in-part of U.S. patent application Ser. No. 16/176,425, filed Oct. 31, 2018, which is a continuation of U.S. patent application Ser. No. 15/947,395, filed Apr. 6, 2018, now U.S. Pat. No. 10,152,756, issued Dec. 11, 2018, which is a continuation-in-part of U.S. patent application Ser. No. 15/720,878, filed Sep. 29, 2017, which is a continuation-in-part of U.S. patent application Ser. No. 15/263,057, filed Sep. 12, 2016, now U.S. Pat. No. 9,824,408, issued Nov. 21, 2017, which is a continuation of U.S. patent application Ser. No. 15/018,954, filed Feb. 9, 2016, now U.S. Pat. No. 9,734,526, issued Aug. 15, 2017, which is a continuation of U.S. patent application Ser. No. 14/853,579, filed Sep. 14, 2015, now U.S. Pat. No. 9,396,491, Issued on Jul. 19, 2016, which is a continuation of U.S. patent application Ser. No. 14/822,368, filed Aug. 10, 2015, now U.S. Pat. No. 9,292,871, issued Mar. 22, 2016, which is a continuation of U.S. patent application Ser. No. 14/672,876, filed Mar. 30, 2015, now U.S. Pat. No. 9,361,638, issued Jun. 7, 2016, which claims priority to U.S. Provisional Patent Application No. 61/973,287, filed Apr. 1, 2014 and also is a continuation-in-part of U.S. patent application Ser. No. 14/230,864, filed 31 Mar. 2014, now U.S. Pat. No. 9,430,794, issued Aug. 30, 2016, and also claims priority to U.S. Provisional Patent Application No. 61/972,843, filed Mar. 31, 2014, U.S. Provisional Patent Application No. 61/972,834, filed Mar. 31, 2014, U.S. Provisional Patent Application No. 61/972,848, filed Mar. 31, 2014, U.S. Provisional Patent Application No. 61/972,865, filed Mar. 31, 2014, U.S. Provisional Patent Application No. 61/972,879, filed Mar. 31, 2014, U.S. Provisional Patent Application No. 61/972,861, filed Mar. 31, 2014, U.S. Provisional Patent Application No. 61/972,878, filed Mar. 31, 2014, U.S. Provisional Patent Application No. 61/972,892, filed Mar. 31, 2014, U.S. Provisional Patent Application No. 61/972,890, filed Mar. 31, 2014, the contents of each of which are herein incorporated by reference in their entireties.

The present application is a continuation of U.S. patent application Ser. No. 16/884,416, filed Jul. 14, 2020, which is a continuation of Ser. No. 16/445,297, filed Jun. 19, 2019, now U.S. Pat. No. 10,511,580, issued Oct. 3, 2019, which is a continuation of Ser. No. 16/420,785, filed May 23, 2019, now U.S. Pat. No. 10,726,472, issued Jul. 28, 2020, which is a continuation-in-part of U.S. patent application Ser. No. 16/176,425, filed Oct. 31, 2018, which is a continuation-in-part of U.S. patent application Ser. No. 16/126,541, filed Sep. 10, 2018, which claims priority to U.S. Provisional Patent Application No. 62/569,841, filed Oct. 9, 2017, the contents of which are herein incorporated by reference in their entireties.

The present application is a continuation of U.S. patent application Ser. No. 16/884,416, filed Jul. 14, 2020, which is a continuation of Ser. No. 16/445,297, filed Jun. 19, 2019, now U.S. Pat. No. 10,511,580, issued Oct. 3, 2019, which is a continuation of Ser. No. 16/420,785, filed May 23, 2019, now U.S. Pat. No. 10,726,472, issued Jul. 28, 2020, which is a continuation-in-part of U.S. patent application Ser. No. 16/279,685, filed Feb. 19, 2019, the contents of which are herein incorporated by reference in their entireties.

The present application is a continuation of U.S. patent application Ser. No. 16/884,416, filed Jul. 14, 2020, which is a continuation of Ser. No. 16/445,297, filed Jun. 19, 2019, now U.S. Pat. No. 10,511,580, issued Oct. 3, 2019, which is a continuation of Ser. No. 16/420,785, filed May 23, 2019, now U.S. Pat. No. 10,726,472, issued Jul. 28, 2020, which claims the benefit of U.S. Provisional Application No. 62/809,170, filed Feb. 22, 2019, U.S. Provisional Application No. 62/812,153, filed Feb. 28, 2019, and U.S. Provisional Application No. 62/818,440, filed Mar. 14, 2019, the contents of which are herein incorporated by reference in their entireties.

RELATED APPLICATIONS

This application is related to U.S. patent application Ser. No. 14/853,545, filed Sep. 14, 2015, now U.S. Pat. No. 9,373,138, Issued on Jun. 21, 2016, U.S. patent application Ser. No. 15/018,432, filed Feb. 8, 2016, now U.S. Pat. No. 9,449,338, Issued on Sep. 20, 2016, U.S. patent application Ser. No. 15/018,457, filed Feb. 8, 2016, now U.S. Pat. No. 9,466,081, Issued on Oct. 11, 2016, U.S. patent application Ser. No. 15/018,497, filed Feb. 8, 2016, now U.S. Pat. No. 9,436,957, Issued on Sep. 6, 2016, U.S. patent application Ser. No. 15/018,514, filed Feb. 8, 2016, now U.S. Pat. No. 9,524,519, Issued on Dec. 20, 2016, U.S. patent application Ser. No. 15/018,934, filed Feb. 9, 2016, U.S. patent application Ser. No. 15/018,923, filed Feb. 9, 2016, now U.S. Pat. No. 9,430,790, Issued on Aug. 30, 2016, and U.S. patent application Ser. No. 15/018,939, filed Feb. 9, 2016, the contents of each of which are incorporated herein by reference in their entirety.

BACKGROUND

1. Technical Field

The present disclosure relates to applying new payment processes to making simplified purchases of products using a code or NFC tag configured on an object or a product in-store, in-stadium ordering, vehicle rentals, cryptocurrency payments, or purchasing a product through a scan of an already purchased product. A task or combination of tasks can be performed in a simplified way as initiated by a code or an NFC tag being interacted with by a mobile device.

2. Introduction

This application addresses a number of issues related to simplifying and managing on-line purchases of products and navigation between sites on the Internet. Other issues addressed herein and covered in related patent applications are also discussed such as problems related to in-store brick and mortar purchasing processes.

In-store shopping is currently going through a revolution, just as online shopping is. However, some of the new in-store shopping solutions are not optimal, and are very expensive. For example, Amazon's Go Store provides an improvement of the user experience when shopping but still retains several downsides. The process is as follows. A user must download the Amazon Go app to coordinate with an Amazon payment account (stored credit card) of the user. As the user enters the store, they start the app and scan a visual pattern or code (called a key) that is shown on their phone. The user has to find the app on their device and click on it to generate the pattern that they must scan as they enter.

Cameras are set throughout the store to monitor the activity of the user so that as they pickup items for sale, the item and the user can be identified, such that the user can simply walk out and the chosen items will be charged to their account. In some respects, this process is certainly simpler than a manual check out experience, but there are several deficiencies. For example, a very expensive infrastructure is required to monitor the user's selections for identifying what products they are purchasing. Expensive infrastructure is also required to scan the code as they enter the store. The user has to download another app which can clutter up their mobile device and be difficult to find. These and other challenges exist in efforts like Amazon Go and other efforts to simplify in-store purchases.

Other issues include how one might make payments associated with objects like rentals of equipment or parking spaces without the need of downloading a separate application for each different use case.

SUMMARY

The present disclosure provides a number of innovations to address the various issues as set forth above. The present application addresses these deficiencies by introducing a new in-store purchasing process which can enhance the user's brick-and-mortar purchasing experience. In another aspect, the present disclosure also addresses other payment contexts which involve interacting with objects but which can be performed outside of a store. For example, NFC tags can be associated with objects such as parking meters, vehicles, products already sold, doors, and so forth. A combination of events can be initiated such as the payment of a fee and the opening of a parking gate. The user can interact with and NFC tag which can contain or transmit basic information to the user device for initiating a browser and accessing a site such that a user interface can be presented via a browser and from the site that enables tasks to be performed. Tasks can include renting an object or parking space, making a purchase, registering for a reward program, opening a door, performing a physical function, as well as combinations of events, and so forth. A benefit of this approach is that there is no need to download an individual application for whatever the respective function is. The ability to easily pull up the user interface via a site and the use of a browser on the user device eliminates the need for opening or accessing an app on a user device that might have many apps. Scanning a code/tag can initiate a series of tasks such as the user with their device walking through a series of doors in which a fingerprint or faceprint presented to the user device or a component associated with a door would enable multiple doors to be opened in series.

The concepts disclosed herein with respect in-store purchases, and which can be applicable to other payment mechanisms as disclosed herein, are as follows. First, a store that sets up the use a browser payment API does not need any cameras or expensive scanning equipment. The user's mobile device acts as the primary mechanism for identifying products to be purchased and to manage the purchase process.

The user walks in to a store to potentially purchase a product. The store has a backend server which is accessible as any website on the user device. The user can simply type in the store URL on the browser loaded onto their user device. For example, the user may type in go.merchant.com and in response, the server communicates a user interface to the browser, which includes functionality to access or receive product identifications from the store. In one aspect, the process is manual, and in another aspect, a code on the product or a near field communication, or RFID type of signal is provided from a product or at the store entrance which can run a script or an automated process to open the browser and populate the URL data such that, the user does not have to manually type in a URL or start the browser. In this regard, the user may simply walk into the store, and an interface would automatically be presented with instructions regarding how to choose products, such as to scan a code using the camera on the phone or to simply position their phone near a product to receive a near field communication identification of each respective product.

Once the user has established communication with the server associate with the store, the user can simply choose products to purchase. Each product that is purchased can be identified via a camera shot of the visual code or key or through a confirmation from a near field communication identification that a particular product is desired to be purchased. The user may simply also pick products and place them in the bag and motion detection or near field communication based on a tag attached to each product can automatically identify which products the user is carrying around without the need to manually scan a visual pattern or to enter in the code. For example, the motion of the tag in connection with the motion of the mobile device can be used to train machine learning models to determine an association between a product that's been picked up by a user and their mobile device. The mobile device may be programmed to monitor signals from tags associated with products and when a connection is made, or when a threshold is passed with respect to a confidence level that the user has selected a product for purchase, the mobile device can initiate a browser, populate the browser input field with the URL appropriate to that store, and pass information about the product to the store server. The trigger may also just store the items, for later purchase, in the user is offline. A browser-based API can then be used, to finalize the purchase.

When the user has finished shopping, each product that is identified in the various ways set forth herein can be combined into a single purchasing interaction utilizing a browser payment API or other payment process. The server can request via the browser API payment information for the product or products that the user has in their shopping bag or that they have chosen. In this scenario, the user can have both a virtual shopping cart, as well as a literal shopping cart in store and at the same time. The device can respond to the browser API request with payment data which enables the server to process a payment for the products. The payment data can be a token for one time use, credit card information, or confirmation that an online payment service such as PayPal or a cryptocurrency wallet has processed the payment. Online payment services such as Apple Pay, Google Pay, and the Payment Request API or the like are thus applied to the brick-and-mortar purchasing experience. Thus enabling a consistent purchasing experience both online and in-store. Stored payment data at the site can also be used.

Users can thereby pay using their mobile device and simply leave the store. Dealing with shoplifting can be greatly reduced in that only individuals that have been identified to the use of their mobile device can enter the store in one aspect. Thus, having identification of everybody that has been in the store a particular day can reduce the temptation to shoplift. Other approaches could also apply to identify individuals who may shoplift. The infrastructure needed is greatly reduced in expense thus enabling a simplified process to smaller merchants who cannot afford expensive infrastructure.

Further, other enhancements can be provided in this approach in which the user mobile device can add extra value in terms of guiding a user around the store to purchase products, handle the product not in stock if it is still desired, or to up sell, or to accessorize product that they desire to purchase. By enabling enhanced capabilities from the user's mobile device, the in-store purchasing experience can be improved dramatically through the principles disclosed herein.

Another benefit of the approach disclosed herein is that it can completely eliminate the cost of infrastructure for a store. There is no need for a checkout facility or a point-of-sale location. A store can be provided with electrical components for providing near field communication or the proper codes for scanning via a camera on a mobile device without the need of any other point-of-sale purchasing infrastructure. This approach also is much more efficient and inexpensive than the Amazon Go store which requires users to download an app, scan a code at an entry location of the store, and which furthermore requires cameras and expensive infrastructure to monitor users as they select items for sale. This approach eliminates all of that cost, and would be much easier to implement for small merchants and in some cases can be just as convenient for the user as far as a brick-and-mortar purchasing experience.

Furthermore, in other scenarios, other infrastructure like POS devices at parking garages can be eliminated where a user can scan a tag, which can provide data to a site about what exit the user is at and can receive a payment through the processes disclosed herein. The site can then remotely cause the exit gate or door to open to enable the user to leave.

BRIEF DESCRIPTION OF THE DRAWINGS

FIG. 8 illustrates a payment screen that can be used for in-store purchases;

DETAILED DESCRIPTION

The following disclosure describes a number of different innovations related to simplify in-store purchases. The approach can be less expensive to implement than the Amazon Go store, and can indeed eliminate the point of sale and checkout lines. In many stores and restaurants, the point of sale is also a point of congestion. The time it takes to simply check out the user can be cumbersome and cause much delay in the entire process. The approach disclosed herein combines the capabilities of user's mobile devices with respect to cameras or communication components that can be used to identify products the user desires to purchase, with the simplicity of a browser-based API for communicating payment data to a store server. Combining these technologies results in an in-store purchasing experience that can be more efficient than any current process. The effort made by the individual is minimal in this process and completely eliminates point-of-sale devices and infrastructure. The process also eliminates the standard near field communication infrastructure needed for the initial versions of Apple Pay, Samsung Pay and Google Pay. In other words, using the approaches described herein, there is no need for a near field communication component at a cash register where the user needs to bring their mobile device in close proximity to. This is because the payment process occurs via a wireless communication via Wi-Fi or cellular and which is not dependent upon a near field communication type of interaction at a point of sale location.

Various examples of the disclosure are described in detail below. While specific implementations are described, it should be understood that this is done for illustration purposes only. Other components and configurations may be used without parting from the spirit and scope of the disclosure. When specific method examples are discussed, the various steps of the method examples can be implemented in different orders, combinations, or permutations, including additional steps, or excluding specific steps.

Figure 1:
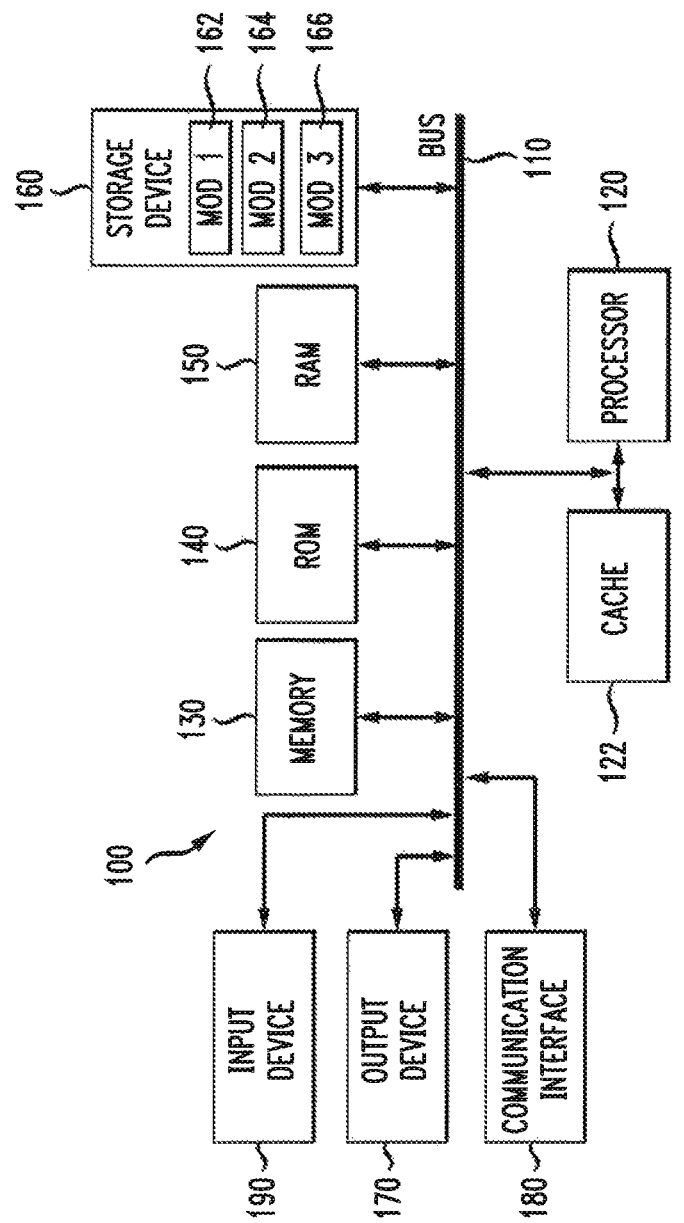
FIG. 1 illustrates a system architecture.

A description of a basic general-purpose system or computing device in FIG. 1 which can be employed to practice the concepts, methods, and techniques disclosed is illustrated. With reference to FIG. 1, an exemplary system and/or computing device 100 includes a processing unit (CPU or processor) 120 and a system bus 110 that couples various system components including the system memory 130 such as read only memory (ROM) 140 and random access memory (RAM) 150 to the processor 120. The system 100 can include a cache 122 of high-speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various operations or actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric. The processor 120 can include multiple processors, such as a system having multiple, physically separate processors in different sockets, or a system having multiple processor cores on a single physical chip. Similarly, the processor 120 can include multiple distributed processors located in multiple separate computing devices, but working together such as via a communications network. Multiple processors or processor cores can share resources such as memory 130 or the cache 122, or can operate using independent resources. The processor 120 can include one or more of a state machine, an application specific integrated circuit (ASIC), or a programmable gate array (PGA) including a field PGA.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage devices provide nonvolatile storage of computer-readable instructions, data structures, program modules and other data for the computing device 100. In one aspect, a hardware module that performs a particular function includes the software component stored in a tangible computer-readable storage device in connection with the necessary hardware components, such as the processor 120, bus 110, display 170, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 100 is a small, handheld computing device, a desktop computer, or a computer server. When the processor 120 executes instructions to perform "operations", the processor 120 can perform the operations directly and/or facilitate, direct, or cooperate with another device or component to perform the operations.

Although the exemplary example(s) described herein employs the hard disk 160, other types of computer-readable storage devices which can store data that are accessible by a computer, such as magnetic cassettes, flash memory cards, digital versatile disks (DVDs), cartridges, random access memories (RAMs) 150, read only memory (ROM) 140, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system example is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative examples may include microprocessor and/or digital signal processor (DSP) hardware, read-only memory (ROM) 140 for storing software performing the operations described below, and random access memory (RAM) 150 for storing results. Very large scale integration (VLSI) hardware examples, as well as custom VLSI circuitry in combination with a general purpose DSP circuit, may also be provided.

The logical operations of the various examples are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 120 can include all types of processors disclosed herein, including a virtual processor. However, when referring to a virtual processor, the processor 120 includes the software components associated with executing the virtual processor in a virtualization layer and underlying hardware necessary to execute the virtualization layer. The system 100 can include a physical or virtual processor 120 that receive instructions stored in a computer-readable storage device, which cause the processor 120 to perform certain operations. When referring to a virtual processor 120, the system also includes the underlying physical hardware executing the virtual processor 120.

In each case within this disclosure, reference to "Amazon" or Amazon.com" is broad enough to encompass any purchasing/delivery or ecommerce website, as well as websites for traditional, brick-and-mortar businesses that provide goods or services. References to a "Google" site or search refer to any generalized search engine. In many instances, the principles set forth herein may be applicable to other, non-search and non-commerce sites, which the system can manipulate or traverse in order to accomplish a specific, intended action on behalf of the user.

The system of FIG. 1 can also represent a virtual reality device. The device can be a headset that is entirely contained or can include a headset that receives a mobile device such as a Samsung device or an iPhone or other mobile device. In this regard, the features of FIG. 1 can include the components of such a headset. The input device 190 can represent one or more different types of input devices, such as a camera for taking still images or video, a fingerprint reader which can be configured on a side of the headset for easy confirmation of purchases by a user, while in a virtual reality environment. The output device 170 can represent a screen through which the user views images. A communication interface 180 can provide a Wi-Fi, or cellular or other wireless communication means with other devices, access points, base stations, and so forth. The adjudication interface 180 may also represent an interface between a removable mobile device and the headset for communicating data between the two components. Memory 130 can represent any standard memory used in the art as well as a secure element which can be used to store payment information and/or other user information in a secure manner for use in payment processes such as Apple Pay.

In-Store Purchasing

The concepts disclosed herein can also work for physical malls and stores, as well as for objects positioned outside or at any location. People could do two things with an in-store context. In one case, users just shop at various stores and put items in their physical shopping bag. Users could scan via a code or NFC tag data for each item. Different modes of identifying products could be applied. The users would not check out at individual store points of sale but could just go from store to store. One checkout for all the stores could be used for all the items together with one payment interaction. The checkout could be at an exit or on their own phone, via a bar code reader or other identifier of the products which can combine them such that a single click can process all payments using the browser API or other payment process disclosed herein. The users could access a mall URL or site or individual store sites using their browser to initiate the process of enabling a camera, wireless component, or NFC component to scan or receive information about the product for entering into a virtual shopping cart. A benefit of this approach is that users don't need to download a specific app for each store but use a website accessible through their browser to initiate or complete the scanning capability for identifying products. Another benefit of this approach is that the store infrastructure is much cheaper than is needed for Amazon Go. There is no need to scan a code upon entry into the store and there is no need for complicated camera systems to monitor users' activity and products that they pick up. Rather, users simply utilize their mobile device in connection with picking up products. Data is communicated from a wireless component or camera component on the mobile device which communicates with the browser. The browser, based on the data scanned, initiates a connection to a server and transmits data regarding the products to the server. The server can return a user interface which can also include other functionality like controlling the camera, NFC scanner or other components to perform other tasks. The store server can then utilize the browser API or other payment mechanism to finalize the purchase or complete some task. This also completely eliminates the checkout line and can greatly simplify the user experience with in-store shopping. Further, other tasks like opening an exit gate, or a door, or a combination of tasks could be coordinated between the scan of data, the store server, and a physical environment of the user.

Figure 2:
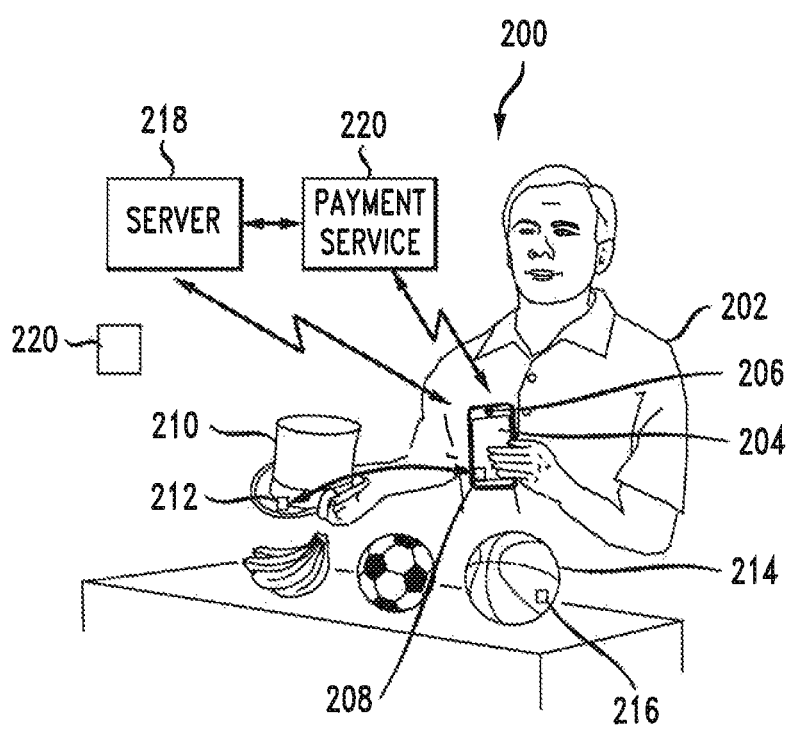
FIG. 2 illustrates a brick and mortar purchasing experience with the store server.

The browser API enables an easy purchase without the need for any checkout infrastructure and enables the purchase without storing payment data on the store server. FIG. 2 illustrates the approach 200. The user 202 enters a physical store and accesses a store network based site 218 using a mobile device 204. In one aspect, the device 204 includes a camera, NFC module or other communication module 208, 206 that can be initiated and can communicate with the browser connected to the site 218. Thus, when the user scans an item 210 from the store, a communication to the server can be initiated via the browser. No app needs to be accessed or downloaded. The server 218 can present a user interface for confirming a purchase or to identify that item and put it in a virtual shopping cart. After scanning one or more items, the user can be given the option to pay and can use the browser API disclosed herein to provide an easy payment for all the items using a payment server 220, or a payment mechanisms like Apple Pay, Google Pay, Microsoft Pay, cryptocurrency wallet, etc., which are browser based. Where an app is used, a software module which communicates payment data to the app can also be used with a respective API which coordinated requests and responses between the app and the software module on the user device. Items to be purchased 210, 214 can include a tag 212, 216 that can communicate wirelessly with the mobile device 204. The tag can be like an RFID tag, NFC tag, and can have a battery for power or can be solar powered. The mobile device may also power the product tag.

The user device 204 can have an NFC component, a code reader/camera or other communication component and as they look at products they like, they can scan a code, or the product could be automatically identified through near field communication or some other wireless protocol. In one basic aspect of this disclosure, the user 202 can then simply walk out of the store and at an appropriate time can manage the payment through a browser API or some other payment mechanism is disclosed herein. By communicating with the store server 218 through a URL, and the browser on the device 204, data can be communicated between product identification, the browser, and the store server 218 to provide the ability to easily purchase the items using the mobile device 204 and without the need of near field communication infrastructure at a point of sale.

In one aspect, a wireless component 220 can be configured at a point in a brick-and-mortar store such as at the entrance which can identify that the user is entering with the mobile device 204 and can perform a test of whether the mobile device is capable of performing the basic functionality needed to enable shopping as disclosed herein. If so, the user is allowed to shop. If not, the user cannot enter.

The user might not then actually take the item the desire to purchase with them. Users could interact with their mobile device 204 to simply confirm items they desire to purchase as they go from store to store. These items that they physically connected with through their mobile device can be placed in a virtual shopping cart. Once they've gone to all the stores and looked at say four items in four different stores, they can then pull up their shopping cart on their mobile device and see all those items placed in a shopping cart. They can then one-click (or use a simplified process) purchase and all the payments are processed for the respective stores. The items could be brought to them as they leave the store, at a certain exit, such that notices to runners at each store in the mall to take the purchased item and deliver it to John at the East exit to the mall, or they could be delivered to them at home so the user can just leave. In a stadium scenario, the item such as food could be brought to the user's seat.

The system could also track the movement of the buyer's mobile device and simply find them in the mall or stadium. A code could be used by the runner to confirm the right user is receiving the purchased products. The shopping cart can provide the option to have items delivered or a code or other data. Timing expectations can be provided to users for how long they have to wait. Perhaps the users could buy the items on their phone and as they start to walk away to their car, and given the tracking of their mobile device, which can provide geofencing information on which entrance they came into, the items they've purchased can be waiting for them at the exit. Runners can deliver the items to an identified locker, seat or to the user based on location information of their phone, or location at their exit so they can then take the items home. This improves the experience where users don't have to carry around all the items they've purchased as they walk around the mall. Expected timing of delivering all the products could be provided. The user could click "buy" on their shopping cart and the system may predict a 10 minute time when all the products will be delivered to the user. It might increase the number of items people would buy as well. From a single shopping cart, the browser-based API can be used and a component could manage all the payments to the different stores. Items could be placed in lockers at an exit or at a particular location and the users could unlock the lockers with their mobile device interacting with an NFC tag on the locker.

Users also could use Apple Pay or other payment mechanisms at each store as well, and the system could simply combine the purchased items into the "shopping cart" such that when the user leaves, they can indicate that they are leaving and they need delivery. Then the items can be gathered and delivered to the user. The runner or runners can receive, via an app or browser, instructions on what items to get, from which stores, an identification of the purchaser, and can easily gather up all the items and bring them to the purchaser.

In another aspect, by scanning items in a store using a mobile device, the system can evaluate an expected weight of a bag containing all the items purchased from a store or stores. The weight could be added up, the user could place the bag of products on a scale and the purchases from that user, identified by NFC data, Bluetooth data, or a scan at the scale, or other mechanisms, can confirm that the weight corresponds to the group of items they purchased. Item 220 can also represent the scale that might be used at an exit of the store. If the weight was greater (or less) a manual check could be provided. This weighing of the products can further simplify the process of leaving the store. Multiple stores can be shopped at and an exit to a mall can provide the weighing mechanism. A server would compare the weight of the items on the scale with the weight of items in their virtual shopping bag or the items they've purchased. The scale would be on the floor where the user walks in and out. The use of a payment mechanism could also correspond to the weighing process where they click on a pay button after the weight matches their virtual shopping bag items. Thus, a timing element could be introduced in terms of when the payment button is presented after a successful weighing. It of course could come before or as the user buys items. Then they are correlated for a weighing operation. Being browser based, the user could navigate to the store or mall's website and initiate the process of making purchases through scans. There is no need to download an app to accomplish the functionality when using the browser-based API's disclosed herein.

One aspect of the process described above is that the user can open their browser and type in the URL to access a server associated with the store they are standing in. One mechanism of simplifying this process would be to provide a capability of automating this navigation. For example, as a user enters the store, there could be a wireless communication through an NFC station, Wi-Fi, Bluetooth, code scan, geofence, or any other protocol 220 which provides an instruction to the device to launch a browser and auto populate the appropriate URL and hit "enter" to navigate to that server. This could be a "dumb" terminal in that there is no need for an Internet connection but merely the need for a wireless communication to the user's mobile device. The mobile device could include a setting which the user can set to automatically act when the instructions or the wireless communication is received. A new syntax or protocol in the context of wireless communications in short ranges, such as NFC, will enable the mobile device to receive the data and instructions, and will cause the mobile device to carry out the instructions based on the received data. Thus, a wireless station at the entrance to a store could send data such as "go.merchant.com", "launch browser" and/or "initiate camera". The operating system or programming of the mobile device can be updated or programmed to automatically respond to these instructions. The user can set their mobile device to turn on the automated functionality, for example, when they go into a mall, or when they go shopping for the day. Then, the user does not have to manually click on their browser, or manually type in the URL of the store. The syntax can include a store address or location, GPS coordinates, or any other data but fundamentally its purposes to provide instructions to initiate a connection to a server via a browser and went on a product to provide the basic product information. An NFC tag or code could also be placed on any object at any location and interaction with that code via a mobile device can launch a browser to a site. The site returns a user interface enabling the user to buy a product, rent something, perform a task, or initiate a combination of tasks.

In one aspect, the user interface for shopping in store would only take part of the display screen, this enabling multitasking while shopping. Another way this can occur is simply via a wireless communication component attached to each product in a store. Each product can have its own wireless communication component or tag 212, 216 that transmits a signal that can include an instruction to launch a browser and navigate automatically to the appropriate network-based server to establish communication with the server of the store. In this scenario, the user literally needs to only walk into a store and start shopping. The first item they bring in close proximity to their mobile device will launch the browser, navigate to the URL, initiate other needed processes if necessary, such as a camera, and thereby place the mobile device in a state of being able to communicate with the store server for the product that the user desires to purchase or rent. The user can then select products according to the available process such as by scanning a code using the camera on their mobile device or merely using communication technologies to bring their mobile device near a product such as that the electrical component attached that product provides the necessary data for adding the product to their shopping cart. Of course, the component attached to each individual product can include product information as well to identify that product and enable the user via the interface to select the product for purchase via the browser API or other payment mechanisms. In one example, the mobile device could be an electronic watch. The user might be able to simply pick up items for purchase using their hand, which is close to their electronic watch such that the near field communication, information attached to the product can be processed by the watch. The watch can establish the browser-based connection to the store server, and enable a browser API based payment process to finalize the purchase. It is noted that the same automatic instructions can also be provided via a camera on the mobile device scanning a code. In other words, the code that is scanned can be modified to include the instructions to launch a browser, navigate to a URL, and established communication with a server.

Thus, the user could scan a code as they enter the store as well to initiate the communication with the server which can launch the user interface for continuing to scan for products to purchase, rent or perform some other task. Once the server responds with a user interface and capabilities to select products for purchase, later scans or camera images of codes associated with products can identify that the server is already accessed and the mobile device only needs the product information in the data received. The server 218 can communicate a user interface which can guide the user with respect to how to select products for purchase in the physical store. For example, instructions can include guidance on scanning codes attached to items for purchase or instructions that, by simply selecting items for purchase and carrying it with them, their mobile device will be able to identify the items and communicate them to the server to enable payment processing.

Another possible advantage of the approach described above is that the products at a particular location don't need to be all from the same source. For example, one store could contain products from a first merchant, a second merchant, and a third merchant. As the user picks a first product and uses near field communication identify that product as one to purchase, the system could navigate to a first merchant server to identify that the user desires to buy that product. The same process can occur for the second merchant server for a second product and the third merchant server for a third product at the location. All the products can be contained also within the same virtual shopping cart. Then the user can make a final purchase of all of the products, and each merchant can be paid. In other words, this approach enables a much more flexible shopping environment which is not need to be tied to a single merchant at a physical location. Different tasks could also be placed in the same shopping cart. The user could rent a parking place and purchase an item all in one payment.

Claims covering the above concepts can be drafted from the standpoint of the electronic component (having a battery, data stored as described herein, a mechanism for transmitting wirelessly, a tag, etc.) on a product and how it has a syntax for transmitting in a near field electronic signal with instructions for initiating a browser and populating a URL for a store server. The tag could also be on a plate or package for food from a restaurant, or placed on a table to be near the mobile devices of the restaurant customers. Claims can cover a mobile device programmed or configured to receive a wireless instruction communication via a communication module (blue tooth, NFC, etc.), automatically launch a browser, populate a URL in the browser based on the data, establish a communication with a server, pass data to the server for a product identification, and receive user interface data from the server for interacting with products for making purchases, rentals or performing some other task including the browser API payment process. A claim could also be drafted from the product standpoint having a component contained thereon as well as a claim to the server and its functionality as described herein. One example also is the mobile device itself which includes the necessary hardware components (like an NFC component) and software components like a browser to enable the processes disclosed herein.

Shopping carts in one scenario can span online, in app, and in-store product selections. The system can store the various products that have been perused on the various websites and/or in store. As a user then enters a product into a shopping cart, and option can be presented which populates the shopping cart with one or more of these other items from other sites or physical stores. The system can strategically present this option. For example, if the user had perused a toothbrush and the toaster on different websites, but now places a different toaster in a shopping cart or is in store and adds an item to their shopping cart, the system may only ask if they would like to see the other toaster presented with comparable information. If the user has a certain number of items that they have recently perused, the system may ask if they would like to see the most recent three items added to their cart (again, whether on line or in store), or the items that they spent the most time on reviewing, or the most expensive items, or any other characterizations that the user might desire. This approach allows the user to control which items are added to their universal shopping cart for a one click purchase of the group of items.

One benefit of the approach disclosed herein is that users don't need to register their payment information or address information with a store in which they are shopping. The browser API is utilized for the payment information. However, some of the other functionality could also be applied where the user registers payment information, address information, or any other information with the shopping cart plug-in, extension, or online while in the store.

For in-store shopping or object-based shopping, people could do two things. In one case, users just shop and put items in their physical shopping bag. The users would not check out at individual stores but just go from store to store picking up products and carrying the products out the store. One checkout for all the stores could be used for all the items together with one payment. The checkout could be at an exit through a communication station or component such as a near field communication station, or on their own phone, via a bar code reader or other identifier of the products which can combine them such that a single click can process all payments using the browser API disclosed herein. The users could access a mall URL or site or individual store sites using their browser to initiate the process of enabling a camera or NFC component to scan or receive information about the product for entering into a virtual shopping cart. An NFC component on a mobile device can use an NFC Data Exchange Format (NDEF), or any other type of protocol, to obtain data from an NFC tag. A benefit of this approach is that users don't need to download a specific app for each store but use a website accessible through their browser to initiate the scanning capability for identifying products. The browser API enables an easy purchase without the need for any checkout infrastructure. The user 202 enters a physical store and accesses a store network based site 218 using a mobile device 204. In one aspect, the device 204 includes a camera, NFC module, RFID tag reader module or other communication module 208 that can be initiated and communicate with the browser connection to the site 218. Thus, when the user scans an item 210 from the store 200, the mobile device communication component sends data to the browser which sources it to the site such that the server 218 can identify that item and put it in a virtual shopping cart. After scanning one or more items, the user can be given the option to pay and can use the browser API disclosed herein to provide an easy payment for all the items using a payment server 220, or on-line payment mechanisms like Apple Pay, Google Pay, Microsoft Pay, etc., which are browser based or other payment mechanisms like PayPal. Cryptocurrencies can also be used to pay in full or in part (such as Ripple as a bridge currency) through the use of one or more APIs in which the browser acts as an agent to coordinate the payment process.

A wireless station at the entrance to a store could send data such as "go.merchant.com", "launch browser" and/or "initiate camera". The operating system of the mobile device can be updated or programmed to automatically respond to these type instructions. The user can set their mobile device to turn on the automated functionality, for example, when they go into a mall, or when they go shopping for the day. Then, the user does not have to manually click on their browser, or manually type in the URL of the store. The syntax can include a store address or location, GPS coordinates, or any other data but fundamentally its purposes to provide instructions to initiate a connection to a server via a browser and enable an interface for the user to search for products in the store. Another way this can occur is simply via a wireless communication component attached to each product in a store. Each product can have its own wireless communication component that transmits a signal that can include an instruction to launch a browser and navigate automatically to the appropriate network-based server to establish communication with the server of the store. In this scenario, the user literally needs only to walk into a store and start shopping. The first item they bring in close proximity to their mobile device will launch the browser, navigate to the URL, initiate other needed items if necessary, such as a camera, and thereby place the mobile device in a state of being able to communicate with the store server for the product that the user desires to purchase.

The user can then select products according to the available process such as by scanning a code using the camera on their mobile device or merely using near field communication technologies to bring their mobile device near a product such as that the electrical component attached that product provides the necessary data for adding the product to their shopping cart. Once in the "state" of being in the store and having a connection to the store server, the browser can help to manage other components of the mobile device for product identification. For example, the browser may have access to the camera for scanning a code or for merely taking a picture of the product they want to buy. Either way, the product data is transmitted to the server for identification and confirmation and to enable at the appropriate time the browser API payment process.

Generally speaking, this disclosure provides various mechanisms of initiating a browser connection to a store server when a user physically takes the mobile device operating the browser into the brick and mortar store. The process causes the mobile device to be placed in a "state" of in-store shopping. The state includes some characteristics. The device will have its phone used to scan codes which are communicated to the browser and thus to the site for processing, of pictures of the product will be transmitted to the browser and site for processing etc. If the user wants to switch states and take a normal picture in the store to be stored on their phone or in the cloud, an option can be presented to toggle between a normal state of operation and an in-store shopping state of operation. Portions of a display screen can be used for both modes.

Another benefit of the approach above is that it can completely eliminate the cost of infrastructure for a store. There is no need for a checkout facility or a point-of-sale location. A store can be provided with electrical components for providing near field communication or the proper codes for scanning via a camera on a mobile device without the need of any other point-of-sale purchasing infrastructure. A store could be set up with training data of pictures of products to be sold such that the user taking a picture of a respective product can have a high probability of identifying that product for sale through the browser API approach. This approach also is much more efficient and inexpensive than the Amazon Go store which requires users to download an app, scan a code at an entrance to the store, and which furthermore requires cameras and expensive infrastructure to monitor users as they select items for sale. This approach eliminates all of that cost, and would be much easier to implement for small merchants and in some cases can be just as convenient for the user as far as a brick-and-mortar purchasing experience. Claims covering the above concepts can be drafted from the standpoint of the electronic component (having a batter, data stored as described herein, a mechanism for transmitting wirelessly, etc.) on a product and how it has a syntax for transmitting in a near field an electronic signal with instructions for initiating a browser and a URL for a store server. Claims can cover a mobile device programmed or configured to receive a wireless instruction communication via a near field communication module (blue tooth, NFC, etc.), automatically launch a browser, populate a URL in the browser based on the data, establish a communication with a server and receive user interface data from the server for interacting with products for making purchases, including the browser API payment process. A claim could also be drafted from the product standpoint having a component contained thereon that communicates product data to a mobile device as well as a claim to the server and its functionality as described herein.

The system may also enable multiple stores to function as a group. A user might be able to navigate to a localmall.com site which can turn on or access a group of stores in that mall such that the user can go through and scan items from any of the stores and do a single checkout for all the items at a mall exit or at any other location. A scale can be provided at an exit which can coordinate the weights of all the products purchased. At a grocery store, a scale can cover an entire shopping cart and the products therein. The user may walk out and have the cart/products put on a floor-based scale to confirm the purchases made. This process can alleviate long check-out lines. In some cases, brick-and-mortar check out schemes like NFC-based Apple Pay and Google Pay would also be eliminated in favor of the browser-based API model described herein in that no checkout point of sale would be needed including no need for the expensive NFC equipment.

In another aspect, the system can store the various products that have been perused on the various websites or in-store. As a user then enters a product into a shopping cart, and option can be presented which populates the shopping cart with one or more of these other items from other sites, other stores, or other locations within the same store the user is currently in. The system can strategically present this option. For example, if the user had perused a toothbrush in the toaster on different web sites, but now places a different toaster in a shopping cart, the system may only ask if they would like to see the other toaster presented with comparable information. The user interface could direct the user to a different isle in the store or to a neighboring store. If the user has a certain number of items that they have recently perused, the system may ask if they would like to see the most recent three items added to their cart, or the items that they spent the most time on reviewing, or the most expensive items, or any other characterizations that the user might desire. This approach allows the user to control which items are added to a universal shopping cart for a one click purchase of the group of items. Artificial intelligence and/or machine learning approaches can also be utilized to characterize user shopping and navigation history with respect to their buying habits such that the shopping cart could be populated with only those items having a threshold probability of the user actually purchasing. As has been noted above, the shopping cart can also involve multiple users. Accordingly, multiple users group by family, friends, payment accounts, browser usage, or any other grouping can be coordinated such, for example, that if a parent opens a shopping cart, that items viewed by the children could be added to the shopping cart for determining whether to purchase or not. Such a shopping cart can also be a jumping off point for continued shopping at any respective site or other physical locations. For example, if the shopping cart includes three items from three different sites and/or stores, and the second item from the second site is a toaster but not quite the right toaster, a selectable object can be presented to continue shopping at that site for similar products. The object can be configured to transition the user to a deep link in the second site with search results associated with the product in the shopping cart, but that shows comparable products for continued perusal. In such a scenario, the persistent state could be maintained such that as the user transitions to the second site for continued shopping, if the user chooses a separate toaster, the user could transition back to the shopping cart with the separate toaster replacing the initial toaster for again single click purchase of a group of items.

One benefit of the approach disclosed herein is that users don't need to register their payment information or address information with a shopping cart plug-in or service inasmuch as the browser API is utilized for the payment information. However, some of the other functionality could also be applied where the user registers payment information, address information, or any other information with the shopping cart plug-in or extension.

Figure 3A:
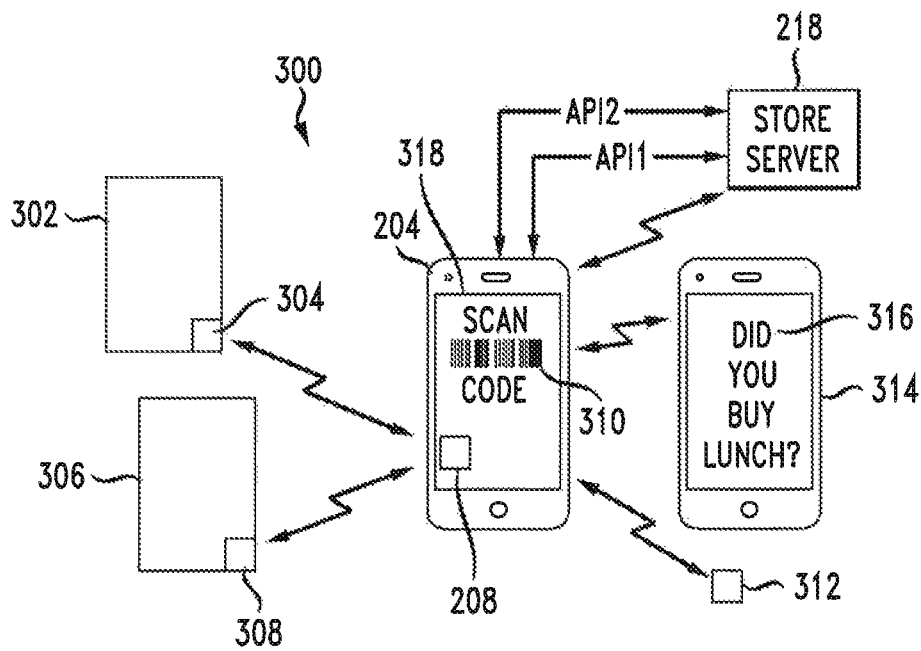
FIG. 3A illustrates the interaction between the tags on products and the mobile device of the user.

FIG. 3A illustrates the basic concepts 300 for a simplified in-store shopping experience. The user brings the mobile device 204 into a store and either manually, or in an automated fashion, a browser on the device 204 is populated with the URL to connect to a store server 218. The store server 218 can provide a user interface 318 (such as via a browser, or an application that is downloaded to the device) with instructions 310 regarding making purchases in the store. Initially, the user interface can be simple and enable the user to simply scan a code 304, 308 on respective products 302, 306. A camera or other communication component 208 can be used to receive data from the product 302, 306. In another aspect, machine learning could be used to enable the device 204 to simply take a picture of a product without a code and have that data communicated to the store server 218 to identify the product for purchase. The system could confirm with the user that a threshold has been met to properly identify each product. This can further simply by the process without the need of a tag 304, 308 which contains a code or an electronic component for transmitting in wireless signal to the device 204.

Having identified the product or products 302, 306 that the user desires to purchase, the device 204 via the browser communicates with the store server 218, and enables the store server to initiate a browser API based payment process for products in a shopping cart. FIG. 3A can also illustrate other aspects of this disclosure.

Several additional concepts can also be introduced by applying the enhanced capabilities of the user's mobile device for scanning for codes associated with products to be purchased, communicating with a store site 218 through a browser and making the payment through a browser-based API. For example, in restaurants, the user could walk in to a store such as Chipotle, order lunch, the store could attach a device on the lunch in some manner, such as on a container, and the user could just walk out of the store. The device 304, 308 could have encoded the cost of the meal and can transmit a signal which is received by the mobile device 204 to identify the cost, the meal, and initiate communication with the store server 218 to enable the user to make the purchase via a simplified browser-based payment process like Apple pay or Google pay.

As the user approaches the counter, a device 312 could detect that the user has a device 204 with the capability of using the above simplified shopping and payment process. A notification can be provided to a worker at the store that this customer will use that system. As lunch is ordered, a disposable RFID tag, or similar tag 304, 308 can be printed or generated and stuck to a package. Rather than printing a receipt, the system could print an electronic tag that has a sticky side that is simply attached to a container of the food. The user can then simply walk out of the store. Time is saved and there is no need for an expensive infrastructure at the point of sale to manage payments. Once the product (or meal) is communicated to the device and the browser connection is made, a payment can occur. The tag can be of course an NFC tag that includes the price, the store, and any other data such that the user can scan the tag which will launch a browser, connect to a site, and enable the user to confirm the purchase. This approach can also lead to further on-line interactions with the merchant. For example, the user could be launched into a social media network like on the store's Facebook page to post a photo (for a discount) rather than just a merchant site for managing a sale. The user might get points for posting their purchase or their experience on a social media site and receive Facebook Coins or other value for the social media interaction. The interaction can be initiated by the code/tag on an object.

In one example, an interface can be presented to the user to purchase an item (your lunch is ($9.50), and give them the option to post a picture of them eating the lunch and pay $8.50. Multiple tasks could be combined in this context (payment+posting).

Figure 3B:
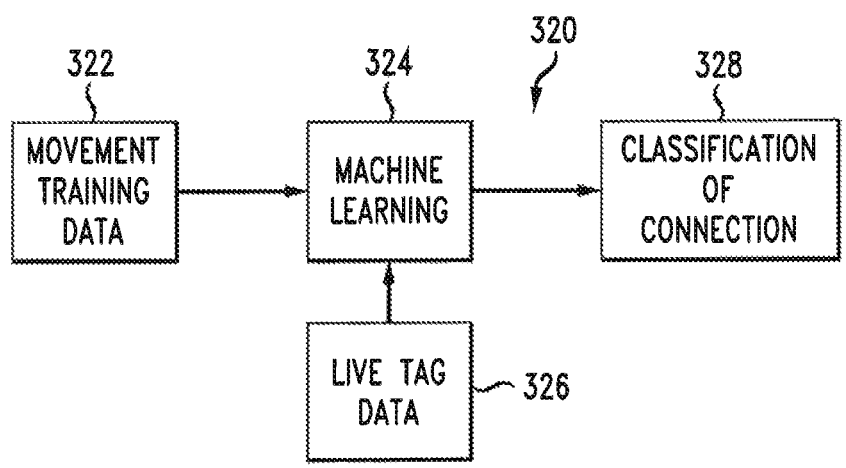
FIG. 3B illustrates a machine learning approach to classifying a moving tag as being associated with a mobile device for processing a purchase.

Machine learning algorithms can be implemented to determine the patterns of the physical movement and relationship between a user's mobile device 204 and the item purchased 302, 306. A machine learning system is shown in FIG. 3B and can be fed with training data 322 regarding known patterns of movement. If a user has purchased a lunch to go and is carrying the lunch and also has their phone 204 in their pocket or in a purse, the products 302, 306 with the tag 304, 308 will move in the same direction and within a few feet of the mobile device 204. Patterns can be developed to identify when a companion or friend is walking beside the person holding the meal and how to distinguish between mobile devices that are also near to the product bearing the tag but that are not part of the specific purchase. A disambiguation interaction can be presented to the user on the device 204, via a user interface, or audible interaction, or any other kind of interaction, where a threshold level of confidence is not been met with respect to the proper purchaser of the item.

Having trained machine learning algorithm 324 with the training data 322, the system could then receive live data regarding tag motion relative to device motion 326 and make a classification decision regarding a connection associated between the two 328. Thus, the output of the machine learning component 324 would be a determination that a particular tag is connected to or associated with a particular mobile device that is going to process a purchase for the product associated with that tag.

For example, if Mary and Joe go to a restaurant or store and Mary buys lunch but Joe does not. Assume they're both walking together and the system cannot disambiguate between whether Mary is supposed to pay for the lunch or whether Joe is supposed to pay for lunch, based on the data received by their respective devices. The system may identify the individual with a higher likelihood that they are the purchaser. If both have devices that have the capability of performing the functionality disclosed herein, the devices may coordinate and generate a disambiguation user interaction. The system can generate an interaction 316 for Joe's mobile device 314 to simply ask "did you buy lunch or did Mary"? Joe can respond by clicking a button or providing any kind of user input to confirm that Mary bought lunch. The system could also ask for Mary's fingerprint (or any biometric like a faceprint or a code) to confirm that she bought the lunch on either her device or Joe's. Communication could be exchanged between the two devices to accomplish a simplified approach to finalizing the purchase. In other words, each device can be programmed with not only the capability of detecting tags in their close vicinity but running algorithms to determine whether a tag is associated with a product that needs to be purchased. The algorithms also can be built-in to communicate with other devices that are also nearby for disambiguation purposes. Some of these approaches can occur locally only on the mobile devices and in other scenarios, the devices may reach out for more computing power via a network-based service.

There are many benefits to this approach. First, there is no checkout line and the user can immediately be provided with the product and leave. The amount of infrastructure at a store can be minimized. There is no need for near field communication component at a point of sale for the user to bring their phone near to for confirming the purchase. This approach will speed up the checkout line in any store and be inexpensive to implement.

In addition, if Mary and Joe both purchased lunches and are walking out, the system can identify a group of purchases 302, 306 associated with the group of mobile devices 204, 314. Where each individual lunch can be tied to the proper mobile phone, the system can simply pop up a confirmation graphical interface 316 to enable the user to simply confirm with a facial recognition or fingerprint recognition (or other means) that they made the purchase. This process can be managed with the browser as an agent to receive confirmation data and communicate via a communication link to the store server to achieve the payment using the browser-based APIs disclosed herein.

Where it is ambiguous with respect to the group of meals associated with the group of individuals, the system could also present a simplified user interface in which the interface could ask whether each is purchasing their own meal or whether Mary or Joe is purchasing both meals, and so forth. Typically, individuals will be together and the system will simplify for them the ability to finalize the purchase with the proper person paying for the proper meal or meals as desired. Furthermore, patterns or indicators could be developed in which the user who is purchasing the meal for the group will simply place their mobile device on the table, and others will keep them in their pockets or purses. Such group signaling can be coordinated between devices to enable an easy disambiguation of who will be purchasing the meal or whether a cost will be shared.

Social media data can be drawn upon to determine whether the two individuals that are next to each other do have at least some level of association. This can have bearing on the analysis of whether they are together, whether they know each other and whether a joint communication should be provided. Where there is doubt about whether the two individuals are related or together, the system may provide a separate interface 316 for each of them separately to confirm the purchase. Such an interface may also be anonymous so as to not share information about the other individual. For example, if Mary and Joe don't know each other are simply walking close to each other, and the system determines that they might not be friends, the system may simply ask for confirmation from Joe or Mary regarding the meal that they just purchased. Social media or other data can be used to determine whether there is a relationship between the people.

In another aspect, the machine learning algorithm 324 for restaurants where people sit down to eat can also be trained such that individuals of the same table or same booth can be determined to be part of a group or a meal and at the conclusion of the meal, the system can present options for purchasing the meal. In this scenario, users may simply go to restaurant, order, receive their meal with a tag associated with it, or different meals, each with a respective tag, and simply sit down and eat. The system can be analyzing the location of each meal tag, the location of each mobile device of the users, and make determinations as to who ordered which meal. When done, individuals can simply leave the restaurant. The system can identify or present a user interface 316 at any time for them to confirm the payment for the meal. The system could provide the confirmation after they leave the restaurant. The system could present the confirmation once the customer leaves the store and sits down in their car and before they start their car to simply confirm the purchase. The confirmation could also be correlated between the mobile device and a user interface in their car. For example, the user could shop, eat, or otherwise interact with tags associated with products that they are to purchase. Their mobile device and/or communication with a store server can identify that the user has shopped in several places and has one to three or more items to purchase. As the user sits in their car to drive away from the mall, an option can be presented on their touch sensitive screen to simply confirm all of those purchases. Whether directly from the vehicle or through Bluetooth or other to communication with their mobile device, the confirmation can be provided through browser-based or other payment mechanisms.

Options can be presented for people to purchase the whole meal or all the meals, or to break out the meals to individual purchasers. Individual user patterns can also be incorporated into the machine learning algorithms 324. For example, if Joe has a tradition of purchasing dinner for a group of individuals, that data can impact the type of interactions that are presented after meal with Joe such that it can be biased in favor of him purchasing all the meals.

After a user leaves the restaurant or store, the system can "call" or text or email or provide any kind of communication to finalize the purchase. For example, where payment processes are built into email and texting, or voice interactions, the system could add that purchase to a shopping cart of other online purchases for a simplified purchasing transaction. For example, the user could go the restaurant sit down and eat and go home. They may have used Alexa, or Google home to earlier add a product from target into their shopping cart. They may have made an online selection of a product to go into a shopping cart. This approach could add and in-store purchase or a restaurant purchase to that same shopping cart so that, as they are in a more convenient position of being online to handle purchases, they can simply add the restaurant or in-store purchase to their list of purchases. This approach even simplifies the process further where the user doesn't even have to manage a payment process, or an interaction with their mobile device when they are with their friends. The user could simply leave the restaurant and go home, and later, when it is convenient to confirm the purchase, the purchase can be confirmed.

A service such as Apple pay, or Google Express or Google Shopping Actions can incorporate these kinds of purchases as well. A benefit of this approach is that by utilizing the principles disclosed herein, purchases can be identified appropriately as the user interacts with the product via their mobile device, such that payment can occur at any time that is more convenient. Furthermore, a benefit of this approach of separating the timing of a payment with the picking up of a product can also enable further advertising or customer care approaches which are currently not available. For example, a user may pick up a pair of sunglasses at a brick-and-mortar store in which the tag associated with the sunglasses is properly connected to their mobile device. However, they may return home and be on their laptop computer and have an advertisement or notice provided to them regarding whether they would like to now purchase those glasses and accessorize them with a hat as well. Browsing of products on-line by a user can be coordinated with directions on a mobile device or interactions on the user's mobile device while they are in store or elsewhere in connection with an object. Thus, up-selling or advertising can be presented on a user interface with respect to products previously physically retrieved from a store and brought to a new location, but not yet actually purchased. Advertisements can flow both ways. Ads can be provided on-line based on in-store activity, or advertisements can be provided while in-store based on online activity. Further, in-store activity at one store can impact communications while the user is in another store. An advertising server of module can coordinate such communications with a store server or other entity.

Another aspect of this disclosure is fraud detection. One of the benefits of this approach is that it utilizes knowledge about the individuals which is readily available with respect to their smart mobile devices 204 that users carry around with them. In one aspect of this disclosure, the system manages or records data regarding individual movements and purchases utilizing this browser-based in-store or object-based purchasing process. Each user can develop a credit score value or profile. This would be similar to a regular credit score but would have additional data regarding their level of honesty in utilizing the infrastructure disclosed herein. Clearly, this would involve a completely new paradigm of shopping where individuals would appear to simply walk into a store and walk out without paying. However, by implementing the technology disclosed herein, each individual consumer can develop a profile regarding their success rate in terms of honestly purchasing products from stores or restaurants. The credit score could also include the fact that when they purchase the product later at home that they picked up at the store that they have a tendency to also accept an accessory product which is purchased at the same time.

In one aspect, a high credit score can enable individualized pricing on products. For example, notices can be provided for users where they are in an excellent credit score range, which can cause individual pricing to be adjusted. This can include rental prices or the ability to perform any task such as opening a door or combination of tasks. Furthermore, where any questions exist, a negotiation can occur in which users confirm or resolve any potential issues. For example, if the algorithms are incorrect and mis-associate a product that a person wanted to buy to another person, such that the other person ended up making the purchase or ignoring the purchase request, the data regarding the transaction can be presented to the person who desires to buy the product. For example, a notice can be provided that a lamp was taken from the lamp store on Saturday which costs $39. The notice may state "There's a chance that you may have intended to purchase this lamp. Please confirm." Thus, the person can interact with the system to either purchase the lamp at that time or to confirm that they did not desire to purchase the lamp. An individual who mistakenly purchase the product can also have a refund where such user interaction can disambiguate a particular transaction. A gamification process can occur where users can seek to enhance their credit score in the system, and thus receive the best deal on products purchases.

In one aspect, to prevent fraud, the system can identify users that come into a store that have capable mobile devices. For example, sensors 312 could be set at the store opening, which can ring a bell, or cause some kind of confirmation to a clerk that the user has a device capable of making browser-based in-store purchases. For example, a near field communication test can establish the device capabilities. Requests and acknowledgements as defined in the protocols could continue as the user exits the store, the sensors can again confirm that the device has the capabilities and could also confirm that there is an appropriate identification or connection between a product or products and the device. This could prevent the user from entering the store with a confirmation of the appropriate capability in their device, and then turning off their phone and simply grabbing some products and walking out. The system could also track which devices were on as they enter the store, as well as which I devices were off as they exited the store. For example, the system can identify that John entered the store with their device operational but never left the store, and that on that day two products were also carried out of the store without being paid for. By tracking the flow of individuals in the store and out of the store, based on their mobile devices, the system can identify potential shoplifters. Again, in one scenario, John's phone may have died or run a battery in the store, and he inadvertently therefore could not pay for the products. By performing an analysis of the various individuals in the store, and the products that left the store, the system could later, once John's phone is online, could present an interface indicating that the two products may have been desired to be purchased by him, but not yet been purchased. The system could then at that time confirm the purchase and John's credit score would not be impacted by the experience. The system could even infer the issue but perhaps receiving data about a battery level for individual mobile devices.

In one example, users could be part of a club or a group environment in which they receive discounts for being a part of the group. Where individuals are part of clubs such as for a grocery store where they get a discount on items purchased or gas discounts, the system disclosed herein can include data identifying the individual, such that the discount prices would apply. For example, as a user walks into a store, and the initial communication with the store server 218 is established from the browser on the user's device 204, data regarding the individual can be transmitted to the store server such that as the user identifies a product or a product is identified as being associated with the user for purchase, that particular user's pricing can apply and that purchase can also apply to gas discounts or other incentives. By enabling an indication of the individual as they communicate with the store server via their browser, all incentive programs can be implemented for that user as they normally would.

An example process as follows, the user's browser or app 318 accesses a store server 218 via use of a URL or other approach. Via a browser-based API (API1) or other communication protocol with the application, the user interface or browser 318 transmits user identification information to the store server 218. For example, the API protocol may include the ability of the store to request personalized data about the individual and/or friends or family members of the individual. The data could include a body model, user preferences, social media data, and so forth, for one or more people. Where a user is identified, the protocol can enable a response from the browser to provide the user ID or information that can be used by the store server 218 to confirm that the user is part of their incentives program. The data might be a phone number, for example. Then, for that session, as the system receives an identification of products for purchase, whether in a store, associated with an object, or in a restaurant, the incentive program can apply to those purchases, rentals or other tasks. As the system presents the interface 318 to confirm the purchase, the incentives can be identified (You've got 50 cents off on gas per gallon), the reduced price can be identified, and the user can confirm the purchase. All of the various kinds of interactions utilizing an API of this kind can be included as within the scope of this disclosure. For example, confirmations that the user is part of an incentive program, offers to enroll the user in an incentive program (Hi, you are new to our store, click here to join our incentive program for your purchases), and so forth.

In another aspect, the system can be configured to simply provide data regarding the user's credit score or general data that is anonymous but identifies that they are part of the incentive program. Thus, based on one or more of the credit score, the participation in the incentive program, or any other parameter, the system as it receives an indication of the products that the user is going to purchase or rent, can provide discounts or the incentive benefits through the use of this browser-based in-store shopping and payment process.

One aspect of this disclosure is anonymization process. In some scenarios, using browser-based payment processes, the merchant does not ever completely identify the user or receive directly user payment information because it is tokenized or anonymized. A one-time use token is often transmitted to the merchant for managing that particular payment. In this scenario, where the purchase is in-store, or associated with an object, the system also could provide an anonymized approach of using one-time use tokens, which can enhance the user shopping experience utilizing their mobile device 204 in the store that maintains anonymity. For example, a one-time use token can be generated which includes data about a credit rating or credit score, a body model, past purchasing history, color preferences, data about friends or family, and so forth. A protocol can be developed which will enable the store to enhance the user experience but also in an anonymous way. Users can be directed to cloths that fit them or a friend/family member, virtual reality approaches can be provided, upselling or product information guidance can be provided for products they pick up, and that are connected to the device such that data can be transmitted to the server 218, and so forth. In this manner, users can still remain anonymous as they would if they went into a store and paid with cash.

In one aspect, the system could be made to look personalized by the store server 218 sending fields related to user interactions, but which fields are filled in locally. For example, the user's mobile device can store the user's name ("Mary"), but the user interactions from the store servers might be something like this: "Welcome [Name] to our store, please just choose what you want and walk out—we'll handle payment through your [Device name]". The local device can have a database indicating Name=Mary; Device Name=iPhone X. The local device can fill in this data and personalize the experience but maintain anonymity of the user.

By transmitting personalization data from a device 204 to a store server 208 via a first API, the interactions or interface presented to the user can be tailored and personalized for that user. The system can instruct the user that the jeans that will fit them are on aisle 3. Location based tracking can help to guide the user to that location. For example, the store server 218 may provide a detailed store a map with a destination of the product for that user. The process can include receiving personalization data through an API configured between the user interface 318 and the server 218, identifying one or more products with a location within the store and populating a graphical map that is transmitted to the user device 204 marking a location on the map of products chosen based on the personalization data.

As the user identifies an item for purchase via a scan or receive an electronic signal, or manually type in data, a second API (API2) can be used to communicate the payment data, as disclosed herein. In another aspect, the first API and the second API shown in FIG. 3A can be configured as a single API between the browser 318 acting as an agent and the server 218. In this regard, whether the API is configured as a single API or two separate APIs, the APIs enhance the experience for the user to be much more personalized experience in-store using their own mobile device to guide them and enhance the purchasing experience while also using the mobile device to handle the payment process without the need of any point-of-sale infrastructure. The other browser-based APIs disclosed herein typically focus on a payment process and simplifying that process. This section describes a correlated concept in which a browser-based API is implemented to exchange information between the browser and the website can be made to personalize the user experience when the user is in a brick and mortar store associated with the site.

The browser API1 can define a protocol or syntax to enable communication between a site and a browser (acting as an agent) in order to retrieve personalized information, such that the site can be modified for that user. The API operates in a similar general manner to the payment request API in the sense that it operates as an API between a site 218 and a browser 318. It could also work for apps as well in which an application is configured to be downloaded to the mobile device and used to transmit personalized information to the site 218 to aid the user in the store. The API can communicate any kind of data that can be utilized to tailor that website and the in-store user experience. For example, a body model of the user, the user friend or family member, or other individual could be communicated to the site 218 such that no size options need to be presented or the user could be guided around the store to clothing that would fit or that they would prefer, or to food items that they need if a recipe is uploaded to the site.

In one example, as a user enters a grocery store, personalized data that is transmitted to the site can include a history of recipes used by the customer in the past week. The system can track meals made an offer to provide via a user interface 318 different recipes for a variety of meals. If the user accepted a recipe via the interface, the system could guide the user to the items needed to make that recipe in the grocery store.

Assume the user is in a clothing store and the browser 318 on the mobile device 204 navigates to a site 218 which is developed to provide assistance in the store and to make purchases. Because the store sells clothing, the server 218 can issue a body model request call via the API to the browser. The request is made using a protocol that is configured to enable a standardized description of data about the site and communicate that information to the browser. For example, the site 218 might be exclusive to men's clothing or children's clothing, or women's shoes. Through communication of data between the site 218 and the browser 318, negotiations can occur in which an appropriate body model associated with the user is transmitted to the site. For example, the user could set up within the browser 318, body models for him or herself, a spouse, children, friends, and so forth. The data can be stored on the device or a server. Thus, if the site 218 being navigated to is only for children's shoes, the browser may not send the body model for the father or mother to the site but might be able to only send the body model of the children which can include their shoe size as well as shoe or foot shape (i.e., narrow, wide, etc.). Pictures can also be provided of each person in the body model such that as the body model is delivered to the site, the presentation of shoes or accessories can be made in a model that can be shown to show the user how they will actually look wearing the clothing. Furthermore, rather than picking a size when purchasing clothing, the picture of the individual who will wear the clothing can be presented and the user can select a picture of their mom, their wife, a child, a friend indicating that the size of the pictured person will be delivered (in an online purchasing scenario).

If the user is shopping for his family and the body models of his family are communicated to a site, the site can transmit a user interface guiding the user around the store to find the proper clothing. When a tag associated with a good pair of shoes is connected to the mobile device, that data about the shoes can be transmitted to the site 218 and the interface 318 can tell the customer that those shoes would fit Johnny. The interface can present the names of his children or a family member or anybody associated with the user. After receiving the personalized data, the site 218 can be modified essentially to be operational as a new site that is tailored for the individual or that provides a personalized interface to managing purchases in-store. In one aspect, the same site 218 is used in-store for purchasing assistance.

An algorithm can match the appropriate sizing of the clothing that a user scans in-store to match as closely as possible the proper size with the individual. Different manufacturers have different sizing ratings, and thus this approach can be much more accurate. For example, a size 9 shoe from one manufacturer might not be quite the same as a size 9 shoe from a different manufacturer or a shoe from a different country. Thus, the use of the body model eliminates the need to know a shoe size and provides the capability of having much more confidence that a purchase made online or in store will match the recipient's body size and shape. The system may help the user to know that shoes for Johnny in this store should be size 9.5, on isle 3.

A payment API can include similar infrastructure/protocol concepts that can be utilized for the body model or other personalized data API.

The disclosure also covers the transmitting of a face with the body model that can then be used for 3D modeling using the face to see what people personally would look like. In this regard, via the API configuration or protocol, a browser 318 can send a part of a body model depending on what kind of clothing is sought. Thus, the data associated with the facial recognition component of a device can be transmitted to the site 218 such that such data could be utilized in a virtual reality or augmented reality scenario, in order to enable a buyer to view how they might look in a particular environment which can include clothing, accessories, furniture, homes, outdoors, or any environment.

In another aspect, typically the API disclosed herein for the purpose of managing purchases is implemented after a user lands on a site 218, navigates to a product, and clicks on a purchasing button. In this scenario, data is communicated via the protocol of the API between the browser 318 and the site 218, in some scenarios, the user confirms the purchase via facial recognition or fingerprint recognition or other biometric. The browser independently or in connection with the API or a separate API, can communicate with a network server 218 which perform some part of the functionality. The browser 318 then can transmit a token, payment data, address data, and so forth for the site to use to process a payment or to confirm in advance a payment of all products retrieved at a store.

In other words, one aspect of this approach might be to pre-authorize a purchase of items as a user enters the store. As the user enters a physical store with their mobile device, a device could receive a facial scan, fingerprint scan, or other authorization for purchases made in the store. Then, through the concepts disclosed herein related to tracking of items selected using tags associated with the items or photos of the items, or some other identification mechanism, the system can identify what items are with the customer when they leave the store. As long as a proper indication of the items is received at the server 218, the system could then automatically process the purchase of those items. In this regard, this approach can be similar to the Amazon Go store but without the need of an application and without the need of scanning an image from a mobile device at the entrance of the store.

A novel aspect disclosed herein includes the application of the API or multiple APIs closer to the beginning of the user entering the store. An example scenario is as follows. A user enters a store that sells clothing. When the user enters the store and the basic communications are established between the user device, browser and the site 218, the site 218 can send an inquiry or request to the browser 318 identifying data associated with the site 218. For example, the data may indicate that the store accepts Apple Pay, Google Pay and Paypal. The store server 218 may identify that it sells clothing, cars, books, or any data associated with the products. The browser 318 or a network-based entity, or the device 204, can store personal profile information associated with the user and/or friends or family members of the user. For example, a body model of the user can be stored within the browser, on a secure element of the device, or the network-based location. Personal preferences for various products can be stored as well. Purchasing history data can also be stored as well as payment data in a secure element. Any kind of data that can be helpful in terms of configuring the site/user guidance in the store via a user interface for the particular user can be stored and passed in this API. Any user preferences for color, size, style, shape, brands, and so forth can be transmitted via the API as the user lands on the site and which can be used to change the user interface and personalize the user experience.

The user might have searched online at a site or similar sites or other stores for vehicles, clothing or toys, etc., prior to going to the brick-and-mortar store. The browser can store and compile that information such that when the user lands on a site or looks for products in a store, aspects of the historical data can be authorized by the user to be transmitted to the site 218. For example, a connection might be made between a tag and a mobile device as the user tried on a pair of shoes—but they did not end up buying the shoes. That data can be stored for later use or to bring up later with respect to making purchases on-line. In this regard, advertising, discount offers, coupons, accessorizing offers, and so forth can be coordinated between an online experience and an in-store experience in ways previously not possible.

When the user picks a product from the store, they can then either in the store or later, manage the payment process. Once the link is made between the product and the mobile device 204, the customer can use the browser based APIs to make the purchase and complete the process through the payment APIs disclosed herein.

In yet another aspect, the mobile device 204 can include an additional component which is specifically designed for aiding in in-store purchasing. For example, a secure element can be programmed with the capability of confirming that the user has purchased the three items that she is carrying. The algorithms and machine learning capabilities disclosed herein can enable a connection, or link to be made between items are being carried and a mobile device. The mobile device 204 can emit a signal that confirms that the link has been established and either that a payment has been made in the store via a payment API, or preauthorized as described above or can occur in the future. As the user exits the physical store, a signal communicated from the mobile device can trigger a receiver 220 that may cause a positive bell to ring or positive sound to be made which can indicate to a store clerk that that person leaving the store has purchased or will purchase the products. In another aspect, a clerk at the store may be presented with a map of the store on their device that can identify each user, and their status. For example, a graphical representation can identify in green all of the user's that have purchased the product that they are carrying or where the appropriate link has been made to identify or connect the products they are carrying with their mobile device. A red color may indicate to a clerk that there might be an issue with that individual in the clerk can go talk to the person identify or address the issue to make sure that person's mobile device operates in the system appropriately.

Figure 3C:
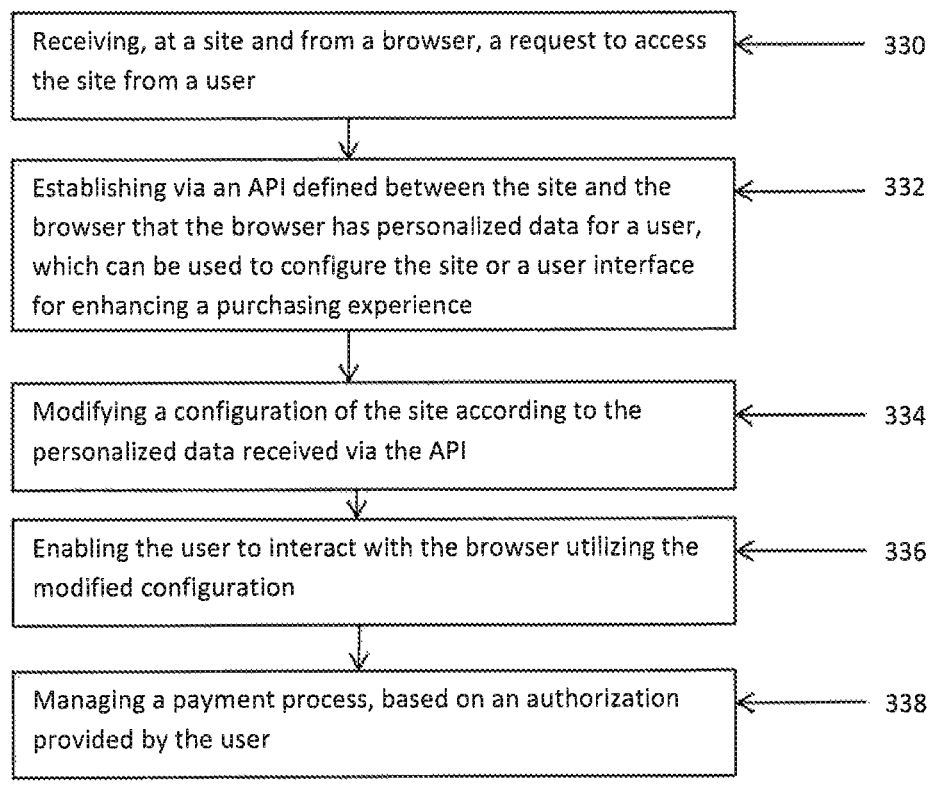
FIG. 3C illustrates an example method.

FIG. 3C illustrates a method aspect of this disclosure. The method can be practiced by the browser or device operating the browser 318, a network-based entity, or the merchant site 218. The method includes receiving, at a site and from a browser, a request to access the site from a user in a physical store or in connection with a product or object which can be outside of a store (330) and establishing via an API defined between the site and the browser that the browser has personalized data for a user, which can be used to configure the site or a user interface for enhancing an in-store purchasing experience (332). The request can come as a result of, for example, the user interacting with the user device and an NFC tag on an object like a product, a parking meter, or a vehicle. The NFC tag can communicate data to the user device such that a browser can be launched, the URL can be entered, and the user interface from a site associated with the object can be presented on the browser for simplified purchase, rental or any other kind of payment or task associated with the object. The object can be in a store, or can be a product that was sold that can include the tag in a more permanent fashion so that other people seeing the object could easily purchase one for themselves. The NFC tag (or QR code, other code, other signal, etc.) can be developed for the particular purpose. For example, in a rental situation, the tag would provide the information necessary to enable the user to rent the object or parking space and the interface that is presented would be tailored for that particular use. If the tag relates to a product that the user can purchase for themselves, the tag would provide the proper information to access the appropriate site in the interface presented to the user would enable them to purchase the product for themselves and have it delivered to their home. Other scenarios could also be tailored such as the ability to perform other operations such as opening a door and making a payment or registering for a loyalty program or passing personalized medical information, and so forth. The general concept disclosed herein is using such a tag on an object which the user can achieve a task in a simplified manner through interacting with the tag and accessing a site for receiving a customized interface.

The method of FIG. 3C can further include modifying a configuration of the site according to the personalized data received via the API (334), interacting with the browser utilizing the modified configuration (336) and managing a task, or a payment process for purchasing a product or making a payment associated with an object, based on an authorization provided by the user (338). As noted above, the above processes of communicating personalized data and managing a payment process can occur at different times, via different APIs, or via the same API.

A pre-authorization of purchases in a store or to use a personal data while in the store can be limited in time for security purposes. For example, if the user enters the store, and then walks out of the store, having provided authorization for making purchases in the store, the user would not want a second person to steal their mobile device, go back into the store, and make purchases without their knowledge or approval. Machine learning algorithms can be trained to identify user activity, particularly after authorizing communication of personal data to a site and pre-authorizing purchases. A re-authorization might need to occur, after a timeout period, or a trigger based on user interaction, motion detection (first motion indicative of theft of the device), facial recognition, and so forth which can identify a risk that a user currently interacting with the site or in a store is not the original user that landed on the site and provided the authorization. The data sent to the site via the API can be encrypted, tokenized, parameterized, anonymized, and so forth such that a personalized configuration of the site can be used to interact with the user, after which the configured version of the site can be deleted or decommissioned. The site would not store a user's personal information in one aspect but it would be one-time use. The tokenized payment data may be sent at the end after a user is checking out of using a shopping cart or interacting with a buy button even though the authorization was provided in terms of timing when the user landed on the site.

In another aspect, a store clerk could provide authentication or confirmation that the purchase has been made. This can be done on the customer's mobile device. For example, fingerprint or facial confirmation data can be provided from a store clerk on a user's device that confirms that the clerk has seen the products, and that the user can leave the store. The server can transmit data as necessary identifying the biometric information of the store clerk or the mobile device can transmit that data back to a store server via the browser to confirm the clerk's identification/confirmation information. Some other data can be also entered by the clerk (such as a code) or the clerk may scan a code presented on a display screen of the customer device.

In one aspect, as the user lands on the site associated with a brick and mortar store, a dialog can be initiated to determine which personal information is to be communicated to the site for their in-store experience. The construction of the dialog can be based on machine learning or intelligence gathered about the user, life events upcoming for the user, past events (i.e., a death in the family), or other data which can be used to configure a request for a certain set of personalized information that is both relevant to the products or services offered by the site and relevant to the user's current situation. The interface can include a listing of likely body models, anonymizing options (don't send real names but send nicknames or labels like mom or dad), and so forth of people that might be relevant to the user that the user will shop for. An option can be presented as well to just use the default site. All this can operate to enhance the personal experience with any site or in any store in particularly for sites or stores where users have to choose a size or color or style of product or service. In one aspect, for example, if the user requests that the site receives a male body model, just for the user, the site might eliminate or render less prominent children's clothing, women's clothing, or other content that is less relevant to the personalized data that was transmitted to the site. This can also include a payment option in which the user selects a payment mechanism, as they land on the site which can then cause the site to only simply present a buy button without payment options throughout inasmuch as Google Pay or Apple Pay or PayPal are requested and a preauthorization is provided at the beginning.

Figure 4:
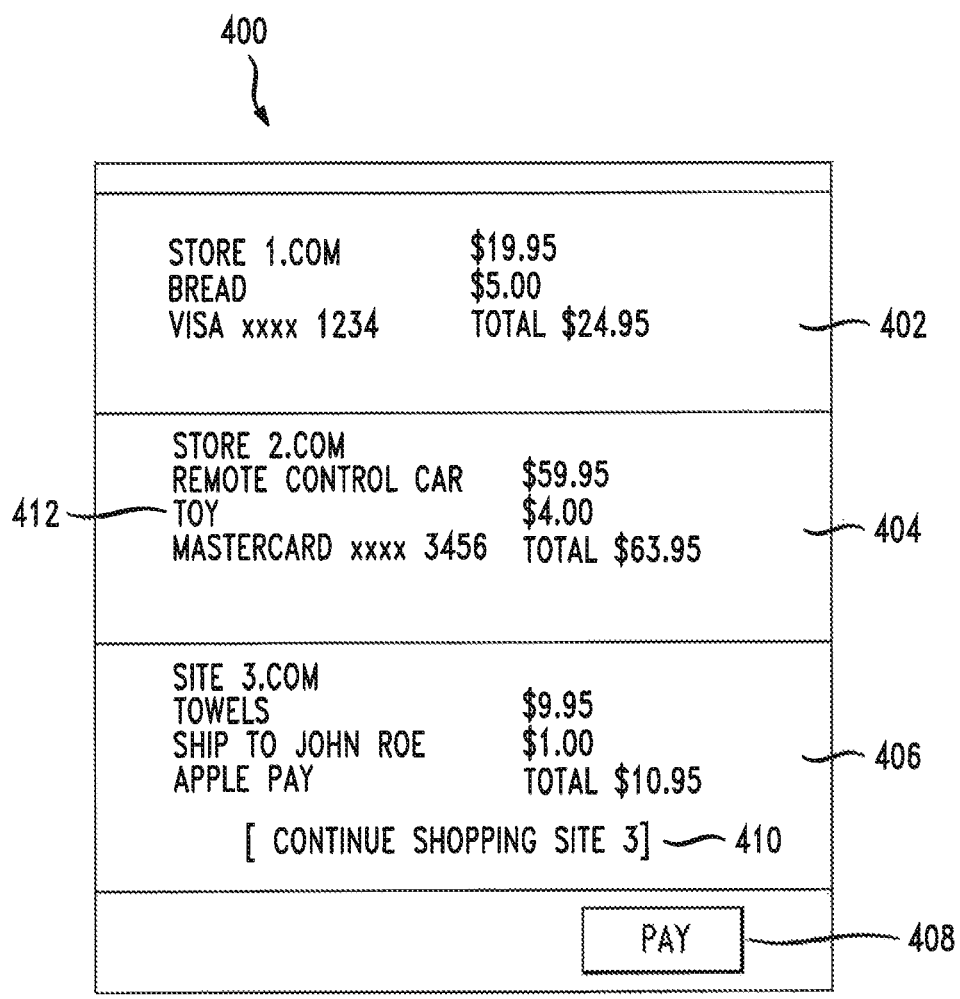
FIG. 4 illustrates a user interface for making a purchase.

FIG. 4 illustrates an example user interface 400, which can be presented on a browser 318, or other app to guide the user through a store or group of stores. The figure illustrates various items in a persistent shopping cart which can span purchases online, in-store, or both. The toaster from store 1 is shown at 402, with a remote control car and toy legos from store2.com 404 and towels from an on-line site3.com 406. These stores and sites can be accessed through different devices as well. A "continue shopping" object 410 it is also shown as well is the pay now button 408. This interface can be the result of the user physically going to store 1, having the appropriate link established between the toaster retrieved and the mobile device such that the toaster is added to a shopping cart, in the user going to store 1 and taking home a remote control car and toy Legos in which the appropriate link is made to the mobile device such that the items are placed in the shopping cart. Finally, the user is online, and places an item in a shopping cart from site3.com. In this scenario, the user can pull up a single payment mechanism that can combine the product that they have selected throughout the day both in a store and online, and make a single purchasing transaction. Again, the advantage of this approach is that via the one pay now enter action 408, the system will carry out (1) a payment using the Visa card to store2.com (such as by sending a token or the necessary payment information, as well as other information through the browser API to site1.com), (2) a payment using the MasterCard to store2.com for the remote control car and toy Legos and (3) a payment site3.com using Apple Pay for the items. Of course, a total amount can be shown for all of the purchases, as well as other options for deleting the purchase, changing the number of items, change in shipping addresses, and so forth. Where such individual manipulations take place, the browser shopping cart API can communicate with the respective site in order to update the total amount charged based on the number of items, or a change to the shipping address or shipping instructions. Thus, the interface 400 can include any such objects to enable the user to make the appropriate changes and adjustments to each individual order at which point, when the user pays all of the various payment mechanisms can be implemented.

Usually, a merchant site initiates a call through the browser API for payment data. Under a later purchase made through a shopping cart model, the browser may initiate a call to the merchant site informing them that the user has purchased one of their items. The call may include identification information to reference the earlier search of the user for the item on the site or from the physical store and initiate the necessary communication via the API for the payment data to be transmitted and processed. In one aspect, a separate local or Internet-based service could provide one unified payment from the user and then the service could, based on the information about each purchase, make a payment to each individual vendor or merchant. Another beneficial aspect of this approach is that while the user physically went to the store to buy the toaster, the user could also purchase another toaster or return, their toaster in the same manner as though they had made the purchase online. In other words, this approach can provide many of the same types of benefits with respect to additional of selling, accessorizing, and return procedures that online purchases currently now enjoy. This approach can integrate such beneficial services into an in-store purchase.

As noted above, the shopping shown in FIG. 4 can also occur at a physical store in which a user scans or uses a device to identify a product from the store. Accessing the store's site 218 using a browser 318 on the device 204 can enable the site to control or enable the device 204 to initiate a camera, NFC module, or other function or component 208 to communicate with a component 304, 308 on a product 302, 306 in a physical store to identify that product for purchase. The server 218 provides the proper interface to guide the user on how to select objects for purchase via a camera scan of a code, taking a picture of the product, or a wireless communication with an electronic component (such as an RFID or other tag) on the product to receive the data identifying the product. These various components on the wireless device communicate data to the browser 318, which passes that data to the store server 218. The payment 408 can then be achieved through the browser API disclosed herein. The browser acts as a further agent not only for payment processes but for interactions with mobile device components that enable physical product identification and purchasing.

A user interface can also present information about each product. For example, a user brings the device 204 near a toy car 302 in a brick and mortar store. Through the interface 318, beyond just providing a button or interaction to add it to the shopping cart, the system can provide a deeper dive for the user to get user comments, ratings, safety information, pricing comparison, warranties, coupons, etc. for that identified product in store. For example, any of the Amazon services, comparisons, other products purchased, photos, videos, social media actions, customer reviews, return services, alternate colors or sizes, etc., that are provided by Amazon.com for products that a user surfs to on-line can be served up to a user interface in this interaction to aid the user in making a purchasing decision while in the store. In other words, a state of the user interface on a mobile device which has received an identification of a product the user might desire to purchase can be similar to a state on Amazon.com in which the user has selected an item and is ready to make a one-click purchasing action. In that state, product ratings, product comparisons, accessorizing, product descriptions, and so forth are often provided in the user interface to aid the individual in making a purchase, either of the item in store or an alternate item online. Similar data can be provided by a server 218 when it receives from the browser 318, identification of the product that the user is looking at in the physical store.

In this regard, the server 218 would receive the identification of the product that the user is holding or is viewing in the store. The server could offer a confirmation that the correct product is being considered. If any disambiguation needs to occur, it can occur through a voice interaction, object interaction, or any other kind of interaction to confirm the product. Once the product is identified, a complete interface similar to an Amazon.com interface could then be presented to the user. In one aspect, data on a product tag, RFID tag, or in any other mechanism communicated to the device can include data that enables the sensing component to communicate that data to a browser such that the browser can navigate to an associated server or website, and using the product identification information return an interface in a one click purchasing state like Amazon.com. This would be similar in nature to a user to enters Amazon.com into an input field of a browser, wherein login information (name, password, email, etc.) is stored such that the user lands on Amazon.com registered with the site and ready to search for products and make purchases through one click interactions. In other words, the scanning or indication of the product in store could automatically return via the process of communicating data through the browser (initiating the browser if necessary) to a website with product identification information, an interface similar in nature in state to an Amazon one-click purchasing interface. The interface can process payments using payment and delivery data stored on the merchant site or can process payments through the API approach disclosed herein. In addition to a traditional one click purchasing button in this scenario in which the product is purchased and delivered automatically to the user, the interface could additionally include an in-store one click purchasing button, which would result in the payment being processed for the product that the user is physically holding. Again, by presenting such an interface to the user, optional products can be presented. The user may like the lamp they are holding but desire a different color, or a different size or different model. By engaging the user in this manner, in presenting such an interface, the user may decide they like the brand, the model, or any other aspect of the product but simply desire a slight variety or different color or different size. In this scenario, the user can simply pick on the interface the product with the proper color, and in one click have that product delivered to their home. This approach essentially blends in-store purchasing and online purchasing in ways never conceived, but which enhance the in-store purchasing experience to be much more robust.

Another benefit of this approach is that it could be altered such that, for example, it could present items frequently bought together with the chosen item or related items to the chosen item, and can also direct the user to where those related items are in the store. Thus, the user can be directed to the related items while physically in the store. Alternately, the interface could explain that there is another item that is typically bought with the chosen item, but the store is out of stock. The user at that time could also add the out of stock item to their purchase, and it could be delivered to their home while they take personally home the chosen item from the store. In this approach, a greatly expanded opportunity is presented where in-store and online purchasing is blended together, into a type of hybrid environment which can enhance the user experience and also increase the conversion of products sold by the merchants.

In another aspect, the user can place a first toaster 402 in the persistent shopping cart 400 from store 1 and then find a different toaster from store 2. Both toasters in this scenario are actually brought home by the user and are in the shopping cart for purchase. The system could identify that similar items have been placed in the cart (ie brought home), and that the user may desire a comparison analysis. In this regard, when the user retrieves the persistent shopping cart with both toasters, the shopping cart could present some comparable information between the exact two items. This is a very easy location with which to provide such comparisons because at this state of interaction with the user, the user could then simply choose one of the items and return the non-selected item and proceed with the purchase process. Further, from the persistent shopping cart, links can be provided for options to "continue shopping" at each respective site. This process can eliminate and simplify the shopping experience across multiple sites including physical stores.

A service could also provide an analysis of the various items in the shopping cart and provide suggestions or upgrades accordingly. For example, if a user bring home plates from one store and glasses from another store, or a suit from one store and a tie from an on-line site, the system could analyze the items within this coordinated shopping cart and provide suggestions and advertisements for alternate items or items that might better match each other, upgrades, alternate colors, and so forth.

The browser 318 could also store the history of the items purchased for later retrieval and processing, such as selecting to return an item or following its shipping progress. In this regard, after a purchase is made or the user brings the item home from the physical store, the information could be communicated through the browser API and stored for later retrieval from the browser or via an object on a site, social media interface, app, and so forth as disclosed herein.

Another aspect includes integrating a shopping cart with other product searches beyond products placed in shopping carts. This can be expanded to cover an in-store experience. For example, if a user navigates to Amazon.com on a desktop computer or target.com via a voice-based device and looks or orders at a toaster, but does not place the toaster in a shopping cart but merely views, at some level, data about a toaster that could be bought (it could include putting it into a shopping cart), then one current process that exists is presenting an Amazon advertisement in a newsfeed featuring that toaster. In another aspect, the system can identify that the user is now in a physical store and has established a link to a toaster in the store, the system could provide a notice that this is the same or different toaster than the one they looked at on-line. Comparisons could be provided such that the user could either purchase the physical toaster in the store, or may confirm that they want the on-line toaster they looked at earlier.

Where the user may have looked in a store at an item, but not taken it home or not made the purchase, the system can track that data and present an advertisement on a newsfeed or elsewhere while the user is online. The advertisements enable the user to have another opportunity to purchase the item. In the present scenario, this concept is extended such that any user interaction with the product, whether it be physically, virtually online, in a virtual reality environment, and so forth, could cause the system to generate a shopping cart entry for that item. A service could retrieve the information about which products the user surfed for, picked up in a store, or viewed and generate a most likely product which the user would like to buy. Then, when the user views their multi-site shopping cart, that item could be listed and easily bought with one click either individually or in an aggregated way with other items. Inasmuch as such items were never put into a shopping cart by the user, additional interactions could be presented such as a selectable object which the user can click on to formally place the item in the shopping cart for purchase.

In another aspect, the item could be placed in the shopping cart in a preconfigured state such that clicking on the buy button within the shopping cart will cause the purchase to be made for that item, as well as any other items in the shopping cart. A threshold could be set for when such an item is placed within the shopping cart. For example, machine learning could be utilized to determine parameters such as how deeply the user searched and studied the item, how much time the user spent on the item, how many reviews the user read, whether the user compared the item to other similar items, how long the user held the item in the store, whether they try the clothes on, and so forth. In this scenario, once that threshold is met, then the system would create an entry for the user's shopping cart featuring the item. In another scenario, if two similar items were searched, the system could present both items with comparison data within the shopping cart enabling the user to review the comparison information, click on the selected item, such that the next click or next interaction could literally be a purchase of the selected item with any other items within the shopping cart.

The shopping cart disclosed herein can be integrated within a website such that no extension needs to be logged into or clicked on to utilize the features. No separate registration of payment data or an address needs to occur within a shopping cart extension. The universal shopping cart can operate without a selectable object on a browser interface to activate the cart. Sites may register, for example, with a search engine to be able to coordinate a universal shopping cart model such that items can be placed in the universal cart across different devices and across different merchants and difference devices. Shopping can occur from a device, within an assistant application, via a voice-based device, via a browser, via a vehicle-based device, a watch, in store, and so forth. The universal cart can span these various modes of interaction with merchants, including in-store interactions as disclosed herein, and be coordinated by a network-based system. The search entity can then process payment of multiple items for one or more merchants in the same universal cart using stored payment data. This can be done through the browser API disclosed herein or an API or other technology managed by the search entity. An item can be placed in a shopping cart from a web search on a first device, followed by another item placed in the cart from a voice dialog via a second device, followed by another product being selected in-store and brought home. The user can checkout once for all items through a unified purchasing process using the browser API or a search entity-based process in which data stored with the search entity is applied to purchase the plurality of items. Each merchant can be paid and then ship the respective items, and for the product that the user brought home, the merchant can just be paid such that a confirmation can occur that they have made the purchase. The search entity can charge the merchant(s) for using the universal shopping cart at the time of purchase.

Other concepts related to a universal shopping cart include providing data to website from the shopping cart—i.e., items in cart, demographic data, to improve the site search or presentation—which can modify the user shopping experience online or in-store. For example, if store 2 knows that a toaster from store 1 is in the universal shopping cart, which can mean that the user physically may have taken the toaster from store 1 but not yet paid for it, the navigation results or search results or presented items for the user at store 2 can be modified to improve the user experience or provide a discount or other incentive to buy that toaster and return the other one.

This disclosure notes that the use of an API (or multiple APIs) between the site and the browser can be in both directions. For example, the user buys an item in a shopping cart and a package of information is passed through the API to the website with one or more of an object, a token, payment information, address information, registration information, login in formation, product information, size data, etc. to initiate the whole transaction from the browser API. This is what would happen if the user had left a website but had an item placed in a shopping cart.

A method can include identifying a first item that can be purchased from the first stored or site based on user navigation or based on the user taking the item from the store, but the first item is not yet purchased. This can be done within the normal standard navigation of the site or through the user simply retrieving the item from the store and walking out in which there is the appropriate link established between the item and the mobile device. The method includes establishing the link between the product and the mobile device and receiving a transmission of data associated with the first item (which can be over an API to a browser, an extension, or to a network service). For example, the W3C browser API includes a "displayItems" member and/or the "additionalDisplayItems" that are part of a PaymentDetailsBase dictionary that is an optional feature for providing details of products or a breakdown of taxes and/or shipping. The browser API could be modified such that the site could pass product details at any time during the navigation process to a shopping cart for later retrieval. The triggering of transmitting the data about a product can be at any number of navigation states or stages between an initial search and a completed purchase or during different stages of in-store shopping experiences such as picking up an item, or carrying an item for awhile and then setting it down, or taking the item from the store. For example, the mobile device can track or identify that the user has handled the product for 30 seconds and then placed the product back down and did not carry it with them. The system could, based on such data, place the product in a shopping cart for later consideration of purchasing and delivery. This can be accomplished through the communication of data between a product tracking module configured on the mobile device with the browser and from the browser to the store server. The store server can communicate the data to a server, or network-based entity associated with maintaining a shopping cart of such items.

In one example, if the user has a browser API interface presented but they do not complete the transaction (such as at a store where the user should finalize the purchase on their phone but does not), the site can pass the product data to the browser for storage and later retrieval. Assume the user then navigates to a second site via the same device or via a completely separate device which can also include a device with a voice-based or other type of user interface. Or the user could go to the store or another store. The method includes identifying a second item that can be purchased from the second site based on user navigation or a second store through being in store, the second item being placed in a shopping cart, transmitting information about the first item to the shopping cart, receiving a confirmation via user interaction with a purchasing object to buy the first item and the second item, communicating purchasing information to the first site for processing the purchase (and potentially delivery) of the item and communicating payment data to the second site for processing a purchase of the second item. With the in-store example, the shopping cart might include an object that the user is physically holding in the second store but might include a purchase and delivery of the object from the first store that they picked up but did not keep.

The communication can include communication using a browser API with information to initiate a purchase at the first site of the first product or the store. For example, the browser API could be used to transmit data to the first site to place the first site in a state as though the user had navigated to the point of purchasing the first item and clicking on a purchase button. Normally, that interaction would cause the first site to initiate a payment request through using the browser API to the browser for the payment information. However, in the above scenario, the user has left the first site or the first store and the information about the first item is retained in the shopping cart. Accordingly, to facilitate the purchase of the first item, the improvement includes expanding the use of a browser API to initiate the purchase of a product through transmitting the information using the API to the first site. In this aspect, the first site would then initiate a payment request to the browser using browser API, to retrieve the payment data, address data, and so forth and complete the purchase and delivery of the product in the normal fashion, even if the first experience with the product is an in-store experience. Additional communication may need to be exchanged in order to make this happen. The package of information sent to the first site can trick it into thinking that a user has navigated to the first item and hit the "buy" button. The information can cause the merchant site to initiate the browser API request back to the browser to ask for payment information for processing a payment of the product. The package of information could be sent when the user opens the shopping cart such that timing wise, when the user clicks on the "buy" button with a first item from a first site and a second item from a second site, both sites basically have a state as though the user had navigated to the point of viewing the respective item with a buy button for processing the purchase. However, the shopping cart buy button can be linked to these two different states such that when the user does hit the buy button, both sites send a payment request through browser API for processing the payment based on the single click. The programming for the shopping cart can disambiguate or present any other interaction information necessary for processing the payment. For example, if one website requires Apple Pay, the shopping cart can simply ask for the user's fingerprint or facial recognition for the payment but does not have to identify that it is for one particular product purchase.

In another aspect, the browser coordinating with the shopping cart can send a package of data that includes payment capabilities for the user, a payment token, payment data, address data, product data, price, etc., such that the first site can finalize the purchase and delivery the product, again even in a scenario where the first site is associated with an in-store experience. This approach represents an expansion of the capabilities of the browser API concept. In one aspect, based on the user's initial navigation at the first site or user experience in store, the lack of purchase of an item of the first site or the first store, the first site can generate a transaction ID, which is transmitted through the API to the shopping cart management system (which can be a plug in or an extension for a browser or a third party network-based service). This transaction ID can later be used and passed back to the first site with the payment data, address data, and any other data, such as a one-time use token, to remember the item and process a purchase of the item for the user.

Other aspects include tracking the location of a device for product related activity like sitting in a chair at Staples and once a user gets a threshold interaction with a product that indicates an interest, providing details about the product in the persistent shopping cart. This can include a coordination or communication of data associated with the product such as a photo, RFID tag, geofence context or NFC data. As the person surfs the web, once they hit that threshold, like reading reviews of a product, or spending a certain amount of time on a product page, the information can be forwarded to a service that includes a product ID, merchant ID, timing, personal information, cost, discounts, etc. for placing that item in a shopping cart even when the user is at another site or another store.

The network device disclosed herein that can be used for managing multiple items placed within a universal shopping cart can coordinate the universal shopping cart across the various devices used by the user and/or various stores visited by the user. For example, a search entity can identify a first product put into the shopping cart from a first browser search on a mobile device and then identify the user using a voice instruction on a second device to identify a second product to put into the shopping cart. A third product can be picked up in store. The user can then purchase all products on either device or at any time. The system can identify the user through voice identification or through other means to connect the items as being part of the same user shopping cart. The voice-based device can already be associated with a particular payment account or can adjust to different payment accounts based on voice identification. For example, a user at home might put a first product in a universal shopping cart from a desktop computer and then go to a friend's house. Through social networking data or speech/voice identification, the user could talk to the voice based device at their friends house, which could confirm their identity by asking "Is this Mary Smith?", at which point the user could add another item to the shopping cart via a voice command and make the purchase of all the items. Social media data or preferences could connect Mary to potentially using her friend's voice-based device for purchases. Similarly, a first friend might be able to grab a second friends mobile device, identify themselves (through biometrics or otherwise), and scan a product in store and add that product to their shopping cart to pay for later or pay for at the time under a context of their own identity. A separate biometric confirmation could be provided in these scenarios as well to confirm the purchase is from the proper person. Thus, users can switch between identities or a single device to perform any function disclosed herein.

In one example, when Mary goes to her friend's house or is in a mall with her friend, a voice-based device or other device can identify her through her mobile phone. Geo-location data can also be provided based on Mary's location. Based on this data, a voice-based device through a search entity can be configured to potentially expect that Mary may make a shopping request at her friend's home or in the mall using her friend's mobile device or through the voice-based device. Speech recognition models, speaker identification models, or any other speech related pre-configurations that might need to occur can be initiated on a network basis or transferred to the local voice-based device, or both. Thus, when Mary says to the voice-based device, "Please add paper towels to my shopping cart," either in her friend's house or at a store using her friend's phone, the system can recognize Mary's voice, interpret the speech using a tailored speech recognition model, and respond with "OK Mary, the paper towels are in your shopping cart with the salt and pepper shakers to added yesterday, do you want to check out?". She can then make a single purchasing transaction for all the items in her shopping cart from her friend's voice-based interface device, even in a store. To confirm the purchase, the system may ask Mary to provide a fingerprint authentication which can be coordinated via the network system. It can be similar to a NFC payment experience as well. The voice-based device might have a NFC capability and to confirm the purchase, Mary would simply move her phone near the voice-based device and provide a fingerprint to complete the purchase of all the items. The data provided to the voice-based device would be similar to what is provided at a NFC device at a retailer when Apple Pay or Google Pay is used or might put the items in Mary's shopping cart for her to pay for later when a browser API can be applied. The user would move their device close to the voice-based device and the payment interface would pop up asking for a finger print or facial recognition. In this manner, users could complete shopping or initiate shopping easily at a friend's home, at a store, or at a device at a different location from their home location, but using the same simple interface. All of the necessary communication to and from the network system (such as the search entity managing the payment process), can occur between the voice-based device and the system to enable Mary to order an item, have it included in her shopping cart and check out.

If Mary did not have her phone with her, the voice-enabled device may have a fingerprint reader on it as well that Mary could use to "register" at the device. Facial recognition or any other mechanism could be used as well. Once identified at the device, it can become as though it was her device for the purpose of her universal shopping cart or for shopping in store. Devices can be positioned at restaurants, shops, or at any location for similar purposes. If multiple people are at a friend's house, multiple profiles can be added to the voice-enabled device at that location such that any person of the group can talk to the device and have it adjust to their profile, their universal shopping cart, and so forth, even though the people do not live at that location. The device may also not have any pre-configured data based on knowledge that the person is at the location. The system may just identify the user by their voice when they speak to the voice-based device. Where no payment data is available, the system can handle the payment later.

Accordingly, if a user has searched sites for a particular vehicle, with particular characteristics such as a year, mileage range, price range, and so forth, when the user lands on a different site or is shopping in store, the approach disclosed herein provides a mechanism of data being communicated via an API to the new site, or the site associated with the physical store, such that it perhaps can pre-populate or modify its presentation to the user to focus the experience on similar types of vehicles, for example, or similar types of toys or cloths. Users in this scenario should more quickly be able to research and find products that are similar to what they have previously researched online or in a store. Where an interface might be presented to the user, when the user lands on the site or enters the store, the user can also indicate that they are looking for a similar vehicle that they looked for on cars.com, or they can indicate that they do not want this data communicated to the site. Thus, users can become familiar with the process and recognize the level to which a site might be tailored for their own personal use and can choose whether to have an un-modified site or modified site in a particular way.

In one example, assume a user has searched for an old used truck and a new sports car either in store or online. These two search histories can be stored at a location, such as the browser, a network-based storage location, or the device. The user lands on cars.com to do some additional research. An interface can be presented, as managed by the browser, which can ask whether the user wants the truck search data or the sports car search data communicated to the site. The user might want to continue with looking for the sports car either online or in store. The user can then simply select that option, and the search defaults on cars.com might be pre-populated or preconfigured for newer vehicles and sporty vehicles. Of course any product or product history example can be incorporated into this process. In this scenario, the user can then begin their navigation of the site as though the user had entered in search terms such as a year range, a manufacturer, a price range, or any other type of search data on the site. The site can be landed on by the user in a more advanced state that normally would occur in which the user simply went to www.merchant.com and started to navigate from scratch. Sites can also include their default mode in which no data is retrieved and the user must navigate from a beginning point.

Continuing with the example, the site may request from the browser a body model and/or color preferences associated with the user who is just landed on the site or entered the store. An interface can be presented as part of this initial interaction in which the user authorizes the communication of this personal information to the site. This can be similar to an Apple Pay authorization, or any other type of authorization. Assume in this example, that the browser responds to the request by transmitting a body model identifying the user, which can include facial characteristics, as well as optional other types of data such as favorite colors, or data associated with purchasing histories. Any combination of data can be retrieved and prepared for deliverance to the site.

In the payment scenario, a one-time token is used by the site to process a single payment for a product purchased online or in store. Similar types of security can be implemented into this "other data" the can be transmitted to the site. For example, the user would not likely want their body model maintained or stored on the site. In this regard, a tokenized version of the body model might be delivered to the site for a single session of the user with the site. In one scenario, a virtualized instance of the site might be generated which utilizes the personal information to personalize the site for the user's interactions. Thus, the user would no longer see a choice of S, M, L, XL shirts but would merely see the option to choose a shirt for John or Mary. The user knew would no longer see an option to buy shoes with a requirement to select a shoe size, amongst ten different sizes. Again, one issue with buying clothes online is that one manufacturer's 9.5 male shoe size will differ from another manufacturer's 9.5 male shoe size. By transmitting body model data associated with the user, the site can process that body model data, and convert or compare the body model data to its clothing sizes, and make a determination of the closest or best fit size for the user or can provide an interface or directions where in a store the user can find the appropriate sizes. The system could also direct the user to the kind of product they want in store but notify them that the size is not available and offer to order the size online and ship it to their home. Where the body model might not perfectly fit, the site can offer "John large" or "John small" sizes, which can give a hint as to whether the clothing would feel larger or smaller, given their size is. The site can run an algorithm which can compare data within the body model with their sizes of clothing which can also be modeled. The personal data transmitted to the site of course would include the user's name, emoticons, icons, or any other data that might be incorporated or blended into the user's experience with the site.

In one scenario, information is simply used to modify or personalize the site for that user and then the information is discarded after the user makes a purchase or leaves the site. However, where this requires the user to trust the site not to store the personal information, an alternate approach can include one-time use tokenized personalized data which is eliminated or destroyed and which cannot be maintained by the site. For example, the model might have a timing element in which is only usable for ½ hour. If the user is still navigating the site, the model may be enabled for another ½ hour. In another aspect, if the user were navigating the site in the normal manner, the user would be providing a shoe size or shirt size in any event, and thus sharing of such size information may not be worrisome to users.

Where the site is modified, however, for the particular user, the concept of spawning a virtualized version of the site that is modified to provide user names and specific user sizes of products can be implemented. In this scenario, the user interacts with the virtualized site personalized for them and upon leaving the site, the virtualized instance of the site can be deleted. Thus, this scenario include several optional components, such as merely passing body size or other personal information through an API at the beginning of interaction with the site, which causes the sites to be modified according to the personal data such that the site no longer presents size information associated with clothing purchases. Other data that can be eliminated from the site can be color choices as well as some product choices based on the personal information that is passed.

In the payment aspect, this approach can enhance the payment experience. This can primarily be due to the fact that a biometric authorization, or other authorization, is provided at the beginning of the process and can be applied across multiple purchases. In this scenario, a fingerprint or facial print, for example, has already been recently retrieved from the device and thereby can be applied to multiple purchases at different times. This approach can also help in utilizing shopping carts where items can be placed in shopping carts or a shopping cart and a one click purchase, can occur in which the final purchasing and payment process can be essentially preauthorized by the fingerprint or biometric authorization that was provided when the user landed on the site. Thus, imagine a user landing on a www.merchant.com site, and the site requests and receives through an application programming interface that is configured to communicate personal data between the site and the browser, and wherein the user authorizes the communication of data from the browser to the site via a variety of mechanisms including fingerprint or facial recognition. This can occur as the user lands on the site and/or when the user enters a physical store and accesses the store site.

The user then can navigate the site to a product 1920 or go to the physical product in the store, such as a book or a hat, and see a one click purchasing option 1916. The user can click on that buy button to make the purchase 1916. Because the fingerprint authorization has already been provided and maintained, a payment token, or other payment data, or PayPal-like approach can be implemented for making the purchase without the need of a fingerprint authorization at that time. The end result can be a finished purchase 1918 without the need for a separate fingerprint authorization for each purchase on the site or in the store. This approach adds a timing element to maintaining a fingerprint authorization to be associated with a session at a site. It is contemplated that if the user navigates to a new site or a new store, that the fingerprint authorization would be canceled for the earlier site or earlier store. If the fingerprint authorization is maintained, the user can browse to a first product or pick up a first product, and make a purchase by clicking a buy button without the need of providing a biometric authentication. Items can be placed in a shopping cart and purchased via one or two clicks (or more) but all being associated with the same authorization action. By staying on the same site, the user could then purchase a second product by clicking on the buy button, again without needing to provide biometric authorization. In this regard, where multiple purchases are made on a single site, this approach can improve the purchasing experience.

A gameification approach can be applied where the user is in store purchasing products and the user interface can trigger a sound or some kind of visual representation or a haptic representation to indicate that, for example, confirm an amount of points has been earned or an indication of additional products that might be purchased to continue the stimulation or feedback. Thus, a goal could be established for an amount of products purchased as the user enters the store and the system can help them attain that goal by purchasing enough products to win some kind of compensation such as a free product, or discounts, and so forth. By tracking the user via their mobile device, and dynamically identifying what products they picked up for purchase, the system can enhance the experience to make it more fun and potentially increase their sales by making the experience a gameification experience.

In one aspect, as the user lands on a site or enters a store, an interface managed by the browser could be presented in which preselected or negotiated sets of data can be transmitted to the site and authorized. For example, a window could be presented (much like a payment request API or Apple Pay window), in which the user can see the body model for them as well as a body model for their wife and color preferences are being communicated to the site as well as a pre-authentication for purchases. This can be triggered by a communication between the mobile device and a communication component at the store site or entry with data about the products sold in the store and to initiate the user's browser, populate the URL, and access the store site. Thus, the user can authenticate and authorize the communication of that data and understand that a bio metrics authorization will apply to later purchases on the site or in the store.

In another aspect, social media data and/or machine learning data can be utilized to strategically identify what data should be communicated to the site via the API. For example, if it is a wife's birthday, or child's birthday, or a mother's birthday, and so forth, the system may utilize the API or another API that is communicating with a network-based server, or social media site that stores such data to retrieve additional body models, or additional personalized information for specific people in a social group. A manual approach could also be presented in such an interface as one lands on the site in which the user could choose from a contact list for personalized information of friends or family. A social networking site like Facebook could hold such personal information and share that information with friends for the purpose of enabling sites to be modified and personalized for a user. When users share contact data in Outlook, it could include body model data. Thus, the site may receive body model data for the user browsing the site, their best friend Mary and their dad Doug. This may be an automatic selection of a group of individuals or might be manual. As the user navigates the site for products, the site could present options to purchase the dress for Mary or the book for Doug and/or Mary. The site might present a pair of jeans with options for the user to buy the pair for Mary or for Doug. The site could present a graphical representation of how individuals would look in the clothing as well. The names presented for selection might be the most probable names of who the user is shopping for which can be based on characteristics or data such as the type of site (women's clothes or men's clothes), social media data, calendar data (friend's wedding in two weeks), and so forth. In one example, the user might also be presented with an option to see size options as well on the site or in the store.

Body models of families or friends could be retrieved and also stored on a browser or accessed from a network-based source via an API or some other mechanism. Of course, individuals may store a body model on a social networking site, Outlook contacts, or other site and authorize their friends or family to access the body model, in certain circumstances, such as whether they are purchasing clothing for the individual. Where gifts might be surprises, the system can enable the user to authorize sharing the body model body model for their friends or family in general and understand or acknowledge that they may not receive a notice of the sharing of the body model as long as it is with someone authorized by the user.

The browser in this scenario essentially acts as an agent between the site, the store, the user, and the user's personal information, as well as family or friends personal information which can include a network-based communication component like the Payment Handler API does for payment services. The site receives the body model data and converts it into their own sizes and then presents clothing by name to the user for a more personalized shopping experience whether online or in store.

In another aspect, the site may transfer some data associated with a product back through the API to the browser. A virtual reality engine, or an augmented reality engine on the device can receive the data associated with the product, and utilize that data to create a virtual reality or augmented reality experience. This can be in home or in store. In the clothing example, the user might be able to access the selfie camera on a mobile device and go into a selfie mode and actually look at themselves utilizing the selfie camera and have the clothing that they are shopping for presented in an augmented reality scenario on them. The user can then see how they might look in the cloths using their own phone, to get a sense of what they would look like in the cloths they are interested in buying. Of course is can apply to jewelry, furniture, or any other item that can be presented visually. The user could also see a graphic showing how the individual would look on the clothing or sitting on the furniture. The body model can also be used to show how the furniture might look with the specific user sitting on it or how much a bed might adjust when the user lies down on it. The virtual reality component might be the cloths the user is virtually trying on or might be the user's home where the user is in-store shopping for furniture and the furniture is real.

In this regard, there can be extra coordination between the site and the device utilizing the following steps. For example, the site can include a button selectable to view the clothing on the person in selfie mode or to view a room in a home to preview a furniture purchase. If the user were to click on that button, the site could pass information about the particular clothing item through the API to the browser. The browser can initiate a selfie augmented reality module, which could automatically coordinate the received clothing data from the site with the visual data about the user in connection with starting the camera function on the device and placing it automatically in selfie mode. Thus, by a single click on the site by the user, the user can essentially instantly be placed in their camera application in selfie mode where they can view themselves wearing the clothing or viewing their living room to get a sense of how it might look. The system can also incorporate a buy button into that interface such that if the user desires to make the purchase after viewing the clothing in their selfie mode, a single click can affirm that they want to purchase the clothing item (or other item). Or the user can add the cloths to a shopping cart. This can occur in store or online.

In such a scenario, where the user is essentially in a camera application on the device, the camera application can identify that the user has confirmed that they would like to purchase the clothing item, and the camera application can communicate with the browser that confirmation. The browser can then communicate the confirmation of the purchase via the API to the site which, in this scenario, has already received the biometric preauthorization for purchases. In other words, the system can coordinate between the browser, the site, and the camera app to enable in each and easy purchasing process after the user views clothing on them in a selfie augmented reality mode.

Merchant and Browser Interaction Utilizing an Object to Exchange Payment Data

Figure 5:
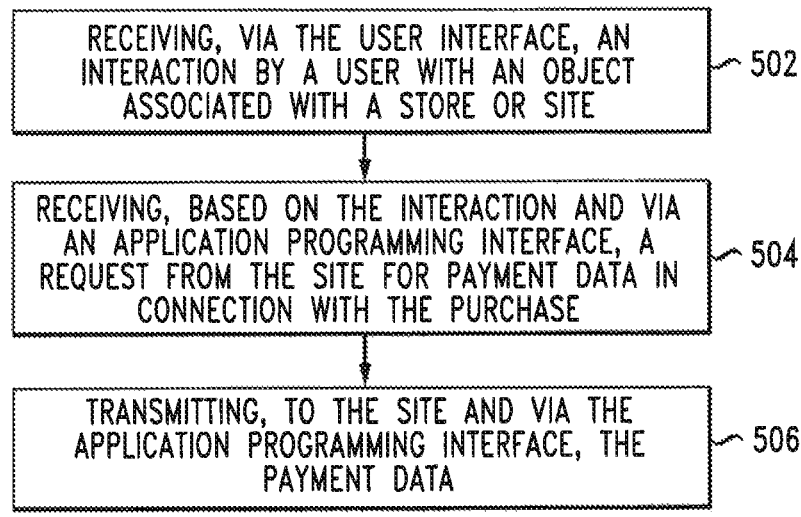
FIG. 5 illustrates an example method.

In another aspect, the disclosure covers, as is shown in FIG. 5, a browser receiving, via the user interface, an interaction by a user with an object associated with a site or an object in a physical store or any other kind of object (502), the interaction indicating a user intent to make a purchase or perform a task, receiving, based on the interaction and via an application programming interface, a request from the site for payment data in connection with the purchase (504) and transmitting, to the site and via the application programming interface, the payment data (506), wherein the payment data can be used to process a payment or deliver a product associated with the purchase. The data could also be any data useful or necessary for performing a task, such as causing a door to open.

The process can in more detailed be performed as follows. After a user interacts with the object (i.e., browses on a site or picks up an object in store, interacts with an NFC tag on a parking meter or vehicle, or scans a code on a product outside of store but in a friend's home), the mobile device in the in-store scenario can receive an interaction with the product or a tag and transmit data associated with the product to the site. The site, based on the product information received, can make the JavaScript API call for a payment request via use of a browser API protocol between the browser and the site. The API request can include data such as acceptable forms of payment for the site (Visa, Mastercard, Bitcoin, etc.), the amount to be charged, what currency they expect, other data depending on the context of the purchase, in store data and so forth. The API request can also include details about the transaction such as one or more of total amount, currency, how amounts are calculated, tax, discounts, shipping costs, etc. The browser can then determine a match between acceptable payments and available payments through stored credit card information, access to an altcoin wallet for the user, Apple Pay, Android Pay, PayPal, crypocurrencies or any other type of payment service. The system may present the user with current information and an opportunity to add a shipping address, correct data, or change any of the necessary data for the transaction. In-store options can be printed as well. The system receives and updates any changed data. If options are presented to the user, the user can select which payment option to use for processing the transaction.

Next, the user can authorize the transaction depending on the type of payment account the user is using. A shipping address might be exchanged or used to include in a total amount a shipping charge. Shipping in one scenario might be used for an in-store purchase for a large object or objects that the user simply does not want to carry home but it is confirmed that they desire to purchase. An interface can be presented to the user to confirm one or more of a payment method, a payment amount, a shipping address, and so forth. The payment method might be through a stored credit card in which the last 4 digits might be presented for confirmation. If that is used, then the credit card information (card number, expiration date, name, CVC) is transmitted through the API to the site for processing using the site's payment process system. This can be an encrypted transmission or some secure mechanism to maintain security such as a generated one time use token. If a local payment is chosen through say a Google Wallet, Android Pay or Apple Pay type of service, then the chosen service can process the payment and a report through the API can be provided to the site. Other information about the user can be sent to the merchant as well such as email address, address, payer phone, social media data, contacts in social media, etc. The merchant can then continue with a relationship with the buyer.

Another aspect of this disclosure relates to how to initiate the scanning of a code like a QR code or an NFC tag, in a simple manner for the user. In one example, a camera on the user's mobile device could have additional programming which could locate or connect to a network server in which images are evaluated for certain patterns. For example, if the user were to take a close-up picture or turn the camera on and focus it on a QR code, then the camera could detect a pattern in the image that would initiate a communication with a browser or other software module. The browser may initiate a link to a site associated with the product or object. A software module might initiate a communication with an app or a progressive web app which can illustrate the product or present an interface with or without connection to a back-end server. In this way, the user would not have to open a dedicated QR reader and could simply use their camera. Using an NFC tag on an object also enables a user to just tap the tag and have a browser initiated. A certain pattern in the feature could indicate or cause a confirmation sheet to appear which could have the user confirm that it should launch a browser and pass along product information for a purchase. The camera could coordinate with a QR reader on the device and/or a back end server such that images could be processed for confirming that the particular type of feature is being viewed and a likely intent of the user is to gain data about this product.

If the user is viewing a feature on a device and optionally confirms that it should launch a software module or browser, the device can then have the camera pass the information to the browser with instructions to launch the browser, go to a particular URL, pass along product information, as well as other information that might be required according to a protocol. A certain code might include a requirement to send the location of the mobile device to the merchant server, or to send a body model if it is available because the product is clothing, and so forth. The code can include information as well that can impact the interaction with the user. If the clothing is a girl's shirt, the code of course can indicate that. If the user of the mobile device is a man, then the system may determine that he might be shopping for his daughter. By knowing social media data or family data, the system can tailor the interactions with the user to be more efficient. The interface could ask if this shirt is for his daughter Mary.

The mobile device should have enough processing power to decode the feature on the product or object and pass it from a reader or camera to a browser or software module. This disclosure includes a new communication approach and coordinates between software components and device components on a mobile device. The browser or software module can receive, via an API, instructions for what merchant server to connect to and what particular data to pass to the merchant server according to protocols for providing that information and according to a desired task like a purchase, rental, physical action like opening a door, and so forth. The browser or software module will have new programming to enable this functionality.

In another aspect, the user might be able to initiate the scanning of a feature on a product or object directly from the browser. The user could launch Chrome or Safari, for example, and have an option to scan a code presented in a drop down menu or icon that is selectable. The user could provide a voice command as well to "scan code" when the browser is open. Again, in an NFC tag scenario on an object, the tapping or interaction of a user device and the tag can initiate a browser or interface accessing a proper server for presenting an interface to achieve the task. Machine learning or pattern recognition or detecting a particular position of the mobile device could also provide hints that a scan should occur. A user interface could be presented to confirm that a scan of a feature should occur. If the user initiates the scan from the browser, then the browser can instruct a camera or QR reader to turn on, scan and evaluate the code, and send back the instructions to the browser for accessing the merchant server. The code on the product can include all types of data such as sex, size, color, gender, race data, date of manufacturing, product materials, price, original purchaser, location of original sale, suggested accessories, URL of merchant, time for parking rental, etc. The data could be encrypted or tokenized as well. The data embedded within the code can be evaluated by the mobile device alone or in connection with a merchant server or network entity for decoding the data within the code. Then, based on that data, user interfaces and presentation can be configured to easily enable that user to purchase the product, rent a product, provide medical information (via a token) or a similar product plus accessories or related products. The user may be informed that there is an updated version of the product which can be purchased and what the new features are. The user may be told that the product is discontinued but that eBay has a used one just like this for sale. In this scenario, the merchant site could be triggered based on the scan of the code to check alternate secondary markets for sales of that same product which might help the user make a purchase of the same item. At a doctor's office, a user could scan an NFC tag which could initiate a process of accessing a site, retrieving private medical information or identification information, pass that information to the site in a tokenized manner, and register the user for an appointment.

A separate application could also be developed for handling the functionality disclosed herein, rather than using a browser. The same coordination would occur between a camera, a code evaluation engine, an NFC reader, and the application.

In one aspect, the code or NFC tag can include instructions that additional data associated with this product or object is found on the merchant site or a database. The instructions to the site can include instructions to access that data, which can include purchaser name, date, and other data associated with the purchase of the actual product. That data can be coordinated with one or more of location data and other data to be evaluated by a user interface or user interaction engine which will determine or predict the user's desire with respect to this product or object, such as to buy an exact copy of the product, rent the object, or whether it is for the user or a friend or family member, how many to buy, what color to buy, whether to provide a body model of whose body model to provide, speed of delivery of the product (is there a birthday of a daughter in three days and does the shirt match the daughter's size or style) and so forth. According to the new protocols disclosed herein, all calls, requests, responses, parameters, and so forth for enabling communication between the components on a mobile device and communication to a network entity such as a merchant server or other network entity are included as within this disclosure.

The browser or software module can present the option that is selectable for initiating the camera or scanner (which can include NFC tag, QR code or any interaction) at any stage such as a high level menu, based on search patterns or state, via facial recognition or biometric input and even from a website or app. A website or app could present an option such as an icon which is selectable to initiate a scan and start the process for a renting an object or purchasing product, or some other task. Haptic or motion input or other multimodal input could be provided as well. A user might be searching for lamps on-line and be on a product page, but desires to order the lamp physically in front of them, the product page could include an option to scan a local product for purchase rather than providing the product shown in the mobile device. The initiation of the process could also occur via an app, such as a messaging app where a link could be provided in a text that, when clicked on, would initiate the scanning mechanism for starting the process. In another aspect, a user could take a picture of the product and text it to a service that would use machine learning to analyze the picture and return a link for accessing a merchant site configured to purchase the product or a buy now option using like Apple Pay to purchase the product. Perhaps several pictures from different angles could be sent or a picture of the code could be emailed or texted to a service for returning an option to link or purchase the item directly.

A camera or reader could also be provided on a home unit that is designed for voice or audio communication. The user could say "scan this" and hold up the product with the code for the device (which would have a speaker and a microphone to receive voice instructions and provide audio) to scan and receive via a voice interaction and instruction to purchase the product. For example, a user Fred can hold a toy truck with a QR code on the underside to the home unit and say, "scan this item". The scan can initiate a communication from the home unit to the Internet and to a server identified in the code which can provide instructions or audio to say back—that is a Tonka Truck, yellow, would you like one Fred? The system can identify through voice recognition or some other manner the speaker, identify their account or payment and address data, and when Fred confirms the purchase, the site can deliver Fred his own Tonka Truck. Similar interface could be in cars or other appliances such that users, if they are around a product they would like to buy for themselves, they can easily buy the product.

Figure 6:
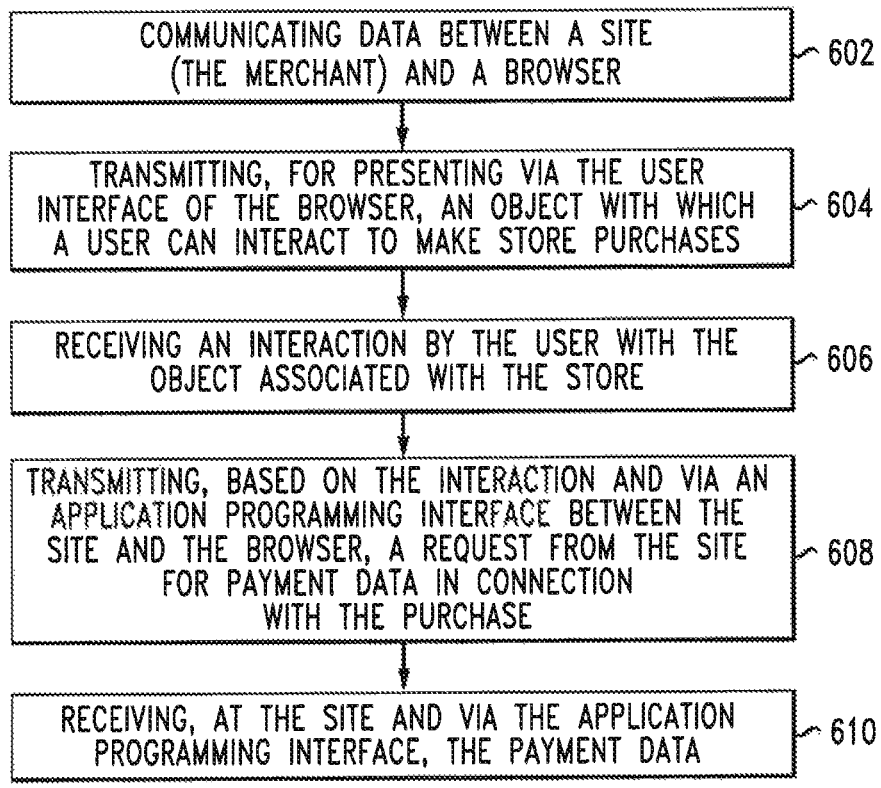
FIG. 6 illustrates another example method.

From the merchant standpoint, the method can generally proceed as follows and shown in FIG. 6. The method includes communicating data between a site (the merchant) and a browser (602). In the in-store scenario, the user will have entered a store with their mobile device and accessed the merchant server via a browser manually or in an automated fashion. The method includes transmitting, for presenting via the user interface of the browser, an object with which a user can interact (602). For online, it can be a buy button. For in-store, it may be an interface used to manage the scanning of codes or confirming links between a product and the mobile device for purchase, a store map, and so forth. Cameras or scanning components will be accessed. The method can include receiving an interaction by the user with the object associated with the site or store (606), the interaction indicating optionally a user intent to make a purchase, transmitting, based on the interaction and via an application programming interface between the site and the browser, a request from the site for payment data in connection with the purchase (608) and receiving, at the site and via the application programming interface, the payment data (610) such as a token or payment confirmation. The user can identify a product in the store to purchase, and confirm that they want to buy the product and then complete the purchase via the browser API or other payment method. The payment data can confirm a payment or can be used to process a payment for a product, a rental, or deliver the product associated with the purchase. In one aspect, identifications of the product's image can be used to confirm the product. For example, the product may simply need to have its picture taken and that data can be sent to the server for confirmation of which product the user picked, then the user can buy the product using the browser API approach (or other approach) and walk out of the store without any point of sale interaction or equipment. Various pictures of each product which is available to purchase can be used in a machine learning context to train a machine learning algorithm such that when a user takes a picture of a product, that picture is transmitted to the site via the browser to confirm which product it is. For example, a picture of a parking meter would initiate a rental process for the parking space. If a threshold is not met, the system can request via a user interface the product or ask them to take another picture.

As noted above, the payment processing can occur on either side of the API depending on what service the user is signed up for or the preferences of the user. When the site processes the payment for the product, the payment data can include at least user payment account data such as a one-time use token. The method can further includes the site processing the payment for the product based on the payment account data received from the browser via the application programming interface. When a payment service processes the payment for the product, the payment data can include a confirmation that the payment for the product has occurred by the payment service such that the site can deliver the product to the user or provide a notice that the user can walk out of the store now. Alternately, if an altcoin/cryptocurrency approach is selected, the API protocols can include a feature for exchanging, in an encrypted fashion, information or personal keys, addresses, amounts, conversion data between currency and altcoin values, and any other data necessary to enable an altcoin wallet or payment service to make the altcoin payment to the merchant site and report the success of the payment. In this regard, the API protocol is structured such that the user can select various methods of payment, including payments occurring on the browser side of the API (through the browser or payment service associated with the browser or communicating with the browser, or an altcoin system) or on the merchant side of the API, through the merchant's standard payment processing structure for payment systems like Visa, Mastercard, Debit cards, PayPal, etc. Thus, in one user interface as the user is getting close to making a purchase, the user could see payment options such as "Visa ********1234" or "Android-Pay". Choosing the Visa payment method would cause the back end processing between the merchant and the browser to have the Visa payment information, account number, security code, user name, address, etc. transmitted to the merchant site so the merchant can process the payment. Choosing Google Pay would result in the purchase amount, tax, shipping and/or any other necessary data to be transmitted through the API such that the Google Pay service could process the payment and report back a confirmation of a completed payment such that the merchant can deliver the product. A second payment handler API between the browser and a payment service can also be used to enable the browser to act as an agent between the site and the payment service.

The above approach also can be applied to the drop down or drop up menus, even for in-store purchasing processes. With the API in place, the efficiency of making purchases from a drop down/up menu option can be increased. For example, a user's information such as hat size, shoe size, shirt size, pant size, etc. can be stored. User preferences for color, style, etc. can be stored and such information can also be accessed via social media sites or contact information. This data can be used to help autocomplete or select products to list in a drop down menu. Such information can be communicated via the browser API with merchants who sell products with parameters that can be filled in through such user data, or for in-store, the user can be directed to the proper location for items that fit. If the user starts to type "green baseball cap", a drop down menu item could state "green baseball cap 7 8/5 inches, buy now with Visa, $11, delivered by Walmart on Tuesday" or for in-store, "Try isle 4, left side for that hat". As the user types the words, a correlation to a product database at a merchant site (which can include products in the physical store the user is currently in) could lead to the merchant exchanging product information or make a request for a payment request through the payment request API, or other directions to the user such as a mapping of a product in the store relative to the user's location. For online sales, the user's address can be drawn upon to determine shipping costs, taxes, etc, quickly such that the drop down/up menu can include one or more of a charge, a payment option, delivery information, description of product, size information, personal user preferences for color or style, etc. The user merely clicks on that option to make the payment (on either side of the API depending on the capabilities of the merchant, user payment accounts, and so forth), and have the product delivered. If more than one payment option is available (Visa, Google Pay, Bitcoin), the item in the drop down menu can perhaps have multiple sub options to choose from perhaps in a left to right fashion. This would be a more dynamic drop down/up menu in which the user could drop down to select the row but then slide to the right or left until the cursor is over the Google Pay option. Releasing the cursor could cause the system to continue to exchange information via the API and process the payment through the Google Pay option and report that payment to the merchant. The menu option could report any number of different pieces of information for the product, such as a pickup location (For pickup at Walmart in Dunkirk), a location in the store of the product, product delivery by a runner in a mall to the user's hotspot location according to the mobile device, and so forth. Current drop down menus provide some options like to search for the item on Amazon.com or Yahoo.com but they do not provide the purchasing simplicity that can be achieved by tailoring the drop down/up choices through use of the browser API between the browser and merchant sites. Objects that the user can interface with can be presented in any location on the user interface, not just drop down menus.

The process, through the browser API, enables the exchange of payment data, one-click parameters or settings, in store related data, or any other data, and to process the payment in the manner chosen by the user. The merchant delivers the item for online purchases and the user is enabled to walk out of a store with the product for the in-store context. The drop down/up menu concepts disclosed herein work in a different way with the browser API but achieve a similar result of more efficient purchasing process and a more efficient user experience in the store for the user. The disclosure covers the interactions both from the side of the browser interacting throughout the process through the API with the merchant and the processing from the merchant site where they manage their database of products and interact and exchange information, requests and so forth via the API with the browser.

A unified input field (such as a browser input field or search engine input field, such as Google or Yahoo) aspect can also be provided in connection with an in-store shopping experience or object-based task. The unified input field is one that enables a user to either search the Internet for items of interest or to enter a product search, as though they were at a merchant website or at amazon.com, for example. The unified input field processes the input to determine or evaluate the potential intent of the user, including correlating the user input with product databases in general or from specific merchants, and can include search results where the user intent appears to be a desire to purchase a product or suggests a product interest, present search results with which the user can interact to purchase the product using payment data stored by the generalized search engine and/or while remaining in a generalized search engine environment, rather than simply being transitioned to the merchant website associated with an advertisement. In this regard, by connecting a user with a store site, the system can preconfigure a search interface to provide more relevant search results from a generalized search.

In one aspect, a system, method and computer-readable storage devices are disclosed which prepopulate a shopping cart in an online vendor's website or in-store server shopping cart based on intent determined by a classifier that processes input provided to the unified input field, movement of the mobile device in a store, or the handling of objects in the store that can be captured and evaluated for purchasing intent. For example, if a user holds a lego toy in the store for 3 minutes looking at it, the system might infer a level of intent to buy relative to other lego sets that were looked at for 10 seconds. The user intent can be classified or determined in any manner. Data gathered by the user's mobile device can be transmitted to a server, which can perform a machine learning based decision or classification of user intent. A network-based classifier can receive that data and provide such information which can then be correlated with a server associated with the particular store the user is standing in. A user can be registered with and/or logged in with his or her browser, such as Chrome, Firefox, Internet Explorer, Samsung Internet, Microsoft Edge, Safari, or Opera, such that user's purchasing credit/debit card or other accounts and delivery addresses, and/or other data, are stored in a user profile. Then, if the user desires to make a purchase through a destination web site or in a store that may have a product not found on their registered website, the browser (or system processing in a network) can handle negotiation (via an API) between the browser and the website (online or store server) such that the system can convert a shopping-cart based model website with which the user is not registered into a "one-click" purchasing experience for the user. For example, the system (through a service like Google Wallet, Apple Pay, Google Pay, or PayPal, etc.) can handle the payment for the item and communicate with the merchant site to handle delivery or notify the customer in a store that they can take the item home because they've achieved a payment.

Of course in one scenario, the process can be initiated not from a search engine but merely from a state within the merchant site in which the user is in a position of making a purchase of an item, including a state within an in-store shopping experience at a particular location or having held a product for a period of time or made certain motions holding the product that might indicate intent. At that state, the merchant site could communicate via the API with the browser, agent, or search entity, to retrieve payment data for populating the necessary payment fields and present via the interface with the user a simplified purchasing experience. With payment data (one or more of account data, delivery data, dates, delivery options, preferences, etc.) communicated through the API to the merchant site, the merchant site can process a payment from the user's payment account using their normal payment system.

Indeed, one aspect of this disclosure includes a merchant or Amazon.com-type of experience that is coordinated with an in-store experience. For example, when a user navigates on Amazon.com to purchase a product, they type in a product name in a search field and make a selection from the resulting listing and arrive at a state in which a one click purchasing button is available. The benefits of Amazon.com include its one click interface, return service, product ratings, alternate products list, and so forth. A benefit that can be provided for an in-store experience is that rather than the user needing to navigate a website to arrive at a one-click purchasing state, a user in-store could simply scan or have a product that they are holding identified by their mobile device and communicated to a web-based server. The web-based server can return an interface that is similar in nature to the one-click purchasing "state" of an Amazon search. In other words, initiated by a physical scan or identification of a product in store, a server can return a product, description, product photos, choices of colors, other similar products, questions and answers, user comments and ratings, and any of the data or options that are available via an Amazon.com interface in that "state". In one aspect, stores that sell on Amazon.com, could coordinate their inventory with Amazon.com such that the familiar Amazon.com interface could be automatically presented. Of course this can work as well for any merchant using the browser APIs disclosed herein were similar simple one-click or few click type of payment experience can also be provided. One benefit of this approach is that the user might like to feel and touch the product and get a sense that they want to buy it and using this type of interface, they could simply write in the store choose the color or size they want, rather than the one in front of them. Of course they could also simply choose to buy the exact same one that they are holding but have it shipped.

One alternate approach in this one click purchasing "state" is that it could provide additional information, or communication in case the user simply desires to buy the one they are holding such that confirmations of the purchase can be provided for security purposes. Thus, if the store integrates with Amazon.com to manage the sale, and Amazon.com server can communicate data regarding the sale back to a store server or other network based entity that shares the information of the successful purchase with a store clerk or a store security system, or whatever infrastructure is in place to enable the user to safely simply walk out of the store with the product. Of course the reference to amazon.com is a general reference to a merchant site that enables users to search for products, make payments receive information choose alternate products, and provide a beneficial online shopping experience which can be dedicated to a single store, or which can aggregate products from many different stores.

In one scenario, users may simply scan for items in-store. The items are placed in a shopping cart or users can be presented with an option to receive an amazon.com type one-click purchasing interface for particular products. For example, the user may simply want to scan a product and have it placed in their shopping cart that they know they want to buy that product. However, the user may want to explore customer reviews or alternate products, or colors, and can be presented on a user interface with an object to select an interface for the selected product like the Amazon one-click interface with all the information and options available around that product as though they had searched for it on Amazon.com.

Assuming that appropriate permissions are in place, such as in a browser setting authorizing the browser to navigate and provide input in a website's purchasing, registration, or shopping cart process to automatically input name, address, credit card information, etc., the system can automatically populate a shopping cart, including even registering on behalf of the user at a website with which the user has not registered. This can be particularly useful for the in-store shopping experience to automatically engage the user with the store server. The process can occur as part of a transition from say a social networking site to a destination merchant site in a one-click purchasing state or as the user picks up a product in store or based on a setting in the browser that needs to be accessed in the transition. The user in an on-line setting provides input in a unified input field, such as "buy acme toaster 4.5" which the system and the classifier categorize as a desire to make a purchase of a particular toaster model. In store, the user may pick up a toaster such that the mobile device of the user can identify the toaster and similar processes can be initiated. The system determines, based on various criteria such as pricing, shipping, country, and so forth, a merchant web site or store (or other store) that offers that toaster model. The user may type in a product while in a mall or on the street and the system can direct the user to a nearby store that has one in inventory based on an inventory check. The user in one case has never registered or made a purchase at the merchant web site offering the toaster for sale. Thus, if the user were to buy the toaster from that merchant website or the store, the user would have to place the toaster in a virtual shopping cart, then enter personal information such as address, credit/debit card information, user name, password, and so forth to have the item shipped. In this scenario, for an in-store experience, the user can simply pick up the item, pay for it using a browser API after it is identified by their mobile device, and walk out.

The system, in one aspect, can identify the merchant site based on the input provided via the unified input field, a mobile device location such as entering a store or geolocation, or via a communication identifying a product in a store, or can initiate the process directly from the merchant site independent of a search to arrive at the merchant site. Then the system can navigate to the state in the merchant website where the user would normally click to place the item in the shopping cart. In this case, however, the system will navigate to the merchant website where the item can be placed in the shopping cart, and determine that the user is not registered with this merchant website. Then the system can automatically communicate with the merchant website, such as via a new user registration page, or an API, to create a new account on behalf of the user using the user data available to the system and/or to the browser. Thus, the system can present to the user just the confirmation in a button to purchase via one click. The confirmation can be a double confirmation of authorization to create a new account and authorization to then place the order using the new account. The user can automatically authorize new registrations and can establish settings or preferences governing new profile registrations. The system can then enter all the necessary data, retrieved from the browser or some other location, to complete the registration and cause the item to be purchased and shipped without the need of further user input or with a notification that the user can take the item from the brick-and-mortar store location.

This approach can turn non-one-click purchasing websites into one-click purchasing websites, via input through the unified input field. The system can also use the registered payment information to process the payment as well and coordinate with the merchant site for filling the order or confirming an in-store purchase. The process of obtaining payment data through the API for automatically providing payment and/or delivery data can also occur simply between the merchant site and the browser through the API. The merchant site, at the appropriate state in which the user may make a purchase (online or in-store), can submit a request through using the API for payment data which can be provided as stored by the browser, accessed from the mobile device, from a network-based payment service, or agent for simplifying the purchasing process. The data can also be provided from the browser to the merchant site via a tokenized process to protect payment account information. The interface the user views can be a combination of merchant information (picture of the product, reviews, other date) as well as a "'buy now" or "buy through google" or "Google Pay" type of button which is provided via the API to the graphical interface.

In one aspect, the system stores whatever information is necessary to use the browser API on the user device. For example, when a user adds a debit or credit card to a payment mechanism, the account information is encrypted and sent to a network server. The server(s) then link up with the user bank to verify the information. The bank can create an encrypted device account number that is transmitted back to the servers and stored on the secure element in the user device. The secure element can be embedded in a near field communication (NFC) chip on a device. This number is completely unique to the user device and to the credit and debit cards (or cryptocurrency or other forms of payment) associated with it.

When the user makes a purchase through using the browser API, the secure element (which is a security chip) creates a unique code and sends that, along with the device account number, to the payment terminal in place of the card number or to a store server via the API. The card information, in one aspect, is not stored on the user device or in the servers and it may not be backed up to a cloud provider. The unique code is transmitted through the browser API to the merchant site for processing the payment. Thus, according to this aspect, the information stored on the user device may not specifically be the payment account number but is a particular account number which is associated with the payment account number of the user. The end result is the same as if the device transmitted the account number to the merchant site for payment. With some service providers, the device account number is used to identify the credit card or debit card used for the payment.

Figure 7:
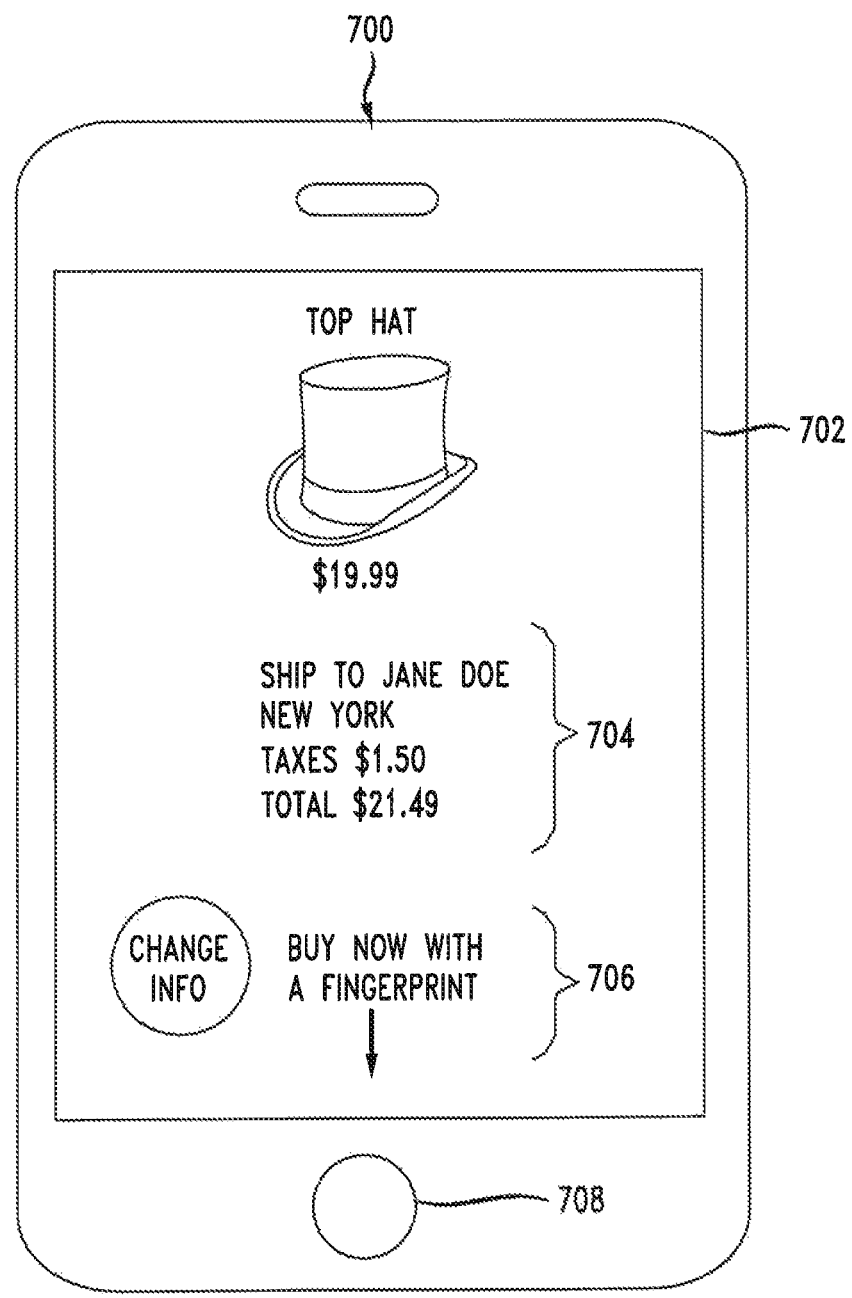
FIG. 7 illustrates a user interface for in-store purchases.

FIG. 7 illustrates an interface 700 which has several unique features to it. This interface can apply to an in-store or any other object-related purchasing experience where an identification of the product or task is received at the mobile device (RFID tag, code scanned via a camera, a photo of the product, manual entry, NFC tag, etc.), and data about the product or task is transmitted to the store or task-related server via the browser, and the server can return an interface 702 used to identify the product, the task, the rental, or other data, and provide a payment opportunity. One unique feature is that there is no buy button in the touch sensitive screen 702. (Of course one embodiment could include a touch sensitive fingerprint reader). The standard way of providing a secure purchasing experience with fingerprint ID is to require several interactions to complete the purchase. The first would be to click on a buy button on the user interface 702, followed by a user ID via fingerprint confirmation. Since it involves two clicks, an approved mechanism for a system which includes a fingerprint ID could be the following. While the user is navigating through a site or shopping in store such that they are approaching a state in which a purchase could be made, the site could provide a request through a browser API for preliminary information associated with a purchase. The preliminary information could include the town or city of the buyer as well as the name of the buyer. It could include payment account information. Some information may be encrypted or delivered in part to maintain privacy. In one scenario, a sufficient amount of information is communicated to provide the user with enough information to confirm that the proper user is identified, as well as the proper town or other data. A type of shipping can also be displayed 704 if the user is on-line or information associated with an in-store purchase. With the communication of preliminary information, the total amount to be charged can be calculated and presented to the user prior to the user clicking on any buy button.

The browser API is an appropriate communication channel to receive, via the browser or user interface, the basic data needed to arrive at the state of the user interface. The trigger for when the browser submits a payment request calls to the browser API for information could be the state of the navigation on the site or the state of an in-store purchasing experience. Thus, rather than triggering a payment request based on the user clicking a buy button, the site could recognize that a user has placed an item in a shopping cart or is holding a product that they might want to buy in the store, and when the user clicks on a functional button that reveals the shopping cart or indicates that they might want to buy the product, which interaction would occur before a buy interaction, the system could submit a payment request such that no buy button needs to be pressed on the interface. One or more of the following parameters could be included in an analysis to determine when to initiate a payment request or call to a browser API for one or more pieces of information associated with the potential purchase: machine learning tools or information about user habits, an analysis of previous interactions of the user and buying habits of the user, the configuration of the website, the time of day, the type of product that potentially could be purchased, a configuration of the store, social media information such as birthdays of friends and family, location of where the user is navigating the site, location of a store, type of device that the user is using such as a desktop, laptop, or mobile phone, and so forth. Any one or more of this data could be analyzed to determine when to initiate a call to the browser API separate from the user clicking on a buy button. As noted, by initiating the call based on a state of the navigation rather than a user clicking a buy button, an interaction can be removed such that to make a purchase. The user doesn't need to both click on a buy button and press a fingerprint reader.

Also shown in the interface 702 is an option for the user to change the information that is presented. Typically, users will have particular patterns which they will use over and over, such as choosing ground shipping. Thus, in many scenarios, the information provided in the user interface which indicates that the user can buy now with a fingerprint 706 (or facial recognition or other biometric or other means) enables the user to truly have a single touch purchasing experience where the single touch not only indicates the intent to purchase but also provide the fingerprint authorization or facial recognition. Of course the biometric authorization could also be provided on the touch sensitive screen 702, if it was so configured. As the use of the fingerprint button 708 is outside of the browser, the device 700 may communicate the touch to the site indicating that the user has provided the intent to purchase as well as the fingerprint, facial or other authorization. At this point, the system could proceed to create the various tokens or encrypted data necessary to return an encrypted token and payment data back to the site for processing the payment. Again, this can work for an in-store purchasing experience as noted herein.

The following example illustrates the point made above. Assume the user has been navigating and selecting several items for purchase from a site, has selected an item in a store, or has scanned an NFC tag and has placed those items in a shopping cart. The items can be products, tasks, rentals, tokens, digital assets, and so forth. Assume three items have been placed in the shopping cart and the user desires to now checkout. Again, the shopping cart can related to in-store items and/or on-line items. The user clicks on a "view shopping cart" button. That button can cause the system to initiate a call to the browser API, which can retrieve one or more pieces of information such that the user can be presented with the three items in the shopping cart, identification of a payment account, such as a visa, an identification of a shipping address (where on-line items may need to be shipped) and shipping method and instructions to simply provide the fingerprint/facial authorization for the purchase. Any needs for in-store purchases can be provided to handle in-store issues like confirming to a clerk or a NFC station that the items the user has have been purchased. There really is no need for a buy button at this stage. Of course options can be presented for the user to edit the information or change the payment account and so forth. Machine learning or other intelligence can be utilized to prioritize which payment account the user is likely to use. For example, a business credit card may be presented based on one or more factors, such as the location where the user is making the purchase, the kind of purchase, the time of day, and so forth.

The machine learning algorithm can also be applied to other types of interfaces such as a spoken dialog interface. Speech related models have been developed in the past with respect to dialog management in general. The additional concepts disclosed herein are to utilize machine learning to dynamically modify or present the payment process as part of any kind of user interface. This can include machine learning data related to physical products being carried by users in a store and how those items are linked to the mobile device. The payment process might be a spoken dialog, graphical, multimodel, near-field communication, mobile-based, desktop-based, and so forth. For example, in a messenger application which includes a text component and a spoken component, the balance of what is presented as a text or a message and what is spoken or visual can be selected or determined by machine learning models. A spoken dialog might select what to say, how to say it, what voice to use (male, female, accent, etc.), whether to switch from one voice to another, and so forth, based on what type of interaction will not only be easier for a user, with less friction, but also what might increase conversions and the completion of the payment process. Plus, voices might be associated with particular payment services, such as from Apple or Google. The choice of dialog, volume, tone, accent, payment service, options presented, can be based on historical data, machine learning data, and other data such as history of purchases, user preferences and so forth. Utilizing such an approach can enable the payment process to differ from person to person in such a way as to enhance the individual user experience with the purchasing process. No longer will everyone be presented with the same set of input fields or the same PayPal button. The very point of committing to make a purchase and authorizing the purchase can be tailored to the individual. That personalized approach can also be offered across different platforms and sites such that the user will have a consistent experience. The browser API could pass to the site some data associated with how the user historically has experienced a checkout or can pass user parameters, or any other data to instruct the site to improve the process. For example, in a normally graphical user interface experience, one user might have a 30% increased likelihood of finalizing a purchase if an audible comment is made when a buy button is presented, such as "Mary, thank you for coming to our site (or to our store). We're set to use Apple Pay for you". A dialog could be added to the graphical experience to step people through the process and make them more comfortable. Tutorials, graphics, video, chatting opportunities, and so forth could all be a part of the payment experience and managed to be presented in a dynamic fashion for each user.

Embedding Features in a Product to Enable a
Rental or Purchase of the Product or a Similar
Product The present disclosure also relates to a new approach to enabling a person to see a product or object (outside of a store, or even in a store) that has a feature (like a QR code or NFC tag) that can be used to trigger a communication via a browser or an app with a server that includes data about the product or task, such that a server can return data that is similar to an amazon one-click state in which a product or other task is presented to the user and they can purchase and have the product delivered in one click or a few clicks or interactions. Other tasks can be achieved such as renting of parking space, renting a vehicle, registering with a service, performing a physical task such as accessing or opening a door, and so forth. A user could see a shirt or a lamp at a friend's home, use their mobile phone to scan a QR code (or NFC tag, a shirt pattern, image of the product, or any feature), which would trigger a browser or an app that transmits data to a merchant server associated with the QR code such that in response to the transmission of the data, the server returns an image of the shirt or lamp with an option to buy using API-based payment methods like Apple Pay, Google Pay, The Payment Request API, Samsung Pay, PayPal, Amazon Pay, cryptocurrency, or any other payment mechanism, such as a traditional check out page, or other mechanisms either built for browsers or for apps (like Apple's PassKit APIs). The user can initiate an app to scan the code and pay through an app-based approach. Any payment mechanism can be implemented. One benefit of this approach is the lack of a need to download an app in a browser-based scenario. Thus, if this kind of purchasing or task oriented capability became ubiquitous, the user would no longer after download an app to go to the Amazon Go-Store, an app for parking payments, an app for renting a car or a scooter, or an app for any other process. By skipping the need for an app, the present disclosure can enable a simplified and frictionless approach to achieving any kind of task which can be initiated by the user interacting with an NFC tag, QR code, or any other mechanism that includes the data needed to initiate a browser, navigate to the appropriate site, provide the necessary information, and present the user with the appropriate interface for achieving whatever the task desired is.

When users pay for a product or perform a task, the payment mechanism can include transmitting their address or other requested/necessary data to the site so that the product can be delivered to them for the other tasks can be achieved. Of course options can be presented for shipping the item as a gift to someone else, reviews, ratings, accessories, etc., can be presented at that time based on the product scanned.

In the context of associating a tag or a code with a product that's been sold, one benefit of this approach is that manufacturers of products can send their products out into the world with the capability of enabling a person to buy another one of the products easily and quickly. Indeed, owners of products could even rent those products to others easily using this approach. This could even apply and scenarios like Air BnB or hotel rentals. Of course a user in a store could also see the product and buy it on-line or through an app. Where sizing is important, body models can be transmitted as the user device initiates the communication with the server such that the proper clothing size can be presented to the user. The novelty of this approach can be any of the concepts individually or collectively of presenting a new feature within products that is configured to enable this kind of capability for a person to easily scan the feature, have a user interface presented based on that scan that enables the user to buy that product, rent something, perform some other task, or search for similar products and easily make a purchase, wherever they are.

Another aspect of this disclosure relates to further gamifying or providing a social media aspect to after first sale sales. How would one can connect the original buyer to additional buyers can occur in various ways. One solution is to connect in a database at the time of the original sale the buyer to the code or feature built into the product. This can be done at the point of sale or perhaps on-line or via an app later by the buyer (if, for example, the product was a gift). A database can be updated to link the feature built into the product with a person. A clerk at a point of sale having identified the product, or a user buying the product in-store using some of the principles disclosed herein on their own device, can be presented with an option to associate the product with a particular person. In online order can obtain this personal information about the purchaser of the product and a particular NFC tag or code can be generated and placed on the product in a persistent way such that one or 2 years later, a friend could use their user device interact with the NFC tag or code and purchase another version of the product for themselves, rent the product, and so forth. A payment system can also be built-in to this scenario where the original purchaser of the product can receive payments or benefits when others rent the product for themselves or purchase a copy or similar variation of the product for themselves. Perhaps the friends doesn't purchase the exact product for themselves but by interacting with the originally purchased product, the friend ends up purchasing a similar product. The friend to purchase the original product can also receive a benefit for being the avenue by which the initiation of the purchase occurs. Databases can be developed which can store or track the history of follow on purchasing renting or interacting activity based on a product purchase by an individual. Social media data, advertising, rewards, and so forth can be made based on such data.

With respect to how data might be configured in the context of these kinds of experiences, people in a social network, family, or other options to search for people can be presented. A charity or other entity could also be designated. Any entity could be designated to be linked to the particular product. The feature could be a number on the product that a user types into an input field of an app or a website.

The feature could be built in the product itself or on a box like a Monopoly Game or card game which has a box which is used to house the game or product. A product could have multiple features or components and each one could be purchased. For example, a chess set might have a separate code or feature for each piece. If a pawn is lost, the user could type in the code or scan a QR code on another pawn and have a replacement sent. Interacting with an NFC tag can cause an interface to come up which presents the user with easily chosen options to purchase the entire chess set or to select the particular piece that's been lost. A user could be provided with an interface for other pieces to complete an order, such as a Queen or a King piece to the same set. Any toy, sporting goods, vehicle part, or any product that has multiple pieces could enable an easy reorder or replacement approach. The packaging for example could include a QR code or NFC tag for each component of the product so that they could easily be reordered.

Then, when a later person sees the product, identifies the product through a scan or other mechanism, and buys the product for themselves, the database will provide a benefit to the original designee. For example, a multi-level marketing mechanism can be built in where the original buyer can receive money, credits, cryptocurrency, points, or any type of benefit. The purchase of the same product by another person can also trigger a social media posting about the sale, with the ability of the users to record video or audio or some other data and post it along with the fact that the friend bought the product. The posting could have a picture of the two people with a posting like "Fred just bought a shirt just like George's!"

Under this approach, one benefit is that the second person buying the shirt in the manner will have a shirt delivered with themselves already linked to the feature built into their shirt such that purchases based on that second shirt will be attributable to them. Different point systems can be provided if the friend buys a similar item but a different color but initiates the sale via a "scan" of the original product. Multi-tiered data can be tracked as well. Person 1 buys a shirt, and person 2 later sees that shirt and buys one for herself. Person 1 gets $0.5 for initiated that sale from their shirt. Person 3 sees person 2 with the shirt and decides to buy one for themselves and scans the feature. Person 2 perhaps makes $0.3 and person 1 makes $0.2 from that sale, and so forth. A database can be updated with all such data and track all such transactions. New shirts delivered will be linked to the person causing the sale and the person purchasing their own shirt. A blockchain can be used to record the data described herein.

Users could scan the feature and also have an ability to access their account which can store their credits or benefits for having products that initiate further purchases. Location-based technology could also be built into a product such that location information can be included in the analysis and transaction. For example, an NFC tag can include some location-based technology or the ability to receive, via WiFI or some other approach, location-based data. Any aspect disclosed herein can also apply to rentals of parking spaces, objects, or can also apply to any other tasks that might be associated with the particular object.

Discounts, coupons, incentives and so forth can be built into this process as well. In one aspect, clothing or any product having a pattern capable of triggering or linking the product to a database such that when a user scans a feature of the product (like a horse on a polo shirt), the product would be identified. A thread or a feature of the material in clothing could be traced or detected by a mobile device which can be used to also identify the product and/or its manufacturer or seller. For example, a logo having a metal thread with a certain characteristic can be detected by a mobile device and used to access the proper server for identifying the product for a new buyer. The mobile device could combine an image of a logo or pattern or shape, etc. of the product with perhaps a responsive electromagnetic signal associated with a thread or component built into the product. The ultimate effect is to enable a user to use a mobile device to interact in some way with the product to identify the product and access a network-based service that can present in a user interface that product, other features such as alternates, rankings, reviews, etc. (as would Amazon.com when a person is ready to make a one-click purchase). Tasks associated with the product or object are presented in the interface for enabling rentals, purchases, physical tasks to be performed, etc. The mobile device, if necessary, would transmit body model data for the buyer, or others that the buyer might designate (I want to buy that shirt for my sister), such that with just a few clicks, the user could obtain a final confirmation of one or more of size, color, type, number, and so for the same product or a similar product to the one their friend has and then be able to purchase the product with a simplified payment process (which may or may not use the APIs disclosed herein) and have the product delivered. The process might be a PayPal type of process or an Amazon Pay process in this scenario.

Normally, a seller of a product focuses on an on-line sale or an in-store sale when that is complete, they are done thinking about the product. One benefit of this approach is that sellers of product can continue to follow their products out into the world and consider them still as capable of prompting additional sales and experiences. In one example, discounts can be offered for all cloths bought through friend connections for a period of time say before a holiday. Advertisements can provide notice of such discounts. People who scan products from friends and make sales can then get discounts, or friends can get additional incentives.

In another aspect, business intelligence can be gathered as each such sale will come from a friends' mobile device. Location-based data can be tracked to identify where the products that were original sold are physically found. Advertisements, discounts, promotions, etc. can be based on location-based data that is gathered according to the location-based data found from the mobile devices buying the products after scanning from friend's products.

In this regard, a method can include gathering mobile location data associated with a mobile device making a purchase or participating in any part of a purchasing process associated with a product having a feature built into the product that enables the mobile device to identify the product and a seller of the product. A database of the location of each product can be used to aggregate information about the distribution of the product into society. The database can be used for delivery of products, to stores, to marketing, to use of demographics for further product development, etc. For example, a store that sells a shirt in NY might determine that 40% of those shirts ended up in Florida, based on the second sales occurring from people wearing the shirt in Florida. The store can make decisions to built a distribution facility or ship items for prepositioning closer to more likely sales based on the data gathered from these secondary sales. The interface that is provided to users can also include ranking input, social media options to post sales, options to record media associated with the sale, and so forth.

Claims can be directed to products having features built into them which can be scanned or identified as disclosed herein, methods for scanning a feature, accessing or connecting to a network-based entity, selecting or confirming a sale or rental or other operation, and authorizing a payment or other task. The method can be from the standpoint of software components operating on a mobile device that controls a camera and other components to perform the functions disclosed herein. Methods can be practiced from the standpoint of a network-based server. The server can receive a communication from a mobile device that accesses the network-based server based on a scan of a feature associated with a product or object. The network-based server can receive according to a protocol an identification of one or more of the product, a buyer or renter of the product or a designee associated with the product, a date the product was purchased, a time of rental, a location the product was purchased, an amount the product was purchased for, size information for the potential buyer, location information, etc. The network-based server can respond to the mobile device with a configured product offering of one or more of the same product, in the right size for the mobile user or a person designed by the mobile user, alternate products, a price (which can be based on the original price paid by the first buyer), reviews, accessory products, a buy now option (like Apple Pay or Google Pay) or any other payment mechanism, such that the mobile user can easily purchase the product and have it shipped to them. A payment sheet can be provided for the user to confirm the delivery of authorized payment data and physical delivery data for the purchase. The payment sheet can include data such as an amount of time for a rental of a parking place or a vehicle.

Data about the original purchase can also be provided to the mobile user, such as "John bought this in NY on Feb. 2, 2017 at X store—it was $19.95, we'll sell it to you for $18 and include shipping". The system can present options to buy a second item for ½ price or an accessory as well. Images can be presented for the user to browse and add to a shopping cart. The user could pay with points that they have earned by having people buy their own products.

In another aspect, the mobile device used to initiate the transaction can start the transaction and a price for the product might depend at least in part on the location. The location for example in a less well to do area might indicate that a lower price would more likely lead to a sale. Gamification approach could be used to. For example, if there is a group of 10 people with clothing or products at an amusement park or at a conference in which a geographic area or fence could be determined, the system could track purchases of the product by other people within that area for each person in the game and keep scores and provide rewards.

In another aspect, a user's purchase history or credit rating or other data could also be provided to a merchant as the user requests or initiates a process to buy a product, rent an object, or perform some other task. This data can also enable a more dynamic approach to product pricing where machine learning data can impact at least in part a decision on what price to present that is likely to result in a sale.

In another aspect, the treatment or presentation of an interface triggered by the feature on the product can change over time. The first time it's accessed or used before the original purchase, the interface can be configured to manage the first purchase of the product itself. Once that purchase occurs and optionally a buyer or designee is associated with the product, then the next scanning can be for a friend to purchase a similar product to be shipped. The system can track the accesses to the database record and change the interface depending on where the product is in the life cycle. One option could also be used to give the product to someone else and have a new designee associated with the product or if it is donated to charity for sale from a used product store, that data can also be provided to a service such that the presentation can be switched back to a sale of the actual product.

The product can have the feature built in, printed on a box, or otherwise permanently affixed. It can be a sticker as well. In one aspect it is expressly not on a removable tag or a sales tag that is intended to be removed after an original sale. It can be independent of a removable tag. The product can be clothing, furniture, electrical equipment, computer equipment, an appliance, shoes or boots, toys, motorized products, tools, books, and even electronic products like digital books can include a graphical code that can be scanned. Any product physical or digital can have a feature built in or associated with the product that can cause in a mobile device a triggering of a browser or other interface to a network-based server to identify the product and present an option for the user of the mobile device to make an easy purchase of the product and have it shipped or delivered electronically to them. For example, in a digital book that the user wants to purchase from a digital device of a friend, the scanning of a code can cause the digital book to be presented on the friend's mobile device, and the information about how to delivery the digital book to the friend's mobile device (like a Kindle) can be transmitted via the API protocol, such that the book can be ordered and delivered.

FIG. 8 illustrates an interface 800 with such information as the user's name, shipping address, shipping options, and email address for a receipt. This interface can be presented for a user in-store (to provide directions and a mechanism for scanning codes, communicating between a camera and a browser, or a scanning component and a browser, and so forth) and served from a site www.store.com. This interface 800 can represent both an in-store or an online interface. For example, for an in-store interface, after user has identified a product, the features 802, 808 and 810 can be presented such that the user can identify a receipt email address and the total amount to pay. For an online approach, features 804, 806 can be presented for selecting a shipping address and shipping options. In one scenario, if the user is in-store, and they select the product, such as a pair of pants that are the wrong size, the user could go from a state of having the wrong sized pants identified to their mobile device as described herein, and easily be able to transition to an online order of those pants, or the same item but in a different size or having a different characteristics. For example, a user may identify a blue couch at a furniture store, and the system may present an option in the user interface to either purchase that couch or to select an alternate color, which can be delivered to their home. If the user selects the alternate couch for delivery, then even while the user is in the store, they can confirm a shipping address and shipping options, at which point they can confirm the sale and simply go home and wait for the couch to be delivered. As can be appreciated, this approach blends an in-store and online experience, which can greatly enhance the user ability to both see products in-store that ultimately purchase the product that they desire.

Overall Architecture for One-Click Payments

Figure 9:
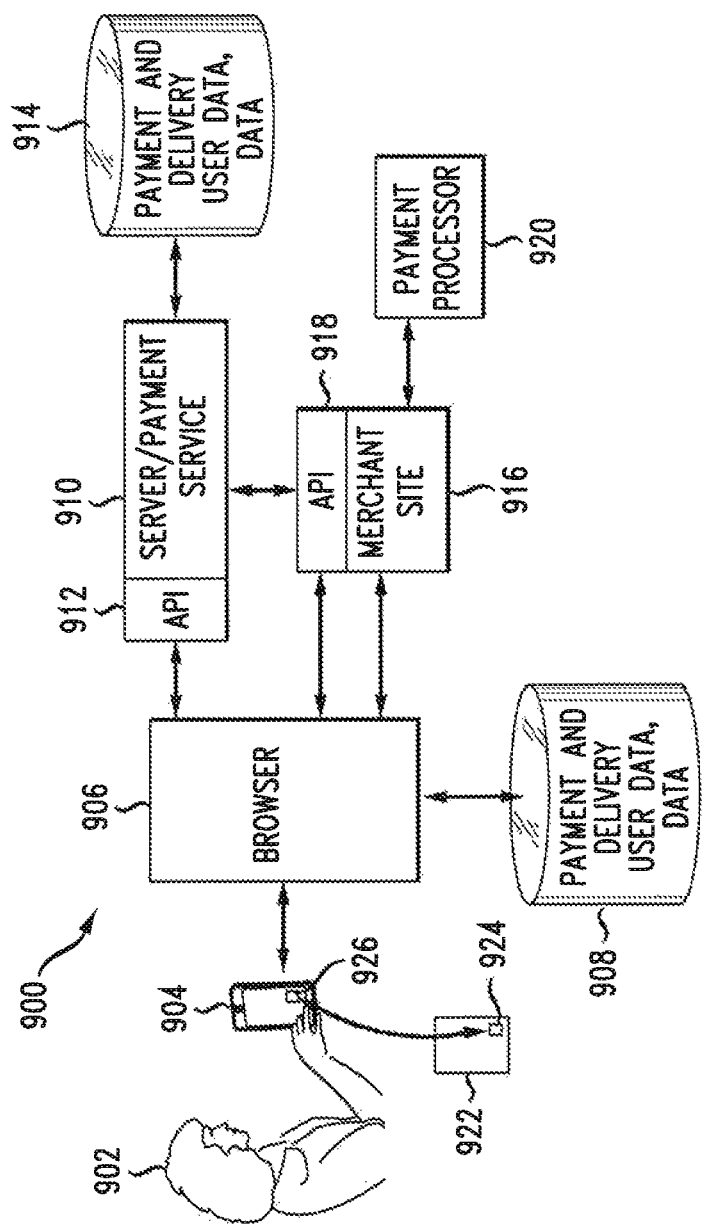
FIG. 9 illustrates the based payment APIs where the browser acts as an agent communication of personalized data for enhancing the purchasing experience.

FIG. 9 illustrates an example architecture 900 for pre-populating a merchant shopping cart, as well as for using a browser API, including for an in-store purchase or purchases or tasks related to object at any location. In this example, a user 902 of a computing device 904 running a web browser 906 loads a web page with a unified input field or any other site such as a social networking site for the online approach. For an in-store approach, a communication component 926 can be used to coordinate with a tag or other component 924 attached to a product 922 within the store. As noted herein, there are number of different ways in which the device 904 can be used to identify a product in an in-store or object-based shopping experience. All of these scenarios would apply to the infrastructure disclosed in FIG. 9. For an in-store experience, the merchant site 916 represents the site at which the user would navigate their browser manually or automatically in order to retrieve an appropriate user interface which can establish a connection between the browser and a component 926, which can be used to identify products. The component 926 can be an RFID tag reader, a camera, a near field communication component, a user interface in which the user can enter product identification information, and so forth. The camera 926 can be used to take pictures of codes on labels or tags associated with products 922, or can be used to take pictures of the product itself and then communicate that data via the browser 906 back to the site 916 for proper correlation with product inventory to enable the user to purchase the product.

The site 916 can communicate with a server 910 via an API 912 for purchases which might use services such as Apple pay or PayPal, or crypto currency payment service 910. The server 910 can represent any site or app, even payment service applications. As the user 902 enters data in the unified input field, or identifies the product in-store that they might desire to purchase, or interacts with the site in any other way based on its respective functionality, the browser 906 sends the data, via using the API 918, to the server 910. The server 910 can analyze the data to identify that the intent of the user 902 is to make a purchase, based on the data entered in the unified input field or user actions in store. For example, the sites 916 can send a confirming interface, identifying the product and confirming that the user would like to add the products to a shopping cart to purchase the product.

The browser 906 can therefore act as an agent between the user in the store, and the merchant site 916. The browser can also act as the payment agent to communicate and manage the process a payment between the mobile device 904, the merchant site 916 and/or a payment service. In one aspect, the browser 906 will communicate a payment token or other payment data confirmed by the user via a biometric dedication step through the browser API 918, according to its protocol to the merchant site 916. In one aspect, a separate payment processor 920 can be utilized to pay the merchant site. In another aspect, the browser 906 will communicate with a network-based payment service 910 via use of a second API 912. The server 910 can identify a merchant website 916 that sells the desired item, and communicate with that merchant website 916 via its associated browser payment API 918, if available. In one aspect in this scenario, the payment data stored 914 can enable the site 910 to process the payment and communicate via the API with the merchant the payment details and information to the merchant 916 to deliver the product or enable the user to take the product out of the store. If an API is not available, the server 910 can communicate with the merchant website 916 via HTTP and can navigate through the web site in an automated fashion as if a user were clicking or entering data on the merchant website 916. The server 910 can use a network-based database 914 of payment and delivery data or other personal data about the user 902 to populate data fields at the merchant website 916.

However, if a network-based database 914 is incomplete or does not exist, the server 910 can, via the API 912, request data from a database of payment and delivery data 908 local to the browser 906 or to the computing device 904. The payment data 908 can be any payment data stored on the local device (or at a network based service), even if for other purposes such as a YouTube account, or associated with an email account, or an iTunes account. If a user is logged into their browser, or their email account or any other type of account, and there is payment data stored, the system can utilize or access that payment data to initiate a commerce purchase. When the user is making a purchase either online or in store, the system can present the various payment accounts stored, such as a credit card in Google Wallet, plus a Pay Store account, and let the user choose amongst the available payment options. This can also occur across platforms such as information stored in Chrome plus an Amazon account stored on Amazon.com. In this scenario, the Amazon.com data can be represented by the server 910 and data 914 and can be provided to the browser 906 through an API 912 or other means. The browser 906 can access and utilize any stored payment data for simplifying the payment process. The server 910 can continuously receive additional data entered by the user in the unified input field via an update or modify data entered at the merchant website 916 based on products selected for purchase at the merchant website 916 or from a brick-and-mortar store, or even switch to a different merchant web site or different store altogether.

The server 910 can transmit a response to the browser 906, via the API 912, so the browser 906 can present actions or destinations to the user 902 based on the data entered in the unified input field. Then, if the user selects one of the actions or destinations, the browser 906 can navigate to that page and communicate with the merchant website 916 directly, or without the server 910, although the server 910 may continue to communicate with the browser 906 to track behavior of the user 902 at the merchant website 916 or in the store. For instance, the server 910 may track eventual purchase details referred through the unified input field or made within the store. The server 910 can update the network-based payment and delivery data 914 from time to time based on information processed from the local payment and delivery data 908, or based on user input. The browser API 918 establishes the basic protocols for communicating information between the merchant site 916 and a browser 906 for simplifying the payment process. The browser 906 can also represent any device such as a voice controlled assistant or an appliance or a device positioned within a brick-and-mortar store.

The payment data that is communicated from the browser 906 through the API 918 to the merchant site 916 can be tokenized for security purposes. The merchant site 916 can then process a payment for the product with their payment processor 920. The benefit of this approach is that the same payment infrastructure can be used by the merchant and only minor changes to a site are needed to utilize the browser API 918 to obtain the necessary data for processing a payment. As shown in FIG. 9, communications between the merchant site 916 via the API 918 with the browser 906 to obtain any kind of data 908, can occur in both directions. Thus, the merchant 916 can initiate a request for data through the browser API and receive that data for any purpose such as payment data to avoid the user needing to manually fill in payment account, address information, as well as any other data such as shirt size, pant size, shoe size, color preferences, one-click purchasing parameters, location within a store of a product, etc.

For example, if the merchant site 916 is amazon.com and the site already has the payment account and address of the user landing on amazon.com, a one-click purchasing authorization or parameter may need to be set on the browser 906 for the destination state to be a "one-click" purchasing state. In the transition from the server 910 to the site 916, the process can include accessing or confirming that the one-click purchasing state is "on" for the browser to enable the user to land on the site 916 and have the next interaction be a one-click to purchase the product. The device 904 can also be switched from a "normal" state mode to an in-store mode in which the browser is acting as an agent to retrieve data from a scanner, camera or other input component built into the mobile device.

Various example aspects of implementing the browser API 918 are disclosed herein. It is noted that the payment and/or delivery data, as well is any other data (such as user profile data, one-click purchasing data, settings, parameters and so forth) that may be used for processing a purchase, can be stored 908 locally, on a user device 904 or may be retrieved from a network server or service, or a combination of both. The network service, for example, can be PayPal or a cryptocurrency service or Ripple which is used as a bridge currency. For example, when the browser 906 receives a payment request through the API 918, it may communicate data with a network server associated with a purchase. A network server can encrypt data and create a token which is transmitted back to the user device, for passing on to the merchant for processing the payment. The server 910 can also represent any site other than search sites, such as social media sites, physical stores, and the respective functionality associated with the respective site will apply to how one might transition from an interaction with the first site 910 to a destination merchant entity site 916. In other words, the initiating transitional interaction may not be entering data into an input field but could be any interaction associated with the respective site, such as interacting with an advertisement or an interaction associated with a game, map application, conferencing application, in-store product selection or manipulation, and so forth.

In one aspect, as is shown in FIG. 9, the site 916 can also request via the API 918 payment data from the server 910, which can have access to the payment data, user data and/or other data. Thus, for example, a site could present a buy button as the user navigates for a product or identifies a product in-store and decides to make a purchase, and to turn that purchase into a one-click type experience, the site (or the browser) could perform an API call to a server, such as a Google based server, an Amazon based server, a cryptocurrency wallet, for example, and retrieve payment information and/or other data stored with network-based service, or any other entity, which can be passed through the API to the merchant site for processing the payment and potentially delivery of the product to the buyer. Thus, payment data stored in say Google Play, or with an email address or YouTube, or at Amazon, could be accessed and provided quickly and easily such that the user does not have to manually enter the data to make a purchase. The server 910 might also access payment data stored in connection with the browser 906 to make a payment. Indeed, the API 918 and/or API 912 could be used to present a number of different payment options via a user interface, such as one payment option stored in a browser 908 and one payment option stored at a Google server 914, or Google Pay, for example, and enable the user to choose which payment account to use for a payment. Information about the chosen payment account can be passed through use of the API 918 to the site 916 for processing.

Figure 10:
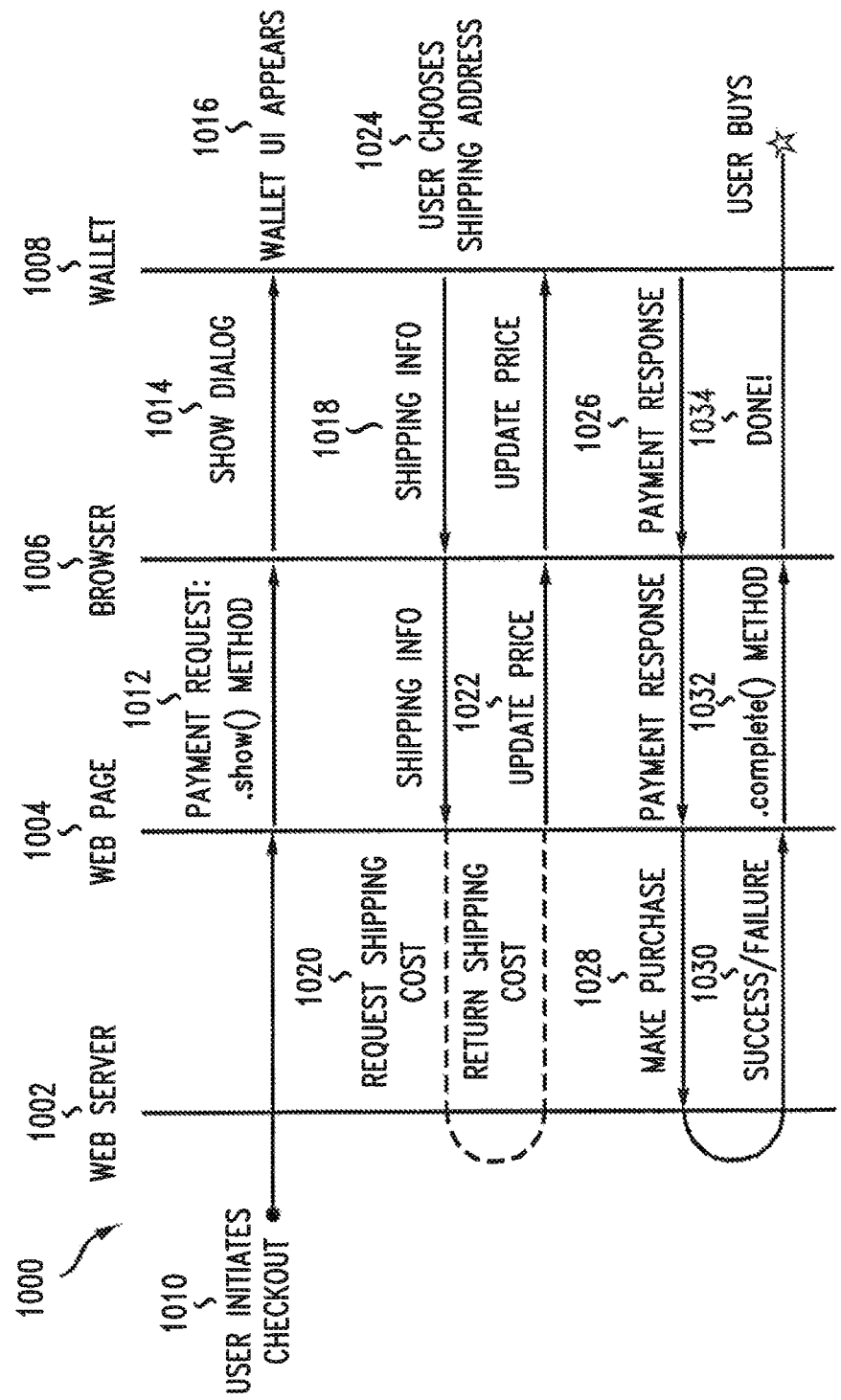
FIG. 10 illustrates a browser-based payment API signal flow.

FIG. 10 illustrates another aspect 1000 of using the browser API for communicating payment data. After the user has navigated through a website and initiates a checkout process or has identified an object or a product in-store 1010 which is communicated from the browser to the store web server 1002, the web site should create a payment request which is typically initiated when the user clicks "buy" button, or another triggering event in-store occurs to indicate that the purchasing process should be initiated. The payment request can include method data, details and options. The method data can include required payment method data that includes payment method identifiers, required transaction information, and optional information such as shipping or contact information that should be returned. In one aspect, the payment amount could be negative and the payment request API could be used to process returns or discounts. This can occur where a user is returning a product to a store where the product could be brought into the store, identified by their device, the URL of the store server can be entered into a browser input field, and communication of data could occur to cause a return process for the item. Such an approach could also occur on a device of a store clerk. The product that was purchased previously could be identified from its code that is scanned. In other words, a user uses their mobile device to scan a product's code and purchases the product in store. When the user goes back to the store with the product, and they scan the code, the server 1002 can identify that the product is back in the store, and is being identified again, and was previously purchased. The system can automatically assume that the user has brought the product back and desires to return the product. The browser API can be used in this scenario to process a return. The interface could request a code from a clerk at the store who can enter the code into the interface on the user device or on a different device to confirm that the product is packaged and can be reentered into inventory. Upon the completion of the return process, the clerk at the store can simply place the product back on the shelf in the system can recognize that that product is now available to be sold again. Such a process can simplify returns and entry of products back into inventory.

Of course in this aspect, money would flow from the merchant site through the browser API to the user's digital wallet or payment account. In this aspect as well, the process could essentially be reversed where the user would initiate a payment request from the browser or from a site and any aspect of this process could essentially be reversed where shipping information, discounts, any other data necessary, can be utilized to enable a refund to be processed. Tokens could be used and generated either on the browser side or the merchant side with account information and data for processing a return or a peer to peer payment. Return shipping information where applicable, extra charges, or any other data necessary to enable a user to return an item, and receive a refund can be exchanged through the browser API in a similar manner as occurs when the user makes a purchase at a merchant site.

In one aspect, the return process can also be used in a simplified manner for products purchased in-store. For example, each individual product can have an associated code such that the user can scan the code with their phone after accessing the store server and receiving the appropriate interface to make a product purchase. If the user goes home and decides they no longer want the product, the return process can simply involve going to the store URL using the browser on their device and scanning the product code again. This time it would register in the store server as an already purchased product and the interface is presented can include a return option. The interface could then guide the user through the return process. This process can include instructions on packaging, a delivery address, a confirmation via a biometric to receive a return payment, and so forth. In the process, the system could automatically charge a restocking fee as well and return to the user. A reduced amount of refund as might be appropriate.

Continuing with FIG. 10, the payment request 1012 can initiate a "show" function, which shows a dialogue 1014 for use as an interface for processing the payment. A user's wallet 1008, such as the Microsoft wallet, Apple Pay Wallet, a cryptographic wallet, payment information stored at a browser or other location, a bank account, a Google Pay account, and so forth can be branded or utilized as part of user interface. A UI can appear 1016 for a wallet where necessary. In this example, the user chooses a shipping address 1024 through the interface for on-line purchases or returns. The shipping information, where relevant, is returned from a wallet 1018 to the browser 1006 which is then passed to the webpage 1004 such that the webpage can request a shipping cost from a server which returns the shipping cost 1020 to the merchant who can then update the price 1022 which is passed to the browser and/or the wallet. A payment response 1026 is generated for the wallet to the browser 1006 which passes the payment response through the browser API to the merchant 1004 who makes the purchase 1028. A success or failure signal 1030 is provided to the merchant who can then complete the process 1032 by informing the browser 1006, at which point the purchase is complete 1034. While FIG. 10 does not specifically mention a tokenization process, various encryption technologies could also be used to encrypt data or tokenize the data such that the payment request or the payment response passed through the browser API could be a one-time use token which encrypts the various information needed to process one or more of a payment, a delivery of payment, and update of user information, and so forth.

As noted above, this process can also apply to payments made where the user is in a store picking out products to buy and using their mobile device to identify the individual products and to communicate data from a product identification component such as a camera or a near field communication module to a browser and from the browser to the server 1002 at which point the browser API as well as secondary APIs can be utilized to manage the payment process and/or a return process.

Figure 11:
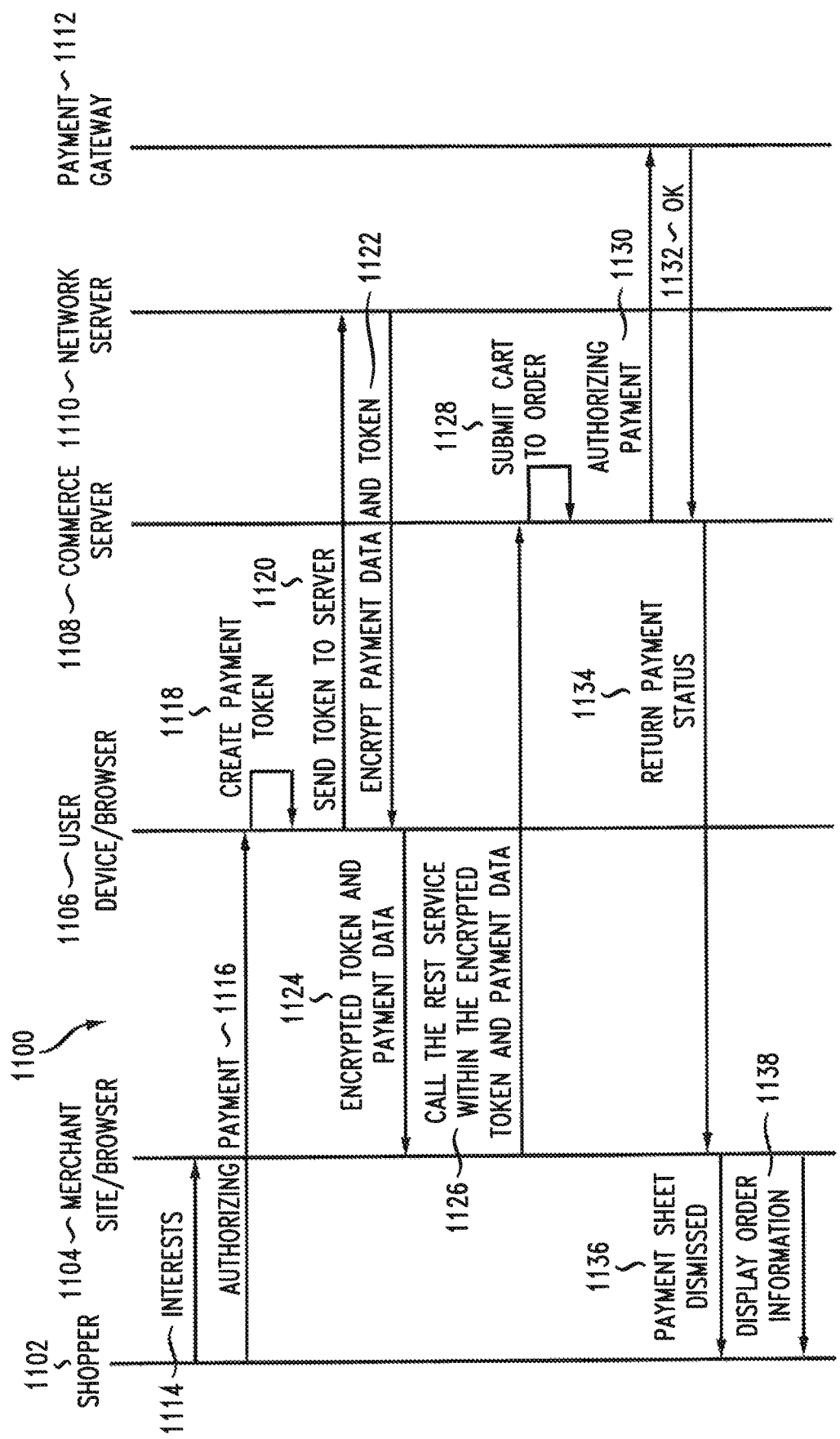
FIG. 11 illustrates another browser-based payment API signal flow.

FIG. 11 illustrates a tokenization process 1100 for use with the payment request API and/or a secondary API between the browser 1106 and a payment service or network server. When using a tokenized process, a merchant 1104 may need several pieces of information to be able to process the received token from the browser API. A merchant may need a unique identifier that represents a merchant associated with the payment process. The merchant may need a payment processing certificate that is used to securely transfer payment data. Network servers 1110 can use the payment processing certificates public key to encrypt the payment data. The merchant may use a private key to decrypt the data when processing the payments or the token information. A merchant identity certificate or a transport layer security certificate can be used to authenticate a merchant session with network servers. This process will be illustrated in more detail next.

As is shown in FIG. 11, merchants or applications 1104 will interact 1114 with a user or a shopper 1102 as the user navigates through the site or is in store and shopping for physical products. Once the user decides to make a purchase, they may click on a buy button and authorize a payment process, or identify a product in store using their mobile device to trigger a payment process between the browser 1106 and the merchant site 1104. This can also include a touch ID such as a fingerprint, facial recognition, or other biometric to authorize payment 1116. Such capabilities can be enabled in Xcode. As noted above, the merchant 1104 has, in one aspect, registered a merchant ID and created a payment processing certificate, which is a cryptographic key that is used to securely send payment data to the merchant server. The clicking of a buy button or product identification in store and providing fingerprint authorization to process a payment can involve a single step or can involve multiple steps.

To initiate a payment, the merchant application creates a payment request to submit to the browser API between the merchant 1104 and the browser 1106. This request can include the subtotal for the services and goods purchased, as well as any additional charges for tax, shipping, or discounts. The merchant can pass this request to a payment authorization view controller, which displays the request to the user and prompts for any needed information, such as a shipping or billing address. A delegate can be called to update the request as the user interacts with the view controller 1114. This can also include requests for size information, color preferences, social media data like birthday information, or any other information that can relate to the purchase.

As soon as the user authorizes the payment 1116, payment information can be encrypted to prevent an unauthorized third party from accessing it. In one aspect, the payment request can be sent to a secure element (such as the secure element used on iPhones to enable Apple Pay with near field communication at a merchant site or point of sale), which is a dedicated chip on the user's device 1106. The secure element adds the payment data for the specified card and merchant, creating an encrypted payment token 1118. It then passes 1120 this token to network servers 1110, where the servers reencrypt the token using the merchant payment processing certificate 1122. The servers 1110 transmit 1122 the reencrypted token back to the user device 1106. The reencrypted token represents a second token that is prepared to be transmitted to the merchant site 1104. Through the browser API, the user device 1106 sends the encrypted token and/or payment data back to the merchant site 1124 for processing. Other data requested can also be transmitted through the API back to the site, such as shoe size, shirt size, pant size, color preferences, style preferences, etc. The site 1104 can send any data necessary such as a user interface, maps, product location information, etc., to the device to enhance the in-store shopping experience for the user.

Multiple different calls to the API can be made in the process at different stages. For example, several steps prior to a payment request being made, the merchant site might want the size information so that the user does not have to click "X" or "XL" or "M" for a shirt size or to help the user find the right size, shirt, pants, or right color lamp in the store. Body models are being generated for the human body. Data for the user can be stored in a body shape model at the browser or accessible by the browser for passing to the merchant site 1104 as the user lands on a website or enters a store which sells clothing. If the user is looking for cloths online, data about their body model could be retrieved via a browser API and transmitted to the site which can adjust the presentation of clothing for that individual. They could also include data for other individuals such that as the user interact with the site, the site could say is this for the user or their sister, or their wife and their body model data could be transmitted such that the clothing could be tailor to the right person. Views of clothing items could then be modified for that body model. For in store shopping, the body model can be used to guide the user to clothing that fits them, or that fits the person they are shopping for. Further, if inventory does not match the body model, the site could guide the user to the right clothing so that they can see and feel the product and then instantly order the right size, color, shape, etc. via their mobile device so that it can be shipped to their home. The user interface could also send the user to another store having the products and a referral could pass the user to another site for handling the purchase at a different merchant. A package of data could be passed between merchants to easily transition the user to a new store.

The merchant site 1104 then, as part of the payment process, calls a REST service (which is known by those of skill in the art for processing payments) or other similar service with the encrypted token and payment data 1126 which communicates the data to a commerce server 1108. The server 1108 submits the order 1128 and authorizes the payment 1130 to a payment gateway 1112. An "ok" signal 1132 is transmitted back to the commerce server 1108 which communicates 1134 a return payment status to the merchant site 1104. The payment, having been processed and confirmed, causes the merchant site 1104 to dismiss the payment sheet 1136 and display an order confirmation to the user 1138.

In one aspect, the payment token is never accessed or stored on the network servers 1110 which are used to encrypt the payment data and token. The servers simply reencrypt the token using the merchant certificate. This process lets merchants securely encrypt the payment information without it having to distribute the payment processing certificate as part of the merchant application. As noted above, this process of course can occur via the browser 1106 and a merchant site 1104 such that the shopper 1102 can actually be in a physical brick-and-mortar store, identify a product to buy in the store via use of their mobile device having a browser 1106, just as they might identify a product online to purchase, and easily make the purchase via the browser API disclosed herein.

In many cases, the merchant site passes the encrypted payment token to a third-party payment solution provider 1108 to decrypt and process the payment. However, where merchants have an existing payment infrastructure, the merchant can decrypt and process the payment on their own server. Reading, verifying, and processing payment information can involve one or more cryptographic steps such as calculating an SHA-1 hash, reading and validating a PKCS #7 signature, and performing elliptic curve Diffie-Hellman key exchange. It is noted that the above approach represents an example tokenization process for use with the browser API. A payment token object can include such data as a transaction ID, an amount of money, data about the product, information about payment network, payment token data such as a signature and a header which can include encrypted payment data, and an amount, a cardholder name, a CVV code, an expiration date, a payment account number, payment processing data, and address, other user preferences, cryptographic currency data, and so forth. Of course other processes are contemplated as well for tokenization, which can add a layer of security to the process.

In another aspect, the browser may be operational on a first user device, such as a laptop computer, and the payment data may be stored on a second user device, such as a mobile device or mobile phone. The first user device and the second user device can communicate wirelessly through a protocol, such as the Bluetooth protocol. In some scenarios, the first device may not have a fingerprint identification option, while the second device does. In this scenario, while the user interacts via the first device with a browser which is configured to utilize the browser payment request application programming interface, the first device, as part of the payment process, will establish a communication with the second device such that the user can authorize the payment via a touch identification, and wherein the second device can be utilized for generating a payment token and communicating with a network server to receive a second payment token which is passed from the second device to the first device and through the browser payment request application programming interface to the merchant site for payment processing. In other scenarios, the first device includes a fingerprint recognition mechanism, and thus only a single device is needed for confirming authorization of the purchase. The browser can be any user interface used to view and navigate sites or applications. The browser API may also receive one or more of data about the product, the merchant, keys for encrypted communication, or any other information such that a payment process could occur separate from passing payment data through the API back of the merchant. For example, for security purposes, payment information may be communicated to a separate payment processor which can handle the payment so that payment data for the user is not provided to the site. However, the merchant still must deliver a product, so the browser API could have a separate payment processor process the payment but pass a user name and address delivery information to the site for delivering the product.

In yet another aspect which relates to processing from a browser or application standpoint, an example method includes presenting, on a graphical user interface, a presentation, the presentation being received from a site over a network. The presentation can include an interface for enabling the user to identify products in a brick-and-mortar store such that the browser can transmit data about the product to the merchant site for completing a payment process or some other task, via the browser API or other payment process such as using stored data at the site. The method can include receiving, via the user interface and from a user, an interaction with the presentation, receiving, via a browser application programming interface between a browser and a merchant site, a request from the site for payment account data for the user and transmitting, to the site and via the application programming interface, the payment account data, or other data, wherein the payment account data can be used to populate payment fields for payment processing on the site. The data can be a token which can be used once for a payment and that maintains privacy of the account information. The payment account data may just be used by the merchant site for processing the payment and may not literally populate fields that otherwise would be manually populated by user input. For example, if payment data is received in a tokenized secure manner, the data may just be used to process a payment and not literally used to fill in pre-set form fields. The payment data may be a continuation of a payment by a payment service. The presentation can include one of a product for purchase and a service. The method can include the site processes a payment for an item or a service using the payment account data for the user. The graphical user interface can be associated with a browser, an application or user interface for managing or guiding a user through an in-store purchasing process. In one aspect the API that communicates data between the site (merchant site) and a browser that can store the payment account data for the user. This aspect covers the process from the standpoint of the browser that stores the payment/deliver data of the user and communicates that data via the API with the merchant site for populating the necessary fields (or an equivalent type of process) to create a one-click or simplified purchasing experience for the user who is on the merchant site or in a store making purchases of products.

The API can also be used to request body type, sizes, or a body model for the user for use in presenting clothing for purchase. In another aspect, the merchant site may determine whether the browser API is available through the browser being used to navigate the site. If so, then a browser API request can continue, and if not, the site proceeds with a standard input field approach for payment and address information.

The method can further include updating the presentation to include a buy option which is configured, based on a confirmation from the user, to enable the site to utilize the payment data received through the API to process a purchase of an item or service without a need of the user to fill in the payment fields on the site. The browser or other agent communicating via the API can also provide the graphic for a "pay now" type of button to integrate with site graphics. The payment data can further include one or more of address data for the user, a payment account number, an expiration date, a security code, a cardholder name, shipping instructions for the user, a continuation of a payment by a payment service, a confirmation of a cryptocurrency payment, and so forth.

The request through the API can further include one or more of a supported payment method for the site, a total amount value for a purchase, items that may be displayed for purchase, a confirmation of a physical product identified via their mobile device, shipping options, return options and/or instructions, payment modifiers, a request for a user email address, a request for a user's phone number, and a request to update information. A user agent similar to or separate from the browser can communicate the payment account data between the application programming interface and the site.

In another aspect, the method includes the concept from the standpoint of the site. The method in this context includes transmitting, for viewing on a graphical user interface, a presentation, the presentation being transmitted from a site over a network to a device having the graphical user interface. The presentation, or data sent from the site to the browser can also be configured to trigger or initiate the browser communicating with another component on the user's mobile device such as a camera, near field communications component, signal sensor, or other component that can receive identification data for products as the user shops, in-store. The method can include receiving, via the network and from a user, an interaction with the presentation (such that, for example, product information that is communicated to the mobile device can be transmitted to the site), and transmitting, to an application programming interface, a request for payment account data of the user. The method includes receiving, at the site and via the application programming interface, the payment data and populating payment data fields associated with a payment process with the payment account data for the user to yield populated payment data fields. The payment data may also be in a tokenized format for processing a payment in a secure way that does not reveal the user's account information. Partial account information (i.e., the last 4 digits of the account number) could be transmitted for presentation on a user interface to confirm which account to use. The site can process a payment for an item or a service using the payment data for the user. The API can coordinate data between the browser and the site wherein the browser stores the payment data for the user. The browser can also act as an agent to coordinate communication between a camera, communication modules on the mobile device, and the merchant site in order to pass product identification information to the site for initiating a payment process or some other task. Upon receiving a confirmation from the user to make a purchase of an item or service associated with the presentation, the method can include processing a payment for the product using the populated payment data fields. The method can also include providing a confirmation of the purchase to a store clerk for an in-store purchase or may communicate a confirmation of the purchase to a communication component on a mobile device such that as the user exits the store, the communication component can indicate that the user has properly purchase the products that they are carrying and can thereby exit the store.

The method can further include, upon receiving the payment account data, updating the presentation to include a buy option which is configured, based on a confirmation from the user, to enable the site to utilize the payment data to process a purchase of a product or service without a need of the user to manually fill in the payment data fields on the site. The payment data can further include one or more of address data for the user, a payment account number, an expiration date, a security code, a cardholder name and shipping instructions for the user or other data related to a task. Biometric data can also be received. The request can further include one or more of a supported payment method for the site, a total amount value for a purchase, items that may be displayed for purchase, shipping options, payment modifiers, a request for a user email address, a request for a user's phone number, and a request to update information. A user agent can also communicate the payment account data between the application programming interface and the site.

In another aspect, a method includes presenting, on a graphical user interface, a presentation, the presentation being received from a site over a network, receiving, via the user interface and from a user, an interaction with the presentation, receiving, via an application programming interface, a request from the site for payment account data for the user, autopopulating a payment field associated with the presentation with the payment account data (or just using the data as necessary for payment processing) and transmitting, to the site and via the application programming interface, the payment account data, wherein the site can process a payment based on the payment account data for the user. The method can also include receiving a confirmation from the user of a purchase after the payment field is autopopulated.

Figure 12:
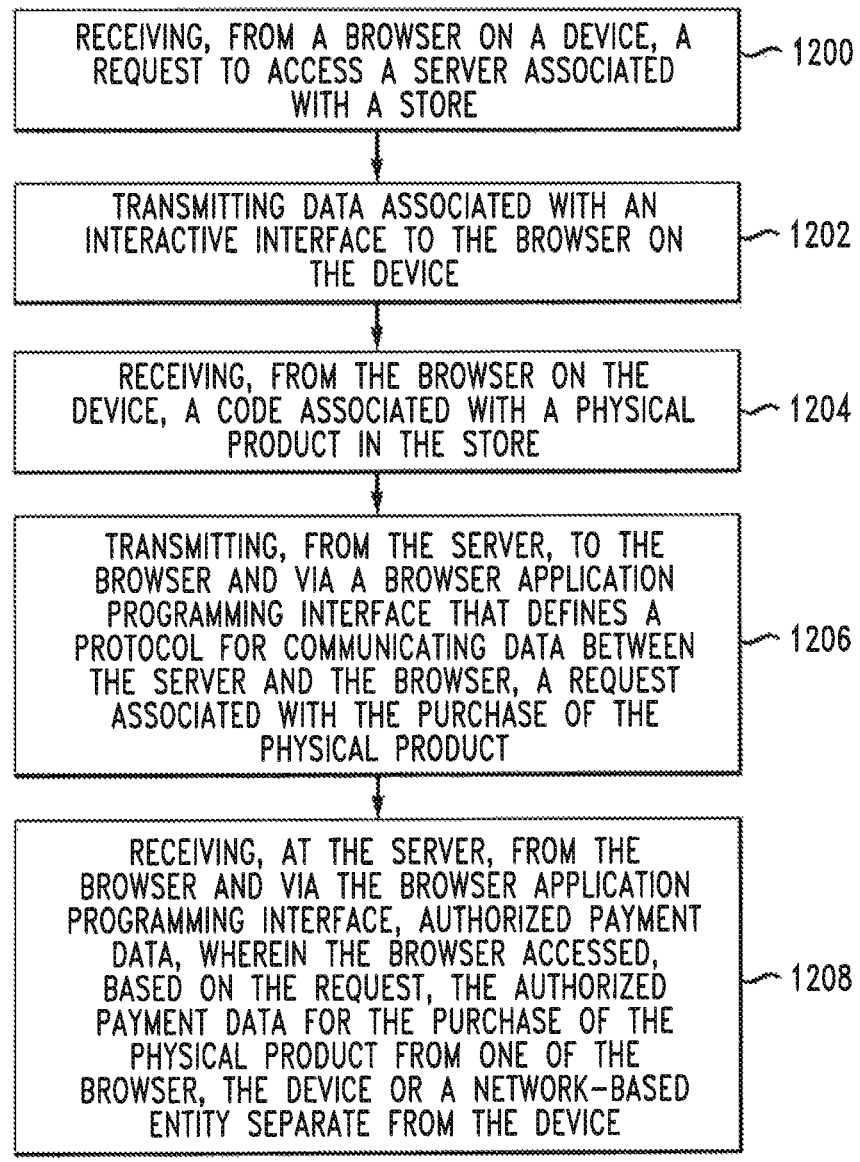
FIGS. 12-21 illustrate various example methods.

In one example, the process can work as follows from the standpoint of a server associated with the store, or group of stores. This method aspect is shown in FIG. 12. The user walks into a store with a mobile device, and accesses the server (1200) via a URL on a browser, app, or via an automatic interface presented via a confirmation, geofencing sensor triggered browser initiation, or location-based service that the mobile device has entered the store. The server provides responsive data including user interface for selecting and adding products to a shopping cart (1202). The browser or app can access a camera or other component on the mobile device such that the server can provide instructions through the browser to control an interface to enable the user to walk around the store, and scan codes associated with the products that they desire to purchase. Codes can be typed in manually as well or provided via NFC, camera images, Bluetooth, RFID, photo identification of the product, or other mechanisms. As the user scans or inputs codes or identifies the products in other ways, the codes or product data (such as a picture) are transmitted back to the server to further process the purchase of those products. For example, the server can coordinate a product picture taken from the device and determine from a database or machine learning algorithm which product the user has. From the server standpoint, the server receives the code/data associated with the product from the browser on the user device (1204). As the user is ready to buy the product or products, a payment process occurs using the browser as an agent and via browser-based API(s) disclosed herein. Payment information is thereby passed through the API to the store server to process the payment. Also, as disclosed herein, the system can enable the user to choose between a network-based payment approach, which is accessed via the browser API such that a service like PayPal, for example, could be selected, the process the payment. Cryptocurrencies could be used as well for payment as managed by the browser API. Any number of different payment approaches can be selected via the use of the browser API. Users may make purchases of individual products or the store server may maintain a shopping cart of the various products to enable a single checkout process. In a scenario where a group of stores are coordinated, such as in the mall, the shopping cart can expand from one store to another for a single checkout of products from multiple stores.

In one example, the method can include, for the browser API process, transmitting, from the server, to the browser and via a browser application programming interface that defines a protocol for communicating data between the site and the browser, a request associated with the purchase of the physical product (1206) and receiving, at the server, from the browser and via the browser application programming interface, authorized payment data, wherein the browser accessed or retrieved, based on the request, the authorized payment data for the potential purchase from one of the browser, the device a network-based entity separate from the device (1208). The data might be any data used to accomplish a task.

Figure 13:
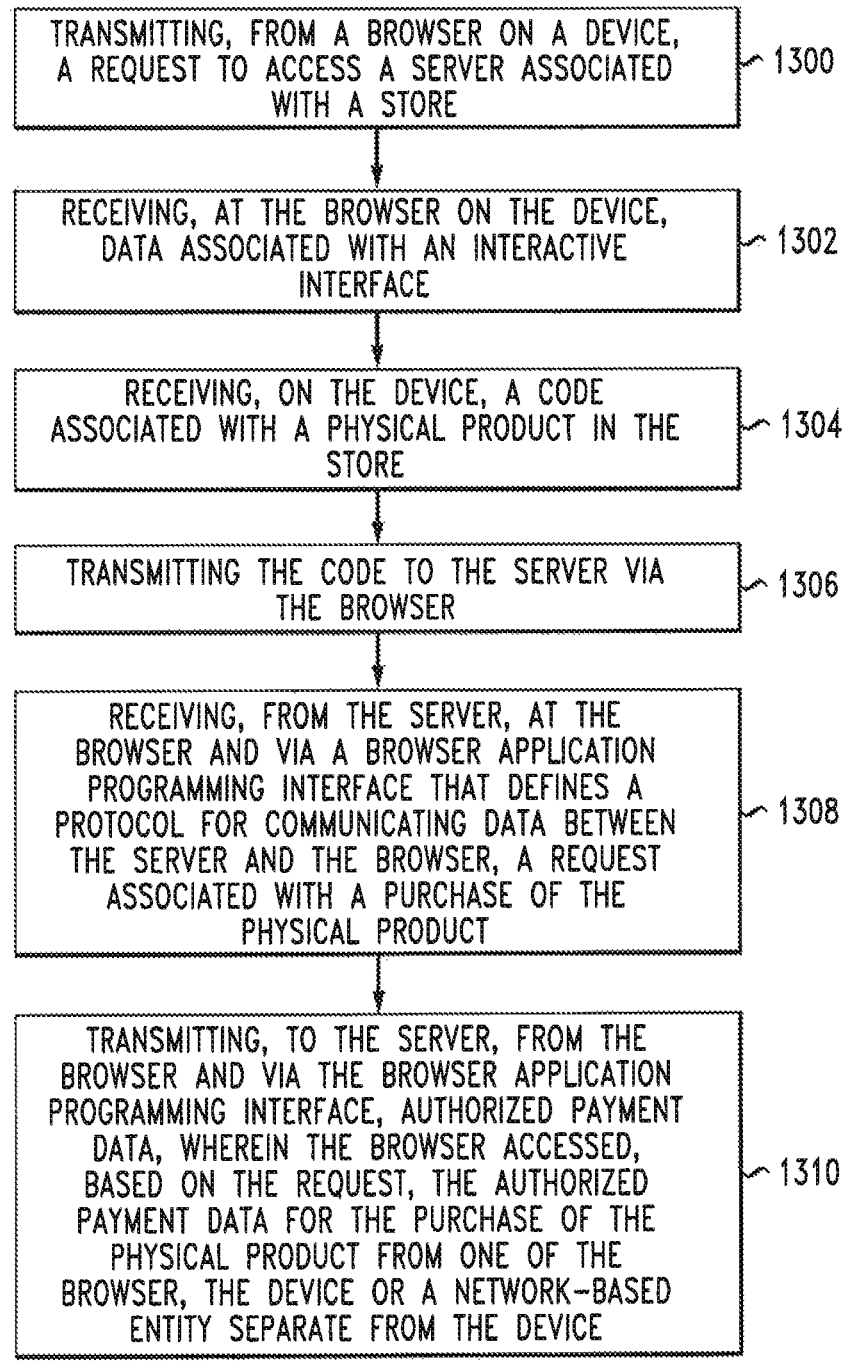

From the standpoint of the mobile device, a method is disclosed in FIG. 13 and includes receiving, via a browser, a URL input from the user, which would cause the browser to establish communication with a store server such as transmitting, from the browser on the device, a request to access a server associated with a store (1300). The mobile device receives instructions regarding how to manage an interface for the user, which includes the browser accessing a camera feature (or other module used to receive data about products in the store) on the device an interface for instructing the user to perform actions to scan a code/data associated with each product they desire to purchase. In other words, the method includes receiving, at the browser on the device, data associated with an interactive interface (1302). The device can receive the image of the code, data or receive the code manually or in some other manner associated with a physical product or object (1304). The code is transmitted via the communication link between the browser and the store server to the store server for processing (1306). When the user is ready to buy the product or a group of products in a shopping cart, the device or the browser on the device manages the payment process as disclosed herein, via a browser-based API between the browser on the mobile device and the store server or a more standard on-line payment process. For example, the method can include receiving, from the server, at the browser and via a browser application programming interface that defines a protocol for communicating data between the server and the browser, a request associated with a purchase of the physical product (1308) and transmitting, to the server, from the browser and via the browser application programming interface, authorized payment data, wherein the browser retrieved or accessed, based on the request, the authorized payment data for the purchase of the physical product from one of the browser, the device or a network-based entity separate from the device (1310).

Codes/data could be retrieved by the mobile device in other ways beyond an image scan as well. For example, a small disposable component could be configured on each product that includes a battery or particular structure and which can, through near field communication protocols, or other wireless protocols, transmit the basic data about the product, which would be the equivalent of an image scan of a code. In this way, rather than needing to align a camera with a code image associated with the product, the user would only need to bring their mobile device in near proximity to the item and data associated with that item would be received. The interface would enable the user to confirm that they desire to purchase that product. The small disposable component with the product could include a small solar panel or be battery powered. As a user approached or grabs the item with the transmission component, the item could appear in an image on the phone to confirm that the right product is being chosen. Where items might be physically together on a shelf, and more than one might be of interest, the mobile device of the user could present both items and ask the user to pick which one they want. Various disambiguation interactions could be implemented to confirm the item the user wants to buy. The component could store an image of the item or it could include data which would cause the browser on the user device to communicate with the server to access an image of the potential item. In this manner, the selection process is simplified where the user does not have to align the mobile camera to scan a code. The electrical component can also be used to detect the product or group of products that the user is taking out of the store for fraud detection. The server can receive through a sensor near an exit the items the user has and compare that to the items in the user's virtual shopping cart for confirmation of a match.

In another aspect, using a transmission component on each item can enable the user to just grab items and place them in a bag. The system could determine potentially by movement detection or by a location based approach that 5 items are being carried around the store in a bag and that are close to a particular mobile device or where all the products/tags and the mobile device are moving together in a pattern that links them products to the mobile device. The system can then simply add that item or group of items to a virtual shopping cart communicated to the site via the browser for a single payment as the user leaves. For example, as the user leaves the store or mall, all the items identified in their bag can be communicated to the server via their browser and the system may notify the user to pay through an audio, video, or haptic reminder. Then all the items can be listed that they have and they can pay using the browser API. Machine learning approaches can be used to identify moving electrical components on items that indicate that they have been picked up by a user for purchase. A good credit store rating can be included in a determination of whether to insure that the user pays before leaving the store or not.

The mobile device can be configured such that, separate from its browser software, the device can operate a module or component that will identify such products or tags that might be picked up in a store and brought home so as to confirm a link between the product and the mobile device. A product identification and confirmation module can communicate such data via an API or a standardized protocol to any browser. Thus, whether the user likes to use Chrome or Safari or Microsoft edge, each browser can utilize standardized protocols for communicating with a product identification and confirmation module whether the mobile device has associated products that the user has likely picked up in the store, placed in a bag, and walked away. In one aspect, the user could simply go to a store, pick out an item like a lamp, and walk out. The mobile device, using its product identification and confirmation module, would detect a tag associated with the lamp that moves physically in a way relative to the movement of the mobile device of the buyer, to confirm that the user has taken the lamp home or to their car. The mobile device could present an interface to user asking which browser they would like to use to contact the store server and finalize a payment. For example, the interface might ask whether to launch chrome to use Google Pay or PayPal, or to launch Safari to use Apple pay. Thus, a user interaction to disambiguate which browser is desired can be initiated. Of course default settings can be utilized as well as historical experience to drive a selection of which browser to initiate, populate with the store URL, and transmit data regarding linked products to the mobile device such that the user can then easily process a payment through the browser APIs or other pay process disclosed herein.

In one aspect, the system can operate as follows. Each product has a component that includes a small battery, a computer chip with data, an RFID tag or small transmitted for NFC communications. The product can also have a certain packaging that the user can just take a picture of. The mobile device of the user receives the signals from the components of the various products in the store. The system determines what the user wants to purchase by virtue of the phone identifying within itself or to the server that a group of 5 signals from 5 different products has consistently been received as the phone moves around and is moving towards an exit. The location based system from a cellular or WiFi system can identify the location of the mobile device. Products that the user has picked up and carries with them will remain registered or in communication distance with their mobile device. Then the system can determine with a level of confidence, via a module which can include machine learning training on such movements that indicate a user purchasing merchandize, what items they want to purchase, communicate that data to the store server, and enable a browser based API payment for all those items by virtue of the store server, generating a payment request to the browser, which can identify the product, the costs, taxes, or any other data needed to process the purchase.

This is a good fraud prevention approach as well because all the items will have the embedded component and all the items the customer walks away with will register with the system and be purchased. The electrical component could also communicate with a WiFi system, cellular system, or any other wireless system to identify movement, location, and so forth. The user's mobile device can send data about components it is detecting to the server via the browser for evaluation and any communication between the detection components of the mobile device (to detect the wireless signal from the product electrical component), the browser and thus the server over the Internet are considered within the scope of this disclosure. The component could be hidden in wrapping, packaging or a container of a produce, or glued on and can be made or hidden such that the user can't see it or remove the component.

RFID tags could be used on products which would be used by the device to launch a browser and/or navigate to a URL of a server. Passive tags can collect energy from radio waves or a solar panel. Batteries can be used with an expected life cycle. Components can be passive, active, battery-assistant passive depending on their structure and need. Components can be read only with the data that the mobile device just reads, or can be read/write. A script can be generated which can be received and run by a mobile device to launch the browser and navigate to a URL. Different devices may have different protocols and the system may send one overall script from which a particular device can extract its syntax for performing the function. In another aspect, a common syntax can be developed by a standards body for providing such instruction. A mobile device can receive a package of data from the component and extract out the instructions in the syntax that device can understand and implement. An RFID tag or other component can also be positioned at the entrance of a store to initiate a browser to navigate to the stores associated Web server, such that the mobile device can receive the interface on the browser for accessing such device components, as a camera, or communication module, for communicating data received by such components to the browser, and from the browser to the server, for purchasing products. This process can also apply to any part in a supply chain where the part is not being purchased but being processed through a supply chain and data is to be transmitted back to a server associated with that part.

Part of this disclosure includes the process of obtaining data for a component related to what data package is needed to launch a browser of a mobile device, populate the URL input field, and hit "enter" behind the scenes (not manually by the user) to initiate the communication with the corresponding server, find product ID data, and to attach the respective programmed component to the appropriate product for display in a store. The component can include fixed or programmable logic and can collect power from a reader (mobile device having a reader module). In one aspect, the mobile device transmits a radio signal to the product component which receives the message and responds with an ID number, product data, instruction package for launching a browser, etc. The mobile devices can be configured to be a passive reader, an active reader of a passive tag, or an active reader of an active tag. Any of the configurations are contemplated as workable in this overall process of shopping for products.

In another aspect, the system can manage and enhance the user experience using their mobile device as they walk around a store. For example, by knowing a specific location of each product, or through location-based services, the interface provided by the store server can include advertisements, suggestions, or directions to other products in the store. For example, if a user scans a code for a shirt, the system can instruct the user that on the next aisle over, on the second shelf, is a pair of pants that would match well with that shirt. A map could be presented on the interface guiding the user to the pants. The advertisements could also be for a product or item in a different store which is nearby, or a different store in a group of stores, such as a mall, of to be purchased on line as an accessory. Accessorizing an in-store purchase becomes very easy in this scenario by blending instore and on-line shipping. Instructions to go to a specific location, accessorizing suggestions, additional online purchasing options, and so forth can also be provided. For example, the person may be buying a pair of pants and a shirt, but the ideal necklace or earrings or watch might not be at that particular store. The store server could present an image of a product that could be associated with what the user is physically buying and put that product as well in their shopping cart for home delivery. Virtual reality could be built into the experience such that as the user tries on a shirt or dress in the store, their selfie camera could be coordinated with the browser such that an image of a neckless or earrings could be provided, which they could buy online at the same time as the other cloths. Thus, the shopping cart in this scenario could span physical items the user is carrying as well as online purchased items as part of the same "shopping cart." Machine learning algorithms can be implemented and trained for providing such suggestions. Inventory supplies can also be accessed to determine whether such products should be offered.

In yet another example, disclosed herein is the concept of providing body model data via a browser-based API to a server. The approach can also be utilized in this scenario, where a user walks into a store with their mobile device to make purchases. For example, as the user accesses the URL of the store server, the browser can manage the communication between the mobile device and the store server, and pass along body model information to the store server. In this scenario, the store server can utilize data regarding the location of various sizes of clothing, for example, and literally guide the user right to clothes that will fit them according to the body model received. For example, the interface for the user may indicate or provide a map of the store with highlighted points, which indicate the sizes matching the user. Inventory can be also correlated such that if the user's size is not available at that time, the interface can enable the user to see clothing styles in the store but order online for their personal size. Often, individuals are looking through a stack of pants, or a series of shirts, of a style that they desire to purchase, but their particular size is out of stock. Using these principles, the system will know as the user enters the store that certain pants are out of stock and the server can present an image to the user on their mobile device, indicating that this is the proper size for the user and the one that the user is holding (which the server can gain knowledge of by virtue of near field communication or the user scanning a code) is the wrong size. However, the user in this scenario can see the product and can then purchase the product online for the right size.

In this scenario, the user could walk into a clothing store, and see and touch clothing that they may desire to buy, and if the user scans a code of a piece of clothing, the system can also identify the size and the configuration of the clothing scanned and instruct the user regarding how well such clothing will fit with their body model. Perhaps a different size in the store will fit better. If there is inventory available, the store server can instruct the user that they should pick a different size, and instruct them that there should be one in stock on the shelf. If not, the store server can communicate with the browser of the mobile device that the pants they've chosen is not the best fit for them and they can order right now online the better fitting pants which will be delivered to their house in two days. This all becomes possible with the communication of the body model to the store server. This process can also of course be available for body models of friends or family members of the individual, wherein a dialogue or graphical interface can be presented to enable the user was walk into a store to pick a body model to transmit to the store server to help them purchase clothing for their friend or family member. All of the description above applies where, for example, the user passes a friend's body model to the store server, the store server can respond with instructions regarding clothing within the store that fits that body model, online offerings of clothing that will fit better than physical products currently at the store, and so forth. Audible instructions can also be provided to guide the user to products that would fit appropriately. Similar concepts can also apply for color selections, product selections, volume selections, food selections, and so forth outside of the clothing scenario. Signals can also be incorporated into the guiding process. In the food scenario, the user could select a recipe that they desire to make and then enter a grocery store. In this scenario, the recipe could be transmitted to the grocery store server and through the browser acting as an agent, the grocery store server can direct the user to not only purchase the proper ingredients for the recipe but the proper sizes or number of items to make the recipe for a specified number of individuals. Thus, the general concept described above involves the user accessing a store server via a browser or app, and being guided regarding the purchasing of products within the store, via the interface, or via a spoken interface, and then being able to purchase the products using the browser API payment process disclosed herein without the need of going through a traditional physical check out process.

Additionally, data regarding current food supplies at a user's home can be fed to a server. For example, a smart home system can be implemented which provides data regarding food storage that a person's home. For example, the system may identify that the user is low on milk, eggs, cheese and cereal. This data can be provided to a browser or a network-based service. For example, while the user is at home with their mobile device, a system can periodically update their browser to contain grocery stock information for their home. This can be done through Wi-Fi, near field communication, or Bluetooth. The browser can be configured to be able to access the communication components of a mobile device and manage a process of retrieving updates of information which can then be used by store servers as a user physically goes to a respective store. Any kind of data is contemplated as being part of this process. Then, as the user goes to a grocery store and accesses the grocery store server for making purchases as described above via their mobile device, the browser could pass a data package identifying their grocery stock information for their home. The system could then instruct the user or suggest to the user certain products, where they are, and/or amounts to enable the user to not forget or easily restock their grocery supplies as needed.

To protect from fraud, video cameras, location-based ID, and correlations of purchases and inventory could identify where mismatches exists and potentially identify shoplifters from that data. Instructions could be provided to people of risk to require them to have a clerk confirm their purchases. Users can generate or earn confidence scores as they shop in these scenarios. If a user is suspected of shoplifting, and the system requires a confirmation of their product purchases, they can increase a confidence score or repair a confidence score through honest purchasing. Such information can be presented to the user as part of the interface such that they know to be honest in their purchasing decisions and activities. For example, a confidence score can be presented to them, such as 9/10 or 5/10, with instructions to note that a clean purchasing experience confirmed by a clerk or scale, or otherwise can cause the confidence score to increase to 10/10. By granting a more efficient process to users with high confidence scores, the overall system can encourage honesty and reduce the amount of shoplifting. Further, shoppers experiences the different stores can be correlated in a confidence score that can span any store or stores that utilize a service.

Another aspect applies to utilizing an API to fill a cross-site shopping cart in a different way. It relates to how users can have product information transmitted through the API or other mechanism from a site to a browser or other location for storage, aggregation, presentation and payment/delivery processing. A site can have programming added to the site to monitor searching and navigation of the user on the site for a determination of what products to send to an API. For example, if a user spends 20 seconds looking at a toaster, reading reviews, looking at pictures, and so forth, the system can determine that there is enough interest to send the product data through an API for storage with the browser or elsewhere. The API, for example, can have a syntax like "sendproductdata (product, UPC, Size, Time, Color, Size, price, taxes, token, rating, other)." This and any other data can be transmitted through the API and stored for later use for making the purchase. A trigger for sending the data can be automatic or manual (such as the user clicking on an object to send the data). As the user navigates to the site, the site can send an API request to determine whether the API is available for product information. If so, the site can utilize the API to send the product data for products that the user searches for. If the user later purchases the product on the site, the product can be removed from the browser product storage. The data can include an evaluation of a likelihood of the user desiring to later purchase the product. All of this information is transmitted through the API to the storage location.

A user can then navigate to other sites as well and surf for products. As the threshold is met, multiple products can be transmitted to the browser for storage. Data associated with the products can be sent as well, such as a user likelihood of purchasing. As the user surfs the web, products will be gathered up and passed through the API and stored. The user can set parameters on the circumstances that will cause product data to be sent, such as viewing for more than 60 seconds, or all products reviewed 2 weeks before a family member's birthday, or all products above a price of $10, or at a certain stage in navigation such as the product is placed in a site shopping cart (and also should be transmitted to the browser shopping cart). The user can then browse for items across different sites, when they get to the point of making any purchase using the browser API interface, such as at site3.com, the system will or can include within the buy button interface, the items from the first site and the second site that they searched. An important point is that the interface here is the browser API interface and not necessary (although it can be) the normal payment interface. The interface can also include other options. For example, the user is at site3.com purchasing the item from that site, the payment interface can include a selectable option to "add other 2 items from browser shopping cart" or "add items searched for today" or "add items searched for this week". The user can then have those items added to the shopping cart and one click can manage the individual purchase and delivery of each item. Disambiguation of different delivery addresses, greetings, or any other data could be gathered at any stage of the searching or payment process. Drop down menus can be included such that when the user is in the purchasing mode, the various items can be gathered together for payment as an aggregated group. The shopping cart could also be viewed directly within the browser independent of any site. Comparisons, discounts, options for incentivizing purchases, can be provided in the aggregated group of items. The browser or other service manages all of the payments to individual sites. The syntax of the payment request API could be adjusted for accomplishing the functionality disclosed herein.

The benefit is that the browser API interface can be modified so that when the user makes a purchase on any site and the browser API is accessed for the purchase, that automatically or manually, the other items in the shopping cart can be added to the interface such that the user can purchase multiple products in one click or the series of clicks to get through the payment process. A threshold can be met for transfer. A site can provide a plus button, buy button or other object that dynamically is presented when a threshold is met that the user can click on to add to browser shopping cart. This can work for instore shopping as well, for products picked up but not purchased. Then the user can move on to the next item. The concept applies both from the standpoint of the site. For example, steps like monitoring, navigation, determining to transmit product data to browser shopping cart API, and receiving data about a purchase of the product on a browser API interface from another site, such that the site can process the purchase of the product can be performed by this site. Even though the user has never navigated to the product on the first site and indicated on the first site that he or she wants to make the purchase there, when the purchase is made at another site as part of a group of products shown on a payment interface, the browser can manage the notification back to the first site that the purchase has been made, and can transmit through the browser shopping cart API and/or the browser API data about the product, the payment account, a one use token, address delivery information, product identification, etc. A package of data can be transmitted to the first site with all of the data to enable the first site to identify the product previously searched and communicated to the browser, a payment token or other payment data, address information, and so forth, such that the site can process the payment and deliver the product. The site can also adjust based on whether the product browser API is available. For example, if it is available, buttons can be presented for adding the item being viewed to the shopping cart. The site can also include a messenger app, communication application, video application, and so forth. So in any context where a product is being presented, the site or application would offer the ability to transmit data to the product API for storage in the shopping cart of the user. Of course an in-store shopping experience can be integrated into the shopping cart API.

In yet another aspect, as the user navigates to the site, the site can access a user information API associated with the browser or a network-based service. The browser or any other service can store information like user hat size, shirt size, pant size, show size, color preferences, style preferences, purchase history, social media information such as friends and family information, sizes, preferences, and so forth. As the user begins searching or shopping in store, the site can receive such data via the API. Based on this data, the site can adjust its presentation to the user of the navigation object and interfaces. For example, the user might not need to be presented with the option to choose between a S, M or L shirt if the API informs the site that the user is a medium. Color or style preferences can be tailored for the user as they search the site or shop in-store. As soon as the user navigates to a respective site, the site can do a call to the browser asking for personalization parameters, and the browser can respond with the personal data for the user and/or other users that the site can use to tailor the browsing experience. The user could set parameters such as buttons on the site, menus, auto transmission of items, and so forth.

Indeed, as the user begins surfing or shopping in store, an interface can be presented to ask what the user is interested in. A natural language or text interface could receive data from the user such as "I'm shopping for my wife's birthday". With the system knowing the social media data for the user, including sizes of family/friends, the user could shop more efficiently for say a coat for his wife's birthday. Color and style choices associated with his wife could improve options presented. Size information can be preconfigured such that the user does not need to choose the size. Any parameter, social media data, size, preferences, style, purchase history, and so forth could be used to change the navigation features for a site as the user navigates. There will be no more need for size choices for shirts, pants, or shoes, etc. Such data can be transmitted through the API to the site for reconfiguring the site for that user's navigation. The site can receive other data about the user that can help in more effective presentation of products/services. If the site knows the user is shopping for a book for his mother that can certainly aid in a more focused presentation of products.

Further, the products searched for could be classified automatically or manually, such as birthday, or Christmas, or other holiday. Options for classification can be presented on the site based on social media data, product characteristics, or menu selections. Thus, a user could browse different sites or stores and have three items classified as mother's birthday items and two items as their own purchases. When the user is buying an item with the browser API interface, the option could be to add mother's birthday items, add personal items, or add all items for purchase. Items could be grouped as toys, or kitchen items, or bathroom items, or office materials. Any number of ways can be provided to add a group of classified items into the shopping cart. All the items in the cart can be groups or organized based on manual or automatic means. Thus, the items that a user wants to purchase together could be more streamlined. The items can further include rental payments, tasks or other items of different types all gathered in the same cart.

At any point, a disambiguation dialog can help to focus the information from the user for improving the navigation. For example, as the user navigates to a site or is in a store or interacting with an object, the system may ask "are you shopping for you or for your Wife's birthday?" With some data about what the shopping is for, the system can transmit the personalized information, address information, etc. to the website via an API so that the site can modify the experience for the user. For example, rather than size buttons like "S", "M" or "L", the system can present, "Mary", "Mom", "Nancy", "Tim". The user just needs to pick the size for her brother Tim. A drop down menu could include the various people the user is shopping for so the user just picks the person. All of the names, sizes, preferences, and so forth can be sent for one or more people to the site for processing. If the system knows that Tim loves red shirts the system could also suggest to the buyer that the blue shirt might not be the best choice.

Triggering events for when a site transmits product data through the API can be time spent on a product, reviews read, placing item in shopping cart, reviewing product, a combination of these kinds of navigation data coupled with data transmitted to the site such as other items in shopping cart, summarized information about the user, size of user, color preferences, etc. A discount can be provided to the user if they authorize the personalized data to be sent. From the site standpoint, the site receives user navigation, receives personalized data for the user via an API such as size information, style preferences, purchasing history, social media data, holiday data, and so forth, such that the site presents interfaces and selectable options based on the received data. Those preferences can also drive the algorithm that determines when to pass product data to the API for placing in their universal shopping cart. A trigger algorithm can be adjusted based on the data transmitted to the site, such as a 30 second time frame for a product can be reduced to 20 seconds based on a birthday coming up.

The size information for people in a social network can be passed as well based on social media data. For example, a friend's size information can be passed if the friend has a birthday coming up. The system can also tokenize that size information such that the user can choose the friend's size for clothing, but they don't know what their size is. A user can share data in a tokenized or secure manner from browser storage.

Figure 14:
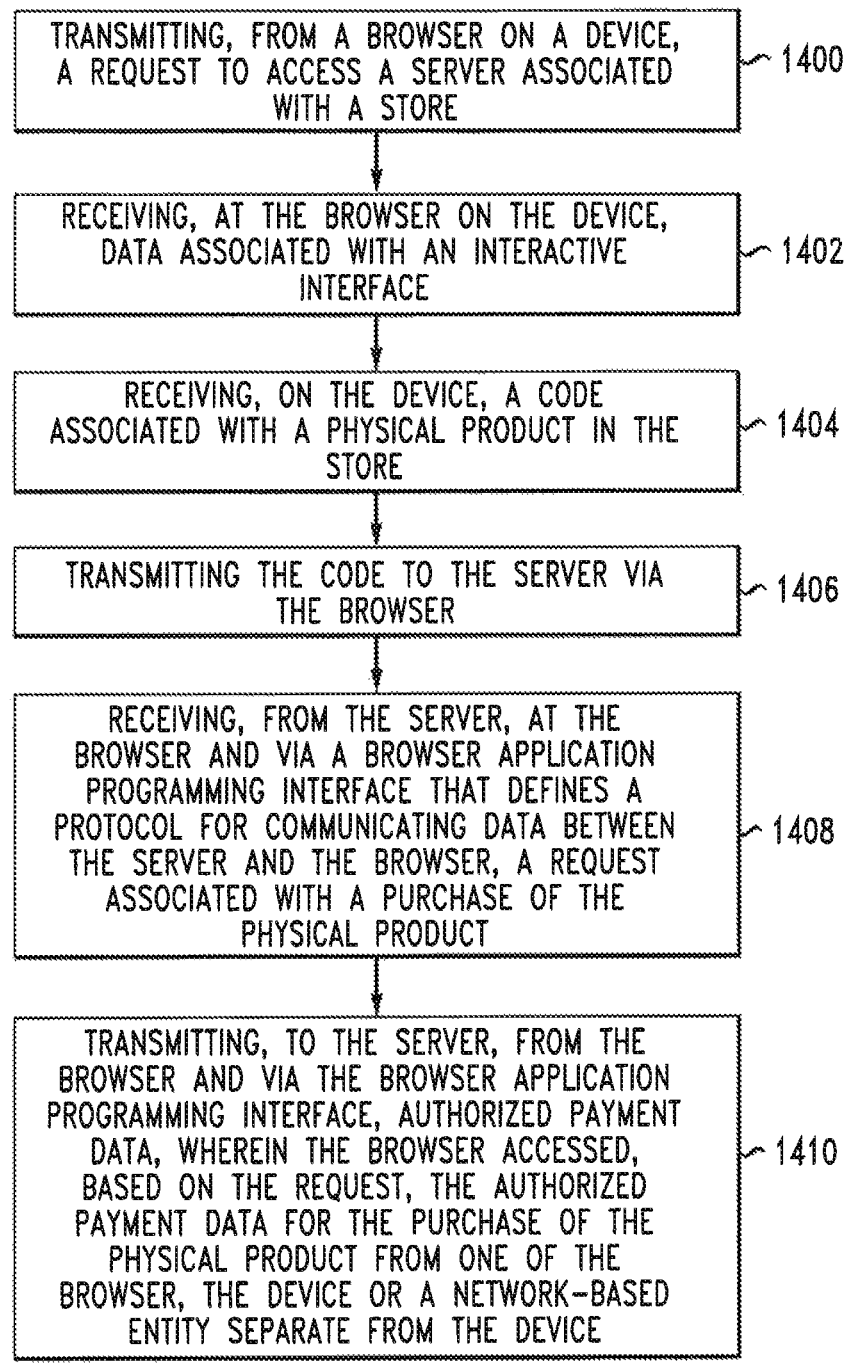

FIG. 14 illustrates an example method embodiment. One aspect of this disclosure applies to multi-site/store/object universal shopping carts and particularly presents a solution that is applicable using a modified version of the browser payment request application programming interface implemented by W3C. Users can access multiple sites across different devices, using different modalities and in different locations. Users can access items via objects, or in-store experiences. In one aspect, a method, system or computer readable storage device operates from the standpoint of the browser. The method includes receiving, via a browser shopping cart application programming interface associated with a browser, first data associated with a first product viewed by a user navigating on a first site or shopping at a first store (or interacting with a first object) using the browser, wherein the user did not purchase the product on the first site (1400). The first data is stored such that it is accessible to the browser or a network service such as a search entity. This storage can be with the browser, on a user device, or on a network device hosted by a search entity or other payment entity. The method includes presenting a browser payment interface (or task interface depending on the task) to the user for managing the purchase of the second product, the browser payment interface being associated with a browser application programming interface in which payment data (or data associated with the task) for the user is passed from the browser to the second site or store through the browser application programming interface (1402). As part of the browser API, an interface is presented to the user that they can interact with to achieve the payment. This interface is augmented with additional shopping cart items to enable multiple items to be purchased with "one-click." (The interface usually requires a few clicks but many less than a normal payment process in which multiple fields have to be filled in manually by the user). The method further includes presenting on the browser payment interface information about the first product and processing a payment of both the first product and the second product based on user interaction with the browser payment interface (1404). The processing of the payment of both the first product and the second product can occur using first communication between the browser and the first site via the browser application programming interface and second communication between the browser and the second site via the browser application programming interface. The difference is that the second site is already communicating with the browser for the payment process of the second product. The user, however, has navigated away from the first site, so a communication back to the first site must identify the product as well as providing payment and/or delivery data to the first site for "reminding" the first site of the previously searched-for product. Processing the payment of both the first product and the second product further can include transmitting, through the browser application programming interface, a package of data which enables the first site to process the first purchase of the first product.

The package of data can include payment data for the first site to process the payment for the first product and address information associated with the user for the first site to deliver the product. The method can also include receiving a confirmation from the user of the purchase of both the first product and the second product utilizing a same set of object interactions used for purchasing one product via the browser payment interface (1406). In other words, since the user is already in the browser interface for processing the payment for the second product, the method can include utilizing the same "one-click" plus perhaps one fingerprint recognition, facial recognition, or CVC code entry, or whatever few steps are utilized for the purchase of the second product, to also process the payment for the first product. As noted, the universal shopping cart may be separate from the browser API and completely managed by a network entity or search entity as well. There may also be coordination between the API and a network entity for managing the cart and the purchases. In-store purchases, browsing, object based tasks, rentals, etc., can also be applied.

Processing the payment for the first product and for the second can include communicating first information via the browser application programming interface to the first site or store for completing the purchase and delivery of the first product from the first site or store and communicating second information via the browser application programming interface to the second site or store for completing the purchase and delivery of the second product from the second site. Receiving the first data associated with a first product viewed by a user navigating on a first site using the browser further can include receiving the first data based on a threshold user interaction associated with the first product. For example, the user may need to put the first product in a shopping cart, or click on a button, or view the product for a period of time to indicate that there might be a purchasing interest. In another aspect, a search entity can store payment credential and address and/or other information for the purchase and manage a payment process for the universal shopping cart.

Figure 15:
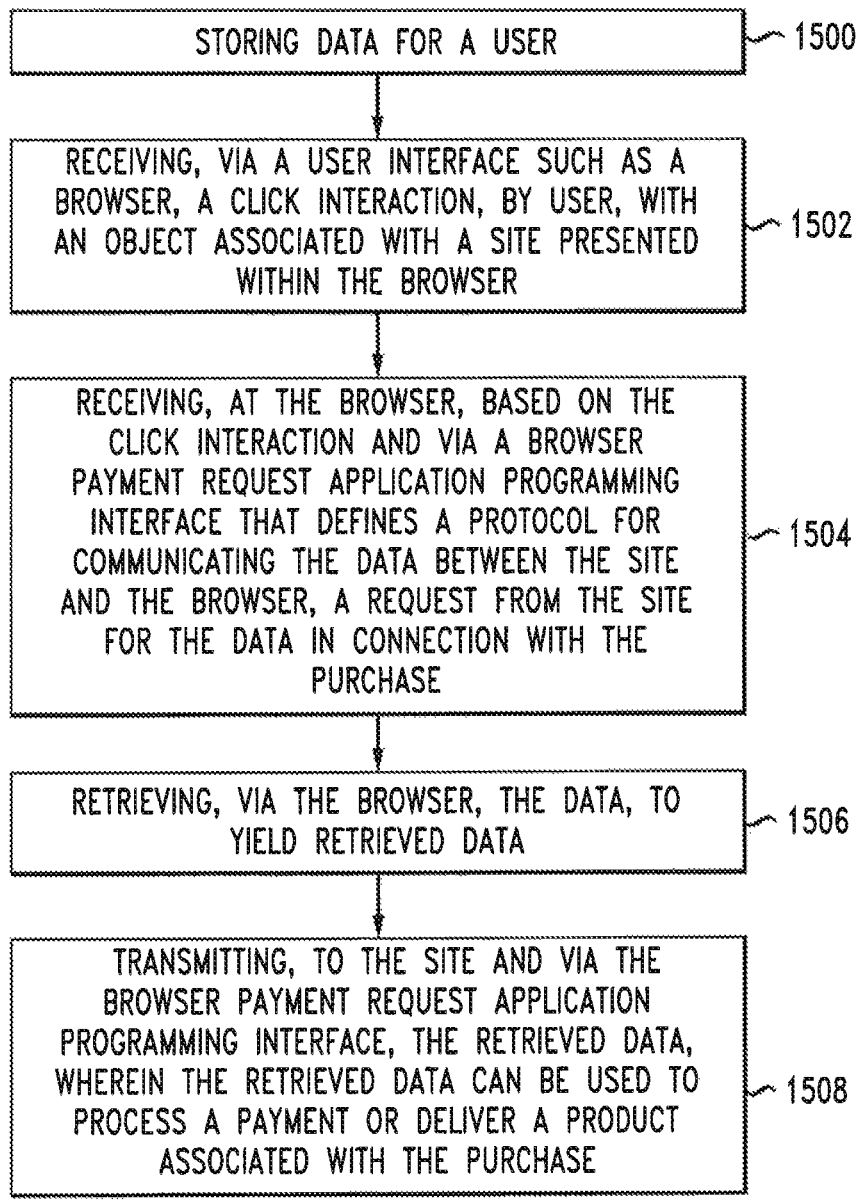

FIG. 15 illustrates a method example related to the browser API(s) shown in FIG. 9. The method can be performed by a browser and include steps of storing, in a non-transitory storage medium of a user client device, payment or task data for a user (1500). In one aspect, the payment or task data can include any one or more of address information, payment account information, a date of expiration, a CVC code, a token or code which can be used or encrypted for providing a payment token for use by a merchant, user delivery preferences, user size information for clothing, and so forth. Any data related to processing a purchase or performing a task can be included in payment or task data. The payment data is typically not associated with any specific site but can be used across multiple sites. Any security mechanism can be implemented to ensure safe communication of payment data or modified payment data to the site 1816 for processing a purchase. User size or body shape information could also be tokenized when communicated through the browser API. When the purchase occurs via the application programming interface between a social networking site and the merchant site, the social networking site can transmit payment data through the application programming interface such that the merchant site can process the purchase of the product.

The method can include receiving, via a user interface such as a browser, a click interaction, by user, with an object associated with a site presented within the browser (1502), the click interaction indicating a user intent to make a purchase and receiving, at the browser, based on the click interaction and via a browser application programming interface that defines a protocol for communicating the payment data between the site and the browser, a request from the site for the payment data in connection with the purchase (1504), retrieving, via the browser, the payment or task data (or a version of the payment data that is tokenized or encrypted for security), to yield retrieved payment or task data (1506) and transmitting, to the site and via the browser payment request application programming interface, the retrieved payment or task data, wherein the retrieved payment data can be used to process a payment, perform a task or deliver a product associated with the purchase (1508). In one aspect, the browser can also interact with another server 1810 which can also process payment data 1814 such as generating a token that is passed back to the browser 1806 for communication to the merchant site 1816. In another aspect, the payment data 1808 can be stored with the browser in whole or in part and other data can be accessed via a network server 1814 in whole or in part to generate payment data or payment information that is communicated to the merchant 1816 for processing a payment. In this example, payment or task data could also include any other kind of data such as user size or body shape information, registration data, or any other data that is exchanged via the browser API. The payment data can be confirmation data that a payment service completed the payment.

Figure 16:
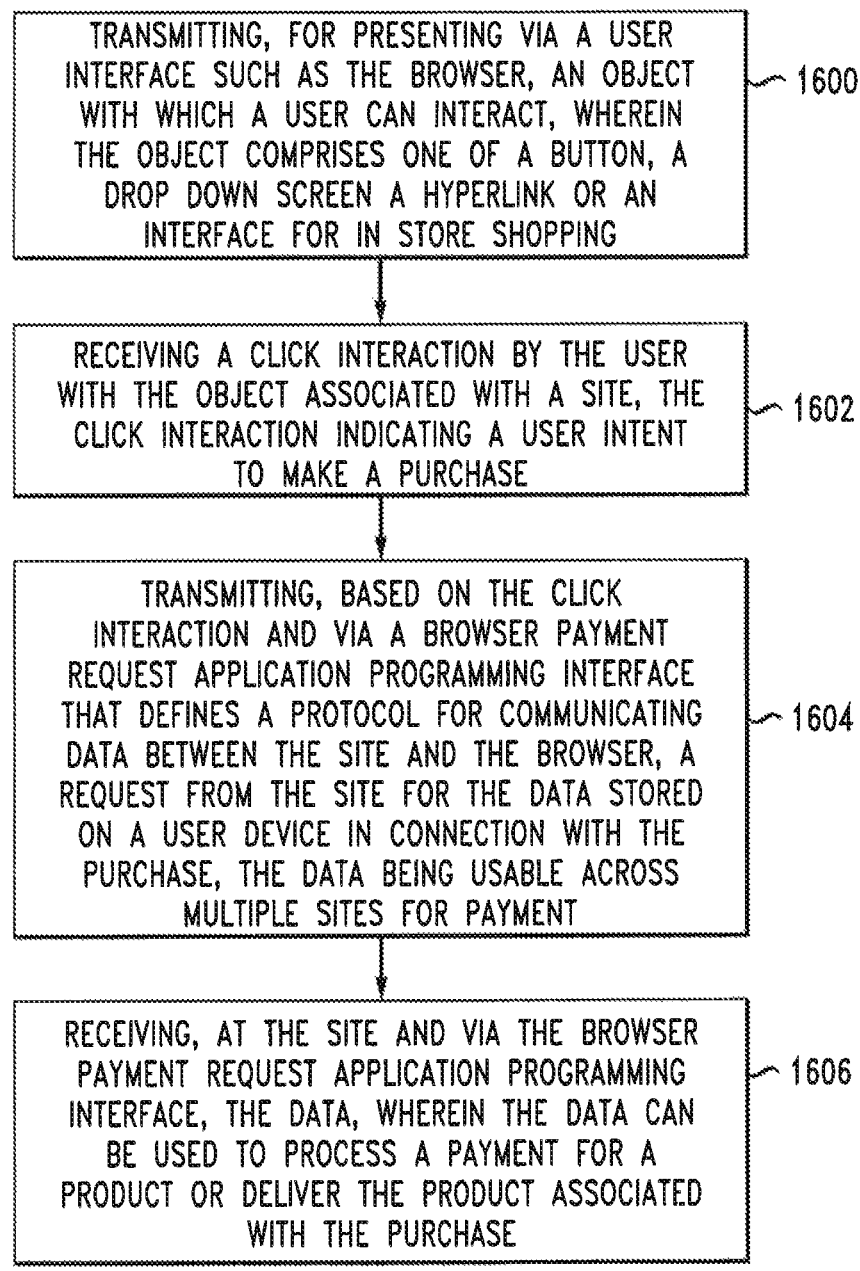

FIG. 16 illustrates a process from the standpoint of the merchant site. In this case, the method can include transmitting, for presenting via a user interface such as the browser 1806, an object 1908 with which a user can interact, wherein the object includes one of a button, a drop down screen or a hyperlink (1602), receiving a click or other interaction by the user with the object associated with a site, the click or other interaction indicating a user intent to make a purchase or perform some other task (1604), transmitting, based on the click interaction and via a browser application programming interface that defines a protocol for communicating payment data between the site and the browser, a request from the site for the payment or task data stored on a user device 1804 in connection with the purchase, the payment or task data being usable across multiple sites for payment (1606) and receiving, at the site and via the browser application programming interface 1818, the payment or task data 1808 (or secure data such as a token based on the payment data), wherein the payment or task data can be used to process a payment for a product, perform the task or deliver the product associated with the purchase (1608). The merchant 1816 can submit the payment data or information received to a payment processor for processing the purchase. A payment service can also manage the payment.

The browser API has a number of characteristics that can distinguish it from APIs between the site and a payment server, such as a PayPal scenario, and from general hypertext markup language (HTML) protocols. HTML is a markup language that web browsers use to interpret and compose text, images, and other material into visual or audible web pages. Web browsers will receive HTML documents from a Web server or from local storage and then render those webpages. HTML generally describes the structure of such webpages semantically and describes using his protocols. The instructions for the appearance of documents on the browser. Cascading style sheets and JavaScript can also be part of HTML. Default characteristics for every item of HTML markup are defined in the browser, and these characteristics can be altered or enhanced by the web page designer's additional use of CSS. In contrast, an application programming interface represents a set of subroutine definitions, tools, and protocols which outline a set of clearly defined structures for communication between various software components. It is an established API for communicating between a site, such as a merchant site, and the browser. As such, the browser must be programmed with the routines, data structures, object classes, variables and/or remote calls to enable a respective site which desires to utilize the API to be able to make payment request calls and receive the appropriate data via the API for processing payments. The browser API is not an HTML interface, nor is it an API that is designed for communication between the site and directly with a network-based payment server or payment service. Disclosed herein is a process in which the browser can act as an agent and manage through other APIs between the browser and network-based payment services, the process of making a payment or providing payment data, such as tokenized data, or confirmation data, to a merchant site. However, in that scenario, the site does not need to make separate API calls to a network-based server because the browser is established as the agent to manage the process, thus simplifying the communication for the site such that only calls through the browser API need to be made for authentication, authorization, network-based processes, to occur. Thus, the API, which can be a set of HTTP request messages, along with a definition of the structure of request messages and response messages, which can be established in an XML or JavaScript object notation format, is built into the browser enabling the browser to act as an agent for providing authorized payment data, password data, login data, tokenized payment data, or to manage as an agent network-based payment processing or logging in processing, all through payment request or other calls made from the site through the browser API. The browser API manages the flow of data between the browser and the site and enables the browser to separately reach out for authentication, data, tokens, or other network based services. The API provides a consistent experience across payment methods, systems, platforms and merchants. Typical web based APIs have defined interfaces between the site and a web service and a novel concept disclosed herein is the new API that defines the architecture and programmable interface, data structures, and so forth, which are built into a browser, and which a programmed site can access, such that the browser can receive payment requests, retrieve authorized payment data, respond to the request, whether the process be a payment process or a login process, such that payment or login processes can be simplified and unified across sites.

Using Two APIs To Manage a Payment Process

Figure 17:
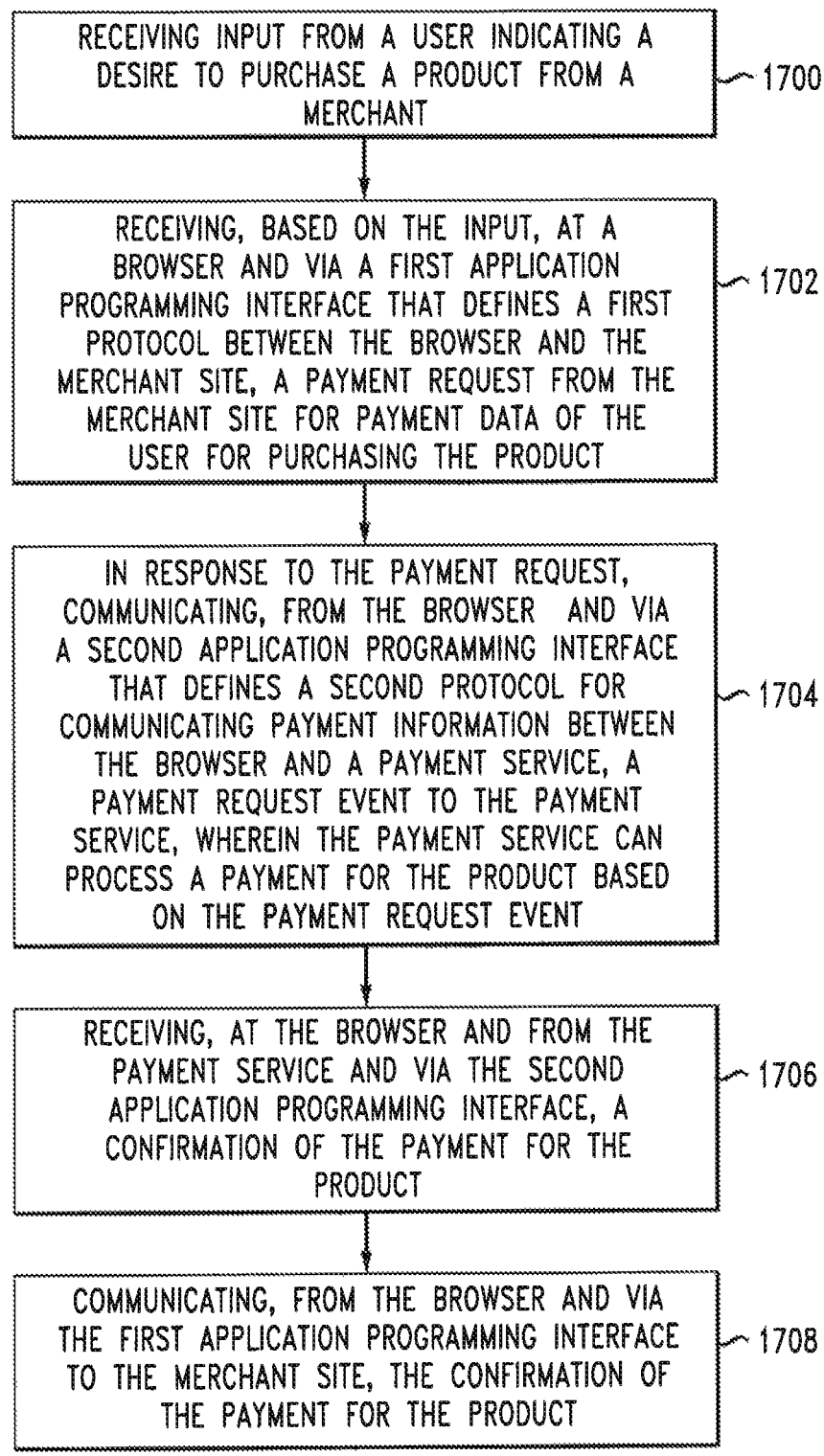

Another aspect disclosed herein relates to the coordination between a first API 1818 and a second API 1812, both of which interface with a browser 1806 in a correlated way to manage a payment process. The approach enables purchasing on a site 1816 to be more like an Amazon.com "one-click" purchasing experience when the user is not registered and does not have an account at the site 1816. In some cases, a user can have a Paypal account but they still must login to that account to make a payment. The coordination of the APIs 1812, 1818 and the browser 1806 acting as an agent between the site 1816 and the payment provider 1810 can simplify the purchasing process. A method in this regard is shown in FIG. 17 and includes receiving input from a user indicating a desire to purchase a product from a merchant site 1816 (1700). The input can be a click, voice input as part of a dialog, virtual reality input, or any kind of input. The method includes receiving, based on the input, at a browser 1806 and via a first application programming interface 1818 that defines a first protocol between the browser 1806 and the merchant site 1816, a payment request from the merchant site for payment data of the user for purchasing the product (1702).

In response to the payment request, the method includes communicating, from the browser 1806 and via a second application programming interface 1812 that defines a second protocol for communicating payment information between the browser 1806 and a payment service 1810, a payment request event to the payment service 1810, wherein the payment service 1810 can process a payment for the product based on the payment request event (1704). The method includes receiving, at the browser 1806 and from the payment service 1810 and via the second application programming interface 1812, a confirmation of the payment for the product (1706) and communicating, from the browser 1806 and via the first application programming interface 1818 to the merchant site 1816, the confirmation of the payment for the product (1708). The payment service 1810 can be a service like Paypal, a Google payment service or any other payment service or payment processor. The approach enables a common interface between the merchant 1816 and a payment service 1810 utilizing the browser 1806 and several APIs 1812, 1818 in a new manner to simplify the purchasing process for users that are signed up for such a service or utilize such as service.

The first application programming interface 1818 can define the first protocol for communicating at least one of payment data and address data between the browser 1806 and the merchant site 1816. The second application programming interface 1812 can include the second protocol for communicating data associated with payment of the product between the browser 1806 and the payment service 1810. The payment request further can include a request for an address of the user and/or for other data associated with the user or associated with the purchase. Thus, the payment could be performed by the payment service provider 1810 and the address could be provided by the browser through the first API 1818.

The method can further include, based on the payment request, transmitting from the browser 1806 and through the first application programming interface 1818, the address of the user 1808 to the merchant site 1816 for use in delivering the product to the user. The first application programming interface 1818 can include a browser application programming interface in that it involves a request from the merchant site 1816 for payment data and/or other data associated with the user. The second application programming interface 1812 can be called a payment handler application programming interface in that it more specifically involves payment handling by the payment processor 1810. This aspect of the disclosure can also have embodiments from the standpoint of the merchant as well as from the standpoint of the payment processor or from the device or browser stand point.

Figure 18:
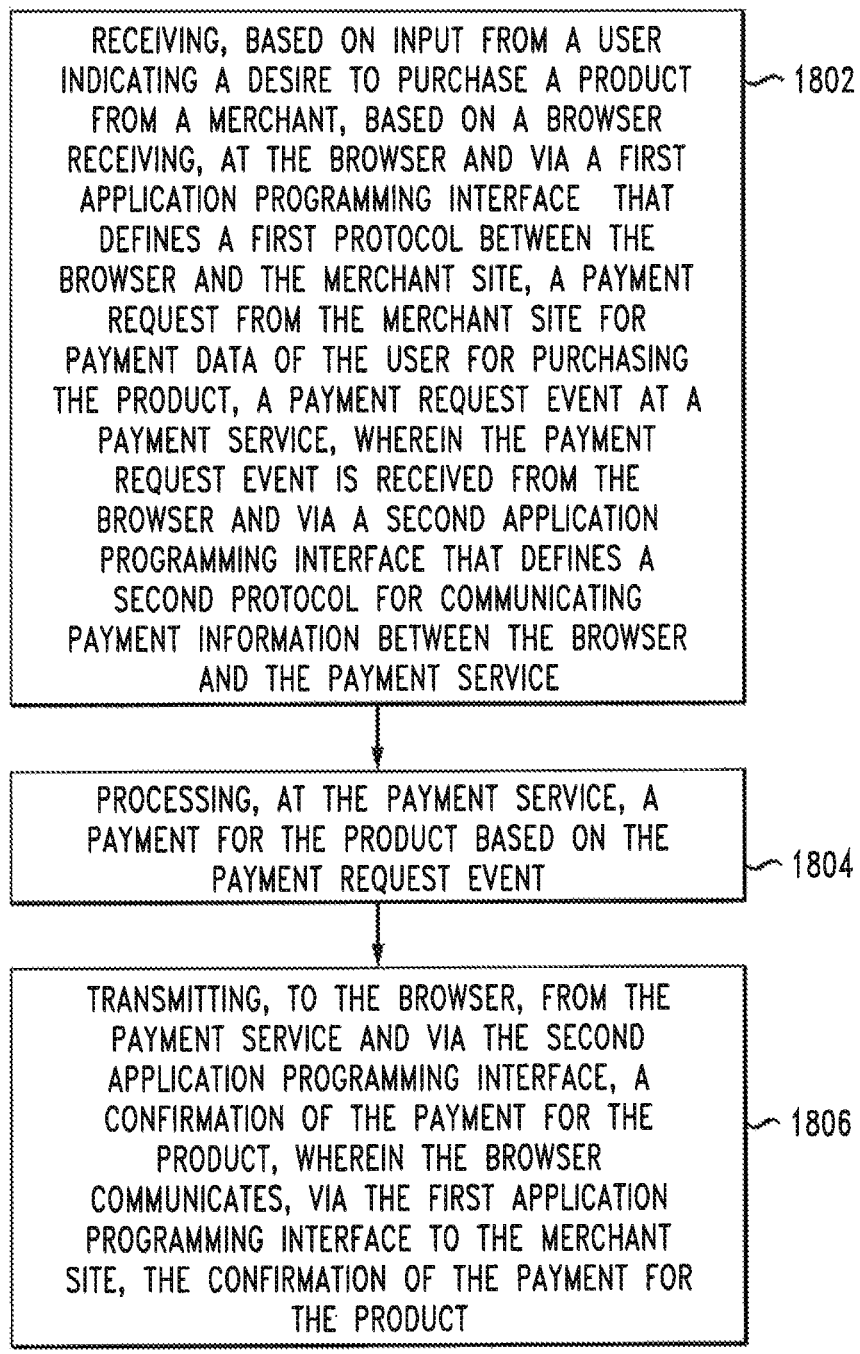

FIG. 18 illustrates this aspect of the disclosure from the standpoint of the payment processor 1810. A method includes receiving, based on input from a user indicating a desire to purchase a product from a merchant site 1816 or a store and based on a browser 1806 receiving, at the browser 1806 and via a first application programming interface 1818 that defines a first protocol between the browser 1806 and the merchant site 1816, a payment request from the merchant site 1816 for payment data 1808 of the user for purchasing the product, a payment request event at a payment service 1810, wherein the payment request event is received from the browser 1806 and via a second application programming interface 1812 that defines a second protocol for communicating payment information between the browser 1806 and the payment service 1810 (1802), processing, at the payment service 1810, a payment for the product based on the payment request event (1804) and transmitting, to the browser 1806, from the payment service 1810 and via the second application programming interface 1812, a confirmation of the payment for the product, wherein the browser 1806 communicates, via the first application programming interface 1818 to the merchant site 1816, the data or the confirmation of the payment for the product (1806). In this approach, the merchant is not using their own payment processor 1820 as would occur if the merchant 1816 were receiving payment account data or a token for processing the purchase. Since the purchase is being performed by the payment service 1810, the merchant 1816 needs that confirmation that the purchase is complete. The payment service can utilize stored payment data 1814 and/or an account of the user. Thus, payment services like Stripe, Google.com, BrainTree, Amazon.com, Paypal, etc. can be represented by payment services 1810. Because the user can be logged into their browser, or a Google account (email, youtube, etc.), the user's credentials can be utilized to login to any specific account that is used for payment without the user manually entering in their account data.

While the use of two APIs is described with respect to a payment process, the use of multiple APIs with the browser or other software module acting as an agent can also apply to other tasks. Coordination between the site, a browser or software module on a user device, and a separate server might need to be coordinated to perform tasks such as confirming an identity of the user, receiving a payment and opening a gate, releasing medical information, making a crypto currency payment, and so forth. Task related data can be communicated along the same rails described above for payment data.

Figure 19:
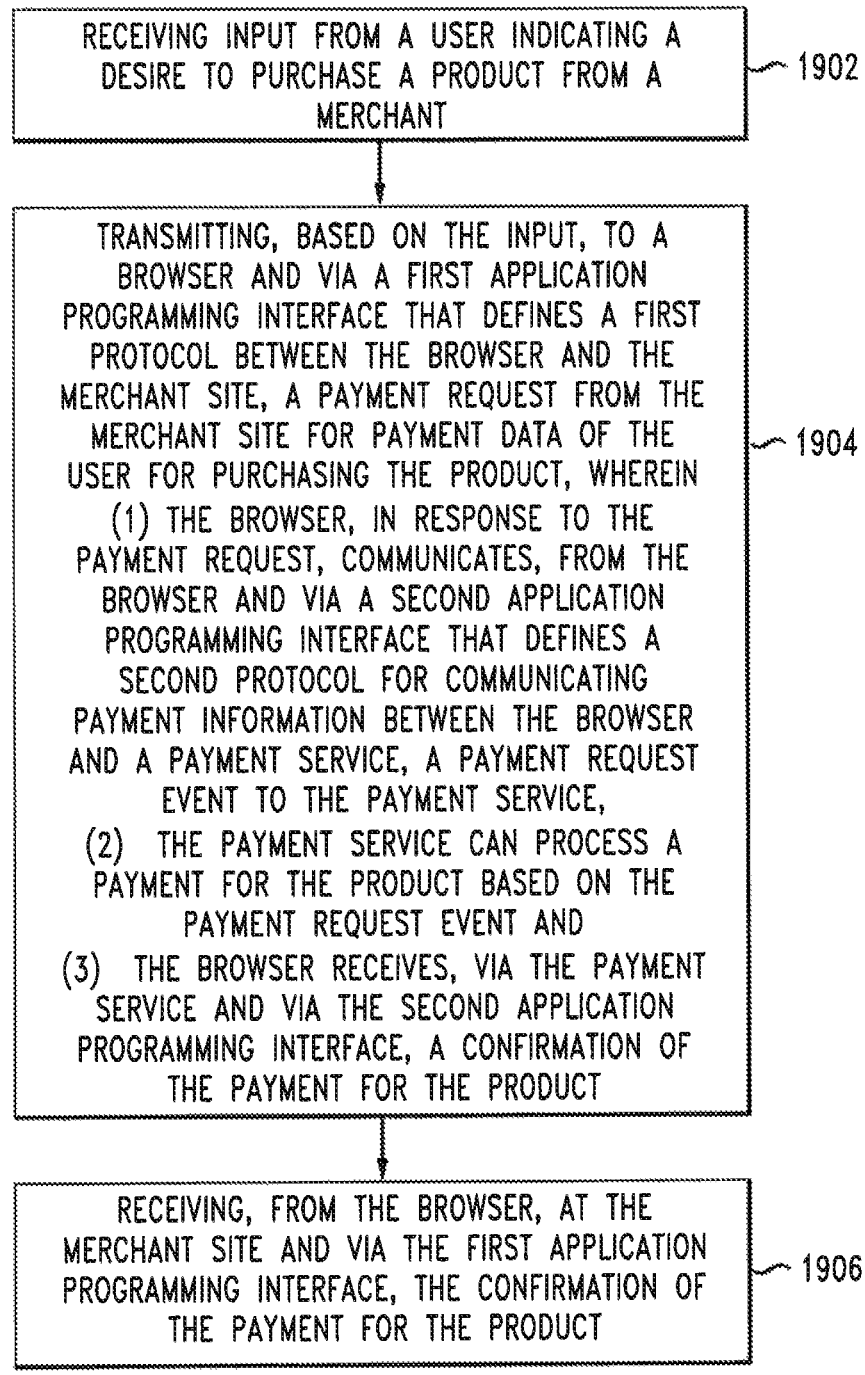

A method performed from the standpoint of the merchant site is shown in FIG. 19. The method includes receiving input from a user indicating a desire to purchase a product from a merchant site 1816 (1902) or in store and transmitting, based on the input, to a browser 1806 and via a first application programming interface 1818 that defines a first protocol between the browser 1806 and the merchant site 1816, a payment request from the merchant site 1816 for payment data of the user for purchasing the product (1904), wherein (1) the browser 1806, in response to the payment request, communicates, from the browser 1806 and via a second application programming interface 1812 that defines a second protocol for communicating payment information between the browser 1806 and a payment service 1810, a payment request event to the payment service 1810, (2) the payment service 1810 can process a payment for the product based on the payment request event and (3) the browser 1806 receives, via the payment service 1810 and via the second application programming interface 1812, a confirmation of the payment for the product. The method includes receiving, from the browser 1806, at the merchant site 1816 and via the first application programming interface 1818, the confirmation or similar data of the payment for the product (1906).

Any communication amongst the browser, a payment or task service, and the merchant site using the various APIs disclosed can be part of this disclosure to achieve a one-click type or simplified purchasing experience by the user at the merchant site 1816. Any task that can utilize this infrastructure can also be accomplished with less friction for the user.

Additional concepts regarding a payment processor processing a payment to a site are discussed next. In one aspect, a method includes receiving, at a browser and via a browser application programming interface that defines a first protocol for communicating information about purchases between a site and the browser, a payment request having data associated with a purchase of a product from the site or in the store for a user and, based on the payment request, transmitting, from the browser and via a browser payment handler application programming interface that defines a second protocol for communicating data between the browser and a payment service, a request to process a payment for the product to the payment service. The method according to this aspect can include receiving, at the browser and via the browser payment handler application programming interface, a confirmation, from the payment service, that the payment service has processed the payment for the product to the site.

The method can further include transmitting the confirmation received from the payment service from the browser and via the browser application programming interface to the site. The method can further include transmitting, from the browser and via the browser application programming interface, address information for the user to the site for delivering the product to the user.

A method from a viewpoint of a payment processor perspective can include, based on a payment request received at a browser and via a browser application programming interface that defines a first protocol for communicating information about purchases between a site and the browser, the payment request having data associated with a purchase of a product from the site or the store for a user, receiving, from the browser, at a payment service and via a browser payment handler application programming interface that defines a second protocol for communicating data between the browser and the payment service, a request to process a payment for the product and transmitting, to the browser and via the browser payment handler application programming interface, a confirmation, from the payment service, that the payment service has processed the payment for the product to the site.

From the site context, an example method can include transmitting, from the site, to a browser and via a browser application programming interface that defines a first protocol for communicating information about purchases between the site and the browser, a payment request having data associated with a purchase of a product from the site or a store for a user and receiving a payment for the product from a payment service, wherein the payment is received based on the browser transmitting, based on the payment request, from the browser and via a browser payment handler application programming interface that defines a second protocol for communicating data between the browser and the payment service, a request to process the payment for the product to the payment service. The method can also include receiving, from the browser and via the browser application programming interface, a confirmation, initiated from the payment service, that the payment service has processed the payment for the product to the site. The method can also include receiving, from the browser and via the payment request application programming interface, address information for the user at the site for delivering the product to the user. In these cases, "via" an API means according to the protocol which the browse and the site are each programmed to utilize.

Figure 20:
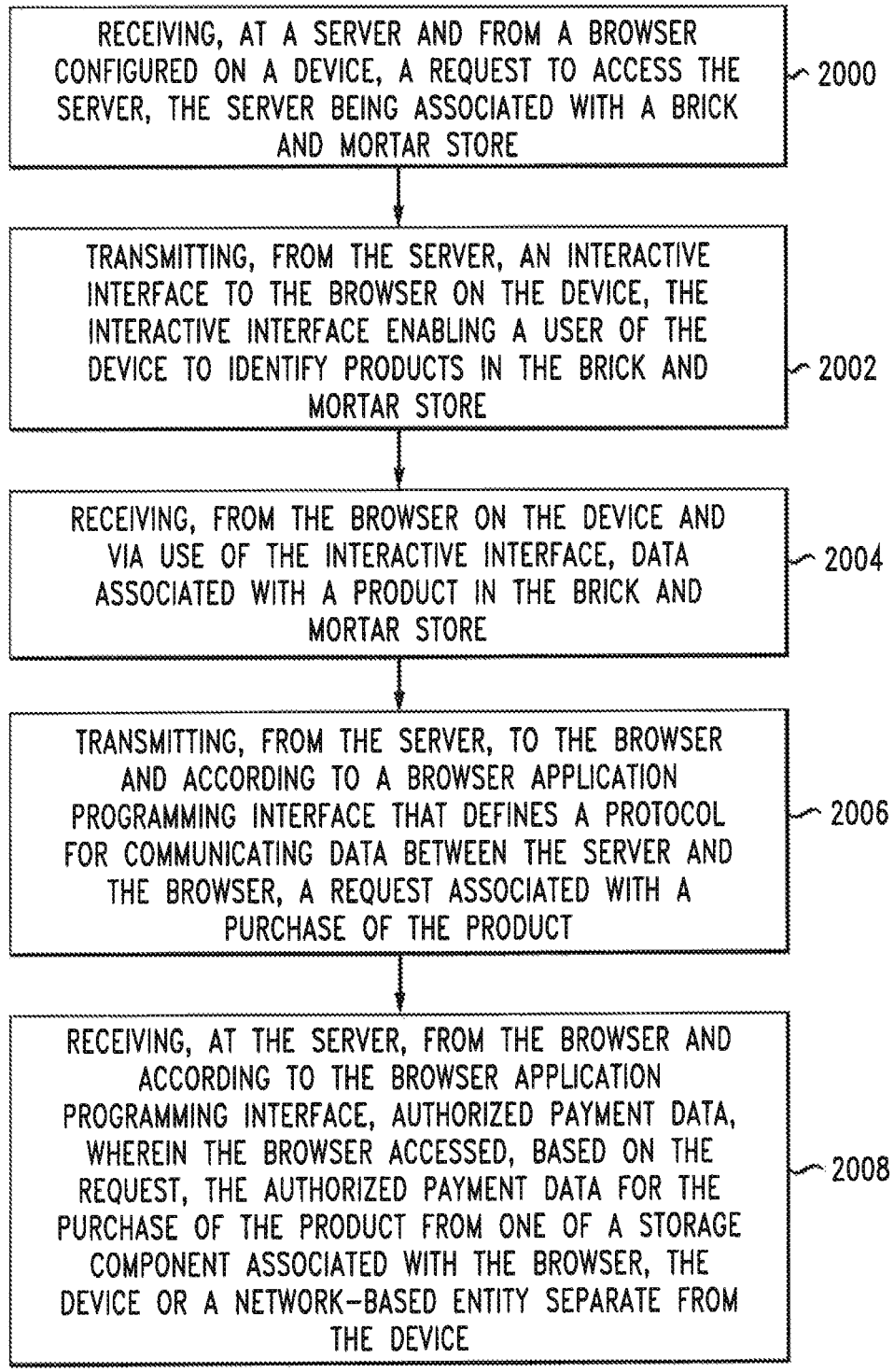

FIG. 20 illustrates a method aspect of this disclosure. A method includes receiving, at a server and from a browser configured on a device, a request to access the server, the server being associated with a brick and mortar store or an object (2000), transmitting, from the server, an interactive interface to the browser on the device, the interactive interface enabling a user of the device to identify products in the brick and mortar store or to manage a performance of a task (2002), receiving, from the browser on the device and via use of the interactive interface, data associated with a product in the brick and mortar store or the object (2004) and transmitting, from the server, to the browser and according to a browser application programming interface that defines a protocol for communicating data between the server and the browser, a request associated with a purchase of the product or to perform a task associated with the object (2006).

The method can include receiving, at the server, from the browser and according to the browser application programming interface, authorized payment data, wherein the browser accessed, based on the request, the authorized payment data for the purchase of the product from one of a storage component associated with the browser, the device or a network-based entity separate from the device (2008). In this manner, the browser acts as the agent between the user's experience in store, and a store server. The browser presents an interface which is not designed primarily for online navigation and purchases, but is designed to enable the user to navigate in a physical store and identify products to purchase. The browser can coordinate with sensing component built into a mobile device of the user for product identification. These can include a camera, an RFID tag reader, an NFC tag reader, an input field for product codes that the user can enter manually, a mobile device, module or component that will evaluate movement of the mobile device relevant to the movement of electronic identification tags on products to identify a linking of products to the mobile device. The supplies for products that the user has picked up off the shelf and is carrying out the door. Such a module or component on the mobile device can be in communication with the browser such that products that are confirmed, at a certain threshold to be with the user can be communicated to the store site for addition to a shopping cart, and for purchase through browser API. In another aspect, an Amazon.com type of purchasing experience can also be applied where the merchant site has payment information stored for a user. In other words, the present concepts for in-store purchasing experiences, using a browser to access a store site does not necessarily need to use the browser API payment mechanism.

The authorized payment data can include one of payment account data for the server to use to process a payment or a confirmation that the network-based entity processed the payment. The authorized payment data can also include login data for a merchant site to enable access to payment data stored thereon. The method can also include transmitting the authorized payment data from the server to a payment processor. In another aspect, the data received from the browser on the device can be received by one of a camera on the device, a sensor component on the device that detects an electrical signal transmitted from a tag on the product, and manually entered data identifying the product. The request to access the server is initiated from a universal resource locator entered into a browser input field either manually by the user or automatically via a signal received or detected by the mobile device of the user in-store.

The request to access the server can be initiated via an automated process on the device that initiates the browser and navigates to the server without manual interaction by the user. The interactive interface operating on the browser can enable the browser to access a camera on the device to receive the data about specific products the user desires to purchase. The camera on the device can be used to take an image associated with the product, wherein data includes the image and wherein the image is one of an image of the product and an image of a tag (having a bar code or other scannable image) associated with the product. Any such data can be coordinated with a product database at the store server for product identification. For example, where in image of the product is used, the store server can maintain various images of each of their products, such that the corresponding product can be identified from the image sent.

The authorized payment data can include one or more of a one-time use token used by the server for process the payment, payment account data, address data, encrypted data, personal contact data, and a confirmation that the network-based entity processed the payment. The interactive interface can include one of graphical interface, a textual interface, a gesture or motion-based interface, an audible interface or a multimodal interface.

The method can include receiving, at the server, the request to access the server is initiated automatically without manual intervention of the user by the device detecting an electrical signal from one of a product tag or a communication component in the brick and mortar store that automatically initiates the browser on the device and navigates the browser to establish a communication with the server.

Figure 21:
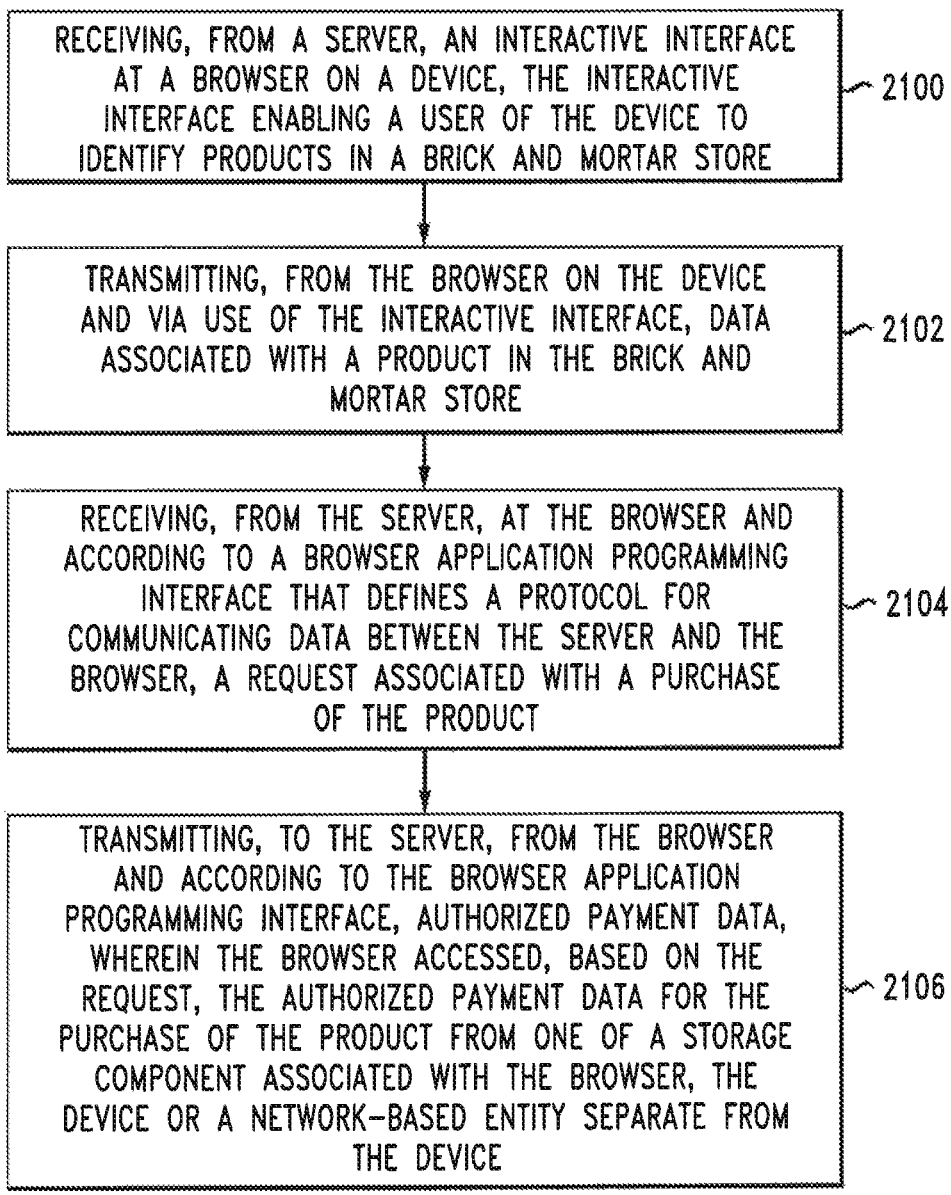

FIG. 21 illustrates the method from the standpoint of the browser or mobile device. A method includes receiving, from a server, an interactive interface at a browser on a device, the interactive interface enabling a user of the device to identify products in a brick and mortar store or a task associated with an object (2100), transmitting, from the browser on the device and via use of the interactive interface, data associated with the task or a product in the brick and mortar store (2102), receiving, from the server, at the browser and according to a browser application programming interface that defines a protocol for communicating data between the server and the browser, a request associated with a purchase of the product or performance of the task (2104) and transmitting, to the server, from the browser and according to the browser application programming interface, authorized payment data or other task data, wherein the browser accessed, based on the request, the authorized payment data or other task data for the task or to purchase of the product from one of a storage component associated with the browser, the device or a network-based entity separate from the device (2106).

In one aspect, an interface could include a presentation of a product on-line or a product that the user scanned or identified in a store, a buy now button and a "manage purchases" button. This interface can represent any interface on any of the approaches for buying products. Thus, the interface could represent a buy now advertisement as a part of search results on Google.com, or a Pinterest post which enables a user to buy the present product, or an in-store browsing of products, and so forth. In any of these outlets, a manage purchases button can be interacted with by the user to access their user account which can be shown in FIG. 22.

Figure 22:
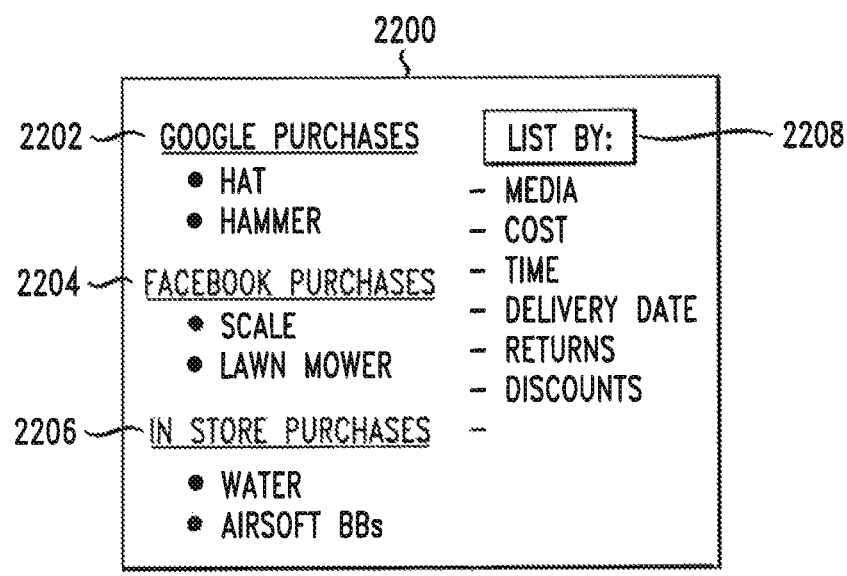
FIG. 22 illustrates an interface for purchases across multiple platforms.

FIG. 22 illustrates an example user account 2200. Here, an illustration of Google purchases 2202, Facebook purchases 2204 and in-store purchases 2206 are presented in a simplified manner. The user is given the option to list these purchases 2208 in various ways. The user could, for example, organize these purchases by virtue of media, cost, time, delivery date, returns, discounts, and so forth.

Multi-Site Site Shopping Cart

Figure 23:
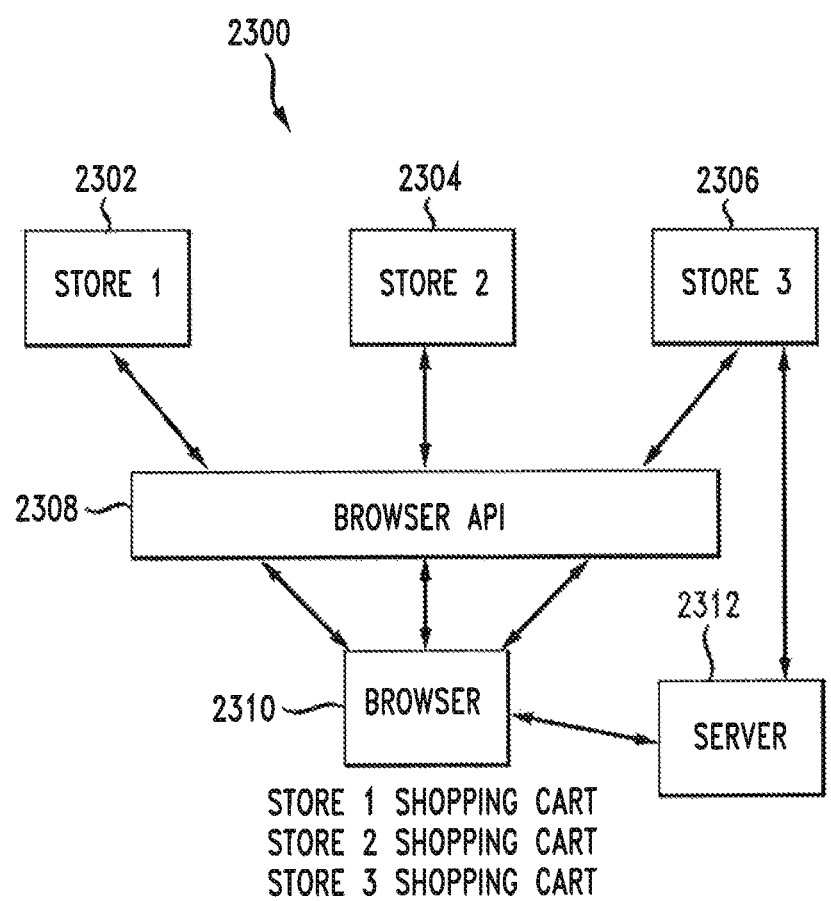
FIG. 23 illustrates a browser based payment API for use across different brick-and-mortar stores.

Referencing the shopping cart above brings up another aspect of this disclosure, shown in FIG. 23. The configuration of system 2300 and this figure represents the user navigating to multiple sites or stores 2302, 2304, 2306 for shopping. If the user is shopping at a single site such as Amazon.com and places a number of items in the shopping cart, the user can view that shopping cart and with one click purchase multiple items within the cart. However, even using the browser API, if the user navigates to multiple different sites and/or stores to make purchases, the user has to make multiple one click purchases to purchase three items. For example, if the user bought a first item from site/store 1 (2302) and a second item from site/store 2 (2304) and the third item from site/store 3 (2306), then the user would have to make three clicks for purchasing because of the separate nature of these sites or different location of the stores. The following is an approach to eliminate a number of clicks when making purchases across multiple sites or stores. This also applies to tasks or other "items" that might be selected in-store, or in association with an object like a rental scooter or parking meter. An aspect of this disclosure is to use the browser API to store items placed in the shopping cart. Another aspect involves storing data across a universal shopping cart with a search engine or search entity or other entity such that a single checkout for purchases made via different modes (such as a shopping cart filled with one item from a web search and another item from a spoken dialog with a dialog system to fill the cart with another item, or another item from an in-store experience). The search entity or entity managing a checkout from a universal cart can charge the merchants for managing the checkout. For example, where multiple merchants have products in a universal cart, the entity managing the checkout can charge each merchant a portion of the fee for managing the payment process. In the case of a search entity, the search entity may not charge for advertising with the merchants but may only charge for purchases made through a universal shopping cart.

For example, assume the user is at site 1 and places a toaster in the virtual shopping cart. An option could be presented to the user to place the toaster in a browser shopping cart. This may be a separate button for interaction with the user from a normal shopping cart which remains at the site, or could be integrated in with the standard site button for placing an item in a shopping cart. If such is the case, the system may notify the user, as they transition from site 1, that the toaster is placed in a browser shopping cart. In any event, the browser 2310 will receive through the browser API 2308 all the necessary information associated with the toaster. The information may be passed through the browser API if the user abandons the shopping cart prior to making the purchase, which process could be modified via user setting. In this respect, the browser shopping cart becomes persistent across navigation to multiple sites and can be persistent as well for in-store shopping or browsing. Assume next that the user navigates to store 2 and places a cookbook in a physical shopping cart (the cookbook can be identified and put in a virtual shopping cart as well) in a similar manner. That information is communicated through the browser API 2308 and stored in a store 2 shopping cart. Assume the user does not buy the cookbook yet.

Next, assume that the user is on site 3 and adds a pencil to their virtual shopping cart. At this point, assume that the user clicks on a "view shopping cart" button. In this scenario, that interaction can trigger a call to the browser API 2308 which can retrieve the toaster in site's 1 shopping cart and the cookbook in store 2's physical shopping cart, and present those items with the pencil in a shopping cart while the user is at site 3. A buy button can be presented enabling the user to purchase all three items at once. As can be appreciated, this process has eliminated at least two clicks from the traditional way of purchasing multiple items across different sites and includes an in-store experience as well. Once the user confirms payment, each respective site gets paid their portion of the overall payment. The browser or other entity can process, for example, a $105 payment in which the first site gets paid $30, the second store gets paid $50 and the third site gets paid $25 for the respective items, shipping costs, taxes, etc. Any approach disclosed herein for managing the purchase can be utilized, such as, a notification on an interface that a fingerprint interaction can purchase all the items. Notifications to the physical store can be provided to a security infrastructure to enable the user to walk out of the store.

Options can be presented for different items to be shipped to two different locations, and so forth. Machine learning, historical information, or other analyses and algorithms can be utilized to predict addresses, payment accounts, shipping options, and so forth, in order to reduce the number of interactions or simplify the process for the user. A network service, via an API or other means, such as a search engine, search entity, or other service, could also provide the functionality for a multi-site shopping cart experience. For example, a network service can store in a shopping cart items from one site accessed by a first device and a second item from a second store accessed or identified by a second device, using a similar or different interface modalities, and then process a payment for all items in the cart at once. Sites or stores can register with the service and claims can be drawn to the service, the browser, the shopping cart model, the physical store infrastructure or web server, and to the merchant processing. By utilizing a browser API 2308 for the purpose of processing the payments, the system can alleviate the need of the user to login to a shopping cart extension or provide payment and address information to a separate shopping cart extension. The universal shopping cart disclosed herein can utilize the browser API to eliminate the need of the user to give their payment information and address information to yet another entity. When an entity like a search entity stores the payment/address data, it can provide a payment process and apply the payment to items in the shopping cart.

It is noted that the browser API 2308 (and the browser 2310) and communication with any respective merchant will harmonize capable payment processes for the merchant relative to the types of payments that the user utilizes. This disclosure recognizes that the persistent shopping cart across multiple sites and/or physical store experiences could result in different payment capabilities across the sites/stores relative to the user abilities. All of these differences are resolved in this process, whether at the browser 2310, or coordinating with other services or entities 2312. In other words, site 1 may only take Visa, while store 2 may only take MasterCard. Site 3 may take Apple Pay. Assume, in this case, that the user has a stored Visa card, a stored MasterCard, as well as an Apple Pay account. The combined shopping cart can present to the user a confirmation that an entity has coordinated all of the user's available payment mechanisms and assigned them to the appropriate respective site such that the single click interaction will cause a visa payment to be made to site 1, a MasterCard payment to be made to store 2 and an Apple Pay payment to be made to site 3. Each respective process can utilize the browser API 2308, a search entity, or other network-based service 2312 (with any other secondary API such as the payment handler API to enable), to accomplish the respective payments, generation of tokens where necessary, and so forth. Discounts can be built in for respective purchase, coupons, refunds, etc. Other mechanisms could also be provided by a service that, for a small service fee, charges the Visa card or any other single payment mechanism provided by the user and processes the other payments to the other respective merchants. In one aspect, a single tokenized payment can be transmitted to a payment processor for handling all the respective payments amongst the different sites.

FIG. 23 represents any and all types of communication, requests, calls, responses, and so forth which can be utilized for providing a persistent shopping cart across different sites, in-store, and/or object-based interactions, using a browser API 2308 including any other APIs for implementing a PayPal or cryptocurrency or other online payment service approach 2312. In some cases, the browser or device upon which the browser is functioning may communicate with a server 2312 to store information, retrieve information, analyze data, retrieve encrypted payment data or tokenization data, and so forth. The server 2312, may also, as part of the process, communicate directly with any of the sites from which shopping cart items are stored. Payment data, any other data or communication can occur between the server 2312 and a respective site. The shopping cart data can be encrypted or tokenized for a single use, or otherwise provided with security measures. This aspect of the disclosure represents an enhanced utilization of the original browser API, which enables a persistent shopping cart to be maintained across multiple sites that are navigated for shopping.

In another aspect, the browser 2310 to simply represent a network-based service that utilizes an API 2308 and functions in the same manner. Data of products placed within a shopping cart can be communicated through API calls in any number of different stages of the process. For example, the merchant site, object-based or in-store shopping server could set up different scenarios for when to transfer the shopping cart information through the API. Information to be transferred as soon as a person places an item in a shopping cart, as soon as they pick up an item and it is confirmed to be with them for X seconds, or as soon as they click on a buy button. In some scenarios, there may not necessarily be a "shopping cart" but merely data associated with a product in the process of being purchased or carried out of a store. For example, between the time someone clicks on an "Apple Pay" button and the time in which they provide a fingerprint to confirm the purchase, the data could be provided to an API for storing and later access. Between the time the user picks up a product and walks to the store exit, information could be exchanged. The service could charge the merchant a certain amount, if the user later purchases that product because it is produced in a persistent shopping cart, and thus brought back to their attention.

Currently, much advertising on, for example, social media involves presenting advertisements to users in their newsfeed based on other website navigation. Users may browse for a toaster, or pick up a lamp in a store, but never even put it into a shopping cart or get close to the mode of making a purchase. An advertisement for that toaster is then later presented on their newsfeed which can result in the conversion. This in-store aspect combines the physical in-store shopping experience with advertisements on a search engine result, or social media site, or any other interface, such as a voice-based interface. Another aspect of this disclosure is to add such items to the shopping cart disclosed herein. Thus, if the user had searched for a toaster or picked up a lamp but never even place one a shopping cart (virtual or physical), rather than later advertising that toaster on a social networking page, one aspect can involve placing that toaster in their shopping cart such that later on when they're making a purchase of another item in the shopping cart, they can see the toaster and make one click to purchase the other item, as well as the toaster. There may be a user interaction as well to confirm that the toaster should be purchased with the other item. Options can be presented to delete the toaster from the shopping cart or hold it for a later purchase. Thus, the shopping cart becomes a more dynamic environment in which items can be purchased in aggregate and thus simplifying the process. In another aspect, a posting on a social media site for the toaster, when interacted with, could transition the user not to the merchant site but to their shopping cart with that item contained therein with other items from the multi-site shopping cart. In other words, a selectable object on an advertisement or posting could cause a transition to a multi-site shopping cart to include the item advertised as well as other items the user has placed in shopping carts.

Another aspect involves aggregating accounts. For example, some couples share an amazon.com account such that purchases made by either individual can be seen in the purchase history. If items are stored in a shopping cart, each individual can see the item stored by the other individual. Another principle that can apply in the present case would be to combine shopping carts based on any number of factors. For example, prior to this disclosure, if a husband shopped on merchant site number one in place an item in a shopping cart, and his wife shopped on merchant site number two and placed the second item in a shopping cart, there was no mechanism of combining those two items into a persistent shopping cart. Accordingly, whether by linking to computers, or accounts, or based on a payment account used, or any other number of factors, such as user preferences, individuals can combine their separate shopping cart items (physical or virtual) into an aggregated shopping cart. Thus, as linked users shop and places items across multiple sites, they both will be able to view the aggregated shopping cart and can make a purchase of those items. Further, the users may have different permissions such as children can add items but only parents can make the purchase.

Additional Features Provided Through a Browser API Interface

Using the browser API interface (i.e., the W3C.org payment request API, Apple Pay API, other APIs, etc., incorporated herein by reference.) is helpful and efficient in terms of handling payments in a common interface across the Internet. In other areas, buy buttons are very common now in social media, Facebook, etc. because they are being presented where people are and where they spend time. Now, with the browser API, the issue is not bringing a buy button to where people are, but what to do in connection with the browser API interface which simplifies the payment process. Now, people all over the web will be using a common interface to buy products and services. The W3C standard payment request API is being implemented by Microsoft, Google, Mozilla, Samsung, Safari (proprietary version), and so forth. Other APIs by Apple and Google provide their interfaces. This disclosure covers other functionality that makes accessing other services more efficient.

For example, the payment interface can be supplemented with an interactable object such as a button, drop down menu or hyperlink which, when interacted with, can present to the user their listing of purchases made and the respective processing for each item. This would be similar to the account information presented to users in Amazon.com which lists the status of all their purchases via Amazon.com. In this scenario, the purchases can be reported to a central agent for purchase across different sites, not just amazon. It can include amazon.com as well. Thus, within the browser API interface, a user can see a "manage purchases" object or the like. The user could select an agent within a selection field of their browser. For example, different agents can offer services that can be integrated into the browser API such that standardized calls and responses can be provided. Or the user could hyperlink to receive information from the account/purchases management agent which would integrate with the payment interface and enable the user to gain access into their product purchase history and status in an efficient manner.

Thus, a user interface can be presented which might appear to be at the standard merchant.com website, but is within the browser API, which provides access to user account purchasing history and information. This enables an aggregation of purchases across multiple sites to be managed much more easily. The "account" can encompass all purchases across the Internet for that user or a group of linked users in a family or other linking. Users will demand easy access to all of their purchases as they become more comfortable with using common purchasing techniques such as our becoming available to the browser API. Thus, since users will demand access to control, review, and further management of their purchases, they will desire and demand such easy accessibility. This process can include in-store purchases and object-based tasks.

Merchant sites may provide calls to the browser API to enable such functionality if they desire. For example, a parameter could be set which, when the user goes through a purchasing process, the merchants could turn on or turn off the presentation in the browser API interface of the interactable object which enables access to the user account. Thus, merchants may be able to simplify their purchasing process by not providing such access. Merchants, of course, could also include authorization for the browser API to be able to communicate the basic data associated with the purchase to a service which can store and add the purchased item to the purchasing history which can be accessible through such an interactable object. Thus, the browser API not only can become an agent which connects a payment process with the user and a merchant, but also could become the agent to communicate the purchasing data to a service or system which will receive all such purchases, combine them together, into one full account history which can be accessible across many different platforms by the user. In one example, a separate "app" could be provided on a mobile device which simply taps into and accesses such a server and provides the ability of the user to manage all of their purchases. For example, such an "app" or service could pull in all of Amazon.com purchases, as well as purchases across the Internet and/or in-store which are reported to the service, and provide all of the functionality and control that is currently only available either on Amazon.com, or with individual merchant.com websites.

Additionally, from the state of interacting with the browser API interface, the system knows who the user is, his or her payment information, and information about products purchased or tasks performed. Thus, from this interface, and from any state along the process, the system could advertise, upsell, suggest alternate products, offer discounts, offer additional services, offer warranties, extended rental times, etc. Furthermore, from this interface, social networking opportunities could be presented. Thus, users could be presented with a link to their Facebook page or Pinterest posting that relates to that product. A "deep link" to a social networking site in a particular relevant state could be made and enabled through data retrieved from the browser. For example, if a friend of the buyer purchased the same product the week before and posting something about it, the system could identify that information and present an object after the user completes the purchase on the payment interface which would transition the user to a social networking feed positioned with that friend's posting. For example, sometimes, a Facebook feed can have 10's or 100's of postings and it is hard to find a particular posting of a friend. A transition can be made from the browser API payment interface to a particular social network posting that is relevant to the purchase just made. The system can present a button on the interface before, during or after the purchase, that says "tweet this purchase" or "post this purchase on Facebook." This can occur in any social networking site or even in any other site, such as a merchant site. The particular functionality of any other site is incorporated herein and assumed as part of this disclosure, such as how Twitter works, Facebook, Facebook Messenger, Texting, emailing, Pinterest, Instagram, and so forth. In other words, the system can analyze one or more of the purchase, the user information, payment history, social media data around the buyer and friends/family for data related to the purchase, and so forth, and present a social media object (or any other transitioning object, such as a product purchased account object) at any stage along the payment process (before the payment, as the user initiates the process which leads to interaction through the browser API, after the payment, etc.). For example, the system could present an object which is configured to transition the user to Facebook Messenger in a state as though the user had selected their friend who bought the product last week to send a message. The object could indicate that by pressing this button, the user will be transitioned to Facebook Messenger with John who will receive a message, and it will be ready for the user to type.

Further, the object presented could be configured to be a posting on a social networking site. For example, a user who has a Facebook account could authorize an object on the payment interface which can utilize the information about the purchase (item, size, number, description, etc.) and can prepare a posting on their Facebook timeline about the purchase. Thus, by interacting with the object, the system can configure and prepare a posting for Facebook preconfigured with a picture of the product, description, and even a buy button for the posting for followers of the user to perhaps buy. This is a new kind of advertisement in which a user, by purchasing a product, can post an advertisement. The user could even insert his or her own comment. Thus, by clicking on the object, the user could be presented with a posting showing details about the product, an opportunity to type in some text about the purchase "I just got this GoPro version 10—very excited" and have the system transmit the posting to their followers with a buy option included. This would be different because it is a personal posting from a user and not necessarily from a merchant. However, companies like Shopify or Bigcommerce could also provide backend processing services to enable the process. The posting person could even get a discount for posting the purchase. The notice of the discount could come at any stage of the purchasing process. For example, when making the purchase, the merchant could give a 5% discount if the user clicks on the social media button and causes a buyable posting to be transmitted through their social network from them. Inventory tracking can insure that the option to purchase or the purchasing process opportunity is only presented when additional items are in stock (the user just bought an item). If there are no more items, the posting can go through with information about when the product will be restocked. All these processes can also be triggered via the user device interacting with a code or NFC tag as well.

This process is essentially a non-merchant posting on a social networking site but with a merchant component. It is powerful because people will see that it is a personal posting and not a merchant posting, but it will still be configured for a buyable interaction. It is noted that this kind of posting or object which leads to this kind of posting can also occur outside of the browser API interface but could work on any site, such as amazon.com or any merchant site using any payment mechanism. At some point the user logs in and the system has enough information to be able to transition to a social networking site for a configured posting. Relationships can be developed between merchants and private posters on a social media site such that at the backend process connects a private posting with the buyable option processing used by many merchants now.

In this regard, the posting from the personal user can be in a sense "co-branded" between the user and the merchant. The presentation can include graphics that couple perhaps the user's profile picture and the logo of the merchant. The process could work where if a user is going to post a buyable posting personally, then the system can dynamically, or in advance, generate a cobranding image that accompanies the posting such that the recipients of the posting can recognize not only that the item is a Canon camera, or a product from Macy's, but is also personally posted by their friend and not a business posting. This approach can enhance the trust the recipient can have in making a purchase based on that posting.

The purchase interface could also include an option to transition to something like Facebook Messenger. The user may be in the process of making the purchase and have a question, the messenger can enable an interaction with the merchant about the product. The user may want to confirm that it has a 2 year warranty or is 4 wheel drive, or any question. The system could transition the final purchasing to be done within the messenger application or transition back to the API interface to confirm the purchase. The API could include the appropriate calls and functionality to make such transitions to and/or from the interface. This process of course can incorporate any application for interfacing with the merchant, not just the Facebook Messenger Application.

Other options are available for enabling people to post privately through social networks for products and get deals, discounts, points, credits, a free product, etc. For example, a social network user may see an advertisement for a product such as a Cannon 7D camera, posted by amazon.com or canon.com. Currently, there are "shop now" or buy now buttons or other buttons associated with actions. The proposal is to add another button in which the user could post that product on his or her own feed with the same structure. In this case, the posting becomes personalized, the user could add comments, or a picture of themselves (perhaps with the product that they bought, or a video of them) and post. What changes is that the posting is through their own social network but it can retain the buy now option such that users can be transitioned to make a purchase of that product. It is a more personal posting because it is from a friend and not a company. The user could get such a posting after they've purchased a product too. Assume the user bought a Canon 7D camera. They could see a Canon 7D camera posting with a choosable option to repost for $10 off their next purchase. The posting could be configured in their newsfeed as being prepared and configured for them to repost. For example, it may not say "buy this camera" but it may say "Friends, I just bought this camera and love it—Amazon is offering it to you at a discount". Thus, when the user reposts the posting, it is from them, to their followers, and somewhat personalized already. This would make it easy for users to share product and have the posting configured for easy purchase.

The purchase could be processed by the social networking site, a separate payment processor, the merchant site, through Apple Pay or Google pay, or through a browser payment request API, or through Amazon.com or a traditional payment approach. The buyers in this scenario could also get a structured discount such as one discount if they buy it from their friends posting, or if they buy and post it themselves on their social network(s), they can get an additional discount. The additional discount could be credited to their payment account if they post on their social network after the purchase. A "retargeting" approach could also be included in which the buyer may not repost the purchase or the item on their social network(s) at the time they make their purchase, but the system could be programmed to post an opportunity for that user, a day, a week, or some intelligent time later, giving them the opportunity for a refund of $5 or a coupon or discount, or miles, or some other benefit, if they post that they bought this item last week and love it.

The benefit in this example is that once a user buys a product, there is a period of time that the user tests or experiments with the purchased product. A user can then post on a social network their feelings about the product, such as how much they love the camera, or vacuum, for example, and suggest that their friends buy it. The system could obtain some kind of network based feedback on usage of the product, which could trigger the reposting. For example, the user may buy an iphone 7 and the system can determine that after the user has taken 50 pictures they should pick several for a personalized posting. The posting can include a buy option, and personal comments in addition to the picture of the product and the user.

Another aspect of the above concept is how to handle deep link transitions. For example, if John gets an amazon.com posting for a product, he can click on a shop now or buy now (or similar label) to explore and/or shop. In some cases, since the posting is known to John, if he clicks on an object, the system can transition him to a deep link within amazon.com where he is automatically logged in, his payment and delivery information is already stored, and he could one-click purchase right after the transition or with very few clicks make the purchase. The "state" of amazon.com is a deep link associated with the user and the product for an ease of purchase. Accessing data from the browser to enable the deep-link one-click purchasing state may be utilized, such as accessing a one-click purchasing parameter.

Referring back to the personal product posting, there may need to be additional transfer or sharing of information as John may repost a product posting such that his 100 followers see the posting and can also make a purchase. The system will track each recipient such that any recipient who clicks on buy now will also be transitioned to a deep link in amazon.com and in a state in which they are logged in and can one-click or with a few clicks make a purchase without the need of entering manually payment information or delivery information. APIs can be established between social networking sites, merchant sites, the browser, payment processors, and/or any other entity for the purpose of handling the transition and back end processing to achieve the results and processes described above.

In one aspect, the opportunity and concepts include transitioning between social networking structures. For example, a user may get a Facebook advertisement in their newsfeed and want to repost that in their Pinterest account as a buyable pin. The system also can translate postings from one format to another, while retaining the buyable configuration. If a transition from one payment structure to another is needed, that transition can occur as well. For example, an amazon.com posting may be transitioned from a deep link processing for payment to a browser API payment or a Google payment approach as the user reposts the merchant posting as their own on Facebook, Pinterest, Instagram, Twitter, or if they transition from one type of social network to another. User preferences may also be changed and drive what kinds of transitions occur. If amazon.com already has the user payment and address information stored, the transition may still require accessing data in the browser such as a one-click purchasing parameter set.

Another example transition from the browser API payment interface could be a "continue shopping" button or object that could bring the user to a shopping state back in the site. The user could be taken to a new search field as though no searches were done or the user could transition to a partial search that would have been part way along to the final state of the product that they purchased.

The browser API could also be enhanced to provide additional functionality such as the option to buy 2 or more of the product with automatic adjustment of pricing, parameter changes (color or size, volume, etc), and so forth. All of the above can also apply to an in-store or object-based shopping experience where the interface can enable a user to buy in-store, take a selfie, access a nice picture of the product, and construct a buy now social media posting for posting on the user's social media site about the purchase.

The additional functionality can also be independent of the basic purchasing process for which the browser API was developed. A merchant site and/or the browser, user, or other entity can initiate this additional functionality through a call to the API. For example, if the browser API is modified to include the additional feature of connecting the user with their payment history and a management mechanism, and the merchant site would like to provide that functionality on the browser API interface, a parameter can be set, or a call can be made in connection with the other communication with the browser which turns on the purchase history management component. If that feature is turned on, then the browser can interact via another API or other mechanism with a service that stores the payment history across the web for that user and responds with the information and management capability. The browser API can help to format that information and present on the browser API interface, and intractable button, hyperlink, or drop down menu which, when interacted with by the user, will present the purchase history for review and/or action by the user. The system may also transition to the user, if that feature is selected, to a separate site for managing purchases. The benefit of this approach is that it provides additional functionality for the user at an interface which is going to be standardized across Internet and/or in-tore purchases. It reduces the "business value chain" by providing access the services in a manner that requires less clicks or less interactions by the user in that the initiation of access to the respective service can be made right through the browser API, which is an interface that many people will use.

In one aspect, a merchant could provide a report of the kinds of services that it offers. This might be similar in a sense to a merchant providing a list of payment mechanisms that are authorized, such as Visa, Discover, cryptocurrencies, and MasterCard. The browser API, which has access to the user payment mechanism, responds with a match such that the payment can proceed. In this additional context, a merchant could provide a listing of alternate services which are available to be performed through the browser API interface. For example, the merchant may provide the purchase history management access, Facebook posting access, Pinterest access, in-store purchasing options, and a FaceTime access where a personal friend of the user has made a similar purchase. In a user profile, the user can also select the alternate types of services they would or might want to access to the browser API interface. Thus, if the user desires access to their purchase history and is a member of Facebook, through the APIs, it is determined that the browser API interface should present one object for Facebook and another object for the purchase history.

Then, if the user interacts with the Facebook object, the system could perform a number of different functions. The system could simply transfer the user to Facebook and their general newsfeed. The system could generate a preview of a posting on the user's timeline which is connected to and configured for the particular purchase. Options may also be presented such as to confirm such a posting, to accept a 5% discount if the posting can be presented with a shopping button or a buyable button, and so forth. These parameters can be distributed through the API with other data as well that might be connected to the alternate service as necessary.

For example, one object could be presented in the interface which indicates that the user's best friend bought the same hat and would they like to talk about it. The button could initiate a call, FaceTime, Skype interaction, and email, text, and so forth. Any type of communication could be initiated based on the capabilities of the two parties, past history, and so forth. Thus, in one aspect, the browser API is expanded beyond providing communication between the browser and a merchant merely for the purpose of rendering a payment process more simple and uniform. The browser API can be expanded to also be an agent for any other kind of service or information. In the payment process, certain pieces of information are known such as the cost, the product, the user, addresses, email addresses, and so forth. Any additional service or capability that can draw upon that data can be leveraged through the browser API to add that additional functionality and capability at that point or state in which the user is. Accordingly, by adding this new functionality which may or may not be directly related to the purchase, the ability of the user to transition to or access these additional services, without needing to leave the merchant site and go to an additional or separate site, to provide a Facebook posting, for example, the user can access and achieve this additional functionality with a minimal number of interactions.

The types of options that may be presented through the browser API interface may also vary depending upon the state of the interaction. Other words, there are different states throughout the process, although the process is brief. There is a state which presents the payment and purchase summary prior to final confirmation. There's a state following the final confirmation, a state in-store between a product identification and a purchase, and so forth. Different services can be presented depending on the state of the interaction. If the state is prior to a final confirmation of a purchase, then an object could be presented which offers a summary of comments, or ratings, or information about the product that may be available from a third party service site. This can provide the user with additional information about the product that may not be gained through just the merchant site. Following the purchase, entities might offer warrantees, service plans, options for additional purchases online or in-store or another store, and so forth which may or may not be affiliated with the merchant. The merchant may coordinate and authorize such additional activities through the API interface. For example, the merchant may set or transmit a parameter which indicates that authorized warranty offering companies can be allowed to present an opportunity for warranty through the browser API interface. In this manner, the merchant can control the level of such additional functionality through the interface.

In some cases, the browser API interface may even add additional pages or interactions depending upon the function that is being performed. Accordingly, beyond merely adding an object which is selectable, depending on the function, the browser API may present an additional interface or more interfaces which enables the user to make additional selections and to achieve or perform the function that is being provided. This functionality can be presented as though it were part of the interface, as though it were part of the merchant site, or can clearly initiate a transition from the merchant site to another environment such as a social networking page, site, application, and so forth. It is important in these contexts for the user to be comfortable with whom they are interacting. Thus, the browser API is presented as part of a payment process on the merchant site. This additional functionality can be presented also on the site, or separately.

Further, the browser API interface can be extended to include other functions. Users can install extensions to the interface, much like they install extensions to the browser. An Amazon Assistant could be installed which would be presented in the interface. Preprocessing could occur using the data obtained from the purchase through the Interface. For example, a user buys a pair of pants. The system knows the user's waist size and the style of pants. An Amazon Assistant could present a pre-populated input field with the term "belt" or "brown leather belt 34 waist" such that an accessory could easily be shopped for on Amazon.com. Other parameters could be set which will cause the search result to be tailored and match with the item just purchased or viewed in-store. In one aspect, extensions added to a browser can be accessed through the browser API interface. In other words, the Amazon assistant that is installed on a browser could be accessed from the API interface rather than just the main browser interface.

An object could be presented on the API interface that enables a further search, such as a Google search or an eBay search. Parameters could also be set which narrow or filter search activities based on the purchase made through the API or a product viewed in-store. For example, if the user just purchased an item, a Pinterest search field could be presented which is or is not prepopulated with a term which enables the user to transition from the API interface to Pinterest for searching and viewing accessories or similar items.

Virtual Reality

The browser API can also be utilized in other contexts such as virtual reality. For example, if the user has an opportunity to shop for items, such as clothes, using virtual reality goggles or headsets, then the use of the browser API can be applicable. Modifications to the browser API protocols can be made to particularly provide for that context. For example, providing proper user identification for security purposes has been discussed above. Using fingerprint authorization or security codes to confirm that it is the proper user making the purchase. Virtual reality goggles can be positioned on a user's face. Elements can be built into the goggles to provide a different type of user identification. For example, rather than requiring the user to provide fingerprint authorization, the goggles may have built in a mechanism for scanning and iris or facial features of the user. The iris scan can match the user's identity and be mechanism for authorizing a purchase. A particular user gesture or movement can indicate a purchase confirmation. Furthermore, some virtual reality goggles will receive a mobile device for its screen. They provide a configuration such that the user can attach their mobile device, and then where the arrangements as goggles for a virtual reality experience. A mobile device could be configured with a fingerprint scanning component on its backside such that a user, while watching a virtual reality experience, and simply reach up and touch the fingerprint scanner to confirm a purchase. Typically, the fingers print scanner is on the front side of the mobile device for easy access by the user. However, when a mobile device is mounted in a goggle configuration, the fingerprint scanner will likely be on the inside of the goggles and not easily accessible by the user. In another aspect, a fingerprint scanner could be placed on the goggles such that either through Bluetooth, near field communication, a wired connection, or any other mechanism, the data from the fingerprint scan on the goggles can be communicated to the mobile device for further processing to authorize a purchase. A mobile device in this respect could have two fingerprint scanners—one on the front for normal use and one on the back for use for purchases made in a virtual reality headset. Goggles could be used in-store to provide further virtual reality such as bringing the buyer's home environment to the furniture store.

Virtual reality goggles could also include an NFC component which can be used to scan an NFC tag to initiate a process such as a virtual reality experience.

Other aspects could also include the goggle configuration being able to identify a forehead shape, a nose shape, DNA data for the user, temperature data, movement patterns, speech, facial recognition, and so forth, to identify an individual for security purposes for a purchase or other reasons. For example, a particular blinking pattern may be established to confirm the identity of the user. These various approaches can confirm or replace a fingerprint or security code to confirm the purchase using the browser API. Using these approaches in a virtual reality context can reduce the number of clicks or interactions required by the user to accomplish a purchase in a virtual reality context. Thus, one aspect of this disclosure can include electronic coordination between goggles and a mobile device configured with the goggles to present a virtual out reality experience for user, in which the mobile device utilizes a browser API to accomplish simplified purchasing process as disclosed herein. Of course any headset for virtual reality can include a browser component which can incorporate the browser API whether it is part of a separable mobile device or a built in screen. In one example, using a VR Headset like the HTC Vibe can include the ability of a user to interact with in a virtual reality world as though they are in a store making a purchase. They could also be in-store and the VR headset could make it as though they are at home. The interactions within the virtual environment can include trying on cloths or playing with a toy. The user can make the purchase within the virtual environment and the VR Headset and/or a coordinated computing device can process a payment made from the virtual world through the browser API. Sensors within the VR headset which sense head movements or gestures can translate that movement into a purchasing interaction which can lead to a purchase. Further, any coordination between a VR headset and another device such as a computer or gaming device can be utilized to complete purchases using the browser API. Thus, any step or any process can be divided between as VR headset and any other device to accomplish an improved approach to making purchases. This can occur in a store as well.

The issue is how to incorporate the browser API into a virtual reality environment. With Apple Pay, the user must use a fingerprint or facial recognition to confirm the purchase. Other methods may require a CVC code or voice authentication and so forth. For a fingerprint/facial environment like Apple Pay, the solution is to receive a fingerprint or face scan when the user begins a virtual reality session. As the user mounts a mobile device into a headset or with a complete headset without a separable mobile device, the headset can include a fingerprint reader or facial recognition component. By receiving the fingerprint/face print in advance, the user can utilize the stored authentication while making a purchase in a virtual environment. The user could shop and virtually make a purchase, even using hand gestures or providing a fingerprint on a virtual fingerprint reader. When the indication is provided within the virtual environment that the purchase should be made, the headset or mobile device can access the fingerprint/face print authorization provided at the beginning of the session and apply that authentication to complete the purchase. The user in the virtual environment can even truly use a one-click purchase to pay since they don't need to authorize the purchase using a fingerprint or face print. The earlier authorization that is recorded can be used for any virtual payment no matter how in the virtual reality environment the user indicates a desire to pay. For example, the environment might simulate the user giving cash to someone and buying an item, but in the background, the systems could process an Apple Pay, or Google Wallet or crypto payment. In the virtual environment, any necessary authentication such as a CVC code, or speech, gesture or any other confirmation data can be provided virtually, or in advance of a VR session for use to make purchases. For example, the user may provide a CVC code before starting the session or may provide payment information, address information etc. for enabling the virtual reality environment to utilize the browser API for requesting and receiving payment data for processing a payment.

In one example, Apple pay, utilizes a browser API by correlating two devices. The user shopping a laptop computer that does not have a fingerprint authorization mechanism, the laptop communicates with an iPhone that includes a secure element which stores the payment information associated with the user, and which has a fingerprint authorization object. When the user makes purchase of the laptop computer, the user confirms the purchase via a fingerprint authorization on the separate mobile device. In a virtual reality scenario, a virtual reality headset, being worn by a user and through which the user is having a virtual reality experience, could include a browser (or similar agent software) configured to communicate requests and responses, or any other communication between a merchant and the browser via the browser API. When a purchase is to be made in the virtual environment, the headset could communicate wirelessly with a mobile device that has a fingerprint authorization mechanism. In this scenario, the virtual reality headset could also be configured, when that time comes to need the fingerprint authorization, to provide instructions orally, visually, or in any other manner, directing the user to the physical mobile device that the user needs to touch to provide the fingerprint authorization. This aspect could be included to provide a physical component to the virtual reality environment to enable the user to make the purchase securely.

Again, when using the browser API in the context of virtual reality purchases, the headset or other device used can act as the agent or browser. If a mobile device is used as part of the headset to create the VR environment, it can function as disclosed herein to provide a storage facility for payment and user data, and the browser (Mozilla, Chrome, Safari, Opera, etc.) can be configured to receive payment requests from a merchant and respond according to the protocol. If the headset does not use a removable mobile device, but is a self-contained system, it can be loaded with a browser or similar software that also is configured with the browser API and also can store in a similar fashion payment and user data (as well as any other data referenced herein). The functionality can be provided within the self-contained headset, including a fingerprint reader or other biometric reader for user identification. Then, as the user engages in the virtual reality environment, if they go to a store, or purchase an item virtually, the system can treat that purchase as they would a purchase on a merchant site where a user clicks on a buy button. The user may virtually give a credit card, or virtually use Apple Pay, or virtually give cash at a point of sale in a virtual store. The user may virtually be at a computer making on on-line purchase. Any virtual situation in which a purchase is made can be applicable to the browser API made available in the headset. At some point in the virtual interaction, a confirmation will occur where money is exchanged or payment is confirmed, at this point, a site or entity representing the merchant or seller can initiate a payment request to the browser API associated with the headset and provide, according to the protocol, the available payment mechanisms for that entity, and receive payment data, address data, a one-time use token for processing a payment, and so forth as disclosed herein, through the browser API, for processing the purchase. In this scenario, a user, for example, could walk through a virtual mall and try on cloths, look at toys or books, and make purchases, and literally physical objects purchased in the virtual world can be purchased and shipped to the user's home.

Protocols associated with the browser API might be modified for a virtual environment. For example, a parameter might be set in a communication through the browser API from a merchant to the browser indicating that the merchant is a virtual merchant and that no buy button will be clicked on but a different type of trigger many initiate the process. A parameter may be set indicating that because the user is in a virtual environment, that a fingerprint or facial authorization will be received and is stored when the user began using the virtual environment which will be accessed if the user makes a purchase during the virtual experience, to alleviate the need for a real-time fingerprint or facial authorization, as normally happens with, say, Apple Pay, but which would not be convenient or possible in the virtual environment. Thus, a response from the headset as part of the browser API protocol might indicate that a fingerprint authorization is stored and current for use to make a purchase. Any parameters or information necessary or helpful to achieve an efficient use of the browser API in a virtual reality environment can be communicated through a modified version of the browser API for a virtual reality context.

This approach can also be used to further simplify the process with normal mobile devices. For example, the system could require the user to apply a fingerprint or face print when they start their device and for a period of time that print could be accessed for Apple Pay or the like purchases. Normally, users have to click on an "Apple Pay" button and then provide a fingerprint or facial authorization. But if the authorization has previously been made, that authorization can be applied in connection with the click on the Apple Pay button and remove the need to use the fingerprint after clicking on Apple Pay to complete the purchase. If the timing is set for say 30 minutes of use under an authorization, the system could present a notice that the need to reauthorize is approach and that the user has say 5 minutes left to make a purchase without an authorization.

The browser in a virtual reality environment could also include or have access to other data such as clothing size, shoe size and so forth, particularly if the user is cloths shopping in the virtual reality environment. That data can help drive what is presented to the user such that it fits the user's size or other preferences.

Cryptocurrency

It is noted that any of the APIs or financial transactions disclosed herein could be implemented through blockchain or similar technology. Thus, any communication between a buyer and a seller or products could be implemented through a contract on a blockchain and payment could be submitted through user addresses according to blockchain technology. For example, a smart contract programmed and implemented on a blockchain could receive and implement items in the transactions.

Another aspect of this disclosure is how to implement a "one-click" or buy button purchasing opportunity on a search engine result, in performing a task, or an in-store purchasing experience, an interface to a merchant site where a purchase can be made, or a buy button posting on a social network. The concept could also work simply from any application or website where a purchase of an item or service is possible or a web-based interface which is used to identify products in store and manage a purchasing process. In these contexts, to make the purchasing process more efficient, the payment/delivery information is stored at the search entity, social networking entity, a separate agent, a browser, or in any other location so that the data can be applied to a purchasing transaction in such a way that the user does not need to manually fill out fields (such as address, credit card number, etc.) to complete a purchase. Filling out these fields prevent more purchasing conversions. The approach disclosed herein can be done through APIs or other protocols to request data, retrieve the data, and fill in the payment forms and give the user a more "one-click" type of experience. This is implemented for example through the W3C Payment Request API, Payment Handler API, Google Pay API, Apple Pay API, the details of which are described in the priority applications to the present application. The browser or the payment API can also communicate with a payment app on the user's device to handle the payment process as well according to the payment app's functionality.

However, with a blockchain approach used for altcoin payments, there is no entity that "holds" the payment account like a credit card. There are three elements to the blockchain and using cryptocurrency to make purchases. There is an address, a private key and wallet software. The address is where others can send bit coin to the person or entity. The private key is the cryptographic secret by which a person can send Bitcoin (or any altcoin) to others. Whenever a particular altcoin like "Bitcoin" is referenced, it could apply to any type of cryptocurrency. The wallet can also store a record of the amount of altcoin that the user controls on the blockchain ledger.

Wallet software is the software that a person runs on their own computer to manage their Bitcoin. Wallet projects are provided by companies such as ChromaWallet, CoinSpark and CounterWallet. Other companies include Coinprism, Melotic and OneWallet. Typically, to send someone or an entity an altcoin, the sender scans the wallet address QR code or otherwise obtains the address characters for the recipient via email or other means. The sender uses the wallet application to enter additional information about the transaction such as the amount, fee, delivery costs, etc. When the sender confirms the transaction using their private key, a message is broadcast from the owner of the sending address to the network that x number of coins from that address now belong to the new address. It is authorized by the sender's private key. After a few minutes, the transaction will be inscribed in the blockchain per blockchain miners and a confirmation notice can be sent. An altcoin address as well as a public and private key is generated automatically when a user set up their wallet. The altcoin address is typically an identifier of 26-34 alphanumeric characters, beginning with 1 or 3, the represents a possible destination for a altcoin payment. Sometimes the address is represented as a QR code. It can operate like an email address. People with a user's public-key wallet address can send the person altcoins.

The present disclosure incorporates this functionality and simplifies it in the context of making purchases on the web, a mobile application or in-store. What will occur when using Bitcoin, Litecoin, Ripple (or any cryptocurrency) is, in one example, a new API that coordinates the altcoin payment through an individual's wallet stored on their device and the purchasing interface (i.e., a buy button search result, a purchase option on a merchant site or a buy now item posted on a social media site). Components such as storage, messaging, wallet interactions, mobile payments, identity confirmation, security, and reputation can be managed using tokens and proper communication protocols of the necessary information to integrate altcoin payments into the browser API widely adopted.

It is assumed that a merchant will accept cryptocurrency in this scenario. Thus, when the circumstances disclosed herein are applicable, and a buy button is presented to a user, or an option to purchase a product in-store, the user will be enabled to make the purchase using their private key to access their altcoin, and the address of the merchant to be able to receive the payment of the altcoin. The wallet software can keep a copy of the blockchain—the record of all the transactions that have occurred in the particular currency—as part of the decentralized scheme by which coin transactions are verified. The wallet can be browser-based, application based, or can be a separate application or smartphone wallet from Blockchain.info, Mycelium, Coinbased, Electrum or other provider. In other words, one aspect of this disclosure is to incorporate the wallet into a browser such that the user's credit/debit/other payment account is stored, their address, as well as their altcoin wallet. Alternately, a protocol (such as the W3C Payment Handler API) can communicate data between a browser (which uses the API between the browser and the merchant) and the altcoin wallet. Such an API is disclosed in the priority application to this application. For example, the wallet may share the address and the private key to perform a payment but then receive the details to add the payment to the blockchain.

As noted above, for a user to send altcoins to a merchant to make a purchase of an item, the user needs the address of the merchant and the private-key part of the buyer's wallet where the software will check that they have control over the altcoins to be paid to the merchant. In some cases people scan a QR code for the wallet address, or scan an NFC tag. That information can be stored right on the product label for in-store purchases. The RFID tag, NFC tag or code that is scanned by the mobile device can include the necessary information to enable a cryptocurrency payment. Usually, the sender (buyer) scans the QR code of the recipient's address and uses the wallet application to enter additional information about the transaction, such as amount, transaction fee (affirming an amount prespecified by the wallet software), or any other parameters. When the sender submits the transaction, a message is broadcast from the owner of the sending address to the network that x number of coins from that address now belong to the new address. The operating is authorized by the sender's private key. The sender may enter in their private key or a password or fingerprint, voiceprint, face print or other authorization may be used to retrieve the sender's private key. The transaction is received almost immediately at the receiver's wallet application, with an "unconfirmed" status and after about 10 minutes, the transaction is confirmed and can be inscribed in the blockchain per blockchain miners.

Applying the basic altcoin operation to the current scenario, several modifications and novel features must be implemented. The goal is to enable in a simple and easy fashion the ability of a user to choose an altcoin payment as though it was a Visa payment or a Mastercard payment managed through the browser API, although the altcoin is processed in a completely separate way. Currently, for example, in a user's Amazon.com account, several credit cards can be listed and one can be chosen for a payment. This approach will enable an altcoin payment for a purchase as well, and includes an in-store purchasing approach managed by the browser as an agent between the buyer's cryptocurrency method and the merchant site. The browser also acts as the agent between the merchant site for in-store purchases and the scanning capability or scanning components within the mobile device of the user while in-store.

Enabling a simple "one-click" ability to choose an altcoin payment process and then handle the payment has some issues. If a user is on a mobile device and wants to make a purchase, they will not be able to scan a QR code of the merchant address in an on-line scenario, but they could in an in-store scenario when they are making purchases. Not all buyers will have bitcoin type wallets. Thus, through an API a merchant advertising or posting an interface that a user can ultimately interact with to make a purchase can receive data that the person viewing the advertisement or interface has a cybercurrency wallet set up and has a profile that indicates that they might make the purchase through bitcoin or other currency. An API can exchange the necessary requirements and data such that in the context of an advertisement or other interface in which the user is in a state in which a purchase intent is indicated or can take place, such as in-store, the same kind of authentication used by the buyer's altcoin wallet can be integrated into the interface such that the user will just need to perform the same kind of function to access their private key. This might be through biometrics, a password, and so forth. The integration can include retrieving an amount of money, address of delivery, date, merchant, and all of such data with the application and retrieval or receipt of the buyer's private key and use of their cryptocurrency wallet so that the payment can be made in cryptocurrency but the delivery, management of the life cycle of the product purchase and delivery and potential return, etc. is handled in the normal fashion by the merchant. Any data necessary for confirmation or handling an in-store purchase can also be provided through these mechanisms.

In this regard, assuming that the data indicates that a wallet exists or a user preference notifies a merchant that altcoins will/can be used to buy products, the advertisement or the graphical presentation will include as part of its data the merchant address to which altcoins can be addressed. In one scenario, the "buy button" could include options to use a stored credit/debit card or any other traditional payment account or the user could choose a cryptocurrency account. If a traditional payment account is chosen, then the processes disclosed herein to utilize the payment account stored at the search entity, social media site, browser, other payment agent or other location to either process the purchase or transmit payment data to the merchant site through the API for providing the necessary data for the merchant to process the payment (i.e., so the user does not have to fill in the forms). The various requests and responses exchanged through the API enables the payment information/delivery information and/or other information to be communicated to the merchant site such that the purchasing process is simple and does not require the user to fill out fields in a payment form. All of this can apply for in-store purchases using the mobile device of the user and the browser as an agent to manage the product identification and payment process.

The process disclosed herein adds the cryptocurrency payment opportunity. If an altcoin payment is chosen, then the interface interacts through an API or other protocol with the user's wallet to retrieve the user's private key or enable the user to enter the private key so that the cryptocurrency transaction can occur and the merchant can be paid. For example, a one-time use token could be generated which provides the address and/or private key to the merchant site such that it can perform the payment function. Or, the API can receive from the merchant site the amount, merchant address, any other data such as tax, fees, etc., and the API can receive that data and communicate with the wallet or browser to process the payment from the user's altcoin wallet. The altcoin wallet could be integrated into the browser such that the processing is performed by Chrome, Mozilla, Internet Explorer, Safari, etc. If the API is between the merchant and the browser, a separate API or protocol could communicate the data between the browser and a user's altcoin wallet on their device. Again, the actual transfer of altcoin to the merchant can occur in any component that is workable. It could be through the user's altcoin wallet, an instance of the altcoin wallet incorporated into a browser, or through the merchant making the transfer.

Typically, the amount of the purchase in altcoin will have to be calculated because it originally will likely be set in dollars but will need to be converted into the corresponding value of the respective cryptocurrency that the buyer will use. The process in this regard could include accessing a data feed which provides a current value of the cryptocurrency in terms of dollars (or any other currency that the merchant is using). This access could be done in real time or near real time such that when the buyer makes the purchase, the proper value of the cryptocurrency is applied to the purchase. That value and data feed could be presented to the user at the time of purchase and could be part of the buying interface.

Some crypocurrencies might be used as bridge currencies such that the process could involve the user making a purchase in dollars, and the dollars are exchanged via an exchanger for XRP, which is then exchanged for euros. Thus, a portion of the overall payment process could include a crypto currency directly or as a bridge currency to convert from one type of currency to another.

The buy button and follow on screens that are part of the purchasing process can include a blending of the interface with access to the cyptocurrency wallet for the buyer. Thus, the interface could include a portion that is connected to or triggers payment through a traditional payment account, and another portion that is associated with the buyer's wallet for cryptocurrency. The user could be presented with a buy option to pay with Visa, Mastercard or Bitcoin. If the user chooses the cryptocurrency, then the system enables the interaction with the wallet such that through accessing automatically or manually, the user's private key is provided or accessed. Passwords, fingerprint/face print authorization, or manual entry of the private key can occur through the purchasing interface for the item, whether is it part of a merchant site, an advertisement, a Google Shopping graphic, a Purchases on Google interface (or any search entity interface), any browser image or application interface, or the use of a Payment Request API developed by W3C.org. The merchant can provide their address and once the buyer provides their private key, the transmission of the cryptocurrency from the buyer to the seller for the appropriate amount for the product can be achieved. All of the processes then can follow for the product as normal, such as tracking, product delivery, communication of delivery information, cancellation, modification, etc. can occur. For in-store purchases or for performing other tasks, the interface could be similar in the processing could be similar with the addition of any information or confirmations necessary for in-store security to enable user to take home the product, rent an object, perform a task, and so forth.

In one example, to maintain the user's private key on their device in their wallet, the process could include receiving a confirmation that the user wants to provide the payment through bitcoin or Ripple. Through an API, the merchant application can provide cost information, a transaction ID, merchant ID, merchant address, delivery charges, taxes, and/or discount data, etc. The API (browser) can communicate the data to the user's wallet directly or through a browser or a combination of both. The wallet can confirm and populate its fields necessary for a transaction such as the merchant address, the amount, notes, etc. The typical wallet can be modified to include transaction ID, merchant ID, user preferences (2 day shipping) etc. Much of this information, however, can also be provided through the API from an agent, the browser, a search engine, etc. Once the user's wallet is populated with the data for performing a transaction, the interface at the merchant site or app that the user is interacting with can then request a password or biometric confirmation to complete the transaction. Alternately, although less secure, the user could opt for just an automatic processing when the user clicks "pay" or a similarly styled button. With this interaction with the buying interface, through the API, a confirmation command instructs the wallet to carry out the transaction and transfer the altcoin(s) to the merchant or recipient.

Currently, the payment processing systems for credit cards, debit cards and so forth are set up for use by merchants. Thus, in the standard payment approach through the API, the payment account information is passed from the browser or other agent to the merchant site through the API for payment processing. The payment account data can be transmitted to the merchant in a secure, one-time use fashion and configured such that the payment can be processed but the merchant cannot store the user's payment account data. However, if the user chooses an altcoin payment approach, it is unlikely they will want to send their private key to the merchant. Processing the altcoin payment differs from a standard Visa/Mastercard type of transaction. Accordingly, in one aspect, the API will receive from the merchant their address, amount, and/or any other data needed to complete an altcoin payment. The API can then provide that data to the user's altcoin wallet, whether the wallet is separate from a browser or other agent or integrated into the browser or other agent. The altcoin wallet then can make a payment to the merchant address of the amount of altcoin to pay for the product/service. A transaction ID can be associated with the product purchased. Notifications can then proceed to be communicated through the API back to the merchant. The user through the interface can be notified of the progress and of what is happening at the back end ("Amazon is sending data to your Bitcoin wallet for processing a payment" . . . "Payment confirmed of 1.2 Bitcoin for the Television"). If the user has multiple different altcoin wallets, they could be processed in a similar fashion in parallel. I.e., the user may be able to choose whether to pay with Bitcoin or Litecoin (or any other altcoins that they own). Depending on which is chosen, the particular processing to access that respective altcoin wallet is carried out for payment. Payments could also be part crypto, part tint, part points, etc. blending of different types of payments could occur.

The above approach enables an integration of the use of cryptocurrency, even with its completely separate blockchain based payment process, with other standard forms of payment and payment processing through an API such as the Payment Request API and/or the Payment Handler API which simplifies the purchasing process by removing the need of a user to fill in payment form fields with name, address, payment account data, etc.

An example method of this approach can include receiving an indication that a purchaser has an altcoin account, presenting an option to make a payment using an altcoin account, and receiving a confirmation to use altcoin. The method includes communicating from a merchant site through an API with a browser or agent to provide information about a purchase of an item. The altcoin wallet can be configured as a separate application or integrated into a browser or other agent process or component. The altcoin wallet receives the data about the purchase and processes the payment to the merchant. The wallet can populate its data fields with the information received through the API from the merchant. The altcoin wallet can include the ability to communicate the payment details through a protocol to the browser or through an API back to the merchant. The merchant site interface can communicate updates to the purchaser of the success/failure of using their altcoin account to make the purchase. A data feed can be accessed to provide current pricing in terms of dollars. If the item is $20 to buy, then at the time of the purchase, the user can see that it would cost say 0.02 Bitcoin to make the purchase and they have 5 Bitcoin currently. The embodiments can include the processing as disclosed herein from the viewpoint of the altcoin wallet, the browser, an agent, a smart contract, either side of the API or APIs, and/or the merchant site. Therefore, claims can be directed to any component in this process and in any configuration (i.e, the altcoin wallet separate, or integrated into the browser, etc.). The ultimate goal is to make payment through altcoin as easy as a "one-click" purchase is for a Visa type payment. This process works for on-line purchases as well as in-store brick-and-mortar purchases.

The processing for such payments or the performing of some task could also be achieved through the use of a smart contract. The smart contract is a program that can be implemented on the blockchain and that performs certain actions in a trustless manner. In other words, it performs its operations in a known and transparent way using the distributed approach of the blockchain technology. Smart contracts are autonomous, self-sufficient and decentralized. They automatically run and perform the programmed functions. There is no need to "trust" a human to perform one part of the contract. In one example, a smart contract can be used for all or part of the processing disclosed herein. For example, assume that the user interface of a merchant site (for on-line or in-store purchasing) provides an option for a user to buy an item using their altcoin. The user confirms the purchase with a "pay" button. The amount say is 1 Bitcoin. The instruction or confirmation of that commitment by the purchaser can be transmitted with 1 Bitcoin to a smart contract, operating on a blockchain technology. The seller of the item can perhaps confirm that they have the product and can deliver tomorrow or that the user can take the product out of the store. The smart contract can transfer the 1 Bitcoin to the merchant and send a notice to the buyer that the item is on the way or a confirmation to a security infrastructure that the user has purchased the product and can take it home. Or, the smart contract could be programmed to deliver the 1 bitcoin to the merchant when a delivery confirmation occurs. At some stage, the communication and tracking of the packet can transition to a normal tracking and notification process such as is operated by Amazon.com for managing purchases made, return policies, etc. If a return is to be made, the merchant can transfer 1 Bitcoin to the smart contract which can then make a payment according to its protocol to the purchaser. Thus, in this respect, the disclosure covers all communications, requests, responses, and data communicated between a merchant site, through an API, to a browser, altcoin wallet, smart contract and/or other agent to achieve a one-click (or simplified) purchasing option of using altcoins for payment in the same fashion as a regular payment account. Because of the different way that altcoins are used, current API's like the Payment Request API must be modified to accommodate the alternate payment structure of altcoins. By extending the API and including the components of the altcoin wallet and/or smart contract to carry out functions in the process, an improvement to the way purchases are made can be implemented to add the ability to pay through altcoins.

The smart contract could also be programmed to perform at task. Once a user is identified via a fingerprint or facial recognition, the smart contract could cause a door to be opened or a gate unlocked. Medical data could be released. Video content could be streamed. A combination of tasks could be initiated via, for example, the scanning of an NFC tag. A payment could be made, a door unlocked, and video could be streamed to a theater.

Yet another aspect of this approach could be payments to the user's altcoins wallet. For example, with the altcoins structure in place which can include the buyer's address and the merchant address, altcoins payments could flow both ways. Thus, small incentives could flow to users. Currently, if an advertisement is clicked on as part of a search engine result, the search engine gets paid. Integrating the user's wallet into the process could enable the advertiser to pay the buyer that clicks on their advertisement some altcoin. Buyers or shoppers could get paid for picking up a product in store. When the mobile device identifies a product and they look at it, advertisers or merchants might pay the user a small amount for handling the product and considering the purchase. Graphics could show for example how much altcoins a user generates by clicking on the advertisement, picking up the product in store, and/or browsing content on the merchant's site. When the user arrived at the state in the navigation where a purchase is made, the user could apply the altcoins they made via browsing on-line or in-store to the purchase or keep them. User could earn points for interacting with products, which can be applied as a discount at purchase. All balances and adjustments at the conclusion of the purchase could be implemented in any fashion, including through submission to a smart contract. Special rates, discounts, incentives, etc. could be provided through credits to the user's altcoins wallet which are completed or finalized at the conclusion of a sale. Such credits could also automatically be made throughout the process. Thus, when a user clicks on an advertisement, altcoins could be transferred to their altcoin wallet automatically through the integration of their address with the browser/agent, or a promise to transfer altcoins of a certain amount could exist or be presented such that the final actual transfer occurs if the user clicks through and buys a product on the site. The transfer could even occur if the user does not buy with altcoins but with dollars or some other currency. This aspect covers all the variations on how a merchant would provide altcoins back to buyers as they interact with their site or are in their store or through other means such as texting, emailing, social media interactions, and so forth. If a user likes a merchant or non-merchant site, or spends more than 20 minutes within a brick-and-mortar store, that site can send altcoins to the user's wallet. This will enhance the user's experience and encourage them to engage more with the merchant or other site or spend more time with the brick-and-mortar store.

Another aspect could be using the blockchain to store and maintain knowledge about browser API transactions. A blockchain is a distributed database that maintains a continuously growing list of ordered records called blocks. Each block contains a timestamp and a link to a previous block. By design, blockchains are inherently resistant to modification of the data—once recorded, the data in a block cannot be altered retroactively. Through the use of a peer-to-peer network and a distributed timestamping server, a blockchain database is managed autonomously. Blockchains are an open, distributed ledger that can record transactions between two parties efficiently and in a verifiable and permanent way. The ledger itself can also be programmed to trigger transactions automatically"

Blockchains are secure by design and an example of a distributed computing system with high byzantine fault tolerance. Decentralized consensus can therefore be achieved with a blockchain. This makes blockchains suitable for the recording of events such as purchasing transactions as disclosed herein.

The first blockchain was conceptualized by Satoshi Nakamoto in 2008 and implemented the following year as a core component of the digital currency bitcoin, where it serves as the public ledger for all transactions. The invention of the blockchain for bitcoin made it the first digital currency to solve the double spending problem, without the use of a trusted authority or central server. The bitcoin design has been the inspiration for other applications.

For example, one could develop a blockchain record of all purchases made through a particular browser, for a particular user. The blockchain could also be narrowed down to tracking transactions using one payment account available through the browser API. So if a user has a VISA account available and Apple Pay, all payments using the visa account could be maintained on the blockchain. Or it could be purchases made through the API that are stored. In this regard, the API could be modified so that the data associated with the transaction, which could use one or more of the pieces of information associated with the transaction (name, address, payment account, product, price, discounts provided, time of order, time of delivery, taxes paid, etc., whether it was a gift, returned items, follow on history of the purchase, context of purchase such as advertisement on Facebook, or transition from a Google ad, etc.). The structure of such a blockchain could be accessible to other services. The management system that utilizes information about purchases to help a user can draw upon information in the blockchain for that transaction or for that browser. Other transactions such as Amazon.com purchases could also be input to the blockchain for that user or that account.

A claim could cover receiving information about a purchase made via the Internet and creating a blockchain record utilizing the information. As later purchases are made using the account, API, browser, PWA, App., person, etc. can be added to that blockchain to record and make available the information. This includes in-store purchases.

The problem to be solved is as the user buys products across the web and in-store using the browser API, how does one easily manage those purchases, tracking the purchases, cancelling a purchase, changing parameters (shipping model), and so forth. There is no mechanism for a person to go to one place where they can see all of their various purchases. If each purchase for a user is added to a blockchain, private or public, and there is an API or mechanism for reporting purchases across the internet to a blockchain that is continually built based on each purchase then this disclosure also provides the ability to then access that data for an individual. Access to the blockchain for that individual could be granted as part of the authorization for a purchase (fingerprint for Apple Pay or CVC code for a VISA purchase), an agreement could include that when the user authorizes the payment that includes an authorization to add to or access their blockchain of purchases. A great benefit of this approach is that it can cover all purchases on-line and in-store in a simplified approach.

If the user is basically accessing their purchase history to make changes or track a purchase, the user could authorize access to their data through a user interface and when that access is granted, information on the block chain can be converted into a user interface similar to the listing of products purchased on Amazon.com but across merchants and/or apps. In one aspect, too, a user could sell access to their blockchain. Users may make money by offering people access to their blockchain. Some information in that case could be anatomized such as their name and address. The data could be provided on an anonymous basis such that the data is provided for product, time, context, and zip code but not name, address, account number, etc. Physical information for in-store purchases can also be provided or anonymized as well.

In one aspect, a merchant site will receive the payment information through the API as a tokenized payment or as a payment account number, name, expiration date, etc. The process with the blockchain can use that information in whatever form it is to identify which blockchain to access to append the data of the current transaction. It could also be accessed through some other mechanism like the user's name or another ID number associated with the browser.

Further, the blockchain may be identified by the user identity and thus multiple accounts could be associated with the user and stored on the same blockchain. Other data such as the user's body model which stores their shirt, pants, shoe sizes and other body related data can also be stored in the blockchain.

The blockchain could be built from browser API purchases or any other purchase including brick and mortar purchases. A user could sign up for a service that would cause each purchase using their various accounts that they use to be reported to a blockchain service such that the user can access all of those purchases from a single user interface, similar to how users can access and manage the history of purchases. A blockchain service can be established with an API that companies interact with whenever the user makes a purchase, whether it is on line, at Amazon.com, through the browser API, in-store, etc. A parameter could be set associated with the payment account or user account such that a certain set of details associated with the purchase is communicated to the blockchain service API. Thus, if a person purchases a book on Amazon.com using their stored VISA account, the details of that purchased can be communicated through an API to a blockchain service provider who creates a block for that purchase. Next, the person buys a hammer at Home Depot using the VISA card. Because the parameter is set, the details of the purchase including one or more of the purchase of the hammer, the time, the location, etc. can be communicated to the service via the API and that purchase can be added to the blockchain. Next, the question is how does the user gain access to the data of all those purchases? The user may want to go back and return the book. Where people are making purchases across different merchants and different payment approaches (some merchants will use a shopping cart, others will use the browser API, Amazon.com, in person, etc.) users will desire to have all of their purchases available for management at one location. The blockchain service can offer a management user interface which presents to the user the purchasing history and status. The blockchain service can also receive tracking information from distribution entities (FedEX, UPS, etc.) through an API that can associate a tracking status with the particular product and include updated data on the blockchain. Thus, in this respect, the blockchain can be continually updated. The blockchain service can present the information via the user interface. The access to the user interface can be via a website, an app, a browser API interface, a selectable object or a selectable menu via social media, in a digital wallet interface, or an Apple Pay interface or Google pay interface, etc. In other words, at any virtual location where the user "is", a selectable object can be presented which enables the user access to the purchase management interface. The selectable object can also be presented at multiple locations available to the user including options within the browser. For example, in Amazon Assistant or another plugin to a browser, the service can provide an updated listing of previous purchases and their status. The underlying data for this status update can be based on the blockchain.

Further, the information that can be stored in the browser, such as payment account, address, etc., can be stored on the blockchain and accessed from the browser. A separate API could also be called to a service which stores that information on the blockchain and returns the payment account data, a token, address information, name, etc. Thus, the blockchain could hold the information rather than the browser, and once the browser receives an API request for payment information and/or other information associated with a purchase or some other task to be performed, the browser can access from the blockchain the necessary information. This can occur in several steps as well. Further, the merchant site could also access the information from the blockchain as well through an API directly to the blockchain rather than through the browser functionality. Where apps are used, a software module programmed to perform the function of the API(s) can communicate with the app to handle requests and responses.

Using this approach, an individual could store in one blockchain their payment information, address, task data, identity data, etc. and any site that needed that payment information or task data could securely access it through the appropriate API. A digital wallet on a device could be the mechanism to access the blockchain with the information. The browser (any time "browser" is used it also can cover a user interface or an agent for the merchant), once it receives an API request, could identify that rather than having a Visa account stored in the browser, that the blockchain digital wallet (or access agent) is to be used to obtain the information. The browser communicates with the access agent to retrieve the information from the blockchain and return it to the browser. The browser communicates the information through the browser API to the merchant site for payment processing.

Other APIs can provide a site with data about the particular user that is browsing to make a purchase as well. For example, location, age, income level, purchasing habits, social media data, browsing history, in-store purchasing history or other in-store data, types of accounts the user uses, how much money is in a user account or accounts, or other information about the user can be provided to a site such that the data can be incorporated into the decision making process of how to present a payment button, how to modify the payment flow for that user, or how to present a user interface for managing product identification and purchasing for in-store shopping. Machine learning, artificial intelligence, rule-based logic, or any other such approach can utilize training data with respect to how users react to payment flows to dynamically present a particular flow or user interface for a particular user such that their experience can be consistent across payment platforms. This can include NFC POS purchases, in-store browser-based shopping and purchasing, on-line, in-app, and mobile purchasing. Embodiments can include claims from the standpoint of a merchant site sending and receiving data as described above, claims from the standpoint of a server or cloud-based service that receives requests and provides responses to help sites configure their payment interface for users, browser-based claims where the API is updated to receive requests and provide responses from the browser acting as an agent to give parameters or data to a site to improve the interface for less friction in the purchasing process. The browser can also use another API that communicates with a network based application to send data back to the browser, which can then send data back to the site for dynamically presenting the interface.

The mobile device disclosed herein could be any kind of mobile electronic device capable of identifying a product in-store and for making or handling the purchase of that product. For example, a device having a chip which could be used to receive or communicate with a tag on a product in-store could be sufficient even if the device simply stored information about the purchases for later retrieval and actual payment. For example, a credit card having the appropriate chip contained therein could suffice.

Blockchain-Based Processes

The following further describes a browser and website-based approach to enabling a purchase of a product based on a code, NFC patch or tag, or a graphical feature on the product or box of the product. The code or tag is developed to provide data about one or more of the product, the merchant, the manufacturer, the date of purchase, the purchaser, the URL, accessory products, and so forth. If Mary is at her friend's house and sees a lamp that she loves and would like to buy, a code or tag could be sown into a lampshade, placed on the bottom of the lamp, or some other location which is accessible to Mary. To purchase that lamp, Mary needs to be able to scan that code with a mobile device or tap the tag to retrieve the data via NFC. The question is how to easily position the device into a scanning mode that is easy to remember and to access. An act could be used which Mary could open which with an access the camera and upon scanning the code, initiating a communication to a network-based server for presenting a user interface which enables Mary to purchase the lamp and have it delivered to her home with any kind of payment mechanism including those such as payment request API based mechanisms or other mechanisms. Using an NFC tag might be as simple as tapping the tag to initiate a browser and receive the appropriate user interface for taking next steps to purchase the product, browse for other products, or perform a task.

In another aspect, where downloading an app might not be desirable, a website can be developed which will enable the initiation of the necessary steps. The user could go to, for example, www.iwantthis.com or buyitcode.com, or any website that is configured to enable the purchasing process to proceed. The user only needs to open their browser and go to the website. The benefit of this approach is that no separate app needs to be found amongst perhaps tens or hundreds of apps on the user's phone. Upon going to the website, the website returns a user interface it is coordinated with the camera on the phone so that the user can recognize that the mobile device is in a mode of being able to capture an image of the visual feature on the product. Of course, other mechanisms of entering data such as typing in a code, tapping a tag, or taking a picture of the item which can be correlated with store pictures to identify the item, or any other mechanism is also available of identifying the item. Any task could also be performed beyond a payment, such as opening a door, registering for a site, starting a car, rent a space, home or an object, and so forth. Where scanning a code is mentioned, it can also include retrieving data through tapping or a user device being close to an NFC tag.

Continuing with the concept of the browser as instructed by the website initiating communication with the camera and configuring user interface that is ready to scan a code, once the code is scanned the data retrieved from the code can be transmitted back to the website. The next step is to enable the user to easily be placed into an amazon.com type one-click purchasing state. In one respect, since the website that enables the scanning to occur is not the merchant website, the website could utilize the URL information retreat from the code and immediately transition the user to the proper merchant website (say www.merchant.com) in a state of showing the lamp and configured with a buy now button which can enable the user to simply click on the button and confirm a payment through a payment sheet, biometric, or other simple mechanism to finalize the payment and delivery. Through Apple Pay, Google Pay, AliPay, PayPal, Samsung Pay, Amazon Pay, cryptocurrencies, blockchain-based payments, etc., the user can make a payment and have their address information passed to the merchant site as well as any other necessary data to enable an easy purchase.

The website could also configure the response to receiving the product data in various ways. For example, the website could return a primary selectable option of the product (the lamp Mary is looking at) from the very same merchant. In this regard, an extra step of having Mary select that option might be included which would then transition her to the merchant.com website. The purpose of providing this option might be to include other options as well. Example, price comparisons, other merchants with cheaper lamps can be presented, used lamps of the same type might be presented. Thus, Mary might be presented with a first merchant that sold at the same lamp to her friend, a second merchant that is a competing merchant with the same lamp for a cheaper price, a third merchant that has the lamp for sale used, and even a posting of the same lamp, and so forth. Indeed, by placing the code/tag on the product, resellers can access that same data so that an eBay or a used product store can enable the websites to have the data said to them that that very product is in their store or being sold on eBay as well. Thus, the website can coordinate the various ways and mechanisms that the user can buy that lamp. An interface could also include the option of Mary buying the lamp right from her friend. If the code/tag of her friend includes the original purchaser information, the interface could include an option for Mary to pay her friend and they could enter the amount for the lamp. All of these options work for rentals as well.

Furthermore, the website can coordinate the accessory presentation as well. The return the user interface after scanning the code/tag can include a first merchant and a second merchant as well as several popular accessories which might be associated with the product. Packages or bundles of product could be purchased together at a discount as well. For example, if Mary was looking at a shirt that her friend was wearing and scan the code for that shirt, Mary's body model could be sent to the website along with data about the shirt and the website could configure an entire clothing ensemble with pants, jewelry, and shoes which could be purchased as a bundle for a discount with the shirt. A variety of different bundles could be presented so that Mary could simply scan through two, three or more different ensemble's with the shirt and different colors of pants, different jewelry, etc. such that she could purchase one that is appealing to her. These can be presented on her body model. Other tasks can be coordinated as well. A user might purchase a shirt and open a door. The code/tag can be designed to stack tasks depending on the circumstance. A user might make a payment which then triggers the opening of a door. Users could go to hotel rooms with a code/tag at the door and scan the code/tag at a door and just pay right there and enter. Using this approach, there is no need to check in or get a door key.

The user interface could also allow a user to view an ensemble of items and/or tasks and delete items. For example, the interface could allow her to see an ensemble and remove earrings or remove the shoes and only by the shirt with the pants as a package. Again, a buy button could be presented at any stage in which she could purchase the ensemble or some portion of the ensemble and have it delivered easily to her home. As noted above, the ensemble can include different types of items such as a task to rent a parking space and an order of lunch at a stadium to be delivered to a particular seat.

The technical benefit of this approach is that it enables an easy and accessible way to initiate a purchase of a product or some other task that the user sees at a friend's home or just out in the world and can include products in store if they have the code on a tag or built into the product or associated with the product.

Other data can be transmitted to the website as well such as location data associated with the mobile device personal data associate with the user, social media data, and so forth. The data can be used to configure the user interface and more personalized way. For example, if Mary has a son who is 14 years old and has a birthday coming up, the product that is scanned might be a product that is likely to be a birthday present for her son. Having such data might cause the website to change the order of options to be presented or make other adjustments. For example, the first option might be to enable Mary to select the exact product from the merchant that sold the product to enable her to purchase the same product. The second option might be to purchase the product but gift wrapped for her son and add an accessory product which might be age-appropriate. Artificial intelligence to be used to gather all of the available data associate with the scan and to make decisions regarding how to present the user interface to the user for maximum efficiency enjoy ability and maximum conversion.

Of course the feature or label itself could instruct the user regarding the URL to enter into the browser—such as www.aftersale.merchant.com. That site can be configured to enable the access to the camera to then scan the code/tag for that product and the data will be returned to the right merchant in the first instance. Thus, the user could access a state in which they can purchase the produce either through a broker/management web site that manages the initial process to access the camera and get the code/tag data or the user can go more directly to the right site, which can initiate the camera to get the product data and return an interface for enabling the user to buy the product.

In another aspect of this disclosure, a mobile device could have improved camera app that enables the user to simply open up their camera and focus it on a QR code or some feature of the device. A particular pattern could be recognized by the camera app which could then trigger a QR code reader to interpret the code and launch the functionality disclosed herein to enable user to purchase the product. The camera app could in this regard communicate with a QR code reader app via an API or some of the communication mechanism. In another aspect, the camera itself could include the necessary components to interpret the images that it is processing to detect a feature that would trigger this functionality. In another aspect, the user might be able to simply take a picture of the feature or several pictures of the device or item itself and simply email them to particular email address (iwantthis@merchant.com) for further evaluation for identification of the product and to process a purchase. A return email address or a text within Apple Pay option for the product could be returned. Of course user could text the photo or photos as well. If the mobile device has sufficient processing power, the product could also be identified locally. However, is more likely that a more powerful server would be needed to receive several photos of a product and evaluate those photos for identifying the product. In this scenario, the particular merchant that the product was purchased from would not likely be identified in the some visual feature would indicate a merchant. In this regard, merchants could begin to add visual indicators of the merchant on products that could later be identified through pictures.

If the item is a parking meter or a vehicle, the user might be able to just take a picture of the parking meter which can have codes, numbers (of a space or street) to identify the location, and that data can be used to initiate a browser and access a website to provide the interface to pay to rent the space. Any task could be performed using these principles.

As noted above, a return text or email to be sent to the user with options for purchasing the item or best guesses regarding which item was sent. The system could also provide the updated versions of the item to encourage the user to purchase the latest updated version of the particular product. Where the photo app on a mobile device is able to be opened, and capture an image having a QR code or the like, the photo app individually or in connection with another app could be programmed to then communicate with a browser or other app to launch a purchasing interface. Thus, the process could be as follows. The user sees a product they desire and sees a QR code associated with the product that is scanable. The user opens their phone app on a mobile device and focuses the camera on the QR code. The camera app detects through physical characteristic of the QR code that it is viewing particular code and switches to a QR code reading mode identify the data in the QR code. Upon successfully identifying data from the QR code that can include information about the product, the URL for purchasing the product, and so forth as described herein, the camera app can communicate via an API with a browser or other app. An NFC tag could also be used to provide the necessary data to a user device. The communication via the API can include protocols for initiating the browser or app and passing the necessary data to launch the browser or app, connects to a network-based server, communicate information such as user contact information, product identification information, user body model information, payment capabilities associated with the browser or app, user preferences, and so forth. This information can be drawn in whole or in part from the QR code or tag and may also be drawn from data stored on the mobile device with respect to user preferences, body model, and so forth. The QR code can trigger the camera app and/or the browser or other app to retrieve the package of data which would be appropriate to send to the network server in connection with the product. Thus, the browser or app may retrieve a body model, a user address, or social media data or purchasing history data, and so forth such that a data package can be transmitted to the merchant site for responding to the scanning of the QR code with the user interface that is ready for the user to either purchase the product, make adjustments to the product such as picking an alternate product were competing product and make a simple purchase such that a sale is achieved with a reduced number of clicks or effort by the user.

In one aspect, a limited amount of data is first transmitted with respect to the product only to the appropriate website. In this regard, the user data, address data, or any other personalized data might be withheld. Then if the user indicates a desire to see an item of clothing, for example, in more detail, the system could send a body model to the site. Furthermore, if the user when viewing a product interface desires to purchase the product and clicks on a buy now button, then the browser or app could send the payment data and address and other necessary information for completing the payment and delivery process is the APIs available.

Blockchain Approaches to Using Codes/Tags on Products

The following provides novel ideas related to the blockchain and using QR type codes or NFC tags on products for product transactions or codes/tags on objects for performing a task. A merchant can also create a blockchain token associated with the product. The token can be accessed or associated with the code/tag attached to the product or object. The user could have ownership associated with the product in the token attached to the product or object. The token can be issued when the first purchase of the product occurs or as the product is being made (starting with manufacturer, to the retailer, to the buyer). An owner of a product could scan the product and access data associated with a blockchain-based token could then cause a transfer to a new buyer or a new owner and they could give them the product. The transfer of ownership could be managed and accessed by a scannable feature. Encryption, biometric readers, or other mechanisms could be added for security purposes to confirm a transfer of an item and add a block to a blockchain as part of a transaction. An NFC tag could also be used to track the product and sales associated with the product. This could be particularly useful for cars, artwork, or more valuable products that are expected to increase in value.

With respect to the user who sees a product and wants to buy a similar product, the system could enable the user to scan a feature and identify the token attached to or associated with the product. That token can then have the data necessary to enable the buyer to purchase their own product. A new token could be mined or transferred for the user to purchase their own similar product and have a new/separate token attached to their product. Special additional value or services could be added to the purchasing experience by virtue of the fact that a user is buying the product "in the field" and from the scanned feature.

A token could be a generated as a product is built/made, and the token could be transferred to or reflect the buyer as the new owner of the product. And access to the token can be triggered by a scan of an item or feature built into the product. The token could store the data discussed herein about the time of the purchase, the date, the buyer, the location, and other data associated with the purchase.

In another aspect, where the device or product contains location-based technology, data from the device such as its location, interactive data, or other data can also be added to or associated with the token for that device.

In another aspect, a product like a car can have a physical title associated with it—on a sale of the car from one person to another, scanning a code/tag or identifying the title, can enable a sale of the product from one person or another while also enabling the transition of the physical title (or digital version) to the new owner. When the user scans a code/tag on a product, the option can be presented to buy another copy for the buyer from a merchant, or whether the user wants to buy that product from the current owner. If the user wants to buy the specific product, and there is a separate title associated with the product (like a car), upon authorization, the title can be transferred simultaneously with the data to the new buyer. Any security mechanism can be used for such a transfer such as a private key, biometric, multi-factor authentication etc. Where a person is buying a new product for themselves, the process can involve generating and digitizing or tokenizing on a blockchain, a new title for the new product.

This approach can also be used to generate an initial title that can be stored on the blockchain or tokenized or stored in a digital manner. When a car is first purchased, for example, through the car ID number, a graphical feature built into the car, or other mechanism, the buyer can have a token created that connects or provided evidence in the same way as a physical title that they are the owner of the car. Then, if the user sells the car, the new buyer could scan the code or enter in the car ID number and a user interface can be generated and enables the first owner to confirm via biometrics, or other security mechanism, that they are part of the transaction, and then the buyer can also confirm via their biometrics or other security measure, and the transfer can take place. A money transaction can also occur as part of the process. A smart contract can be built to receive and confirm each party's participation and confirm and carry out the transfer of the title and transfer of money and other mechanisms. Confirming emails can be provided as well. If both parties were to use Apple Pay, for example, the face recognition or the fingerprint recognition capability can also include or automatically cause the exchange of the title as well as handle a payment.

Accessing a smart contract can be triggered by a QR code, NFC tag or other code or feature. A car could have a code/tag built into a door or hood or at some location where a buyer or the seller could scan the code and initiate processing of a smart contract. The smart contract could provide an interface to the user (buyer or seller) to identify the buyer and seller and the amount of the sale. The interface could confirm that the buyer title is clear and ready to transfer if a sale occurs. Accessing the smart contract can be triggered by the code/tag much like accessing a website is described above for performing a task. Either on the same mobile device or via a text, email or other communication to one or more devices, the smart contract could request a confirmation of the transaction. The seller could get a text with a link to confirm that they want to sell the car for $1500 and will confirm a transfer of the tile to the buyer John Doe. John Doe can get a text or other communication to confirm the money transfer to the seller of $1500 and confirm that the title will be transferred to him from the seller. Upon confirmation, and receipt of the money at the smart contract, the smart contract can exchange the title and money and the transaction can easily be completed.

In one aspect, if an NFC tag or other electronic component is used to trigger a transaction, there is data in the NFC tag used to implement processes. The data could include an identification of a current owner or could include the URL data to access a smart contract or database identifying the owner. If the product is sold to a new owner, the databases, smart contract, blockchain data, and so forth could be updated. In one aspect, the mobile device NFC component could also reprogram an NFC tag on the product to update the current owner or any other data as well.

In one aspect, the user scans the code/tag, which triggers a browser to access a smart contract associated with a process or task, and the smart contract initiates a user interface which can enable the user to interact with the smart contract to provide data, user identity information, confirmation of a payment or task, and so forth. Thus, tasks associated with the smart contract can be performed through a processing of a low friction initiation using the code/tag on an object.

Real-World Token Assets

Real-world asset tokens are a digital representation of a tangible real-world asset. Take gold-based tokens for example. The idea is best summed up by Jim Manning— "The token and the particular amount of gold it represents are one and the same. So while it's not entirely incorrect to think about the token as a unit of value that derives its worth from the price of gold, it's even more specific, as the token represents a particular piece of gold owned by the user. The token acts like your record of ownership of an asset, effectively becoming the digital shadow that a real piece of gold casts into the virtual world." Using this approach, the real-world asset token can be associated with any product and accessed for a trade or any action through a scan of a QR code, NFC tag or feature of the product using the approaches disclosed herein. The novelty primarily lies in the access approach and how one can initiate the transaction easily for a user who sees the asset and wants to buy it or a similar version of it. The title can then be confirmed on the blockchain which records the transaction and transfer. Of course borrowing products, car rentals, or leasing products could also be processed in a similar manner.

For title-based products—a user who owns the title to a product can scan the code/tag and have an interface presented as the owner of the title (product) that enables them to choose an option to sell the product or transfer the title. For example, the user could identify a buyer and provide data to the interface about the buyer and contact information like an email or text data. The seller could confirm their identity through an apple pay or biometric type approach. The system could then email or notify the buyer via an email to click on a link to make the payment (through again any approach but Apple Pay is one example). The biometric authorization for the payment could also be tied to a confirmation that they are going to receive the title after payment has cleared or been confirmed. In that scenario— the triggering of the transaction began with the scan of the code/tag on the product. Natural tokens or real-asset tokens can be used for tracking items and transactions associated with items as described above.

Figure 24:
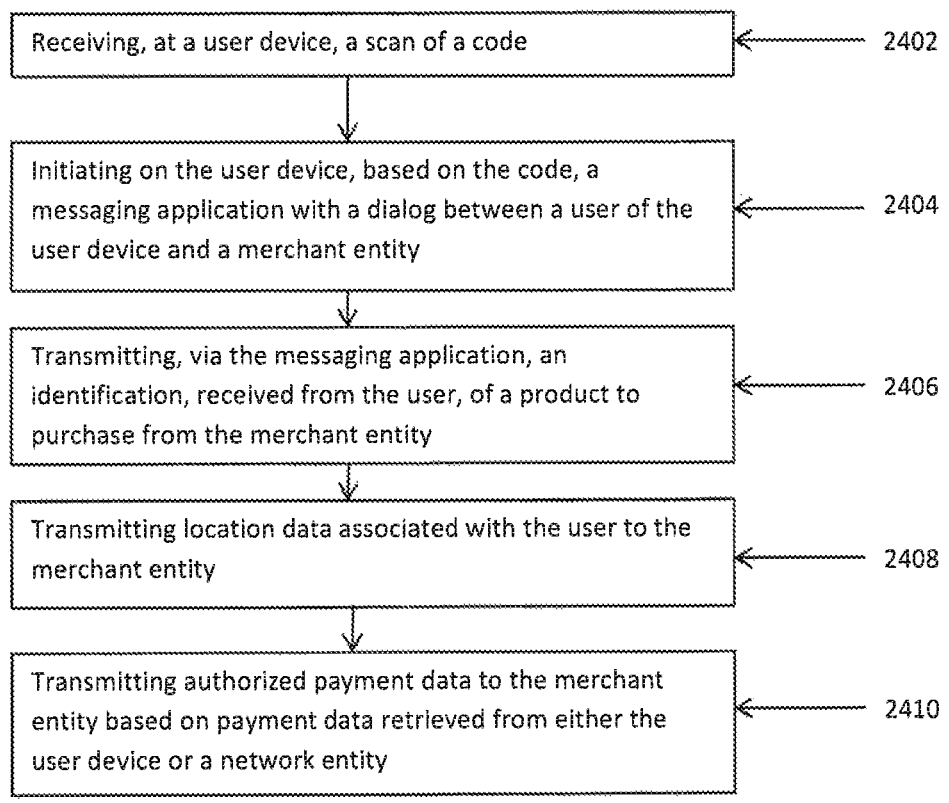
FIGS. 24-31 illustrate different example methods.

FIG. 24 illustrates another method example of this disclosure. A method includes receiving, at a user device, a scan of a code or tag (2402), initiating on the user device, based on the code, a messaging application with a dialog between a user of the user device and a merchant entity (2404), transmitting, via the messaging application, an identification, received from the user, of a product to purchase from the merchant entity (2406), transmitting location data associated with the user to the merchant entity (2408) and transmitting authorized payment data to the merchant entity based on payment data retrieved from either the user device or a network entity (2410). The merchant entity can deliver the product to the user based on the location data. A software module operating on the user device can perform operations including (1) receiving, at the software module and from the messaging application operating on the user device, and according to an application programming interface that defines a protocol for communicating data between the messaging application and the software module, a request associated with the product to purchase, wherein the request comprises information about a purchasing transaction and (2) transmitting, from the software module and to the messaging application, according to the application programming interface, the authorized payment data, wherein the software module retrieved, based on the request, the authorized payment data for the purchasing transaction from one of the user device or a network-based entity separate from the device. Other data could also be shared in this manner for performing other tasks.

The authorized payment data can be associated with a transfer of cryptocurrency from the user to the merchant entity. Transmitting authorized payment data to the merchant entity can be based on payment data retrieved from either the user device or the network entity occurs via an application programming interface programmed into a software module operating on the user device and which transmits the authorized payment data to the messaging application.

Figure 25:
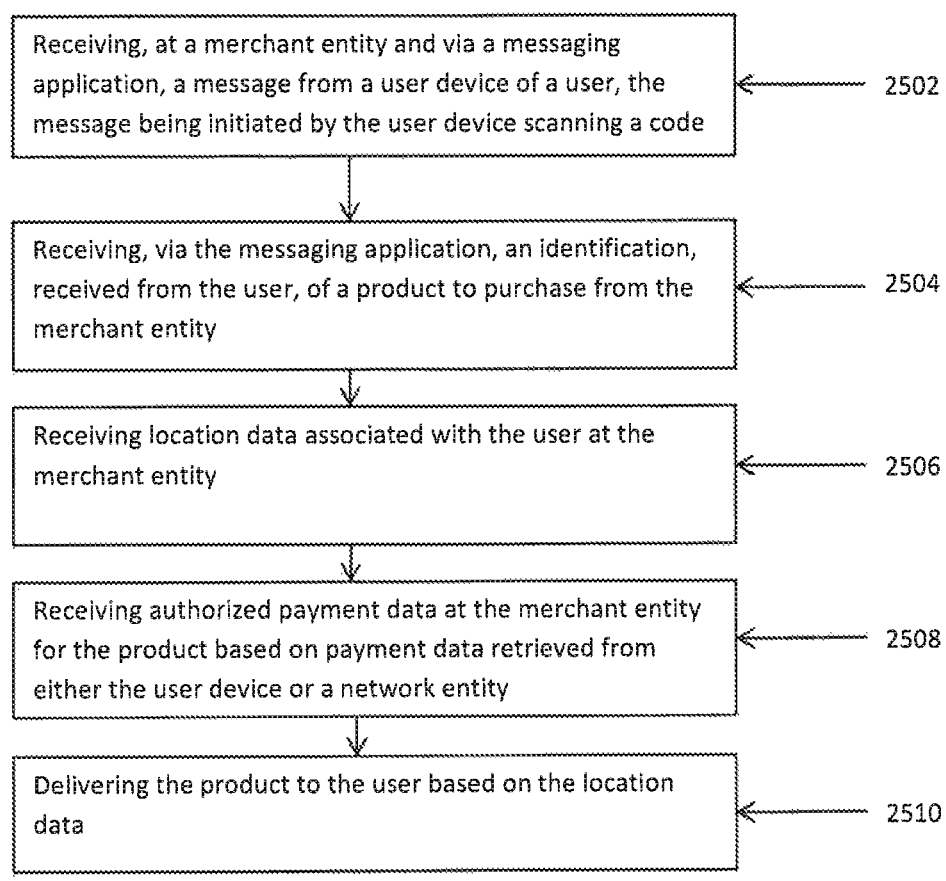

FIG. 25 illustrates another method from the standpoint of a merchant site. According to this example method, a method includes receiving, at a merchant entity and via a messaging application, a message from a user device of a user, the message being initiated by the user device scanning a code (2502), receiving, via the messaging application, an identification, received from the user, of a product to purchase from the merchant entity (2504), receiving location data associated with the user at the merchant entity (2506), receiving authorized payment data at the merchant entity for the product based on payment data retrieved from either the user device or a network entity (2508) and delivering the product to the user based on the location data (2510).

A software module operating on the user device can perform operations including (1) receiving, at the software module and from the messaging application operating on the user device, and according to an application programming interface that defines a protocol for communicating data between the messaging application and the software module, a request associated with the product to purchase, wherein the request comprises information about a purchasing transaction and (2) transmitting, from the software module and to the messaging application, according to the application programming interface, the authorized payment data, wherein the software module retrieved, based on the request, the authorized payment data for the purchasing transaction from one of the user device or a network-based entity separate from the device.

Figure 26:
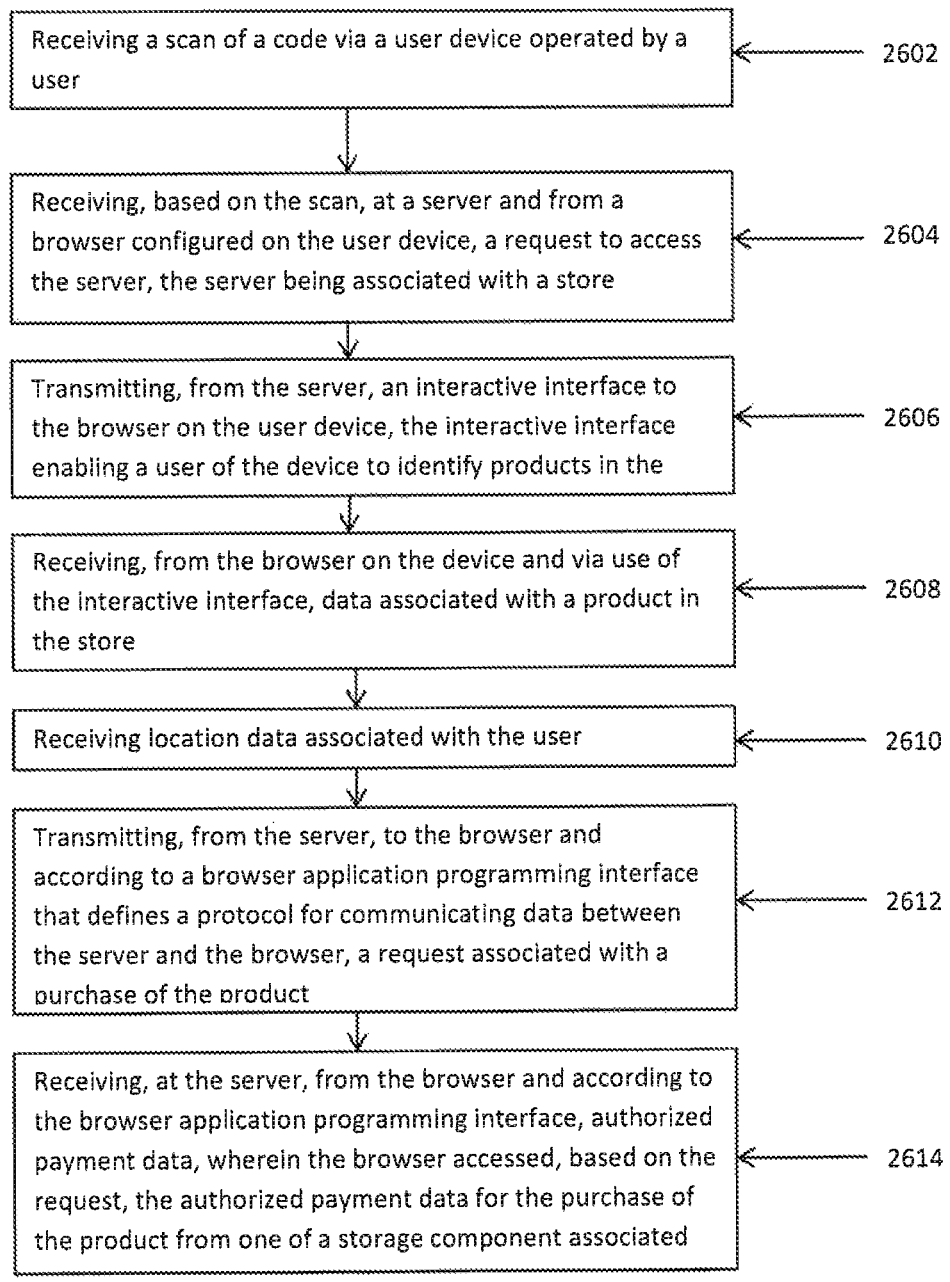

FIG. 26 illustrates another example method from the standpoint of a server. A method including receiving a scan of a code via a user device operated by a user (2602), receiving, based on the scan, at a server and from a browser configured on the user device, a request to access the server, the server being associated with a store (2604), transmitting, from the server, an interactive interface to the browser on the user device, the interactive interface enabling a user of the device to identify products in the store (2606), receiving, from the browser on the device and via use of the interactive interface, data associated with a product in the store (2608), receiving location data associated with the user (2610), transmitting, from the server, to the browser and according to a browser application programming interface that defines a protocol for communicating data between the server and the browser, a request associated with a purchase of the product (2612) and receiving, at the server, from the browser and according to the browser application programming interface, authorized payment data, wherein the browser accessed, based on the request, the authorized payment data for the purchase of the product from one of a storage component associated with the browser, the user device or a network-based entity separate from the device (2614).

The authorized payment data can include one of payment account data for the server to use to process a payment, a cryptocurrency payment, or a confirmation that the network-based entity processed the payment. The authorized payment data can also include other data or can be other data associated with performing some task separate from any payment or can include a combination of tasks like a payment and a physical event like opening a door.

The data received from the browser on the user device can be received by one of a camera on the device, a sensor component on the device that detects an electrical signal transmitted from an NFC tag on the product, and manually entered data identifying the product. The request to access the server can be initiated from a universal resource locator entered into a browser input field. The request to access the server is initiated via an automated process on the device that initiates the browser and navigates to the server without manual interaction by the user. The camera on the device can be used to take an image associated with the product, wherein data comprises the image and wherein the image can be one of an image of the product and an image of a tag associated with the product. In one aspect, the authorized payment data includes one or more of a one-time use token used by the server for process the payment, payment account data, address data, encrypted data, personal contact data, task instructions data (like a token indicating that a door should be opened), and a confirmation that the network-based entity processed the payment.

The interactive interface can include one of graphical interface, a textual interface, an audible interface or a multimodal interface. The receiving, at the server, of the request to access the server is initiated automatically without manual intervention of the user by the device detecting an electrical signal from one of a product tag or a communication component in the brick and mortar store that automatically initiates the browser on the device and navigates the browser to establish a communication with the server.

Another method can include receiving, at a server and from a browser configured on a device, a request to access the server, the server being associated with a brick and mortar store or other object, transmitting, from the server, an interactive interface to the browser on the device, the interactive interface enabling a user of the device to identify products in the brick and mortar store or tasks associated with the object, receiving, from the browser on the device and via use of the interactive interface, data associated with a product in the brick and mortar store or the object, transmitting, from the server, to the browser and according to a browser application programming interface that defines a protocol for communicating data between the server and the browser, a request associated with a purchase of the product and receiving, at the server, from the browser and according to the browser application programming interface, authorized payment data or other task data, wherein the browser accessed, based on the request, the authorized payment data for the purchase of the product or the other task data from one of a storage component associated with the browser, the device or a network-based entity separate from the device.

In another example, a method can include receiving, from a server, an interactive interface at a browser on a device, the interactive interface enabling a user of the device to identify products in a brick and mortar store, transmitting, from the browser on the device and via use of the interactive interface, data associated with a product in the brick and mortar store, receiving, from the server, at the browser and according to a browser application programming interface that defines a protocol for communicating data between the server and the browser, a request associated with a purchase of the product and transmitting, to the server, from the browser and according to the browser application programming interface, authorized payment data, wherein the browser accessed, based on the request, the authorized payment data for the purchase of the product from one of a storage component associated with the browser, the device or a network-based entity separate from the device.

The method can further include transmitting, to the server, a request to access the server, wherein the request is initiated automatically without manual intervention of the user by the device detecting an electrical signal from one of a product tag or a communication component in the brick and mortar store that automatically initiates the browser on the device and navigates the browser to establish a communication with the server.

Yet another method can include providing an interactive interface on a device within a brick and mortar store, the interactive interface enabling a user of the device to identify products in the brick and mortar store, wherein the device is a personal device of the user, receiving, via use of the interactive interface, data associated with a product in the brick and mortar store and receiving a payment for the product via use by the user of the interactive interface communicating with a server associated with the brick and mortar store and independent of a near field communication station. The interactive interface on the device can be initiated based on a geo-fencing detection of the device being within the brick and mortar store.

Another example method can include transmitting, from an application operating on a device, to a module on the device that controls a user interface and according to an application programming interface that defines a protocol for communicating data between the application and the module on the device that controls the user interface, a request associated with a potential purchase, wherein the request comprises information about the potential purchase and receiving, at the application, from the module that controls the user interface and according to the application programming interface, authorized payment data, wherein the module that controls the user interface retrieved, based on the request, the authorized payment data for the potential purchase from one of the module that controls the user interface, the device operating the module that controls the user interface or a network-based entity separate from the device.

Yet another example method includes receiving, at a module that controls a user interface operating on a device, from an application operating on the device, and according to an application programming interface that defines a protocol for communicating data between the application and the module that controls the user interface, a request associated with a potential purchase, wherein the request comprises information about the potential purchase and transmitting, from the module that controls the user interface and to the application, according to the application programming interface, authorized payment data, wherein the module that controls the user interface retrieved, based on the request, the authorized payment data for the potential purchase from one of the module that controls the user interface, the device operating the module that controls the user interface or a network-based entity separate from the device.

Yet another example method includes receiving, at a network-based server, from a module that controls a user interface operating on a device and according to an application programming interface that defines a protocol for communicating data between the module that controls the user interface and the network-based server, a communication associated with a potential purchase within an application operating on the device, wherein the communication comprises information about the potential purchase based on a request transmitted from the application operating on the device to the module that controls the user interface and transmitting, from the network-based server and to the module that controls the user interface, according to the application programming interface, authorized payment data, wherein the module that controls the user interface transmits the authorized payment data for the potential purchase to the application.

Another example relates to experiences that people can have in a location like a stadium. There are approaches to improving a user's experience in ordering food, for example, in a stadium or other location. The approach can relate to a location-based approach such that works when a user opens up an app or other approach such that a system detects that the user is in the stadium or other defined location. A user opens the app, orders their food, pays with Apple Pay or other payment mechanism, and it tells the user when the food is ready for pickup.

Figure 27:
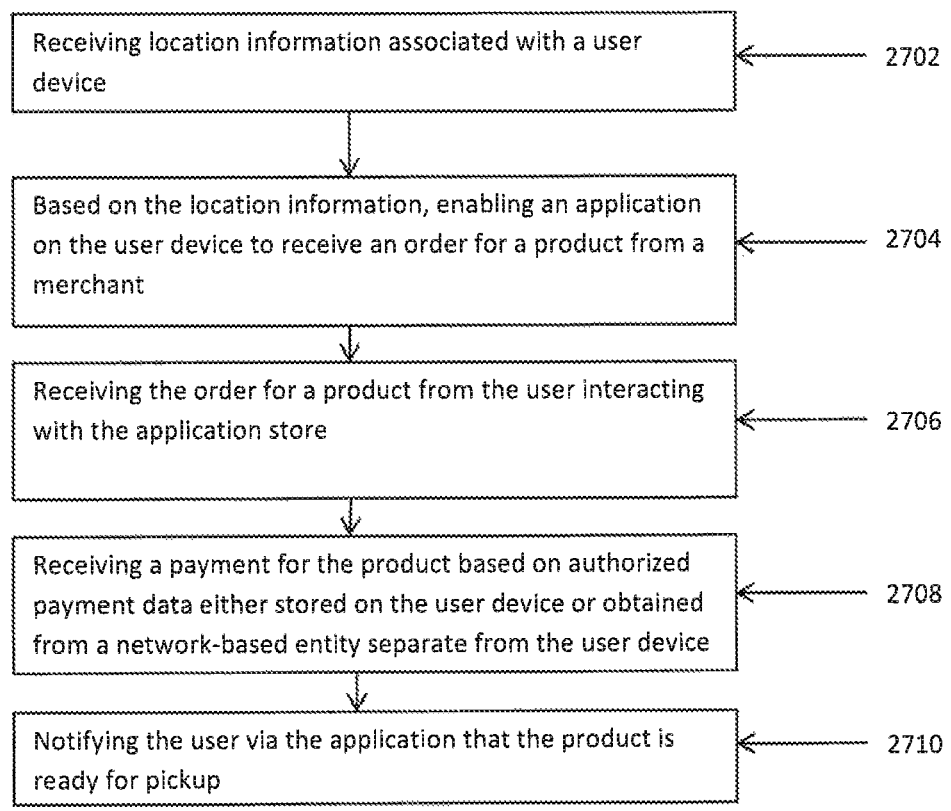

FIG. 27 illustrates an example method. A method includes receiving location information associated with a user device (2702), based on the location information, enabling an application on the user device to receive an order for a product from a merchant (2704), receiving the order for a product from the user interacting with the application (2706), receiving a payment for the product based on authorized payment data either stored on the user device or obtained from a network-based entity separate from the user device (2708) and notifying the user via the application that the product is ready for pickup (2710). The merchant entity can deliver the product to a location where the user can retrieve the product. A software module operating on the user device performs operations can include receiving, at the software module and from the application operating on the user device, and according to an application programming interface that defines a protocol for communicating data between the application and the software module, a request associated with the product to purchase, wherein the request comprises information about a purchasing transaction and transmitting, from the software module and to the application, according to the application programming interface, the authorized payment data, wherein the software module retrieved, based on the request, the authorized payment data for the purchasing transaction from one of the user device or the network-based entity.

The authorized payment data can be associated with a transfer of cryptocurrency from the user to the merchant. The receiving of the payment for the product can occur via an application programming interface programmed into a software module operating on the user device and which transmits authorized payment data to the application. The method can further include sending a message to the user device when the product is ready for pickup. The software module can present a graphical user interface to enable the user the view data about the purchasing transaction.

A method can also be performed from the standpoint of a user device. A method can include transmitting a location associated with a user device to a merchant, wherein an application which manages sales from the merchant is on the user device, receiving, at a software module on the user device and from the application, and according to an application programming interface that defines a protocol for communicating data between the application and the software module, a request associated with a product ordered by a user via the application, wherein the request comprises information about a purchasing transaction and transmitting, from the software module and to the application, according to the application programming interface, authorized payment data, wherein the software module retrieved, based on the request, the authorized payment data for the purchasing transaction from one of the user device or the network-based entity.

In another example, a method can include receiving a scan of a code via a user device operated by a user, receiving, based on the scan, at a server and from a browser configured on the user device, a request to access the server, the server being associated with a store, transmitting, from the server, an interactive interface to the browser on the user device, the interactive interface enabling a user of the device to identify products in the store, receiving, from the browser on the device and via use of the interactive interface, data associated with a product in the store, receiving location data associated with the user, transmitting, from the server, to the browser and according to a browser application programming interface that defines a protocol for communicating data between the server and the browser, a request associated with a purchase of the product and receiving, at the server, from the browser and according to the browser application programming interface, authorized payment data, wherein the browser accessed, based on the request, the authorized payment data for the purchase of the product from one of a storage component associated with the browser, the user device or a network-based entity separate from the device.

Another method can include receiving, at a server and from a browser configured on a device, a request to access the server, the server being associated with a brick and mortar store, transmitting, from the server, an interactive interface to the browser on the device, the interactive interface enabling a user of the device to identify products in the brick and mortar store, receiving, from the browser on the device and via use of the interactive interface, data associated with a product in the brick and mortar store, transmitting, from the server, to the browser and according to a browser application programming interface that defines a protocol for communicating data between the server and the browser, a request associated with a purchase of the product and receiving, at the server, from the browser and according to the browser application programming interface, authorized payment data, wherein the browser accessed, based on the request, the authorized payment data for the purchase of the product from one of a storage component associated with the browser, the device or a network-based entity separate from the device.

Another example method includes receiving, from a server, an interactive interface at a browser on a device, the interactive interface enabling a user of the device to identify products in a brick and mortar store, transmitting, from the browser on the device and via use of the interactive interface, data associated with a product in the brick and mortar store, receiving, from the server, at the browser and according to a browser application programming interface that defines a protocol for communicating data between the server and the browser, a request associated with a purchase of the product and transmitting, to the server, from the browser and according to the browser application programming interface, authorized payment data, wherein the browser accessed, based on the request, the authorized payment data for the purchase of the product from one of a storage component associated with the browser, the device or a network-based entity separate from the device.

In another aspect, a method includes providing an interactive interface on a device within a brick and mortar store, the interactive interface enabling a user of the device to identify products in the brick and mortar store, wherein the device is a personal device of the user, receiving, via use of the interactive interface, data associated with a product in the brick and mortar store and receiving a payment for the product via use by the user of the interactive interface communicating with a server associated with the brick and mortar store and independent of a near field communication station.

Another example method includes transmitting, from an application operating on a device, to a module on the device that controls a user interface and according to an application programming interface that defines a protocol for communicating data between the application and the module on the device that controls the user interface, a request associated with a potential purchase, wherein the request comprises information about the potential purchase and receiving, at the application, from the module that controls the user interface and according to the application programming interface, authorized payment data, wherein the module that controls the user interface retrieved, based on the request, the authorized payment data for the potential purchase from one of the module that controls the user interface, the device operating the module that controls the user interface or a network-based entity separate from the device.

Yet another example includes receiving, at a module that controls a user interface operating on a device, from an application operating on the device, and according to an application programming interface that defines a protocol for communicating data between the application and the module that controls the user interface, a request associated with a potential purchase, wherein the request comprises information about the potential purchase and transmitting, from the module that controls the user interface and to the application, according to the application programming interface, authorized payment data, wherein the module that controls the user interface retrieved, based on the request, the authorized payment data for the potential purchase from one of the module that controls the user interface, the device operating the module that controls the user interface or a network-based entity separate from the device.

In another example, a method includes receiving, at a network-based server, from a module that controls a user interface operating on a device and according to an application programming interface that defines a protocol for communicating data between the module that controls the user interface and the network-based server, a communication associated with a potential purchase within an application operating on the device, wherein the communication comprises information about the potential purchase based on a request transmitted from the application operating on the device to the module that controls the user interface and transmitting, from the network-based server and to the module that controls the user interface, according to the application programming interface, authorized payment data, wherein the module that controls the user interface transmits the authorized payment data for the potential purchase to the application.

A method can include receiving at a user device a scan of a code, initiating on the device, based on the code, a software module operating a user interface, initiating a communication between the software module and a merchant server associated with a merchant, transmitting, via the software module, an identification, received from the user, of a product to purchase from the merchant, transmitting location data associated with the user to the merchant; and transmitting authorized payment data to the merchant server based on payment data retrieved from either the user device or a network entity, wherein the merchant delivers the product to the user based on the location data.

Another method includes receiving, from a software module operating on a user device and at a merchant server associated with a merchant, a communication, where the communication is initiated by the user device scanning a code, receiving, from the software module and by the user, an identification of a product to purchase from the merchant, receiving location data associated with the user at the merchant server, receiving authorized payment data at the merchant server based on payment data retrieved from either the user device or a network entity and delivering the product to the user based on the location data.

Figure 28:
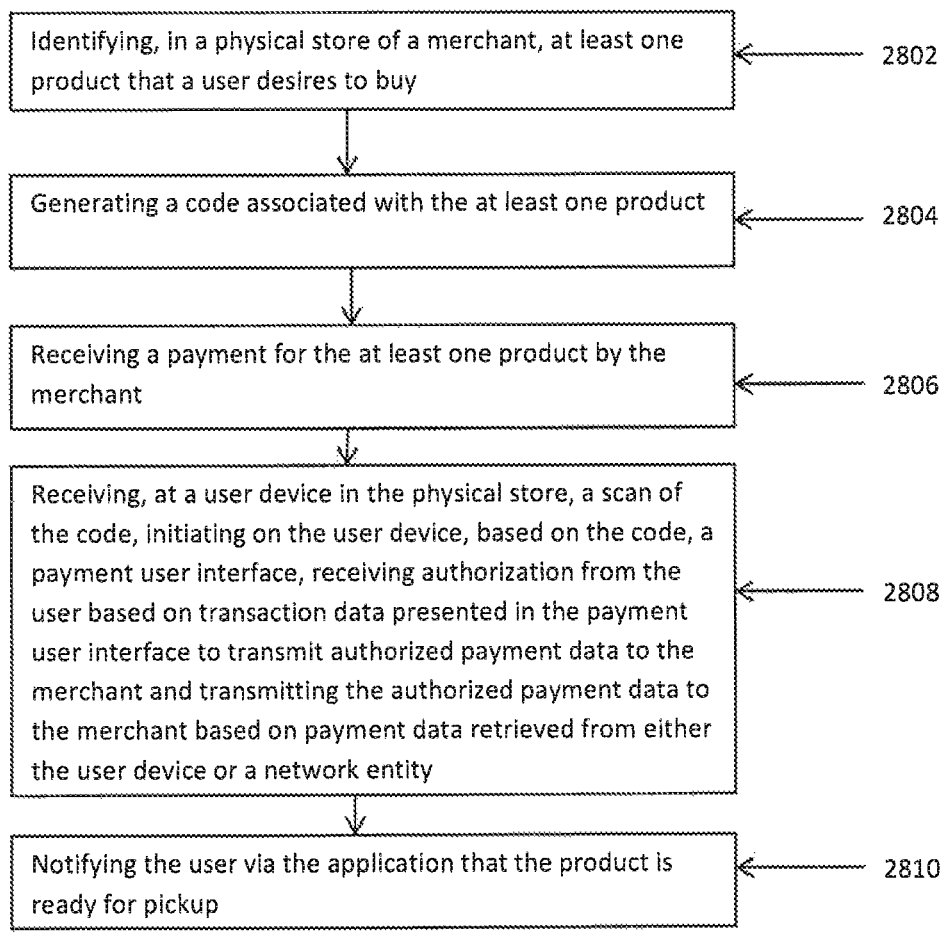

FIG. 28 illustrates another example method. A method in this regard includes identifying, in a physical store of a merchant, at least one product that a user desires to buy (2802), generating a code associated with the at least one product (2804) and receiving a payment for the at least one product by the merchant (2806). The payment can occur according to operations including receiving, at a user device in the physical store, a scan of the code, initiating on the user device, based on the code, a payment user interface, receiving authorization from the user based on transaction data presented in the payment user interface to transmit authorized payment data to the merchant and transmitting the authorized payment data to the merchant based on payment data retrieved from either the user device or a network entity (2810). A software module operating on the user device can perform operations including receiving, at the software module and from the messaging application operating on the user device, and according to an application programming interface that defines a protocol for communicating data between a messaging application and the software module, a request associated with the product to purchase, wherein the request comprises information about a purchasing transaction and transmitting, from the software module and to the messaging application, according to the application programming interface, the authorized payment data, wherein the software module retrieved, based on the request, the authorized payment data for the purchasing transaction from one of the user device or a network-based entity separate from the device.

Transmitting authorized payment data to the merchant entity based on payment data retrieved from either the user device or the network entity can occur via an application programming interface programmed into a software module operating on the user device and which transmits the authorized payment data to the messaging application.

Another example method including receiving, at a merchant entity and via a messaging application, a message from a user device of a user, the message being initiated by the user device scanning a code, receiving, via the messaging application, an identification, received from the user, of a product to purchase from the merchant entity, receiving location data associated with the user at the merchant entity, receiving authorized payment data at the merchant entity for the product based on payment data retrieved from either the user device or a network entity and delivering the product to the user based on the location data. A software module operating on the user device can perform operations including receiving, at the software module and from the messaging application operating on the user device, and according to an application programming interface that defines a protocol for communicating data between the messaging application and the software module, a request associated with the product to purchase, wherein the request comprises information about a purchasing transaction and transmitting, from the software module and to the messaging application, according to the application programming interface, the authorized payment data, wherein the software module retrieved, based on the request, the authorized payment data for the purchasing transaction from one of the user device or a network-based entity separate from the device.

In another example, a method including receiving a scan of a code via a user device operated by a user, receiving, based on the scan, at a server and from a browser configured on the user device, a request to access the server, the server being associated with a store, transmitting, from the server, an interactive interface to the browser on the user device, the interactive interface enabling a user of the device to identify products in the store, receiving, from the browser on the device and via use of the interactive interface, data associated with a product in the store, receiving location data associated with the user, transmitting, from the server, to the browser and according to a browser application programming interface that defines a protocol for communicating data between the server and the browser, a request associated with a purchase of the product and receiving, at the server, from the browser and according to the browser application programming interface, authorized payment data, wherein the browser accessed, based on the request, the authorized payment data for the purchase of the product from one of a storage component associated with the browser, the user device or a network-based entity separate from the device.

Figure 29:
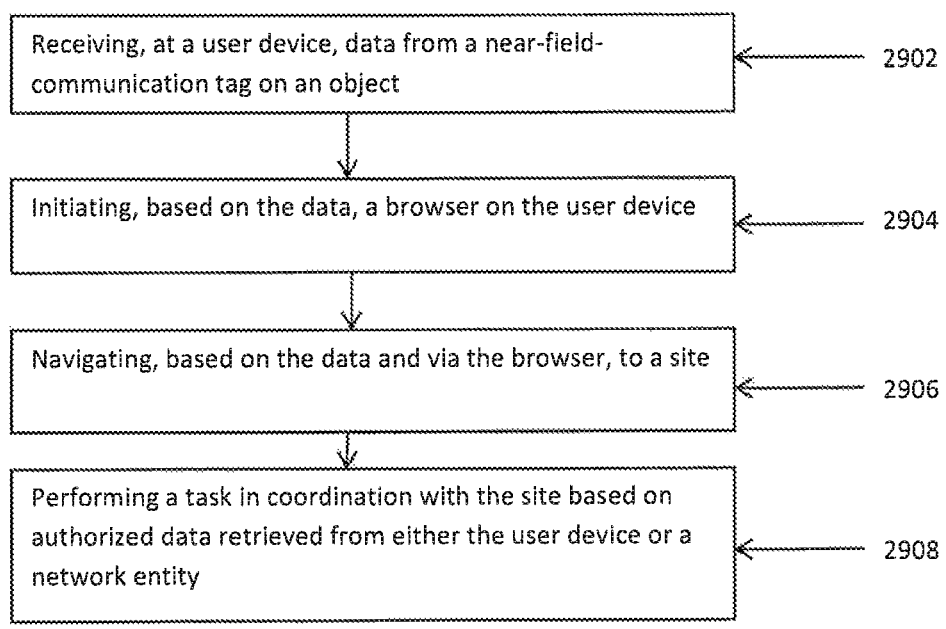

FIG. 29 illustrates another example related to how to use an NFC tag to initiate a browser and perform one or more tasks. An example method includes receiving, at a user device, data from a near-field-communication tag on an object (2902), initiating, based on the data, a browser on the user device (2904), navigating, based on the data and via the browser, to a site (2906) and performing a task in coordination with the site based on authorized data retrieved from either the user device or a network entity (2908). The authorized data can include one or more of (1) authorized payment data and payment for use of the object or to purchase the object; and (2) personal data associated with a user. The navigating to the site and the performing of the task can occur independent of an app downloaded onto the user device. The method can further include transmitting of the authorized data to the site using an application programming interface that defines a protocol for communicating the authorized data between the browser and the site. In another aspect, the method can include receiving a request from the site and at the browser via the application programming interface, wherein the request includes information about a purchasing transaction. The method can further include transmitting, in response to the request and via use of the application programming interface, the authorized data to the site.

Figure 30:
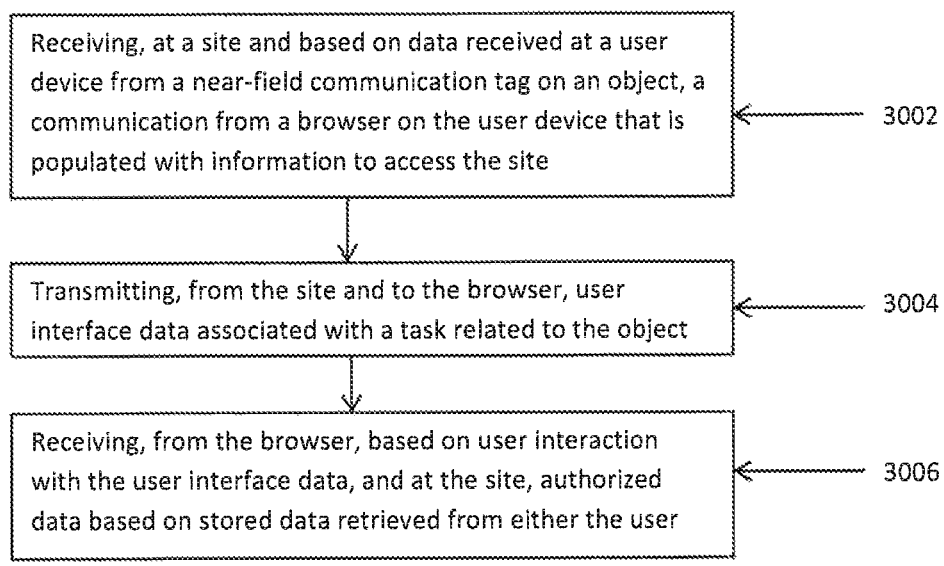

Another method is disclosed in FIG. 30, the method can include receiving, at a site and based on data received at a user device from a near-field communication tag on an object, a communication from a browser on the user device that is populated with information to access the site (3002), transmitting, from the site and to the browser, user interface data associated with a task related to the object (3004) and receiving, from the browser, based on user interaction with the user interface data, and at the site, authorized data based on stored data retrieved from either the user device or a network entity (3006).

The method can further include transmitting, from the site, to the browser and according to the application programming interface, a request associated with the object, wherein the request comprises information about the task. The task can include one or more of: (1) a payment to purchase the object; (2) a rental associated with the object; (3) opening a door; and (4) a combination of a payment event and a physical task. The authorized data can be associated with a transfer of cryptocurrency from the user device to the site.

Figure 31:
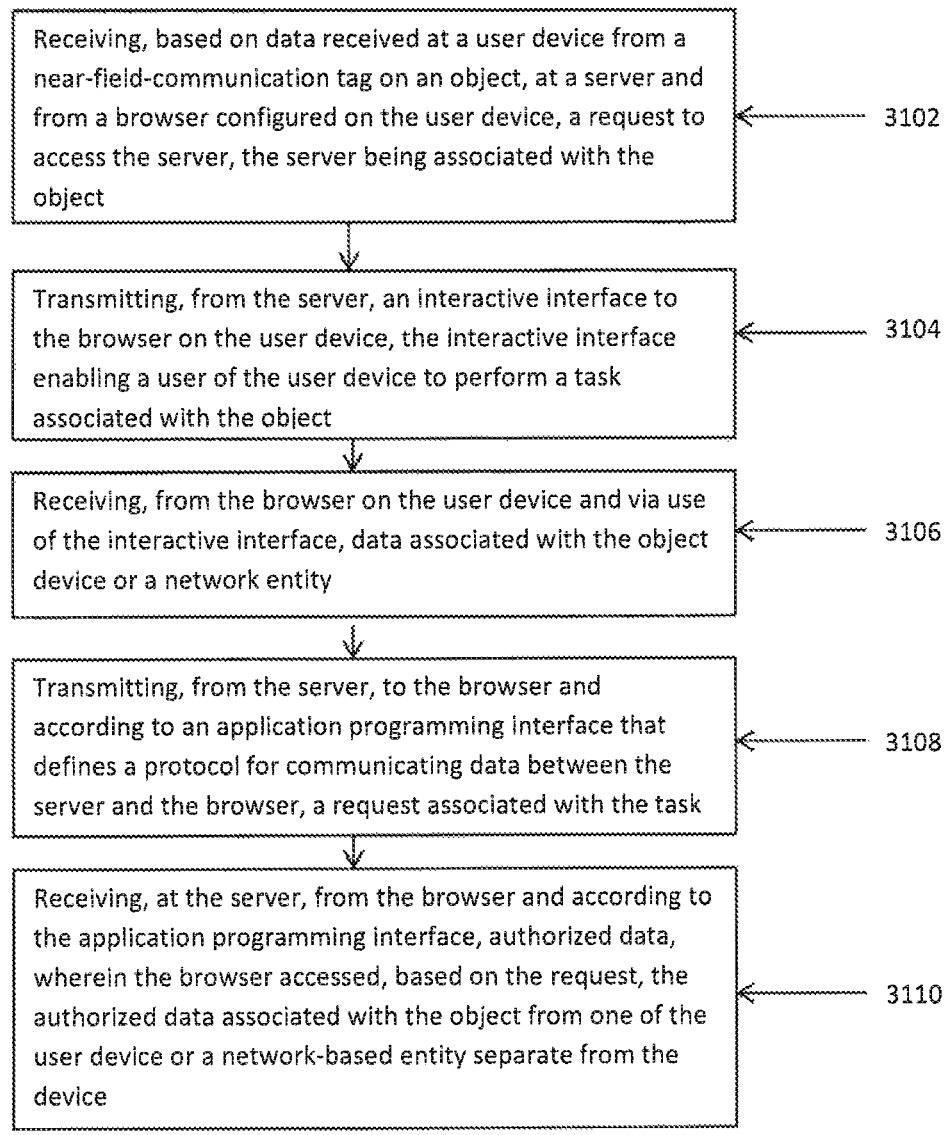

FIG. 31 illustrates another method example from a server standpoint. A method includes receiving, based on data received at a user device from a near-field-communication tag on an object, at a server and from a browser configured on the user device, a request to access the server, the server being associated with the object (3102), transmitting, from the server, an interactive interface to the browser on the user device, the interactive interface enabling a user of the user device to perform a task associated with the object (3104), receiving, from the browser on the user device and via use of the interactive interface, data associated with the object (3106), transmitting, from the server, to the browser and according to an application programming interface that defines a protocol for communicating data between the server and the browser, a request associated with the task (3108) and receiving, at the server, from the browser and according to the application programming interface, authorized data, wherein the browser accessed, based on the request, the authorized data associated with the object from one of the user device or a network-based entity separate from the device (3110).

The request to access the server can be initiated via an automated process on the device that, based on the data from the near-field-communication tag, initiates the browser and navigates to the server without manual interaction by the user. The authorized data can include one or more of a one-time use token used by the server for process the payment, payment account data, address data, encrypted data, personal contact data, personal identity data, and a confirmation that the network-based entity processed the payment. The task can include one or more of: (1) a payment to purchase the object; (2) a rental associated with the object; (3) opening a door; and (4) a combination of a payment event and a physical task.

The receiving, at the server, the request to access the server can be initiated automatically without manual intervention of the user by the user device detecting an electrical signal from the near-field-communication tag that automatically initiates the browser on the user device and navigates the browser to establish a communication with the server.

Any example above related to a brick-and-mortar store can also apply outside of the store with codes/tags on objects and can include other tasks beyond just a payment for a product. Rentals, opening doors, a combination of tasks of different types, etc., can apply to any in-store description above.

Examples within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

The various examples described above are provided by way of illustration only and should not be construed to limit the scope of the disclosure. Various modifications and changes may be made to the principles described herein without following the example examples and applications illustrated and described herein, and without departing from the spirit and scope of the disclosure. Claim language reciting "at least one of" a set indicates that one member of the set or multiple members of the set satisfy the claim. Notably, any feature described in any example or embodiment can be combined with any other feature of any example of embodiment. For example, any feature discussed with respect to a search engine example can be applicable and interchangeable with a social media example, or a product purchase management engine example.

We claim:

1. A method comprising:
   establishing, from a site and based on a user device receiving a universal resource locator (URL) from an object based on the user device interacting with the object, a connection with the user device;
   transmitting program code from the site to the user device, the program code enabling a user, via a graphical interface presented on the user device, to perform a task, wherein the task is independent of a cryptocurrency payment and wherein, on the user device, the program code transmits to a software module a request associated with the task, wherein the request comprises information about the task, and wherein the software module comprises a software module application programming interface that defines a protocol for communicating data between the program code and the software module and receives, at the program code, from the software module and via the software module application programming interface, authorized data, wherein the software module accesses or receives, based on the request, the authorized data from the user device or a network-based entity; and
   receiving, at the site, the authorized data from the user device.

2. The method of claim 1, further comprising:
   performing the task in coordination with the site and based on the authorized data.

3. The method of claim 1, wherein the authorized data can be used in at least part to complete the task.

4. The method of claim 1, wherein the authorized data comprises one or more of (1) authorized payment data to pay for use of an item associated with the object or to purchase the item associated with object; and (2) personal data associated with a user.

5. The method of claim 1, wherein the authorized data comprises authorized payment data.

6. The method of claim 1, wherein the transmitting of the program code from the site and the performing of the task occurs independent of a full application downloaded onto the user device.

7. A device comprising:
a processor;
a near-field communication component; and
a computer-readable medium storing instructions which, when executed by the processor, cause the processor to perform operations comprising:
receiving a universal resource locator (URL) from an object based on the device interacting with the object via the near-field communication component;
establishing, based on the URL, a connection with a site;
receiving program code from the site, the program code enabling a user of the device to perform a task via a graphical interface, wherein the task is independent of a cryptocurrency payment;
transmitting, from the program code, to a software module on the device, a request associated with the task, wherein the request comprises information about the task, and wherein the software module comprises a software module application programming interface that defines a protocol for communicating data between the program code and the software module; and
receiving, at the program code, from the software module and via the software module application programming interface, authorized data for performing the task, wherein the software module accesses or receives, based on the request, the authorized data from the device or a network-based entity.

8. The device of claim 7, wherein receiving the program code does not include downloading a full application that is later viewable and selectable on the device.

9. The device of claim 7, wherein the computer-readable medium stores additional instructions which, when executed by the processor, cause the processor to perform operations further comprising:
performing the task in coordination with the site and based on the authorized data.

10. The device of claim 7, wherein the authorized data can be used in at least part to complete the task.

11. The device of claim 7, wherein the authorized data comprises one or more of (1) authorized payment data to pay for use of an item associated with the object or to purchase the item associated with object; and (2) personal data associated with a user.

12. A method comprising:
establishing, based on a device receiving a universal resource locator (URL) from an object based on the device interacting with the object a connection between the device and a site as identified by the URL;
transmitting, to the device and from the site, a program code, wherein a software module on the device is configured with an application programming interface that defines a protocol for communicating authorized data between the software module and the program code, wherein the device, based on the program code, presents a user interface, the user interface enabling a user to perform a task, wherein the task is independent of a cryptocurrency payment; and
receiving, based on user interaction with the user interface and at the program code and at the site, authorized data for performing the task based on stored data retrieved from the device, wherein the authorized data is received at the program code according to the application programming interface.

13. The method of claim 12, wherein the program code does not comprise a full application that is downloaded on the device and viewable or selectable from a group of full applications downloaded on the device.

14. The method of claim 12, wherein the task comprises making a payment and wherein the authorized data comprises authorized payment data.

15. The method of claim 12, wherein the authorized data is retrieved from a memory configured on the device.

16. The method of claim 12, wherein the task comprises at least one of renting an item, registering for a program, opening a door, performing a physical function or a combination of different tasks.

17. The method of claim 12, wherein the object comprises one of a near-field communication tag a QR code or an image.

18. The method of claim 12, wherein the authorized data comprises one or more of a one-time use token used by the site for processing a payment, payment data, address data, encrypted data, personal contact data, personal identity data, and a confirmation that a network-based entity processed the payment.

19. The method of claim 12, wherein transmitting the program code from the site occurs independent of receiving a full application downloaded onto the device.

* * * * *